(12) United States Patent
Motozuka et al.

(10) Patent No.: US 11,876,591 B2
(45) Date of Patent: *Jan. 16, 2024

(54) TRANSMITTING DEVICE, TRANSMISSION METHOD, RECEIVING DEVICE, AND RECEPTION METHOD

(71) Applicant: Panasonic Intellectual Property Corporation of America, Torrance, CA (US)

(72) Inventors: Hiroyuki Motozuka, Kanagawa (JP); Naganori Shirakata, Kanagawa (JP); Masataka Irie, Kanagawa (JP); Takenori Sakamoto, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 395 days.

This patent is subject to a terminal disclaimer.

(21) Appl. No.: 17/131,408

(22) Filed: Dec. 22, 2020

(65) Prior Publication Data

US 2021/0152674 A1 May 20, 2021

Related U.S. Application Data

(63) Continuation of application No. 16/112,266, filed on Aug. 24, 2018, now Pat. No. 10,911,580, which is a
(Continued)

(30) Foreign Application Priority Data

Feb. 29, 2016 (JP) .................................. 2016-037328
Mar. 11, 2016 (JP) .................................. 2016-048375
(Continued)

(51) Int. Cl.
*H04L 69/22* (2022.01)
*H04B 7/06* (2006.01)
(Continued)

(52) U.S. Cl.
CPC ............. *H04B 7/0695* (2013.01); *H04L 9/40* (2022.05); *H04L 25/0216* (2013.01);
(Continued)

(58) Field of Classification Search
CPC ... H04B 7/0695; H04B 7/0413; H04W 28/06; H04W 84/12; H04W 28/00; H04L 9/40;
(Continued)

(56) References Cited

U.S. PATENT DOCUMENTS 9,363,707 B2 6/2016 Merlin et al.
9,655,112 B2 5/2017 Ghosh et al.
(Continued)

FOREIGN PATENT DOCUMENTS

EP 2811717 A1 12/2014
JP 2012-523774 A 10/2012
(Continued)

OTHER PUBLICATIONS

IEEE P802.11-15/01358r3, Wireless LANs, "Specification Framework for TGay", Mar. 21, 2016 (8 pages).
(Continued)

*Primary Examiner* — Hanh N Nguyen
(74) *Attorney, Agent, or Firm* — Seed IP Law Group LLP

(57) ABSTRACT

A reception apparatus includes reception circuitry and decoding circuitry. The reception receives a signal including a legacy header field, an enhanced directional multi-gigabit (EDMG) header field, and a data field. The decoding circuitry decodes data included in the data field of the received signal. The legacy header field includes a Length field comprising multiple bits. The reception apparatus is an EDMG terminal, and a subset of the multiple bits of the Length field included in the legacy header field is used to indicate bandwidth over which the signal is transmitted. Remaining bits of the Length field included in the legacy
(Continued)

header field are used to indicate data length of the received signal.

8 Claims, 117 Drawing Sheets

Related U.S. Application Data continuation of application No. PCT/JP2017/006473, filed on Feb. 22, 2017.

(30) Foreign Application Priority Data

| | | |
|---|---|---|
| Apr. 25, 2016 | (JP) | 2016-087003 |
| Oct. 7, 2016 | (JP) | 2016-199336 |
| Dec. 16, 2016 | (JP) | 2016-244730 |

(51) Int. Cl.
| | |
|---|---|
| *H04W 84/12* | (2009.01) |
| *H04W 28/06* | (2009.01) |
| *H04L 9/40* | (2022.01) |
| *H04L 27/26* | (2006.01) |
| *H04L 25/02* | (2006.01) |
| *H04B 7/0413* | (2017.01) |

(52) U.S. Cl.
CPC ...... *H04L 27/2603* (2021.01); *H04L 27/2604* (2013.01); *H04L 27/2605* (2013.01); *H04L 69/22* (2013.01); *H04W 28/06* (2013.01); *H04W 84/12* (2013.01); *H04B 7/0413* (2013.01); *H04L 25/025* (2013.01); *H04L 25/0256* (2013.01); *H04L 25/0258* (2013.01)

(58) Field of Classification Search
CPC ............. H04L 25/0216; H04L 27/2603; H04L 27/2604; H04L 69/22; H04L 25/025; H04L 25/0256; H04L 25/0258; H04L 27/2602
See application file for complete search history.

(56) References Cited

U.S. PATENT DOCUMENTS

| | | | |
|---|---|---|---|
| 9,838,107 B2 | 12/2017 | Jo et al. | |
| 9,949,259 B2 | 4/2018 | Eitan | |
| 10,021,695 B2* | 7/2018 | Eitan | H04B 7/0426 |
| 10,033,564 B2 | 7/2018 | Eitan et al. | |
| 10,079,709 B2 | 9/2018 | Sun et al. | |
| 10,187,239 B2 | 1/2019 | Wu et al. | |
| 10,244,531 B2 | 3/2019 | Eitan et al. | |
| 10,644,899 B2 | 5/2020 | Motozuka et al. | |
| 10,911,580 B2* | 2/2021 | Motozuka | H04W 28/06 |
| 2010/0260159 A1 | 10/2010 | Zhang et al. | |
| 2016/0249332 A1 | 8/2016 | Xin et al. | |
| 2016/0323878 A1* | 11/2016 | Ghosh | H04W 28/065 |
| 2016/0323890 A1 | 11/2016 | Cordeiro | |

FOREIGN PATENT DOCUMENTS

| | | |
|---|---|---|
| JP | 2013533680 A | 8/2013 |
| WO | 2011156201 A2 | 12/2011 |

OTHER PUBLICATIONS

IEEE 802.11-15/1472r4, "Task Group AY Jan. 2016 Agenda", Jan. 18, 2016 (50 pages).
IEEE 802.11-16/0076r0, "1 lay Features and Design Principles", Jan. 17, 2016 (9 pages).
IEEE 802.11-16/1422r0, "L-Header spoofing and bit reuse", Nov. 8, 2016 (18 pages).
Indian Examination Report dated Oct. 14, 2021 for the related Indian Patent Application No. 201847031623.
Assaf Kasher (Intel): "SC 64-QAM in clause 21 PHY", IEEE Draft; IEEE 802.11-15/1342r0, IEEE-SA Mentor, Piscataway, NJ USA, vol. 802.11m, Nov. 8, 2015 (Nov. 8, 2015), pp. 1-17, XP068099317.
Alecsander Eitan (Qualcomm): "PHY Frame Format proposal for 11ay", IEEE 802.11-16/0061-00-00, Jan. 18, 2016.
Assaf Kasher (Intel): IEEE 802.11-16/0220r1, "Clause 20 SC MCS Extension", Feb. 2, 2016.
IEEE 802.11ad(TM)—2012 IEEE Standard for Information Technology—Telecommunications and information exchange between systems Local and Metropolitan area networks—Specific requirements Part 11: Wireless LAN Medium Access Control (MAC) and Physical Layer (PHY) Specifications Amendment 3: Enhancements for Very High Throughput in the 60 GHz Band, Dec. 28, 2012.
IEEE Std 802.11ac(TM)—2013, IEEE Standard for Information Technology—Telecommunications and information exchange between systems Local and Metropolitan area networks—Specific requirements Part 11: Wireless LAN Medium Access Control (MAC) and Physical Layer (PHY) Specifications Amendment 4: Enhancements for Very High Throughput for Operation in Bands below 6 GHZ, Dec. 18, 2013.
International Search Report of PCT application No. PCT/JP2017/006473 dated May 16, 2017.
The Extended European Search Report dated Dec. 5, 2018 for the related European Patent Application No. 17759754.9.

* cited by examiner

FIG. 6

| Info | CB | CA | MIMO | OF | Res |
|------|----|----|------|----|-----|
| bit  | 0  | 1  | 2  3 | 4  | 5   |

FIG. 7

| MCS | N_CBPB | R | N_Info | MAX NO. OF BITS IN Info FIELD |
|-----|--------|-----|--------|-------------------------------|
| 1 | 448 | 1/4 | 21 | 4 |
| 2 | 448 | 1/2 | 42 | 5 |
| 3 | 448 | 5/8 | 52 | 5 |
| 4 | 448 | 3/4 | 63 | 5 |
| 5 | 448 | 13/16 | 68 | 6 |
| 6 | 896 | 1/2 | 42 | 5 |
| 7 | 896 | 5/8 | 52 | 5 |
| 8 | 896 | 3/4 | 63 | 5 |
| 9 | 896 | 13/16 | 68 | 6 |
| 10 | 1792 | 1/2 | 42 | 5 |
| 11 | 1792 | 5/8 | 52 | 5 |
| 12 | 1792 | 3/4 | 63 | 5 |

FIG. 9

| Info | WB | CA | MIMO | | OF | Res |
|---|---|---|---|---|---|---|
| bit | 0 | 1 | 2 | 3 | 4 | 5 |
| value | 1 | 0 | 0 | 0 | 0 | 0 |

FIG. 10

| Length | N_BLKS |
|---|---|
| 1 TO 68 | 1 |
| 69 TO 136 | 2 |
| 137 TO 273 | 3 |
| 274 TO 341 | 4 |
| 342 TO 409 | 5 |
| 410 TO 546 | 6 |
| 547 TO 614 | 7 |
| 615 TO 682 | 8 |
| 683 TO 819 | 9 |
| 820 TO 887 | 10 |
| 888 TO 955 | 11 |
| 956 TO 1092 | 12 |
| ... | ... |

FIG. 13

| MCS | N_ratio | N_Info | MAX NO. OF BITS IN Info FIELD |
|---|---|---|---|
| 1 | 14 | 21 | 4 |
| 2 | 28 | 42 | 5 |
| 3 | 35 | 52 | 5 |
| 4 | 42 | 63 | 5 |
| 5 | 45.5 | 68 | 6 |
| 6 | 56 | 42 | 5 |
| 7 | 70 | 52 | 5 |
| 8 | 84 | 63 | 5 |
| 9 | 91 | 68 | 6 |
| 10 | 112 | 42 | 5 |
| 11 | 140 | 52 | 5 |
| 12 | 168 | 63 | 5 |

FIG. 14

| | CONDITION 1 (MAX VALUE OF N_BLKS) | CONDITION 2 |
|---|---|---|
| MCS1 | 18725 | REMAINDER OF DIVISION BY 3 IS NOT 1 |
| MCS2 | 9363 | REMAINDER OF DIVISION BY 3 IS NOT 1 |
| MCS3 | 7491 | REMAINDER OF DIVISION BY 3 IS NOT 1 |
| MCS4 | 6242 | REMAINDER OF DIVISION BY 3 IS NOT 1 |
| MCS5 | 5762 | REMAINDER OF DIVISION BY 3 IS NOT 1 |
| MCS6 | 4682 | — |
| MCS7 | 3746 | — |
| MCS8 | 3121 | — |
| MCS9 | 2881 | — |
| MCS10 | 2341 | — |
| MCS11 | 1873 | — |
| MCS12 | 1561 | — |

FIG. 15

| Length | N_BLKS |
|---|---|
| 1 TO 42 | 2 |
| 43 TO 84 | 3 |
| 85 TO 126 | 5 |
| 127 TO 168 | 6 |
| 169 TO 210 | 8 |
| 211 TO 252 | 9 |
| 253 TO 294 | 11 |
| 295 TO 336 | 12 |
| ... | ... |

FIG. 30

| EXTENSION MCS NUMBER | Base length FORMULA | NUMBER OF BITS TO REPLACE | CORRECTION TERM | VALUE OF MCS FIELD |
|---|---|---|---|---|
| 9.1 | $\left\lfloor \frac{N_{BLKS} * 4}{3} \right\rfloor * 42$ | 5 | 32 | 6 |
| 12.1 | $\left\lfloor \left\lfloor \frac{N_{BLKS} * 4}{3} \right\rfloor * 52.5 \right\rfloor$ | 5 | 32 | 7 |
| 12.2 | $\left\lfloor \frac{N_{BLKS} * 4}{3} \right\rfloor * 63$ | 5 | 32 | 8 |
| 12.3 | $\left\lfloor \left\lfloor \frac{N_{BLKS} * 4}{3} \right\rfloor * 68.25 \right\rfloor$ | 5 | 32 | 9 |
| 12.4 | $\left\lfloor \frac{N_{BLKS} * 4}{3} \right\rfloor * 84$ | 6 | 64 | 10 |
| 12.5 | $\left\lfloor \frac{N_{BLKS} * 4}{3} \right\rfloor * 105$ | 6 | 64 | 11 |
| 12.6 | $\left\lfloor \frac{N_{BLKS} * 4}{3} \right\rfloor * 126$ | 6 | 64 | 12 |

FIG. 32

| EXTENSION MCS NUMBER | Base_Length_1 | Base_Length_2 | VALUE OF MCS FIELD |
|---|---|---|---|
| 9.1 | $\left\lfloor \frac{N_{BLKS} * 4}{3} \right\rfloor * 42$ | $\left\lfloor \frac{N_{BLKS} * 56}{39} \right\rfloor * 68.25$ | 6 |
| 12.1 | $\left\lfloor \frac{N_{BLKS} * 4}{3} \right\rfloor * 52.5$ | $\left\lfloor \frac{N_{BLKS} * 8}{3} \right\rfloor * 68.25$ | 7 |
| 12.2 | $\left\lfloor \frac{N_{BLKS} * 4}{3} \right\rfloor * 63$ | $\left\lfloor \frac{N_{BLKS} * 112}{39} \right\rfloor * 68.25$ | 8 |
| 12.3 | $\left\lfloor \frac{N_{BLKS} * 4}{3} \right\rfloor * 68.25$ | $N_{BLKS} * 210$ | 9 |
| 12.4 | $\left\lfloor \frac{N_{BLKS} * 4}{3} \right\rfloor * 84$ | $N_{BLKS} * 252$ | 10 |
| 12.5 | $\left\lfloor \frac{N_{BLKS} * 4}{3} \right\rfloor * 105$ | $N_{BLKS} * 273$ | 11 |
| 12.6 | $\left\lfloor \frac{N_{BLKS} * 4}{3} \right\rfloor * 126$ | $\left\lfloor \frac{N_{BLKS} * 56}{13} \right\rfloor * 68.25$ | 12 |

FIG. 33

| EXTENSION MCS NUMBER | N_CBPB | R |
|---|---|---|
| 9.1 | 896 | 7/8 |
| 12.1 | 1792 | 13/16 |
| 12.2 | 1792 | 7/8 |
| 12.3 | 2688 | 5/8 |
| 12.4 | 2688 | 3/4 |
| 12.5 | 2688 | 13/16 |
| 12.6 | 2688 | 7/8 |

FIG. 38

| Field name | Field name in 11ad standard | Num. of bits | Start bit | Content |
|---|---|---|---|---|
| Scrambler Initialization | Scrambler Initialization | 7 | 0 | Scrambler initialization value |
| MCS | MCS | 5 | 7 | Value of MCS for appropriately computing TXTIME |
| Channel Aggregation | Length | 1 | 12 | 1 in the case of using channel aggregation, 0 otherwise |
| Channel Occupation1 | | 1 | 13 | Channel occupation Y/N (lowest channel) |
| Channel Occupation2 | | 1 | 14 | Channel occupation Y/N (2nd channel) |
| Channel Occupation3 | | 1 | 15 | Channel occupation Y/N (3rd channel) |
| Channel Occupation4 | | 1 | 16 | Channel occupation Y/N (4th channel) |
| Length | | 13 | 17 | Value of Length for appropriately computing TXTIME |
| Additional PPDU | Additional PPDU | 1 | 30 | Set to 0 in the case of EDMG PHY frame. |
| Packet Type | Packet Type | 1 | 31 | Arbitrary |
| Training Length | Training Length | 5 | 32 | Set to 0 in the case of EDMG PHY frame. |
| Aggregation | Aggregation | 1 | 37 | Arbitrary |
| Beam Tracking Request | Beam Tracking Request | 1 | 38 | Set to 0 in the case of EDMG PHY frame. |
| Last RSSI | Last RSSI | 4 | 39 | Received signal strength indicator (RSSI) of last received frame |
| Turnaround | Turnaround | 1 | 43 | Arbitrary |
| MIMO | Reserved | 1 | 44 | Set to 1 in the case of EDMG PHY MIMO frame. Set to 0 in the case of EDMG PHY non-MIMO frame. |
| Reserved | | 1 | 45 | Set to 0 in the case of EDMG PHY frame. |
| EDMG (EDMG-Header-A) Indication | | 1 | 46 | Set to 1 in the case of EDMG PHY frame. |
| Reserved | | 1 | 47 | Set to 0 in the case of EDMG PHY frame. |
| HCS | HCS | 16 | 48 | Header check sequence (CRC value) |

FIG. 41
PHY FRAME CONFIGURATION OF Data3 PACKET
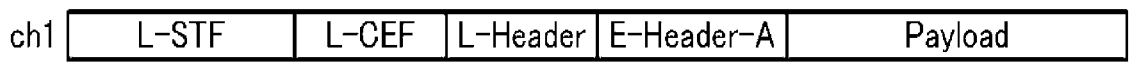
ch2 (NO RADIO SIGNAL OUTPUT ON ch2)
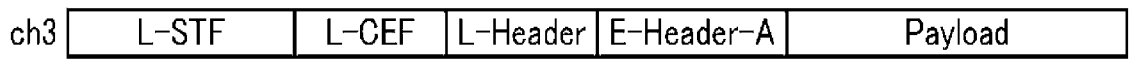
CA FIELD = 1
CO FIELD = 1011
MIMO FIELD = 0

FIG. 44

CASE IN WHICH NUMBER OF USABLE CHANNELS IS 4 CHANNELS

|  | NUMBER OF CHANNELS USED | NUMBER OF CHANNEL COMBINATIONS |
|---|---|---|
| SINGLE-CHANNEL TRANSMISSION | 1 | 4 |
| CHANNEL BONDING | 2 | 2 |
|  | 3 | 1 |
|  | 4 | 1 |
| CHANNEL AGGREGATION | 2 | 6 |
|  | 3 | 4 |
|  | 4 | 1 |
| TOTAL | 1 TO 4 | 19 |

FIG. 45

CASE IN WHICH NUMBER OF USABLE CHANNELS IS 8 CHANNELS

|  | NUMBER OF CHANNELS USED | NUMBER OF CHANNEL COMBINATIONS |
|---|---|---|
| SINGLE-CHANNEL TRANSMISSION | 1 | 8 |
| CHANNEL BONDING | 2 | 4 |
|  | 3 | 2 |
|  | 4 | 2 |
| CHANNEL AGGREGATION | 2 | 28 |
|  | 3 | 56 |
|  | 4 | 70 |
| TOTAL | 1 TO 4 | 170 |

FIG. 47

| Field name | Field name in 11ad standard | Num. of bits | Start bit | Content |
|---|---|---|---|---|
| Scrambler Initialization | Scrambler Initialization | 7 | 0 | Scrambler initialization value |
| MCS | MCS | 5 | 7 | Value of MCS for appropriately computing TXTIME |
| BW index | Length | 5 | 12 | Used channel index |
| Length | | 13 | 17 | Value of Length for appropriately computing TXTIME |
| Additional PPDU | Additional PPDU | 1 | 30 | Set to 0 in the case of EDMG PHY frame. |
| Packet Type | Packet Type | 1 | 31 | Arbitrary |
| Training Length | Training Length | 5 | 32 | Set to 0 in the case of EDMG PHY frame. |
| Aggregation | Aggregation | 1 | 37 | Arbitrary |
| Beam Tracking Request | Beam Tracking Request | 1 | 38 | Set to 0 in the case of EDMG PHY frame. |
| Last RSSI | Last RSSI | 4 | 39 | Received signal strength indicator (RSSI) of last received frame |
| Turnaround | Turnaround | 1 | 43 | Arbitrary |
| MIMO | Reserved | 1 | 44 | Set to 1 in the case of EDMG PHY MIMO frame. Set to 0 in the case of EDMG PHY non-MIMO frame. |
| Reserved | | 1 | 45 | Set to 0 in the case of EDMG PHY frame. |
| EDMG (EDMG-Header-A) Indication | | 1 | 46 | Set to 1 in the case of EDMG PHY frame. |
| Reserved | | 1 | 47 | Set to 0 in the case of EDMG PHY frame. |
| HCS | HCS | 16 | 48 | Header check sequence (CRC value) |

FIG. 48A

| BW Index | OPERATING MODE | | OCCUPIED CHANNEL NUMBER(S) | 1ST CHANNEL NUMBER | 2ND CHANNEL NUMBER | ch1 | ch2 | ch3 | ch4 | ch5 | ch6 |
|---|---|---|---|---|---|---|---|---|---|---|---|
| 0 | 2.16 GHz CB | (a) | 1 | 1 | - | ■ | | | | | |
| | | (b) | 2 | 2 | - | | ■ | | | | |
| | | (c) | 3 | 3 | - | | | ■ | | | |
| | | (d) | 4 | 4 | - | | | | ■ | | |
| | | (e) | 5 | 5 | - | | | | | ■ | |
| | | (f) | 6 | 6 | - | | | | | | ■ |
| 1 | 4.32 GHz CB | (a) | 1, 2 | 9 | - | ■ | ■ | | | | |
| | | (b) | 3, 4 | 11 | - | | | ■ | ■ | | |
| | | (c) | 5, 6 | 13 | - | | | | | ■ | ■ |
| 2 | 6.48 GHz CB | (a) | 1,2,3 | 17 | - | ■ | ■ | ■ | | | |
| | | (b) | 4,5,6 | 20 | - | | | | ■ | ■ | ■ |
| 3 | 8.64 GHz CB | (a) | 1,2,3,4 | 25 | - | ■ | ■ | ■ | ■ | | |
| 4 | 2.16 + 2.16 GHz CA | (a) | 1,2 | 1 | 2 | ■ | ■ | | | | |
| | | (b) | 3,4 | 3 | 4 | | | ■ | ■ | | |
| | | (c) | 5,6 | 5 | 6 | | | | | ■ | ■ |
| 5 | 2.16 + 2.16 GHz CA | (a) | 1,3 | 1 | 3 | ■ | | ■ | | | |
| | | (b) | 2,5 | 2 | 5 | | ■ | | | ■ | |
| | | (c) | 4,6 | 4 | 6 | | | | ■ | | ■ |
| 6 | 2.16 + 2.16 GHz CA | (a) | 1,5 | 1 | 5 | ■ | | | | ■ | |
| | | (b) | 2,4 | 2 | 4 | | ■ | | ■ | | |
| | | (c) | 3,6 | 3 | 6 | | | ■ | | | ■ |
| 7 | 2.16 + 2.16 GHz CA | (a) | 1,4 | 1 | 4 | ■ | | | ■ | | |
| | | (b) | 3,5 | 3 | 5 | | | ■ | | ■ | |
| | | (c) | 2,6 | 2 | 6 | | ■ | | | | ■ |
| 8 | 2.16 + 2.16 GHz CA | (a) | 1,6 | 1 | 6 | ■ | | | | | ■ |
| | | (b) | 2,3 | 2 | 3 | | ■ | ■ | | | |
| | | (c) | 4,5 | 4 | 5 | | | | ■ | ■ | |
| 9 | 4.32 + 4.32 GHz CA | - | 1,2,3,4 | 9 | 11 | ■ | ■ | ■ | ■ | | |
| 10 | 4.32 + 4.32 GHz CA | - | 3,4,5,6 | 11 | 13 | | | ■ | ■ | ■ | ■ |
| 11 | 4.32 + 4.32 GHz CA | - | 1,2,5,6 | 9 | 13 | ■ | ■ | | | ■ | ■ |

FIG. 48B

| BW Index | OPERATING MODE | | OCCUPIED CHANNEL NUMBER(S) | 1ST CHANNEL NUMBER | 2ND CHANNEL NUMBER | ch1 | ch2 | ch3 | ch4 | ch5 | ch6 |
|---|---|---|---|---|---|---|---|---|---|---|---|
| 12 | 4.32 + 2.16 GHz CA | (a) | 1,2,3 | 9 | 3 | | | | | | |
| | | (b) | 4,5,6 | 13 | 4 | | | | | | |
| 13 | 4.32 + 2.16 GHz CA | (a) | 1,2,4 | 9 | 4 | | | | | | |
| | | (b) | 3,5,6 | 13 | 3 | | | | | | |
| 14 | 4.32 + 2.16 GHz CA | (a) | 1,3,4 | 11 | 1 | | | | | | |
| | | (b) | 2,5,6 | 13 | 2 | | | | | | |
| 15 | 4.32 + 2.16 GHz CA | (a) | 1,5,6 | 13 | 1 | | | | | | |
| | | (b) | 2,3,4 | 11 | 2 | | | | | | |
| 16 | 4.32 + 2.16 GHz CA | (a) | 1,2,5 | 9 | 5 | | | | | | |
| | | (b) | 3,4,6 | 11 | 6 | | | | | | |
| 17 | 4.32 + 2.16 GHz CA | (a) | 1,2,6 | 9 | 6 | | | | | | |
| | | (b) | 3,4,5 | 11 | 5 | | | | | | |
| 18 | 6.48 + 2.16 GHz CA | - | 1,2,3,4 | 17 | 4 | | | | | | |
| 19 | 6.48 + 2.16 GHz CA | - | 1,2,3,5 | 17 | 5 | | | | | | |
| 20 | 6.48 + 2.16 GHz CA | - | 1,2,3,6 | 17 | 6 | | | | | | |
| 21 | 6.48 + 2.16 GHz CA | - | 1,4,5,6 | 20 | 1 | | | | | | |
| 22 | 6.48 + 2.16 GHz CA | - | 2,4,5,6 | 20 | 2 | | | | | | |
| 23 | 6.48 + 2.16 GHz CA | - | 3,4,5,6 | 20 | 3 | | | | | | |
| 24 | 6.48 + 4.32 GHz CA | - | 1,2,3,5,6 | 17 | 13 | | | | | | |
| 25 | 6.48 + 4.32 GHz CA | - | 1,2,4,5,6 | 20 | 9 | | | | | | |
| 26 TO 31 | reserved | - | | | | | | | | | |

FIG. 51

| BW index | OPERATING MODE | NUMBER OF CHANNEL COMBINATIONS |
|---|---|---|
| 0 | 2.16 GHz SINGLE-CHANNEL TRANSMISSION | 6 |
| 1 | 4.32 GHz CHANNEL BONDING | 3 |
| 2 | 6.48 GHz CHANNEL BONDING | 2 |
| 3 | 8.64 GHz CHANNEL BONDING | 1 |
| 4 TO 8 | 2.16+2.16 GHz CHANNEL AGGREGATION | 15 |
| 9 TO 11 | 4.32+4.32 GHz CHANNEL AGGREGATION | 3 |
| 12 TO 17 | 4.32+2.16 GHz CHANNEL AGGREGATION | 12 |
| 18 TO 23 | 6.48+2.16 GHz CHANNEL AGGREGATION | 6 |
| 24,25 | 6.48+4.32 GHz CHANNEL AGGREGATION | 2 |
| 26 TO 31 | Reserved | |
| | TOTAL NUMBER OF CHANNEL COMBINATIONS | 50 |

FIG. 53

| Field name | Field name in 11ad standard | Num. of bits | Start bit | Content |
|---|---|---|---|---|
| Scrambler Initialization | Scrambler Initialization | 7 | 0 | Scrambler initialization value |
| MCS | MCS | 5 | 7 | Value of MCS for appropriately computing TXTIME |
| BW index | Length | 5 | 12 | Used channel index |
| Length | | 13 | 17 | Value of Length for appropriately computing TXTIME |
| Additional PPDU | Additional PPDU | 1 | 30 | Set to 0 in the case of EDMG PHY frame. |
| Packet Type | Packet Type | 1 | 31 | Arbitrary |
| Training Length | Training Length | 5 | 32 | Set to 0 in the case of EDMG PHY frame. |
| Aggregation | Aggregation | 1 | 37 | Arbitrary |
| Beam Tracking Request | Beam Tracking Request | 1 | 38 | Set to 0 in the case of EDMG PHY frame. |
| Last RSSI | Last RSSI | 4 | 39 | Received signal strength indicator (RSSI) of last received frame |
| Turnaround | Turnaround | 1 | 43 | Arbitrary |
| MIMO | Reserved | 1 | 44 | Set to 1 in the case of EDMG PHY MIMO frame. Set to 0 in the case of EDMG PHY non-MIMO frame. |
| Reserved | | 1 | 45 | Set to 0 in the case of EDMG PHY frame. |
| EDMG (EDMG-Header-A) Indication | | 1 | 46 | Set to 1 in the case of EDMG PHY frame. |
| Reserved | | 1 | 47 | Set to 0 in the case of EDMG PHY frame. |
| HCS | HCS | 16 | 48 | Header check sequence (CRC value) |

FIG. 54A

| BW Index | OPERATING MODE | | OCCUPIED CHANNEL NUMBER(S) | 1ST CHANNEL NUMBER | 2ND CHANNEL NUMBER | ch1 | ch2 | ch3 | ch4 | ch5 | ch6 | ch7 | ch8 |
|---|---|---|---|---|---|---|---|---|---|---|---|---|---|
| 0 | 2.16 + 2.16 GHz CA | (a) | 1,2 | 1 | 2 | ■ | ■ | | | | | | |
| | | (b) | 3,4 | 3 | 4 | | | ■ | ■ | | | | |
| | | (c) | 5,6 | 5 | 6 | | | | | ■ | ■ | | |
| | | (d) | 7,8 | 7 | 8 | | | | | | | ■ | ■ |
| 1 | 2.16 + 2.16 GHz CA | (a) | 1,3 | 1 | 3 | ■ | | ■ | | | | | |
| | | (b) | 2,4 | 2 | 4 | | ■ | | ■ | | | | |
| | | (c) | 5,7 | 5 | 7 | | | | | ■ | | ■ | |
| | | (d) | 6,8 | 6 | 8 | | | | | | ■ | | ■ |
| 2 | 2.16 + 2.16 GHz CA | (a) | 1,4 | 1 | 4 | ■ | | | ■ | | | | |
| | | (b) | 2,7 | 2 | 7 | | ■ | | | | | ■ | |
| | | (c) | 3,6 | 3 | 6 | | | ■ | | | ■ | | |
| | | (d) | 5,8 | 5 | 8 | | | | | ■ | | | ■ |
| 3 | 2.16 + 2.16 GHz CA | (a) | 1,5 | 1 | 5 | ■ | | | | ■ | | | |
| | | (b) | 2,6 | 2 | 6 | | ■ | | | | ■ | | |
| | | (c) | 3,7 | 3 | 7 | | | ■ | | | | ■ | |
| | | (d) | 4,8 | 4 | 8 | | | | ■ | | | | ■ |
| 4 | 2.16 + 2.16 GHz CA | (a) | 1,6 | 1 | 6 | ■ | | | | | ■ | | |
| | | (b) | 2,8 | 2 | 8 | | ■ | | | | | | ■ |
| | | (c) | 3,5 | 3 | 5 | | | ■ | | ■ | | | |
| | | (d) | 4,7 | 4 | 7 | | | | ■ | | | ■ | |
| 5 | 2.16 + 2.16 GHz CA | (a) | 1,7 | 1 | 7 | ■ | | | | | | ■ | |
| | | (b) | 2,5 | 2 | 5 | | ■ | | | ■ | | | |
| | | (c) | 3,8 | 3 | 8 | | | ■ | | | | | ■ |
| | | (d) | 4,6 | 4 | 6 | | | | ■ | | ■ | | |
| 6 | 2.16 + 2.16 GHz CA | (a) | 1,8 | 1 | 8 | ■ | | | | | | | ■ |
| | | (b) | 2,3 | 2 | 3 | | ■ | ■ | | | | | |
| | | (c) | 4,5 | 4 | 5 | | | | ■ | ■ | | | |
| | | (d) | 6,7 | 6 | 7 | | | | | | ■ | ■ | |

FIG. 54B

| BW Index | OPERATING MODE | | OCCUPIED CHANNEL NUMBER(S) | 1ST CHANNEL NUMBER | 2ND CHANNEL NUMBER | ch1 | ch2 | ch3 | ch4 | ch5 | ch6 | ch7 | ch8 |
|---|---|---|---|---|---|---|---|---|---|---|---|---|---|
| 7 | 4.32+4.32 GHz CA | (a) | 1,2,3,4 | 9 | 11 | ■ | ■ | ■ | ■ | | | | |
|   |   | (b) | 5,6,7,8 | 13 | 15 | | | | | ■ | ■ | ■ | ■ |
| 8 | 4.32+4.32 GHz CA | (a) | 1,2,5,6 | 9 | 13 | ■ | ■ | | | ■ | ■ | | |
|   |   | (b) | 3,4,7,8 | 11 | 15 | | | ■ | ■ | | | ■ | ■ |
| 9 | 4.32+4.32 GHz CA | (a) | 1,2,7,8 | 9 | 15 | ■ | ■ | | | | | ■ | ■ |
|   |   | (b) | 3,4,5,6 | 11 | 13 | | | ■ | ■ | ■ | ■ | | |
| 10 | 4.32+4.32 GHz CA | − | 1,2,4,5 | 9 | 12 | ■ | ■ | | ■ | ■ | | | |
| 11 | 4.32+4.32 GHz CA | − | 1,2,6,7 | 9 | 14 | ■ | ■ | | | | ■ | ■ | |
| 12 | 4.32+4.32 GHz CA | − | 2,3,4,5 | 10 | 12 | | ■ | ■ | ■ | ■ | | | |
| 13 | 4.32+4.32 GHz CA | − | 2,3,5,6 | 10 | 13 | | ■ | ■ | | ■ | ■ | | |
| 14 | 4.32+4.32 GHz CA | − | 2,3,6,7 | 10 | 14 | | ■ | ■ | | | ■ | ■ | |
| 15 | 4.32+4.32 GHz CA | − | 2,3,7,8 | 10 | 15 | | ■ | ■ | | | | ■ | ■ |
| 16 | 4.32+4.32 GHz CA | − | 3,4,6,7 | 11 | 14 | | | ■ | ■ | | ■ | ■ | |
| 17 | 4.32+4.32 GHz CA | − | 4,5,6,7 | 12 | 14 | | | | ■ | ■ | ■ | ■ | |
| 18 | 4.32+4.32 GHz CA | − | 4,5,7,8 | 12 | 15 | | | | ■ | ■ | | ■ | ■ |
| 19 TO 31 | reserved | − | | | | | | | | | | | |

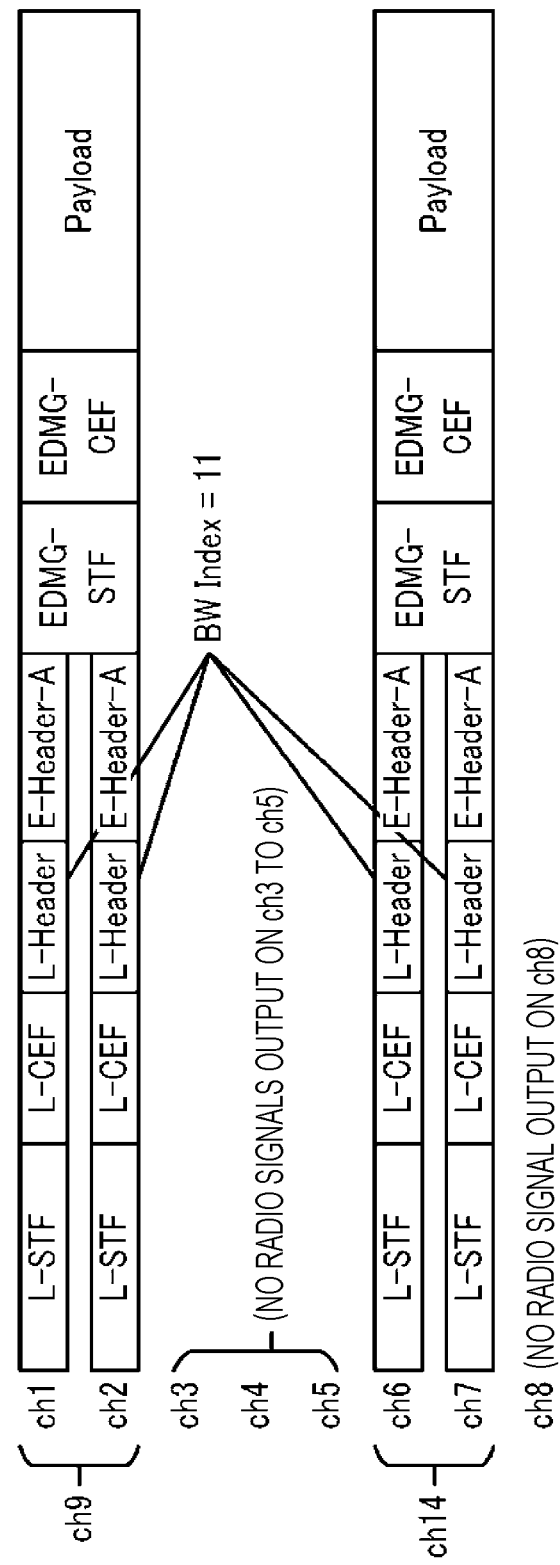

FIG. 57

| BW index | OPERATING MODE | NUMBER OF CHANNEL COMBINATIONS |
|---|---|---|
| 0 TO 6 | 2.16+2.16 GHz CHANNEL AGGREGATION | 28 |
| 7 TO 18 | 4.32+4.32 GHz CHANNEL AGGREGATION | 15 |
| 19 TO 31 | Reserved | |
| TOTAL NUMBER OF CHANNEL COMBINATIONS | | 43 |

FIG. 58

| Field name | Field name in 11ad standard | Num. of bits | Start bit | Content |
|---|---|---|---|---|
| Scrambler Initialization | Scrambler Initialization | 3 | 0 | Scrambler initialization value |
| BW index_L | | 4 | 3 | Lower 5 bits of used channel index |
| MCS | MCS | 5 | 7 | Value of MCS for appropriately computing TXTIME |
| BW index_H | Length | 4 | 12 | Higher 5 bits of used channel index |
| Channel Aggregation | | 1 | 16 | Channel aggregation Y/N |
| Length | | 13 | 17 | Value of Length for appropriately computing TXTIME |
| Additional PPDU | Additional PPDU | 1 | 30 | Set to 0 in the case of EDMG PHY frame. |
| Packet Type | Packet Type | 1 | 31 | Arbitrary |
| Training Length | Training Length | 5 | 32 | Set to 0 in the case of EDMG PHY frame. |
| Aggregation | Aggregation | 1 | 37 | Arbitrary |
| Beam Tracking Request | Beam Tracking Request | 1 | 38 | Set to 0 in the case of EDMG PHY frame. |
| Last RSSI | Last RSSI | 4 | 39 | Received signal strength indicator (RSSI) of last received frame |
| Turnaround | Turnaround | 1 | 43 | Arbitrary |
| MIMO | | 1 | 44 | Set to 1 in the case of EDMG PHY MIMO frame. Set to 0 in the case of EDMG PHY non-MIMO frame. |
| Reserved | Reserved | 1 | 45 | Set to 0 in the case of EDMG PHY frame. |
| EDMG (EDMG-Header-A) Indication | | 1 | 46 | Set to 1 in the case of EDMG PHY frame. |
| Reserved | | 1 | 47 | Set to 0 in the case of EDMG PHY frame. |
| HCS | HCS | 16 | 48 | Header check sequence (CRC value) |

FIG. 62

| Field name | Field name in 11ad standard | Num. of bits | Start bit | Content |
|---|---|---|---|---|
| Scrambler Initialization | Scrambler Initialization | 7 | 0 | Scrambler initialization value |
| MCS | MCS | 5 | 7 | Value of MCS for appropriately computing TXTIME |
| Compressed BW | Length | 4 | 12 | Used channel index |
| Reserved | Length | 1 | 16 | Set to 0 in the case of EDMG PHY frame. |
| Length | Length | 13 | 17 | Value of Length for appropriately computing TXTIME |
| Additional PPDU | Additional PPDU | 1 | 30 | Set to 0 in the case of EDMG PHY frame. |
| Packet Type | Packet Type | 1 | 31 | Arbitrary |
| Training Length | Training Length | 5 | 32 | Set to 0 in the case of EDMG PHY frame. |
| Aggregation | Aggregation | 1 | 37 | Arbitrary |
| Beam Tracking Request | Beam Tracking Request | 1 | 38 | Set to 0 in the case of EDMG PHY frame. |
| IsSC | Last RSSI | 1 | 39 | Set to 1 if Data field is single-carrier (SC) modulated. Set to 0 if Data field is OFDM modulated. |
| IsSISO | Last RSSI | 1 | 40 | Set to 1 in the case of single-stream transmission. Set to 0 in the case of MIMO transmission. |
| GI/CP Length | Last RSSI | 2 | 41 | Index expressing GI length |
| Turnaround | Turnaround | 1 | 43 | Arbitrary |
| Extended SC MCS Indication | Reserved | 1 | 44 | Set to 0 in the case of EDMG PHY frame. |
| Reserved | Reserved | 1 | 45 | Set to 0 in the case of EDMG PHY frame. |
| EDMG (EDMG-Header-A) Indication | Reserved | 1 | 46 | Set to 1 in the case of EDMG PHY frame. |
| Reserved | Reserved | 1 | 47 | Set to 0 in the case of EDMG PHY frame. |
| HCS | HCS | 16 | 48 | Header check sequence (CRC value) |

FIG. 63A

| Compressed BW | OPERATING MODE | | OCCUPIED CHANNEL NUMBER(S) | 1ST CHANNEL NUMBER | 2ND CHANNEL NUMBER | ch1 | ch2 | ch3 | ch4 | ch5 | ch6 | ch7 | ch8 |
|---|---|---|---|---|---|---|---|---|---|---|---|---|---|
| 0 | 2.16 GHz SINGLE-CHANNEL | (a) | 1 | 1 | - | ■ | | | | | | | |
| | | (b) | 2 | 2 | - | | ■ | | | | | | |
| | | (c) | 3 | 3 | - | | | ■ | | | | | |
| | | (d) | 4 | 4 | - | | | | ■ | | | | |
| | | (e) | 5 | 5 | - | | | | | ■ | | | |
| | | (f) | 6 | 6 | - | | | | | | ■ | | |
| | | (g) | 7 | 7 | - | | | | | | | ■ | |
| | | (h) | 8 | 8 | - | | | | | | | | ■ |
| 1 | 4.32 GHz CB | (a) | 2,3 | 10 | - | | ■ | ■ | | | | | |
| | | (b) | 4,5 | 12 | - | | | | ■ | ■ | | | |
| | | (c) | 6,7 | 14 | - | | | | | | ■ | ■ | |
| 2 | 4.32 GHz CB | (a) | 1,2 | 9 | - | ■ | ■ | | | | | | |
| | | (b) | 3,4 | 11 | - | | | ■ | ■ | | | | |
| | | (c) | 5,6 | 13 | - | | | | | ■ | ■ | | |
| | | (d) | 7,8 | 15 | - | | | | | | | ■ | ■ |
| 3 | 6.48 GHz CB | (a) | 1,2,3 | 17 | - | ■ | ■ | ■ | | | | | |
| | | (b) | 3,4,5 | 19 | - | | | ■ | ■ | ■ | | | |
| | | (c) | 5,6,7 | 21 | - | | | | | ■ | ■ | ■ | |
| 4 | 6.48 GHz CB | (a) | 2,3,4 | 18 | - | | ■ | ■ | ■ | | | | |
| | | (b) | 4,5,6 | 20 | - | | | | ■ | ■ | ■ | | |
| | | (c) | 6,7,8 | 22 | - | | | | | | ■ | ■ | ■ |
| 5 | 8.64 GHz CB | (a) | 1,2,3,4 | 25 | - | ■ | ■ | ■ | ■ | | | | |
| | | (b) | 2,3,4,5 | 29 | - | | ■ | ■ | ■ | ■ | | | |
| | | (c) | 3,4,5,6 | 26 | - | | | ■ | ■ | ■ | ■ | | |
| | | (d) | 4,5,6,7 | 27 | - | | | | ■ | ■ | ■ | ■ | |
| | | (e) | 5,6,7,8 | 28 | - | | | | | ■ | ■ | ■ | ■ |

FIG. 63B

| Compressed BW | OPERATING MODE | | OCCUPIED CHANNEL NUMBER(S) | 1ST CHANNEL NUMBER | 2ND CHANNEL NUMBER | ch1 | ch2 | ch3 | ch4 | ch5 | ch6 | ch7 | ch8 |
|---|---|---|---|---|---|---|---|---|---|---|---|---|---|
| 6 | 2.16 + 2.16 GHz CA | (a) | 1,3 | 1 | 3 | ■ | | ■ | | | | | |
| | | (b) | 2,4 | 2 | 4 | | ■ | | ■ | | | | |
| | | (c) | 3,5 | 3 | 5 | | | ■ | | ■ | | | |
| | | (d) | 4,6 | 4 | 6 | | | | ■ | | ■ | | |
| | | (e) | 5,7 | 5 | 7 | | | | | ■ | | ■ | |
| | | (f) | 6,8 | 6 | 8 | | | | | | ■ | | ■ |
| 7 | 2.16 + 2.16 GHz CA | (a) | 1,4 | 1 | 4 | ■ | | | ■ | | | | |
| | | (b) | 2,5 | 2 | 5 | | ■ | | | ■ | | | |
| | | (c) | 3,6 | 3 | 6 | | | ■ | | | ■ | | |
| | | (d) | 4,7 | 4 | 7 | | | | ■ | | | ■ | |
| | | (e) | 5,8 | 5 | 8 | | | | | ■ | | | ■ |
| 8 | 2.16 + 2.16 GHz CA | (a) | 1,5 | 1 | 5 | ■ | | | | ■ | | | |
| | | (b) | 2,6 | 2 | 6 | | ■ | | | | ■ | | |
| | | (c) | 3,7 | 3 | 7 | | | ■ | | | | ■ | |
| | | (d) | 4,8 | 4 | 8 | | | | ■ | | | | ■ |
| | | (e) | 1,6 | 1 | 6 | ■ | | | | | ■ | | |
| | | (f) | 2,7 | 2 | 7 | | ■ | | | | | ■ | |
| | | (g) | 3,8 | 3 | 8 | | | ■ | | | | | ■ |
| | | (h) | 1,7 | 1 | 7 | ■ | | | | | | ■ | |
| | | (i) | 2,8 | 2 | 8 | | ■ | | | | | | ■ |
| | | (j) | 1,8 | 1 | 8 | ■ | | | | | | | ■ |
| 9 | 2.16 + 2.16 GHz CA | (a) | 1,2 | 1 | 2 | ■ | ■ | | | | | | |
| | | (b) | 2,3 | 2 | 3 | | ■ | ■ | | | | | |
| | | (c) | 3,4 | 3 | 4 | | | ■ | ■ | | | | |
| | | (d) | 4,5 | 4 | 5 | | | | ■ | ■ | | | |
| | | (e) | 5,6 | 5 | 6 | | | | | ■ | ■ | | |
| | | (f) | 6,7 | 6 | 7 | | | | | | ■ | ■ | |
| | | (g) | 7,8 | 7 | 8 | | | | | | | ■ | ■ |

FIG. 63C

| Compressed BW | OPERATING MODE | | OCCUPIED CHANNEL NUMBER(S) | 1ST CHANNEL NUMBER | 2ND CHANNEL NUMBER | ch1 | ch2 | ch3 | ch4 | ch5 | ch6 | ch7 | ch8 |
|---|---|---|---|---|---|---|---|---|---|---|---|---|---|
| 10 | 4.32+4.32 GHz CA | (a) | 1,2,3,4 | 9 | 11 | ■ | ■ | ■ | ■ | | | | |
| | | (b) | 2,3,4,5 | 10 | 12 | | ■ | ■ | ■ | ■ | | | |
| | | (c) | 3,4,5,6 | 11 | 13 | | | ■ | ■ | ■ | ■ | | |
| | | (d) | 4,5,6,7 | 12 | 14 | | | | ■ | ■ | ■ | ■ | |
| | | (e) | 5,6,7,8 | 13 | 15 | | | | | ■ | ■ | ■ | ■ |
| | | (f) | 1,2,4,5 | 9 | 12 | ■ | ■ | | ■ | ■ | | | |
| | | (g) | 1,2,5,6 | 9 | 13 | ■ | ■ | | | ■ | ■ | | |
| | | (h) | 1,2,6,7 | 9 | 14 | ■ | ■ | | | | ■ | ■ | |
| | | (i) | 1,2,7,8 | 9 | 15 | ■ | ■ | | | | | ■ | ■ |
| | | (j) | 2,3,5,6 | 10 | 13 | | ■ | ■ | | ■ | ■ | | |
| | | (k) | 2,3,6,7 | 10 | 14 | | ■ | ■ | | | ■ | ■ | |
| | | (l) | 2,3,7,8 | 10 | 15 | | ■ | ■ | | | | ■ | ■ |
| | | (m) | 3,4,6,7 | 11 | 14 | | | ■ | ■ | | ■ | ■ | |
| | | (n) | 3,4,7,8 | 11 | 15 | | | ■ | ■ | | | ■ | ■ |
| | | (o) | 4,5,7,8 | 12 | 15 | | | | ■ | ■ | | ■ | ■ |
| 11 TO 15 | reserved | - | | | | | | | | | | | |

FIG. 63D

| VALUE OF GI/CP Length FIELD | CONTENT |
|---|---|
| 0 | Short GI (GI LENGTH 32 SYMBOLS) |
| 1 | Normal GI (GI LENGTH 64 SYMBOLS) |
| 2 | Long GI (GI LENGTH 128 SYMBOLS) |
| 3 | Reserved |

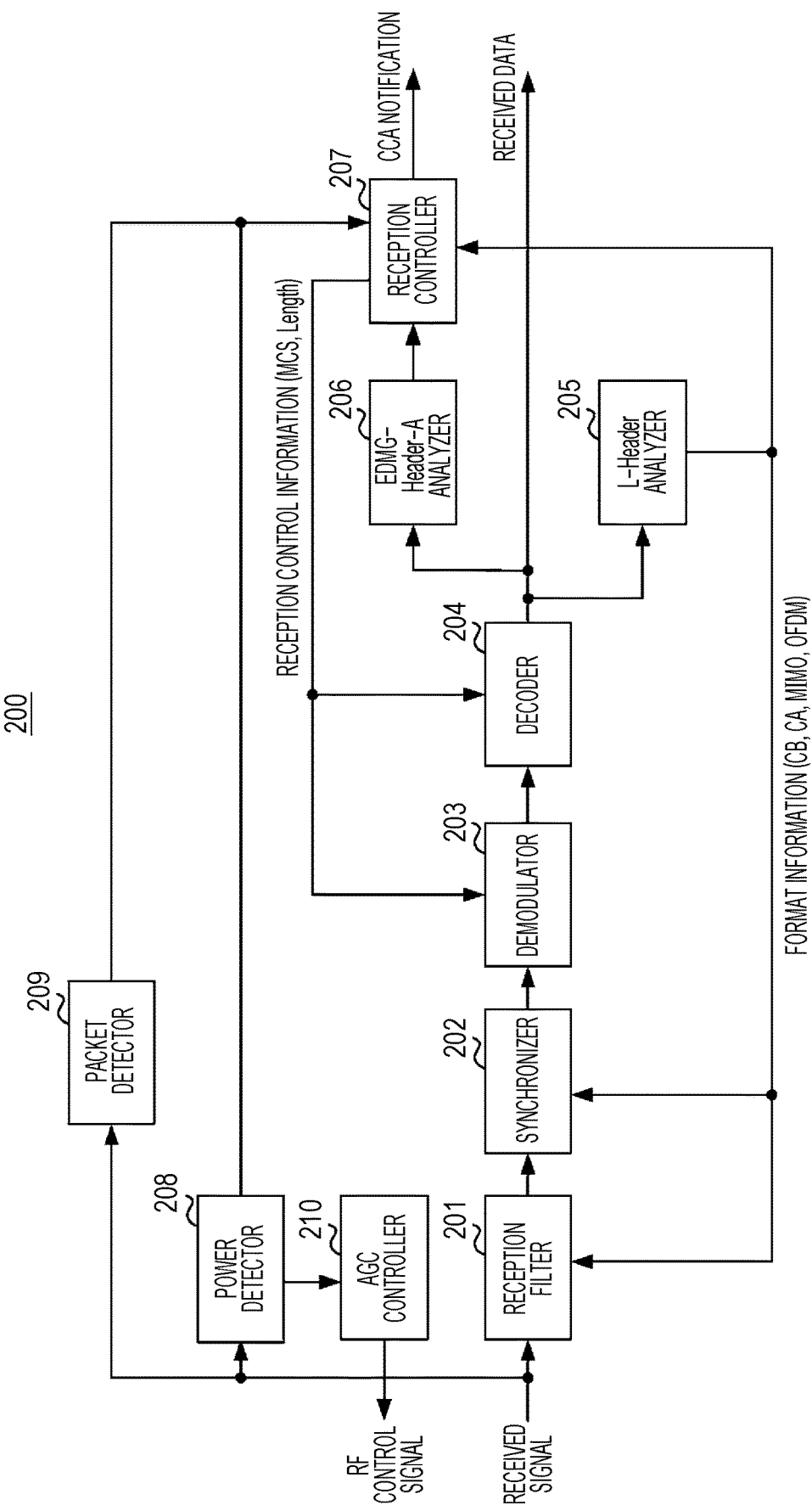

FIG. 66

| VALUE OF Compressed BW FIELD | VALUE OF IsSC FIELD | VALUE OF IsSISO FIELD | VALUE OF GI/CP Length FIELD | FORMAT |
|---|---|---|---|---|
| 0, 6 TO 9 | 1 | 1 | 0 | FIG. 61B (FIG. 65B) |
| | | | 1 | FIG. 61A (FIG. 65A) |
| | | | 2 | FIG. 61C (FIG. 65C) |
| | | | 3 | OTHER FORMAT |
| | 0 | 0 | 0 TO 3 | OTHER FORMAT |
| | 0, 1 | 0, 1 | 0 TO 3 | OTHER FORMAT |
| 1 | | | | OTHER FORMAT |

| VALUE OF TRN_LEN | VALUE OF Nsub (VALUE OF Nmin_error: AT LEAST 0, LESS THAN 256 spoofing ERROR: AT LEAST 256Tc1, LESS THAN 512Tc1) | VALUE OF Nsub (VALUE OF Nmin_error: AT LEAST 256, LESS THAN 512 spoofing ERROR: AT LEAST 0Tc1, LESS THAN 256Tc1) |
|---|---|---|
| 2 | 19 | 20 |
| 6 | 58 | 59 |
| 10 | 97 | 98 |
| 14 | 136 | 137 |

FIG. 89

| VALUE OF TRN_LEN | VALUE OF Nsub (VALUE OF Nmin_error: AT LEAST 0, LESS THAN 128 spoofing ERROR: AT LEAST 384Tc1, LESS THAN 512Tc1) | VALUE OF Nsub (VALUE OF Nmin_error: AT LEAST 128, LESS THAN 512 spoofing ERROR: AT LEAST 0Tc1, LESS THAN 384Tc1) |
|---|---|---|
| 1 | 9 | 10 |
| 5 | 48 | 49 |
| 9 | 87 | 88 |
| 13 | 126 | 127 |

FIG. 90

| VALUE OF TRN_LEN | VALUE OF Nsub (VALUE OF Nmin_error: AT LEAST 0, LESS THAN 384 spoofing ERROR: AT LEAST 128Tc1, LESS THAN 512Tc1) | VALUE OF Nsub (VALUE OF Nmin_error: AT LEAST 384, LESS THAN 512 spoofing ERROR: AT LEAST 0Tc1, LESS THAN 128Tc1) |
|---|---|---|
| 3 | 29 | 30 |
| 7 | 68 | 69 |
| 11 | 107 | 108 |
| 15 | 146 | 147 |

FIG. 92

| MCS IN L-Header | REMAINDER FROM DIVIDING Nblks_spoof(temp) BY 3 | RANGE OF VALUES OF Nmin_error | TRN_LEN | Nsub | REFERENCE | RANGE OF Spoofing ERROR |
|---|---|---|---|---|---|---|
| 5 OR LESS | 0 | AT LEAST 0, LESS THAN 128 | 0 | 0 | FIG. 93, FORMULA (27B) | AT LEAST 0, LESS THAN 128Tc |
| | | AT LEAST 128, LESS THAN 256 | 0 | 0 | FIG. 93, FORMULA (27B) | AT LEAST 128, LESS THAN 256Tc |
| | | AT LEAST 256, LESS THAN 384 | 2 | 20 | FIG. 88, FORMULA (30) | AT LEAST 0, LESS THAN 128Tc |
| | | AT LEAST 384, LESS THAN 512 | 3 | 30 | FIG. 90, FORMULA (34) | AT LEAST 0, LESS THAN 128Tc |
| | 1 | AT LEAST 0, LESS THAN 128 | 3 | 29 | FIG. 90, FORMULA (33) | AT LEAST 128, LESS THAN 256Tc |
| | | AT LEAST 128, LESS THAN 256 | 1 | 10 | FIG. 89, FORMULA (32) | AT LEAST 0, LESS THAN 128Tc |
| | | AT LEAST 256, LESS THAN 384 | 2 | 20 | FIG. 88, FORMULA (30) | AT LEAST 0, LESS THAN 128Tc |
| | | AT LEAST 384, LESS THAN 512 | 2 | 20 | FIG. 88, FORMULA (30) | AT LEAST 128, LESS THAN 256Tc |
| | 2 | AT LEAST 0, LESS THAN 128 | 0 | 0 | FIG. 93, FORMULA (27B) | AT LEAST 0, LESS THAN 128Tc |
| | | AT LEAST 128, LESS THAN 256 | 1 | 10 | FIG. 89, FORMULA (32) | AT LEAST 0, LESS THAN 128Tc |
| | | AT LEAST 256, LESS THAN 384 | 1 | 10 | FIG. 89, FORMULA (32) | AT LEAST 128, LESS THAN 256Tc |
| | | AT LEAST 384, LESS THAN 512 | 3 | 30 | FIG. 90, FORMULA (34) | AT LEAST 0, LESS THAN 128Tc |
| 6 OR GREATER | 0,1,2 | AT LEAST 0, LESS THAN 128 | 0 | 0 | FIG. 93, FORMULA (27B) | AT LEAST 0, LESS THAN 128Tc |
| | | AT LEAST 128, LESS THAN 256 | 1 | 10 | FIG. 89, FORMULA (32) | AT LEAST 0, LESS THAN 128Tc |
| | | AT LEAST 256, LESS THAN 384 | 2 | 20 | FIG. 88, FORMULA (30) | AT LEAST 0, LESS THAN 128Tc |
| | | AT LEAST 384, LESS THAN 512 | 3 | 30 | FIG. 90, FORMULA (34) | AT LEAST 0, LESS THAN 128Tc |

FIG. 93

| VALUE OF TRN_LEN | VALUE OF Nsub |
|---|---|
| 0 | 0 |
| 4 | 39 |
| 8 | 78 |
| 12 | 117 |
| 16 | 156 |

FIG. 94

| MCS IN L-Header | REMAINDER FROM DIVIDING Nblks_spoof(temp) BY 3 | RANGE OF VALUES OF Nmin_error | TRN_LEN | Nsub | REFERENCE | RANGE OF Spoofing ERROR |
|---|---|---|---|---|---|---|
| 5 OR LESS | 0 | AT LEAST 0, LESS THAN 128 | 16 | 156 | FIG. 85, FORMULA (27B) | AT LEAST 0, LESS THAN 128Tc |
| | | AT LEAST 128, LESS THAN 256 | 16 | 156 | FIG. 85, FORMULA (27B) | AT LEAST 128, LESS THAN 256Tc |
| | | AT LEAST 256, LESS THAN 384 | 14 | 137 | FIG. 88, FORMULA (30) | AT LEAST 0, LESS THAN 128Tc |
| | | AT LEAST 384, LESS THAN 512 | 15 | 147 | FIG. 90, FORMULA (34) | AT LEAST 0, LESS THAN 128Tc |
| | 1 | AT LEAST 0, LESS THAN 128 | 15 | 146 | FIG. 90, FORMULA (33) | AT LEAST 128, LESS THAN 256Tc |
| | | AT LEAST 128, LESS THAN 256 | 13 | 127 | FIG. 89, FORMULA (32) | AT LEAST 0, LESS THAN 128Tc |
| | | AT LEAST 256, LESS THAN 384 | 14 | 137 | FIG. 88, FORMULA (30) | AT LEAST 0, LESS THAN 128Tc |
| | 2 | AT LEAST 384, LESS THAN 512 | 14 | 137 | FIG. 88, FORMULA (30) | AT LEAST 128, LESS THAN 256Tc |
| | | AT LEAST 0, LESS THAN 128 | 16 | 156 | FIG. 85, FORMULA (27B) | AT LEAST 0, LESS THAN 128Tc |
| | | AT LEAST 128, LESS THAN 256 | 13 | 127 | FIG. 89, FORMULA (32) | AT LEAST 0, LESS THAN 128Tc |
| | | AT LEAST 256, LESS THAN 384 | 13 | 127 | FIG. 89, FORMULA (32) | AT LEAST 0, LESS THAN 128Tc |
| | | AT LEAST 384, LESS THAN 512 | 15 | 147 | FIG. 90, FORMULA (34) | AT LEAST 0, LESS THAN 128Tc |
| 6 OR GREATER | 0, 1, 2 | AT LEAST 0, LESS THAN 128 | 16 | 156 | FIG. 85, FORMULA (27B) | AT LEAST 0, LESS THAN 128Tc |
| | | AT LEAST 128, LESS THAN 256 | 13 | 127 | FIG. 89, FORMULA (32) | AT LEAST 0, LESS THAN 128Tc |
| | | AT LEAST 256, LESS THAN 384 | 14 | 137 | FIG. 88, FORMULA (30) | AT LEAST 0, LESS THAN 128Tc |
| | | AT LEAST 384, LESS THAN 512 | 15 | 147 | FIG. 90, FORMULA (34) | AT LEAST 0, LESS THAN 128Tc |

FIG. 96A

| MCS IN L-Header | REMAINDER FROM DIVIDING Nblks_spoof(temp) BY 3 | RANGE OF VALUES OF Nmin_error | TRN_LEN | Nsub | REFERENCE | RANGE OF Spoofing ERROR |
|---|---|---|---|---|---|---|
| 5 OR LESS | 0,2 | AT LEAST 0, LESS THAN 512 | 16 | 156 | FIG. 85, FORMULA (27B) | AT LEAST 0, LESS THAN 512Tc |
| | 1 | AT LEAST 0, LESS THAN 256 | 14 | 136 | FIG. 88, FORMULA (29) | AT LEAST 256, LESS THAN 512Tc |
| | | AT LEAST 256, LESS THAN 512 | 14 | 137 | FIG. 88, FORMULA (30) | AT LEAST 0, LESS THAN 256Tc |
| 6 OR GREATER | 0,1,2 | AT LEAST 0, LESS THAN 512 | 16 | 156 | FIG. 85, FORMULA (27B) | AT LEAST 0, LESS THAN 512Tc |

FIG. 96B

| MCS IN L-Header | REMAINDER FROM DIVIDING Nblks_spoof(temp) BY 3 | RANGE OF VALUES OF Nmin_error | TRN_LEN | Nsub | REFERENCE | RANGE OF Spoofing ERROR |
|---|---|---|---|---|---|---|
| 5 OR LESS | 0, 2 | AT LEAST 0, LESS THAN 512 | 0 | 0 | FIG. 85, FORMULA (27B) | AT LEAST 0, LESS THAN 512Tc |
| | 1 | AT LEAST 0, LESS THAN 256 | 2 | 19 | FIG. 88, FORMULA (29) | AT LEAST 256, LESS THAN 512Tc |
| | | AT LEAST 256, LESS THAN 512 | 2 | 20 | FIG. 88, FORMULA (30) | AT LEAST 0, LESS THAN 256Tc |
| 6 OR GREATER | 0, 1, 2 | AT LEAST 0, LESS THAN 512 | 0 | 0 | FIG. 85, FORMULA (27B) | AT LEAST 0, LESS THAN 512Tc |

FIG. 96C

| Packet Type | Nss | Ncb | GI Type | NUMBER | T_EDMGHeaderA | T_EDMGSTF | T_EDMGCEF | T_GI1 | T_add | N_add | Nmin_error(0) | FLAG | INDEX |
|---|---|---|---|---|---|---|---|---|---|---|---|---|---|
| SISO | 1 | 1 | Short | 1 | 960*Tc1 | 0*Tc1 | 0*Tc1 | 64*Tc1 | 1024*Tc1 | 2 | 0 | 0 | 0 |
| | | | Normal | 2 | 960*Tc1 | 0*Tc1 | 0*Tc1 | 64*Tc1 | 1024*Tc1 | 2 | 0 | 0 | 0 |
| | | | Long | 3 | 960*Tc1 | 0*Tc1 | 0*Tc1 | 128*Tc1 | 1088*Tc1 | 3 | 448 | 1 | 3 |
| | | 2,3,4 | Short | 4 | 1024*Tc1 | 0*Tc1 | 1152*Tc1 | 32*Tc1 | 2208*Tc1 | 5 | 352 | 1 | 2 |
| | | | Normal | 5 | 1024*Tc1 | 0*Tc1 | 1152*Tc1 | 64*Tc1 | 2240*Tc1 | 5 | 320 | 1 | 2 |
| | | | Long | 6 | 1024*Tc1 | 0*Tc1 | 1152*Tc1 | 128*Tc1 | 2304*Tc1 | 5 | 256 | 1 | 2 |
| SU-MIMO | 2 | | Short | 7 | 1024*Tc1 | 0*Tc1 | 1152*Tc1 | 32*Tc1 | 2208*Tc1 | 5 | 352 | 1 | 2 |
| | | | Normal | 8 | 1024*Tc1 | 0*Tc1 | 1152*Tc1 | 64*Tc1 | 2240*Tc1 | 5 | 320 | 1 | 2 |
| | | | Long | 9 | 1024*Tc1 | 0*Tc1 | 1152*Tc1 | 128*Tc1 | 2304*Tc1 | 5 | 256 | 1 | 2 |
| | | 1,2,3,4 | Short | 10 | 1024*Tc1 | 0*Tc1 | 2432*Tc1 | 32*Tc1 | 3488*Tc1 | 7 | 96 | 0 | 0 |
| | 3,4 | | Normal | 11 | 1024*Tc1 | 0*Tc1 | 2432*Tc1 | 64*Tc1 | 3520*Tc1 | 7 | 64 | 0 | 0 |
| | | | Long | 12 | 1024*Tc1 | 0*Tc1 | 2432*Tc1 | 128*Tc1 | 3584*Tc1 | 7 | 0 | 0 | 0 |
| | 5,6,7,8 | | Short | 13 | 1024*Tc1 | 0*Tc1 | 4992*Tc1 | 32*Tc1 | 6048*Tc1 | 12 | 96 | 0 | 0 |
| | | | Normal | 14 | 1024*Tc1 | 0*Tc1 | 4992*Tc1 | 64*Tc1 | 6080*Tc1 | 12 | 64 | 0 | 0 |
| | | | Long | 15 | 1024*Tc1 | 0*Tc1 | 4992*Tc1 | 128*Tc1 | 6144*Tc1 | 12 | 0 | 0 | 0 |
| MU-MIMO | 2 | | Short | 16 | 1024*Tc1 | 0*Tc1 | 1152*Tc1 | 64*Tc1 | 2240*Tc1 | 5 | 320 | 1 | 2 |
| | | | Normal | 17 | 1024*Tc1 | 0*Tc1 | 1152*Tc1 | 64*Tc1 | 2240*Tc1 | 5 | 320 | 1 | 2 |
| | | | Long | 18 | 1024*Tc1 | 0*Tc1 | 1152*Tc1 | 128*Tc1 | 2304*Tc1 | 5 | 256 | 1 | 2 |
| | 3,4 | 1,2,3,4 | Short | 19 | 1024*Tc1 | 0*Tc1 | 2432*Tc1 | 64*Tc1 | 3520*Tc1 | 7 | 64 | 0 | 0 |
| | | | Normal | 20 | 1024*Tc1 | 0*Tc1 | 2432*Tc1 | 64*Tc1 | 3520*Tc1 | 7 | 64 | 0 | 0 |
| | | | Long | 21 | 1024*Tc1 | 0*Tc1 | 2432*Tc1 | 128*Tc1 | 3584*Tc1 | 7 | 0 | 0 | 0 |
| | 5,6,7,8 | | Short | 22 | 1024*Tc1 | 0*Tc1 | 4992*Tc1 | 64*Tc1 | 6080*Tc1 | 12 | 64 | 0 | 0 |
| | | | Normal | 23 | 1024*Tc1 | 0*Tc1 | 4992*Tc1 | 64*Tc1 | 6080*Tc1 | 12 | 64 | 0 | 0 |
| | | | Long | 24 | 1024*Tc1 | 0*Tc1 | 4992*Tc1 | 128*Tc1 | 6144*Tc1 | 12 | 0 | 0 | 0 |

TRANSMITTING DEVICE, TRANSMISSION METHOD, RECEIVING DEVICE, AND RECEPTION METHOD

BACKGROUND

1. Technical Field

The present disclosure relates to a transmitting device, a transmission method, a receiving device, and a reception method.

2. Description of the Related Art

IEEE 802.11 is a set of standards related to wireless LAN, and includes the IEEE Std 802.11ac (hereinafter called the "11ac standard"), the IEEE Std 802.11ad (hereinafter called the "11 ad standard"), and the IEEE P802.11ay draft standard (hereinafter called the "flay standard"), for example (see Non-Patent Literature 1-3, for example).

In the frame format of each of the 11ad standard and the 11ay standard, in the beginning portion of a packet, the Legacy Short Training Field (L-STF), the Legacy Channel Estimation Field (L-CEF), and the L-Header are structured in common.

The L-STF is used for packet detection and synchronization. Thus, a dedicated terminal (STA or AP/PCP) of the 11ad standard (hereinafter called an "11ad terminal") is able to use the L-STF to detect packets of the 11ay standard.

Also, by using a common coding and modulation scheme of the L-Header between the 11ad standard and the 11ay standard, an 11ad terminal is able to decode the L-Header and obtain information regarding the packet length. The L-Header also includes reserved bits. In the 11ay standard, the reserved bits included in the L-Header are used to discriminate whether the packet is of the 11ad standard or the 11ay standard.

Also, the information with respect to the 11ay standard may be included in the Enhanced Directional Multi-Gigabit header-A (EDMG-Header-A) following the L-Header.

Also proposed is a scheme (hereinafter called the "11ad extension standard") in which modulation and coding schemes (MCS) are added without changing the basic frame format (see Non-Patent Literature 4, for example). By using a common coding and modulation scheme of the L-Header between the 11ad standard and the 11ad extension standard, an 11ad terminal is able to decode the L-Header and obtain information indicating the packet length. The L-Header also includes reserved bits. In the 11ad extension standard, the reserved bits included in the L-Header are used to discriminate whether the packet is of the 11ad standard or the 11ad extension standard.

SUMMARY

One piece of information that is unique to the 11ay standard is format information (hereinafter called "transmission mode selection information") for discriminating the class (type) of the transmission mode of the EDMG-STF and the EDMG-CEF following the EDMG-Header-A. The transmission mode selection information include, for example, information related the various formats of channel bonding, channel aggregation, Multiple Input Multiple Output (MIMO; Single User MIMO (SU-MIMO) or Multi-user MIMO (MU-MIMO)), Single Carrier (SC) transmission, and orthogonal frequency-division multiplexing (OFDM) transmission.

However, the legacy frame format of the 11ad standard or the 11ac standard does not support the transmission modes used in the 11ay standard, and is inadequate as the format for reporting the transmission mode selection information.

One non-limiting and exemplary embodiment provides a transmitting device, a transmission method, a receiving device, and a reception method making it possible to report the transmission mode selection information appropriately, and receive packets correctly at the receiving device.

In one general aspect, the techniques disclosed here feature a transmitting device comprising: a transmission signal generation circuit that generates a transmission signal using a frame format including a legacy short training field (STF), a legacy channel estimation field (CEF), a legacy header field, an enhanced directional multi-gigabit (EDMG) header field, an EDMG-STF, an EDMG-CEF, and a data field; and a transmission circuit that transmits the generated transmission signal using one or more channels, wherein the legacy header field includes a data length field expressed by multiple bits, and the data length field indicates, to a legacy terminal, information related to a data length using all of the multiple bits of the data length field, and indicates, to an EDMG terminal, information related to a data length using a subset of the multiple bits of the data length field, and uses the remaining bit or bits to indicate information related to the one or more channels in which the transmission signal is transmitted.

According to one aspect of the present disclosure, it is possible to report the transmission mode selection information appropriately, and receive packets correctly at the receiving device.

It should be noted that general or specific embodiments may be implemented as a system, an apparatus, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 6 is a diagram illustrating an example of transmission mode selection information according to Embodiment 1;

FIG. 7 is a diagram illustrating an example of correspondence relationships between the MCS and each parameter according to Embodiment 1;

FIG. 9 is a diagram illustrating a specific example of transmission mode selection information according to Embodiment 1;

FIG. 10 is a diagram illustrating an example of correspondence relationships between the data length and the number of symbol blocks in MCS9 according to Embodiment 1;

FIG. 13 is a diagram illustrating an example of correspondence relationships between the MCS and each parameter according to Embodiment 2;

FIG. 14 is a diagram illustrating conditions on the MCS according to Embodiment 3;

FIG. 15 is a diagram illustrating an example of correspondence relationships between the data length and the number of symbol blocks in MCS2 according to Embodiment 3;

FIG. 30 is a diagram illustrating the relationship between the extension MCS number, the base length formula, the number of substitute bits, the correction term, and the value of the MCS field according to Embodiment 6;

FIG. 32 is a diagram illustrating the relationship between the extension MCS number, Base_Length_1, Base_Length_2, and the value of the MCS field according to Embodiment 7;

FIG. 33 is a diagram illustrating the relationship between the extension MCS number, N_CBPB, and the value of R according to Embodiment 7;

FIG. 38 is a diagram illustrating the format of the L-Header according to Embodiment 8;

FIG. 41 is a diagram illustrating the PHY frame configuration of the Data3 packet according to Embodiment 8;

FIG. 44 is a diagram illustrating combinations of channel allocation for single-channel transmission, channel bonding, and channel aggregation for up to a maximum of four usable channels;

FIG. 45 is a diagram illustrating combinations of channel allocation for single-channel transmission, channel bonding, and channel aggregation for up to a maximum of eight usable channels;

FIG. 47 is a diagram illustrating the frame format of the L-Header in Embodiment 9;

FIG. 48A is a diagram illustrating the value of the BW index field for single-channel transmission, channel bonding, and channel aggregation in Embodiment 9;

FIG. 48B is a diagram illustrating the value of the BW index field for channel aggregation in Embodiment 9;

FIG. 51 is a diagram illustrating the correspondence between the number of all channel combinations and the BW index for each operating mode in Embodiment 9;

FIG. 53 is a diagram illustrating the frame format of the L-Header in Embodiment 10;

FIG. 54A is a diagram illustrating the value of the BW index field for channel aggregation in Embodiment 10;

FIG. 54B is a diagram illustrating the value of the BW index field for channel aggregation in Embodiment 10;

FIG. 56B is a diagram illustrating a different example of packets by channel aggregation in Embodiment 10;

FIG. 57 is a diagram illustrating the correspondence between the number of all channel combinations and the BW index for each operating mode in Embodiment 10;

FIG. 58 is a diagram illustrating the frame format of the L-Header in Embodiment 11;

FIG. 62 is a diagram illustrating the format of the L-Header of a PHY frame in Embodiment 12;

FIG. 63A is a diagram illustrating an example of the value of the Compressed BW field in Embodiment 12;

FIG. 63B is a diagram illustrating an example of the value of the Compressed BW field in Embodiment 12;

FIG. 63C is a diagram illustrating an example of the value of the Compressed BW field in Embodiment 12;

FIG. 63D is a diagram illustrating an example of the value of the GI/CP Length field in Embodiment 12;

FIG. 64B is a diagram illustrating an example of the configuration of the receiving device in Embodiment 12;

FIG. 66 is a diagram illustrating an example of criteria by which the reception controller discriminates the format in Embodiment 12;

FIG. 79B is a diagram illustrating an example of the patterns of –Ga128 and GI128, GI64, and GI32 in M-STF Working Example 4;

FIG. 80A is a diagram illustrating an example of a PHY frame to which channel bonding is not applied in a modification of Embodiment 3;

FIG. 80B is a diagram illustrating an example of a PHY frame to which channel bonding is applied in a modification of Embodiment 3;

FIG. 81 is a flowchart illustrating a process of computing the values of the MCS and Length fields in the L-Header in a modification of Embodiment 3;

FIG. 82 is a flowchart illustrating another example of a process of computing the values of the MCS and Length fields in the L-Header in a modification of Embodiment 3;

FIG. 83 is a flowchart illustrating another example of a process of computing the values of the MCS and Length fields in the L-Header in a modification of Embodiment 3;

FIG. 84 is a diagram illustrating an example of the PHY frame format in the 11ad standard in a modification of Embodiment 3;

FIG. 85 is a diagram illustrating another example of the PHY frame format in the 11ay standard in a modification of Embodiment 3;

FIG. 86 is a diagram illustrating another example of the PHY frame format in the 11ay standard in a modification of Embodiment 3;

FIG. 87 is a diagram illustrating another example of the PHY frame format in the 11ay standard in a modification of Embodiment 3;

FIG. 88 is a diagram illustrating an example of the value of Nsub corresponding to the value of TRN_LEN in a modification of Embodiment 3;

FIG. 89 is a diagram illustrating another example of the value of Nsub with respect to the value of TRN_LEN in a modification of Embodiment 3;

Figure 91:
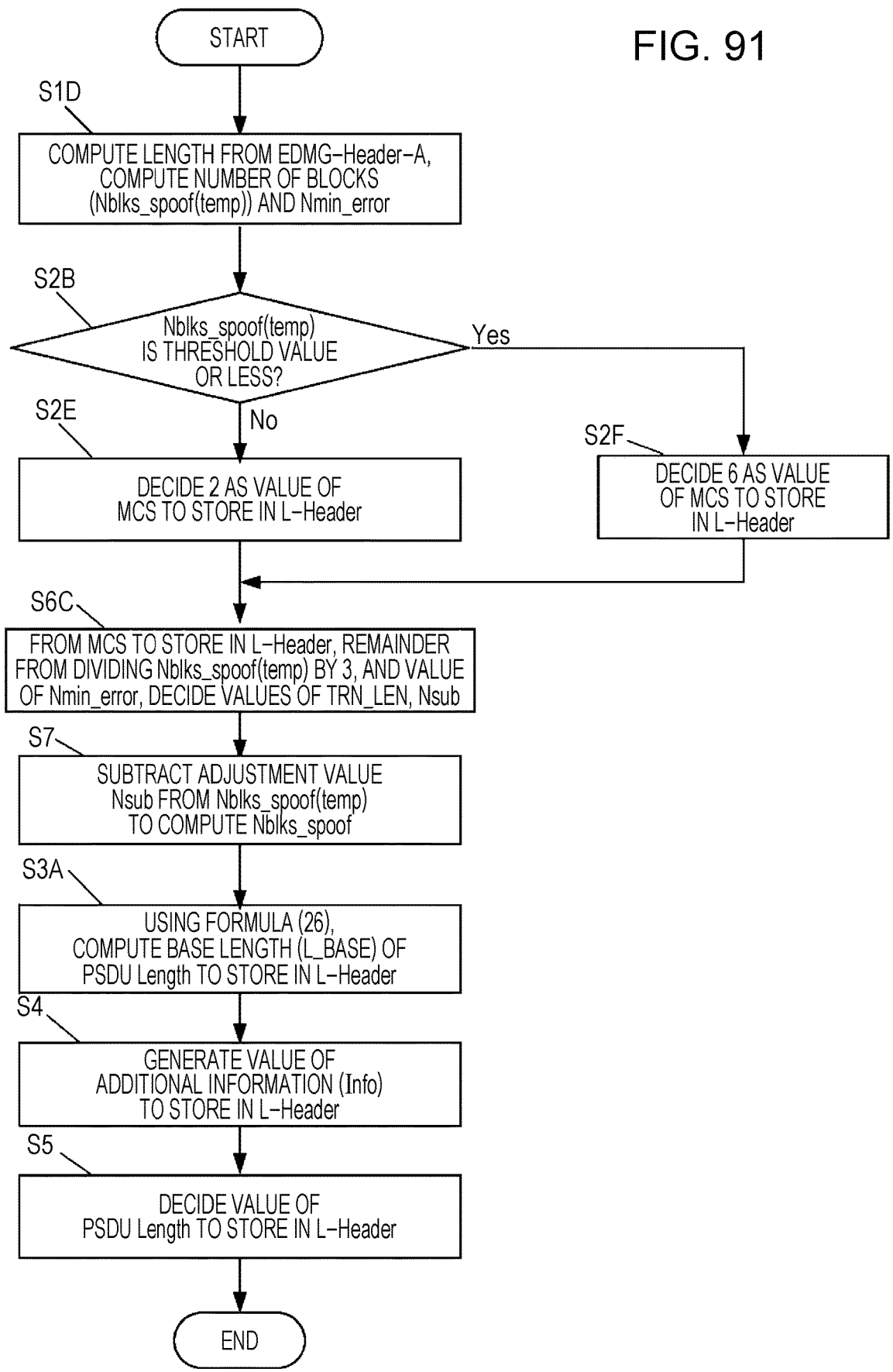
Figure 95:
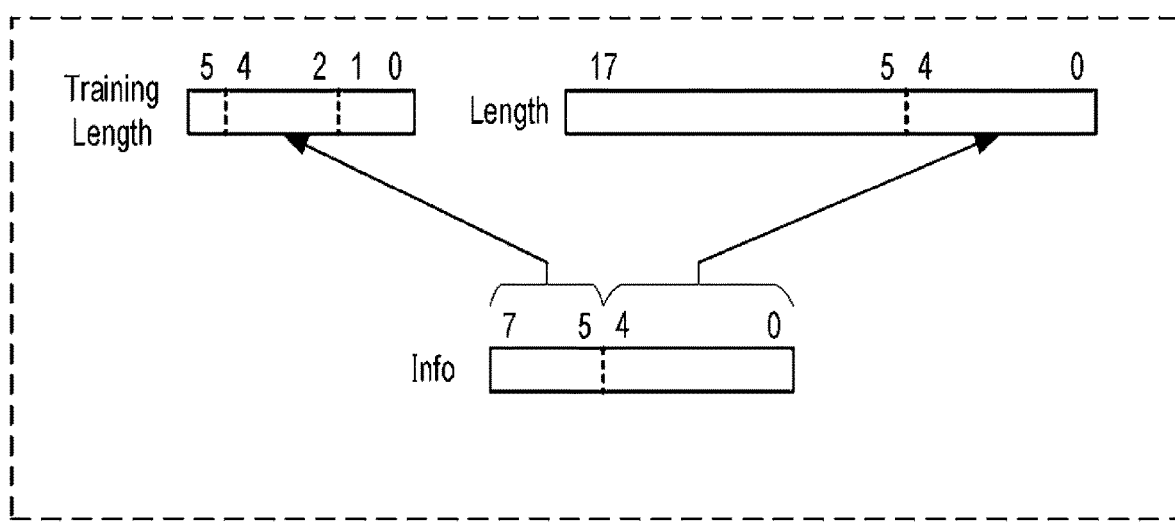
Figure 97:
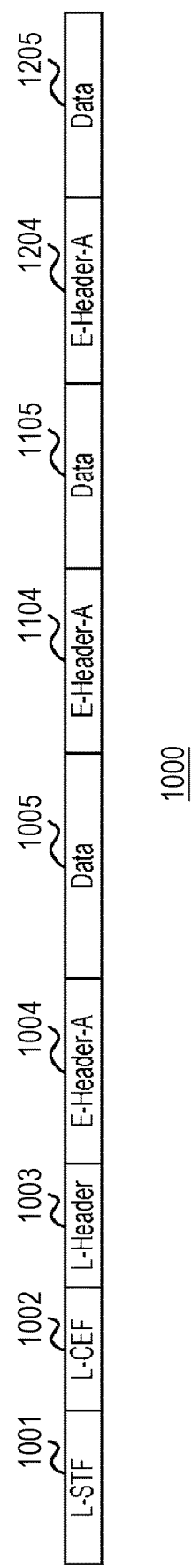
Figure 98:
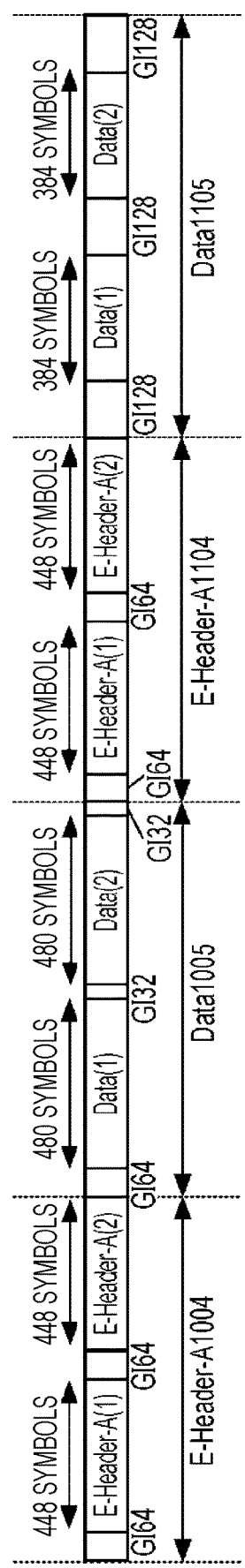
Figure 99:
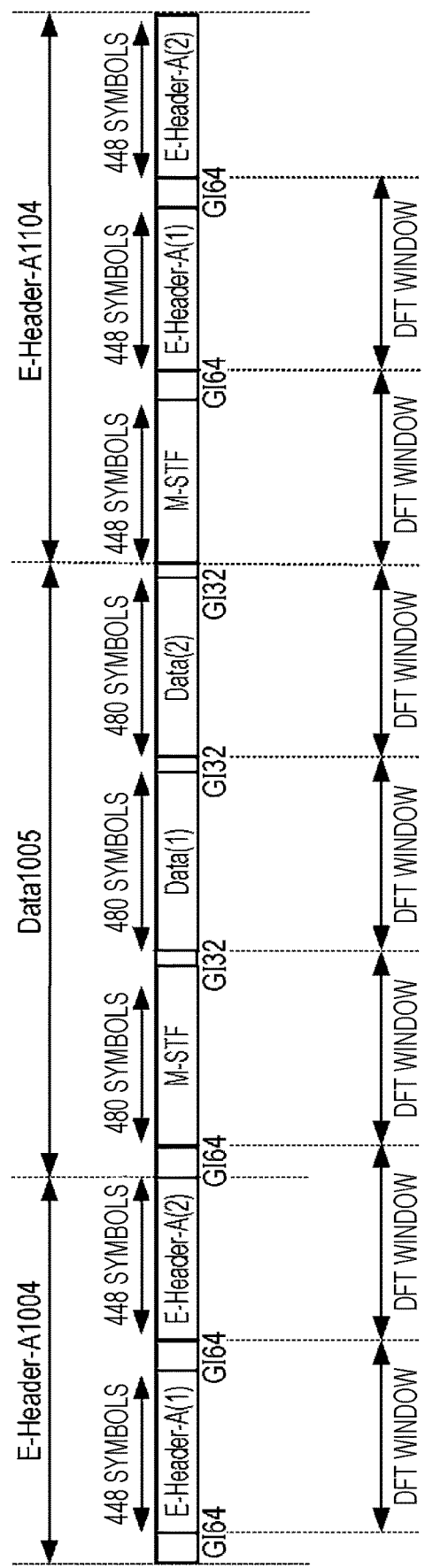

FIG. 90 is a diagram illustrating another example of the value of Nsub with respect to the value of TRN_LEN;

FIG. 91 is a flowchart illustrating another example of a process of computing the values of the MCS and Length fields in the L-Header in a modification of Embodiment 3;

FIG. 92 is a diagram illustrating an example of combinations of the value of TRN_LEN and the value of Nsub with respect to spoofing error in a modification of Embodiment 3;

FIG. 93 is a diagram illustrating another example of the value of Nsub with respect to the value of TRN_LEN in a modification of Embodiment 3;

FIG. 94 is a diagram illustrating another example of combinations of the value of TRN_LEN and the value of Nsub with respect to spoofing error in a modification of Embodiment 3;

FIG. 95 is a diagram illustrating an example of the relationship between the Length field and the Training field of the L-Header with respect to the Info field in a modification of Embodiment 3;

FIG. 96A is a diagram illustrating another example of combinations of the value of TRN_LEN and the value of Nsub with respect to spoofing error in a modification of Embodiment 3;

FIG. 96B is a diagram illustrating another example of combinations of the value of TRN_LEN and the value of Nsub with respect to spoofing error in a modification of Embodiment 3;

FIG. 96C is a diagram illustrating the value of Nmin error corresponding to the packet type in a modification of Embodiment 3;

FIG. 97 is a diagram illustrating an example of the frame format of a PHY frame in Modification 2 of Embodiment 12;

FIG. 98 is a diagram illustrating an example of the E-Header-A field and the Data field in Modification 2 of Embodiment 12; and FIG. 99 is a diagram illustrating another example of the E-Header-A field and the Data field in Modification 2 of Embodiment 12.

DETAILED DESCRIPTION

Figure 1:
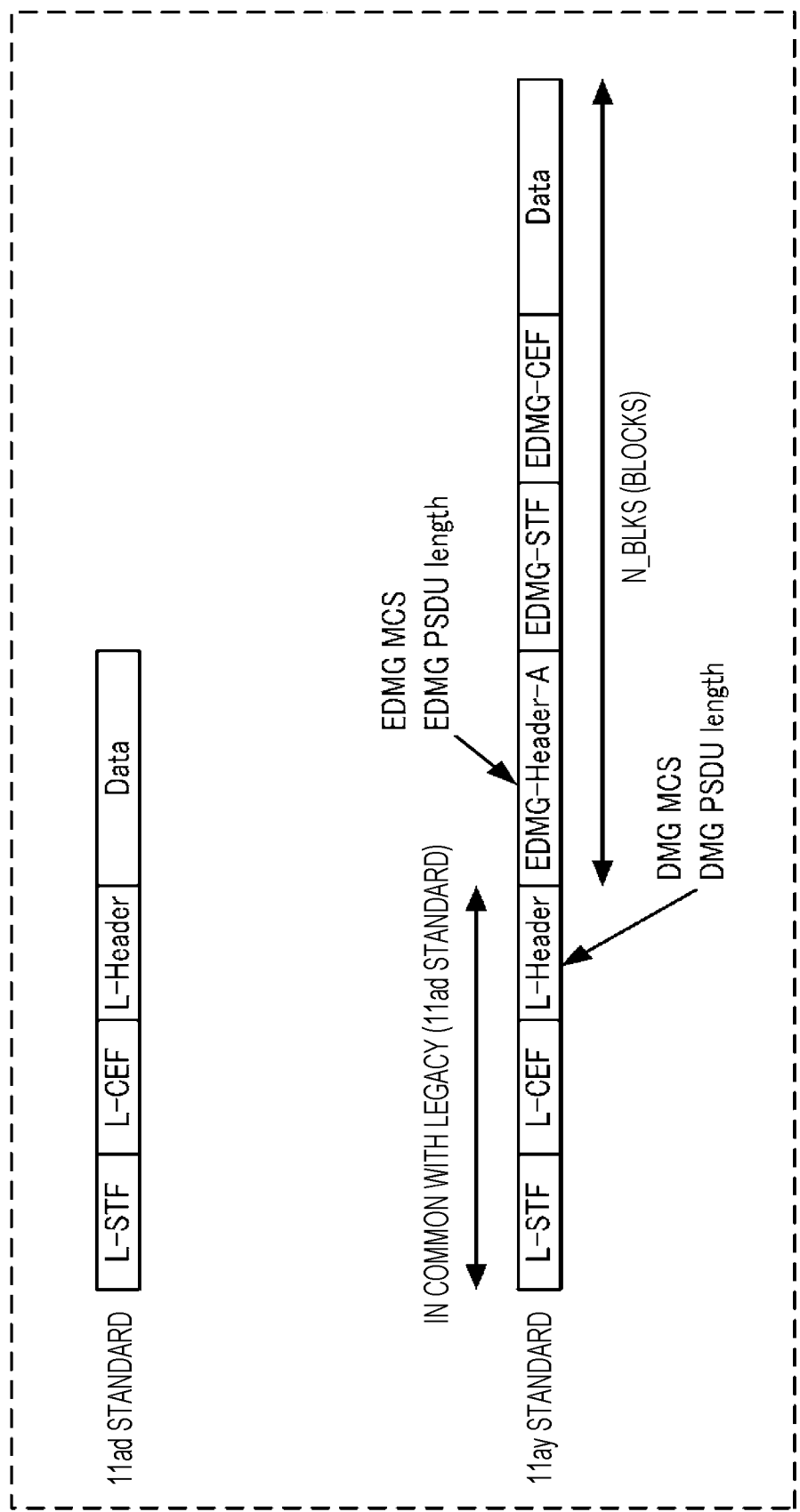
FIG. 1 is a diagram illustrating an example of the frame formats of the 11ad standard and the 11ay standard.

FIG. 1 illustrates an example of the frame formats of the 11ad standard and the 11ay standard.

A frame of the 11ad standard is arranged in the order of the L-STF, the L-CEF, the L-Header, and the Data field (payload). Hereinafter, the L-STF and the L-CEF may also be called the "legacy preamble", and the L-Header may also be called the "legacy header".

A frame of the 11ay standard is arranged in the order of the L-STF, the L-CEF, the L-Header, the EDMG-Header-A, the EDMG-STF, the EDMG-CEF, and the Data field (payload). Hereinafter, the EDMG-Header-A may also be called the "extension header", and the EDMG-STF and the EDMG-CEF may also be called the "extension preamble".

The L-STF, the L-CEF, and the L-Header are fields shared in common between the 11ad standard and the 11ay standard. On the other hand, the EDMG-Header-A, the EDMG-STF, and the EDMG-CEF are fields for the 11ay standard, and are not prescribed in the 11ad standard.

Since the number of reserved bits included in the L-Header is limited (4 bits; see NPL 1, for example), storing transmission mode selection information in the L-Header is difficult.

On the other hand, like in the past (11ac standard), it is conceivable to store the transmission mode selection information in the EDMG-Header-A of the 11ay standard. However, in the case of storing the transmission mode selection information in the EDMG-Header-A, a terminal (STA, AP/PCP) conforming to the 11ay standard (hereinafter called an "flay terminal") experiences a delay of demodulation and decoding processing for extracting the transmission mode selection information from the EDMG-Header-A. For this reason, the 11ay terminal receives the EDMG-STF before the demodulation and decoding of the EDMG-Header-A is completed. In other words, because of the decoding delay, the 11ay terminal receives the EDMG-STF that follows the EDMG-Header-A while the EDMG-Header-A is being decoded. For this reason, the 11ay terminal has difficulty specifying the transmission mode selection information when receiving the EDMG-STF, and has difficulty discriminating the type of transmission mode (format) of the received EDMG-STF.

For this reason, for the 11ay terminal, the types of transmission modes which may be used for the EDMG-STF are limited. In contrast, a method is conceivable in which the types of usable transmission modes are increased by having the 11ay terminal report in advance information about the format to be transmitted next for the EDMG-STF, for example. However, with this method, radio resources are needed to transmit control information for reporting the format in advance.

Accordingly, an objective of one aspect according to the present disclosure is to appropriately report transmission mode selection information from the transmitting device to the receiving device, and at the receiving device, correctly receive packets on the basis of the transmission mode selection information.

Hereinafter, an embodiment of the present disclosure will be described in detail and with appropriate reference to the drawings.

Embodiment 1

[Configuration of Transmitting Device]

Figure 2:
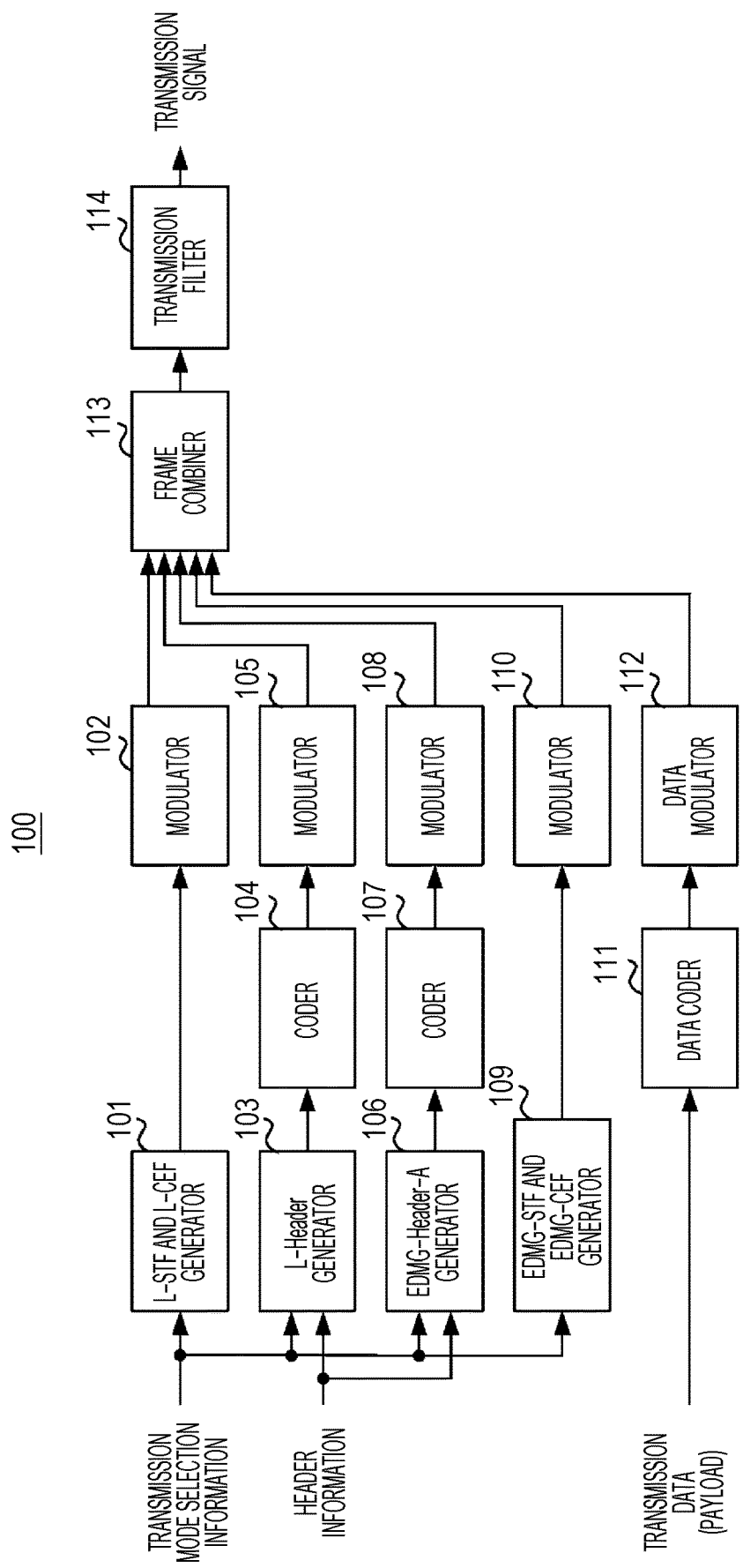
FIG. 2 is a diagram illustrating an exemplary configuration of a transmitting device according to Embodiment 1.

FIG. 2 will be used to describe an exemplary configuration of a transmitting device 100 (11ay terminal) according to the present embodiment. The transmitting device 100 transmits a transmission signal using the frame format of the 11ay standard illustrated in FIG. 1.

The transmitting device 100 includes an L-STF and L-CEF generator 101, a modulator 102, an L-Header generator 103, a coder 104, a modulator 105, an EDMG-Header-A generator 106, a coder 107, a modulator 108, an EDMG-STF and EDMG-CEF generator 109, a modulator 110, a Data coder 111, a Data modulator 112, a frame combiner 113 (corresponding to a transmission signal generator), and a transmission filter 114.

In FIG. 2, transmission mode selection information is input into the L-STF and L-CEF generator 101, the L-Header generator 103, the EDMG-Header-A generator 106, and the EDMG-STF and EDMG-CEF generator 109. Also, header information is input into the L-Header generator 103 and the EDMG-Header-A generator 106.

The transmission mode selection information includes the following information, for example.
PHY class (Control PHY, Single Carrier, OFDM and DMG (11ad mode), EDMG (11ay mode))
Presence of channel bonding, number of channels to bond
Presence of channel aggregation, channel numbers to aggregate
Presence of MIMO transmission (SU-MIMO/MU-MIMO), number of MIMO streams The header information includes the following information, for example.
Transmission data (payload) data length (Physical layer Service Data Unit (PSDU) Length) information
Modulation and Coding Scheme (MCS) information for coding and modulating the transmission data (payload)
Other header information The L-STF and L-CEF generator 101 generates an L-STF and L-CEF bit pattern on the basis of the input transmission mode selection information. For example, the L-STF and L-CEF generator 101 generates a bit pattern using Golay sequences, similarly to the 11ad standard.

Similarly to the 11ad standard, the modulator 102 performs $\pi/2$-BPSK modulation on the L-STF and L-CEF (bit pattern) input from the L-STF and L-CEF generator 101. Note that in the case of channel bonding or channel aggregation, the modulator 102 arranges the modulated data in the channels in which to transmit.

The L-Header generator 103 (corresponding to a header generator) generates PSDU Header (L-Header) data (legacy header number) in accordance with the format prescribed by the 11ad standard, on the basis of the input transmission mode selection information and header information. However, the information generated by the L-Header generator 103 is all dummy information. For example, among the information to include in the L-Header, the L-Header generator 103 sets the value of the MCS and the value of the PSDU Length to indicate the data length of the fields (EDMG-Header-A, EDMG-STF, EDMG-CEF, Data) that come after the L-Header. Also, the L-Header generator 103 includes the transmission mode selection information (hereinafter also designated "Info") in the PSDU Length. Note that the details of the method of setting the values of the MCS and the PSDU Length in the L-Header generator 103 will be described later.

Similarly to the 11ad standard, the coder 104 executes LDPC coding on the L-Header. Also similarly to the 11ad standard, the modulator 105 executes $\pi/2$-BPSK modulation on the L-Header. Note that, similarly to the L-STF and the L-CEF, in the case of channel bonding or channel aggregation, the modulator 105 arranges the modulated data in the channels in which to transmit.

The EDMG-Header-A generator 106 generates EDMG-Header-A data on the basis of the input header information. Note that the EDMG-Header-A generator 106 may also change the EDMG-Header-A data on the basis of the input transmission mode selection information. For example, on the basis of the transmission mode selection information, the EDMG-Header-A generator 106 may change the arrangement (format) of the EDMG-Header-A data, or include part of the transmission mode selection information in the EDMG-Header-A data.

The coder 107 performs coding (for example, LDPC coding) on the EDMG-Header-A data, and the modulator 108 performs modulation (for example, $\pi/2$-BPSK) on the EDMG-Header-A data. Note that, similarly to the L-STF and the L-CEF, in the case of channel bonding or channel aggregation, the modulator 107 arranges the modulated data in the channels in which to transmit.

On the basis of the input transmission mode selection information, the EDMG-STF and EDMG-CEF generator 109 generates an EDMG-STF signal and EDMG-CEF signal indicating a data pattern needed by a receiving device 200 (11ay terminal) to receive and decode the Data (payload). For example, the EDMG-STF and EDMG-CEF generator 109 uses Golay sequences.

Note that in the case of channel bonding, the EDMG-STF and EDMG-CEF generator 109 may also use different patterns depending on the number of channels to bond. For example, the EDMG-STF and EDMG-CEF generator 109 may also repeat a pattern having a sequence length proportional to the number of channels to bond. Also, in the case of channel aggregation, the EDMG-STF and EDMG-CEF generator 109 may use a different pattern for each channel. Alternatively, in the case of MIMO transmission, the EDMG-STF and EDMG-CEF generator 109 may use a different pattern for each stream.

The modulator 110 performs $\pi/2$-BPSK modulation, for example, on the EDMG-STF signal and EDMG-CEF signal input from the EDMG-STF and EDMG-CEF generator 109. Note that in the case of channel bonding, the modulator 110 changes the symbol rate depending on the number of channels to bond. For example, if there is one channel, the modulator 110 may use 1.76 giga-samples per second, whereas if there are two channels, the modulator 110 may use 3.52 giga-samples per second. Also, in the case of channel aggregation, the modulator 110 arranges the modulated data in the channels in which to transmit.

The Data coder 111 performs coding (for example, LDPC coding) on the transmission data (payload), on the basis of the MCS information included in the header information. The Data modulator 112 performs modulation (such as $\pi/2$-BPSK, $\pi/2$-QPSK, $\pi/2$-16QAM, or $\pi/2$-64QAM, for example) on the coded data, on the basis of the MCS information included in the header information.

The frame combiner 113 combines the L-STF, L-CEF, L-Header, EDMG-Header-A, EDMG-STF, EDMG-CEF, and Data ordered in time according to the frame format (see FIG. 1, for example), and generates frame data.

The transmission filter 114 performs filter processing on the frame data input from the frame combiner 113, and generates and transmits a transmission signal. For example, the transmission filter 114 applies an oversampling process and a root raised cosine filter to the frame data. With this arrangement, a transmission signal in the 11ay terminal frame format illustrated in FIG. 1 is transmitted. Note that the transmission signal generated by the transmitting device 100 is transmitted as a radio signal via a D/A converter, an RF circuit, and an antenna, for example.

[Configuration of Receiving Device]

Figure 3:
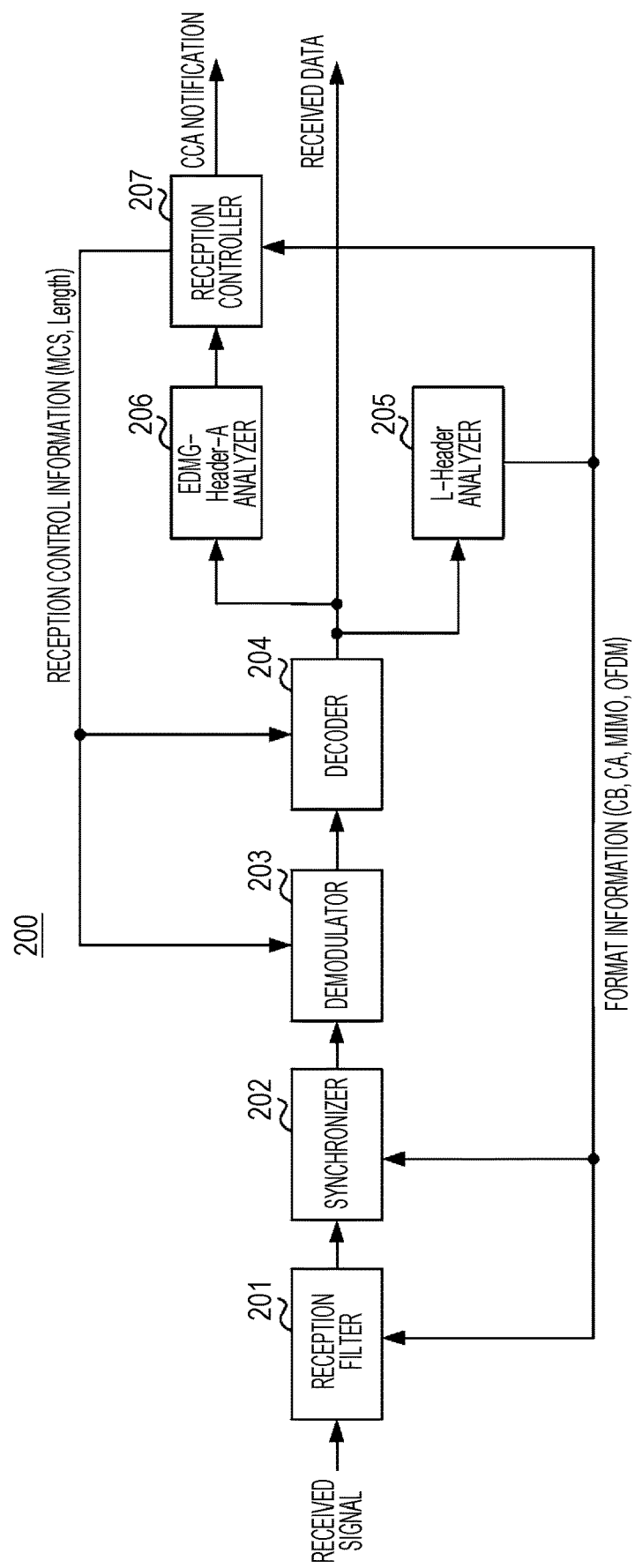
FIG. 3 is a diagram illustrating an exemplary configuration of a receiving device (11ay terminal) according to Embodiment 1.

First, FIG. 3 will be used to describe an exemplary configuration of the receiving device 200, which is an 11ay terminal. The receiving device 200 includes a reception filter 201, a synchronizer 202, a demodulator 203, a decoder 204, an L-Header analyzer 205, an EDMG-Header-A analyzer 206, and a reception controller 207.

The receiving device 200 receives a radio signal transmitted by the transmitting device 100 via an antenna, an RF circuit, and an A/D converter.

The reception filter 201 performs a filter process on the received signal. For example, the reception filter 201 may apply a root raised cosine filter to the received signal. Additionally, the reception filter 201 may also perform sampling rate conversion or a center frequency shift process.

Also, the reception filter 201 decides the tap coefficients of the filter according to the bandwidth of the received signal.

For example, when standing by, the reception filter 201 sets the filter coefficients to receive a signal with a symbol rate of 1.76 GHz to receive the L-STF, the L-CEF, and the L-Header.

Also, in the case in which the received signal (received packet) corresponds to channel bonding, the reception filter 201 sets the filter coefficients to receive a signal with a larger symbol rate than 1.76 GHz at the timing of receiving the EDMG-STF. For example, in the case of 2-channel bonding, the reception filter 201 sets the symbol rate to 3.52 GHz.

Also, in the case in which the received signal (received packet) corresponds to channel aggregation, at the timing of receiving the EDMG-STF, the reception filter 201 sets the filter coefficients to receive signals with a symbol rate of 1.76 GHz on multiple channels at the same time.

Also, in the case in which the received signal (received packet) corresponds to MIMO transmission, the reception filter 201 sets the filter coefficients to receive signals in multiple RF chains at the timing of receiving the EDMG-STF.

Also, in the case in which the received signal (received packet) corresponds to OFDM transmission, the reception filter 201 may also treat the EDMG-STF and the EDMG-CEF as an OFDM-modulated signal. In this case, the reception filter 201 switches to a reception configuration enabling the reception of an OFDM signal.

The synchronizer 202 performs L-STF detection using a correlator (not illustrated). In addition, from among the received signal (received symbols) input from the reception filter 201, the synchronizer 202 uses the L-STF, the L-CEF, the EDMG-STF, the EDMG-CEF, or other received symbols to synchronize the reception timing or the phase.

For example, when standing by, the synchronizer 202 detects the L-STF using the correlator. Upon detecting the L-STF, the synchronizer 202 uses the L-STF or the L-CEF to synchronize the reception timing and the phase.

Also, in the case in which the received packet corresponds to each of channel bonding, channel aggregation, MIMO transmission, and OFDM transmission, the synchronizer 202 resynchronizes using the EDMG-STF and the EDMG-CEF according to the type of each.

The demodulator 203 demodulates the received signal modulated by $\pi/2$-BPSK, $\pi/2$-QPSK, $\pi/2$-16QAM, or the like. For example, the demodulator 203 performs demodulation using a modulation method (for example, $\pi/2$-BPSK) that is predetermined with respect to the L-Header, whereas for the payload, the demodulator 203 performs demodulation by determining a modulation scheme on the basis of the MCS information reported from the reception controller 207. Also, on the basis of the Length information reported from the reception controller 207, the demodulator 203 may also control the start and stop of the operations by the demodulator 203. Note that an equalizer (not illustrated) may also be provided upstream of the demodulator 203.

The decoder 204 performs error-correcting decoding on the data coded by error-correcting code (such as LDPC codes). For example, the decoder 204 performs decoding using a coding scheme and a code rate (for example, LDPC codes with a code rate of 3/4) that is predetermined with respect to the L-Header, whereas for the payload, the decoder 204 performs decoding by determining a coding scheme and code rate on the basis of the MCS information reported from the reception controller 207. Also, on the basis of the Length information, the decoder 204 may also control the start and stop of the operations by the decoder 204.

The L-Header analyzer 205 extracts the transmission mode selection information (Info) from the values of the MCS field and the Length field included in the L-Header. The transmission mode selection information includes, for example, channel bonding information (CB), channel aggregation information (CA), MIMO information, and OFDM information. The L-Header analyzer 205 outputs the transmission mode selection information to the reception filter 201, the synchronizer 202, and the reception controller 207.

The EDMG-Header-A analyzer 206 analyzes the frame format of the EDMG-Header-A input from the decoder 204, and acquires the MCS, Length, and other reception control information.

The reception controller 207 calculates the frame length on the basis of the MCS and Length information input from the EDMG-Header-A analyzer 206, and asserts a Clear Channel Assessment (CCA) signal over the period in which the frame is being received. Note that the CCA is a process of determining and reporting whether or not a signal of a fixed level or greater is being received on the receive channel. If the received packet is in the format of the 11ay standard, the reception controller 207 notifies the demodulator 203 and the decoder 204 to perform demodulation and decoding processes on the received packet.

Note that in the case of detecting that demodulation or decoding cannot be performed correctly, the receiving device 200 may stop the demodulation or decoding operations in an attempt to save power.

Figure 4:
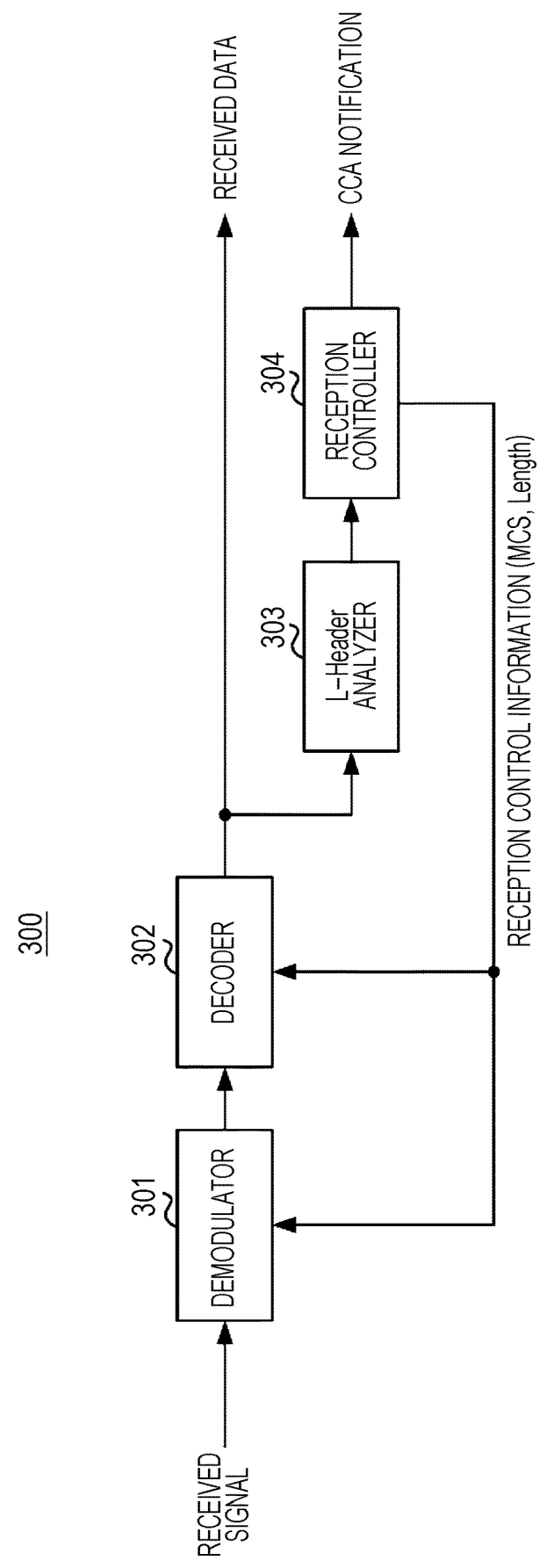
FIG. 4 is a diagram illustrating an exemplary configuration of a receiving device (legacy terminal) according to Embodiment 1.

Next, FIG. 4 will be used to describe an exemplary configuration of a legacy terminal of the 11ad standard, namely a receiving device 300, for example. The receiving device 300 includes a demodulator 301, a decoder 302, an L-Header analyzer 303, and a reception controller 304.

The receiving device 300 receives a radio signal transmitted by the transmitting device 100 via an antenna, an RF circuit, and an A/D converter.

The demodulator 301 demodulates the received signal modulated by $\pi/2$-BPSK, $\pi/2$-QPSK, $\pi/2$-16QAM, or the like. For example, the demodulator 301 performs demodulation using a modulation method (for example, $\pi/2$-BPSK) that is predetermined with respect to the L-Header, whereas for the payload, the demodulator 301 performs demodulation by determining a modulation scheme on the basis of the MCS information reported from the reception controller 304. Also, on the basis of the Length information reported from the reception controller 304, the demodulator 301 may also control the start and stop of the operations by the demodulator 301. Note that a reception filter, a synchronizer, and an equalizer (not illustrated) may also be provided upstream of the demodulator 301.

The decoder 302 performs error-correcting decoding on the data coded by error-correcting code (such as LDPC codes). For example, the decoder 302 performs decoding using a coding scheme and a code rate (for example, LDPC codes with a code rate of 3/4) that is predetermined with respect to the L-Header, whereas for the payload, the decoder 302 performs decoding by determining a coding scheme and code rate on the basis of the MCS information reported from the reception controller 304. Also, on the basis of the Length information, the decoder 302 may also control the start and stop of the operations by the decoder 302.

The L-Header analyzer 303 analyzes the frame format of the L-Header input from the decoder 302, and acquires the MCS, Length, and other reception control information.

The reception controller 304 calculates the frame length on the basis of the MCS and Length information input from the L-Header analyzer 303, and asserts a CCA signal over the period in which the frame is being received. In the case in which the received packet is in the format of the 11ad standard, the reception controller 304 notifies the demodulator 301 and the decoder 302 to perform demodulation and decoding processes on the received packet.

In addition, even in the case in which the received packet is in the format of the 11ay standard, the reception controller 304 acts as though a packet of the 11ad standard has been received, and issues instructions to each of the demodulator 301 and the decoder 302 to start demodulation and decoding operations. At this time, the demodulator 301 and the decoder 302 are not necessarily able to demodulate and decode the packet correctly. However, according to the present embodiment, since the frame length computed by the reception controller 304 from the MCS and the Length in the L-Header is a positive value, the reception controller 304 is able to issue the CCA notification correctly. In other words, the transmitting device 100 does not influence the operation of the legacy terminal (receiving device 300), even when information (the Info field) which is information not used by the legacy terminal (receiving device 300) but identifiable by the 11ay terminal (receiving device 200) is embedded in the L-Header.

Note that in the case of detecting that demodulation or decoding cannot be performed correctly, the receiving device 300 may stop the demodulation or decoding operations in an attempt to save power.

[Operations of Transmitting Device and Receiving Device]

The operations of the transmitting device 100, the receiving device 200, and the receiving device 300 having the above configurations will be described.

Figure 5:
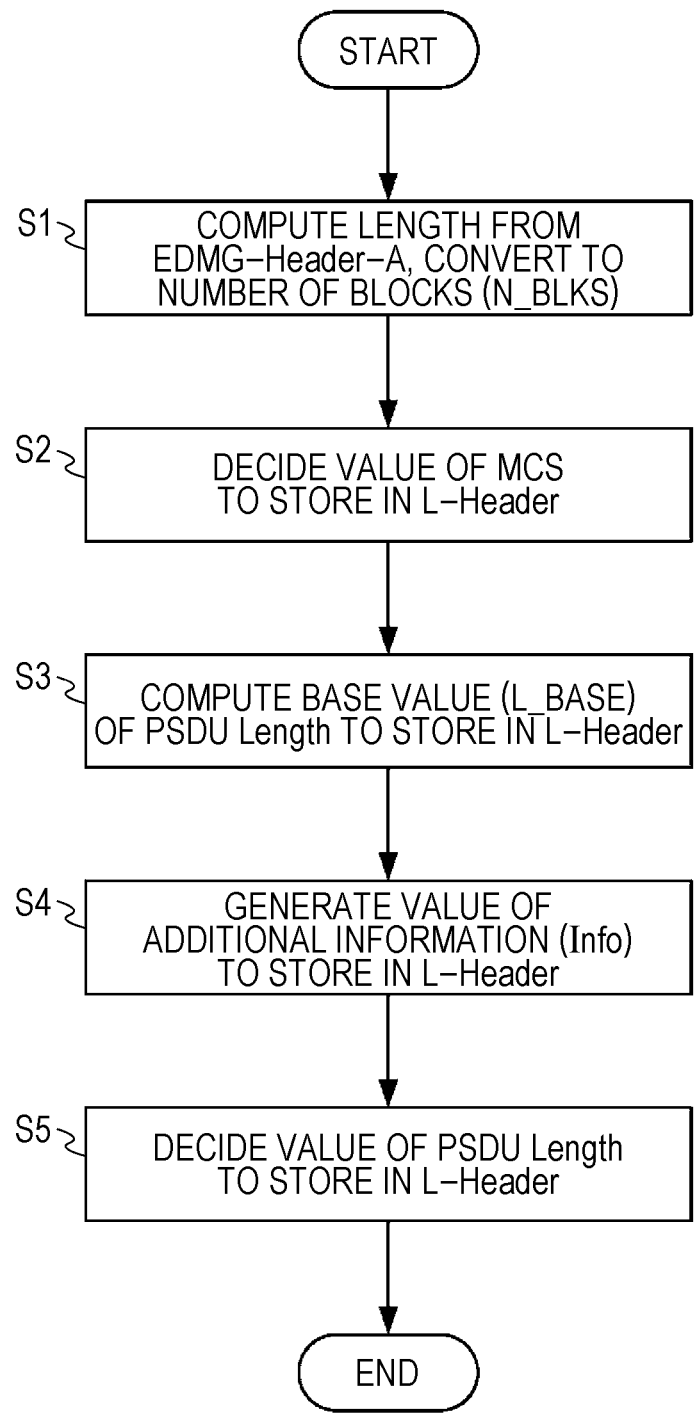
FIG. 5 is a flowchart illustrating operations of the transmitting device according to Embodiment 1.

FIG. 5 is a flowchart illustrating operations in the transmitting device 100 (L-Header generator 103).

In step S1 of FIG. 5, the transmitting device 100 computes the packet length (duration) from the EDMG-Header-A (that is, the packet length from the beginning of the EDMG-Header-A to the end of the Data field). Subsequently, the transmitting device 100 converts the computed packet length into a number (N_BLKS) of 11ad SC PHY symbol blocks.

At this point, as prescribed in NPL 1, a single symbol block includes 448 symbols of data and a guard interval (GI) of 64 symbols, for a total of 512 symbols, which is approximately 291 nsec in time.

In step S2, the transmitting device 100 decides the value of the MCS to store in the L-Header. Note that in the following, for the sake of convenience, the MCS to store in the L-Header will be designated the "DMG MCS", while the MCS to store in the EDMG-Header-A will be designated the "EDMG MCS". For example, the transmitting device 100 may select a fixed MCS as the DMG MCS.

In step S3, the transmitting device 100 computes a value (base value; designated "L_BASE") to use for computing the PSDU Length (data length information) to store in the L-Header. Note that in the following, for the sake of convenience, the PSDU Length to store in the L-Header will be designated the "DMG PSDU Length", while the MCS to store in the EDMG-Header-A will be designated the "EDMG PSDU Length".

In step S4, the transmitting device 100 generates the value of the transmission mode selection information (additional information; designated "Info") to store in the L-Header.

FIG. 6 illustrates an example of the transmission mode selection information Info. Herein, the maximum number of bits in the Info field is 6 bits (bit0 to bit5).

In FIG. 6, bit0 is treated as a channel bonding (CB) field that indicates the presence of channel bonding, bit1 is treated as a channel aggregation (CA) field that indicates the presence of channel aggregation, bit2 and bit3 are treated as a MIMO field that indicates the presence and type of MIMO transmission, and bit4 is treated as an OF field that indicates SC transmission or OFDM transmission. Also, in FIG. 6, bit5 is treated as a reserved bit for future functional extensions. The value of bit5 is always set to 0, for example. Note that a specific example of each value in the Info field will be described later.

In step S5, the transmitting device 100 uses the base value L_BASE computed in step S3 and the value of Info generated in step S4 to decide the value of the DMG PSDU Length. The transmitting device 100 decides the DMG PSDU Length so that the packet length expressed by the DMG MCS and the DMG PSDU Length is equal to the number of symbol blocks (N_BLKS) computed in step S1.

For example, the transmitting device 100 computes the DMG PSDU Length according to Formula (1) or Formula (2).

$$DMF\ PSDU\ \text{Length} = L\_BASE - \text{Info} \quad \text{Formula (1)}$$

$$= \frac{\text{floor}((N\_BLKS \times N\_CBPB - \text{mod}(N\_BLKS \times N\_CBPB, L\_CW))}{\times R/8) - \text{Info}}$$

$$DMF\ PSDU\ \text{Length} = L\_BASE - \text{Info} \quad \text{Formula (2)}$$

$$= \text{floor}(\text{floor}(N\_BLKS \times N\_CBPB / L\_CW) \times L\_CW \times R/8) - \text{Info}$$

In Formula (1) and Formula (2), the function floor(x) denotes a function that returns the largest integer not exceeding the numerical value x, and the function mod(x, y) denotes the modulo operation that returns the remainder of dividing x by y. Additionally, N_CBPB (the number of coded bits per symbol block) and R (the code rate) are values determined according to the value of the DMG MCS in NPL 1. FIG. 7 illustrates correspondence relationships between the MCS, and N_CBPB and R. Also, as prescribed in NPL 1, L_CW (the code word length)=672.

From Formula (1) and Formula (2), the value of L_BASE corresponds to the value of the DMG PSDU Length in the case where Info=0. In other words, in step S3, the transmitting device 100 computes L_BASE using L_CW, N_BLKS computed in step S1, and N_CBPB and R corresponding to the DMG MCS decided in step S2. the Also, in Formula (1) and Formula (2), the value of the transmission mode selection information Info takes a value that is 0 or greater, but less than N_Info. N_Info is computed by floor(L_CW×R/8). FIG. 7 illustrates correspondence relationships between each MCS, and the value of N_Info and the maximum number of bits in the Info field.

For example, in the case in which the transmitting device 100 computes the DMG PSDU Length using each MCS illustrated in FIG. 7 in accordance with Formula (2), the results are expressed as follows.

MCS1: DMG PSDU Length=floor(N_BLKS×2/3)× 21−Info

MCS2: DMG PSDU Length=floor(N_BLKS×2/3)× 42−Info

MCS3: DMG PSDU Length=floor(floor(N_BLKS×2/ 3)×52.5)−Info

MCS4: DMG PSDU Length=floor(N_BLKS×2/3)× 63−Info

MCS5: DMG PSDU Length=floor(floor(N_BLKS×2/ 3)×68.25)−Info

MCS6: DMG PSDU Length=floor(N_BLKS×4/3)× 42−Info

MCS7: DMG PSDU Length=floor(floor(N_BLKS×4/ 3)×52.5)−Info

MCS8: DMG PSDU Length=floor(N_BLKS×4/3)× 63−Info

MCS9: DMG PSDU Length=floor(floor(N_BLKS×4/ 3)×68.25)−Info

MCS10: DMG PSDU Length=floor(N_BLKS×8/3)× 42−Info

MCS11: DMG PSDU Length=floor(floor(N_BLKS× 8/3)×52.5)−Info

MCS12: DMG PSDU Length=floor(N_BLKS×8/3)× 63−Info           Formula (3)

In this way, the transmitting device 100 transmits the transmission mode selection information Info included in the DMG PSDU Length inside the L-Header. With this arrangement, the receiving device 200 is able to acquire the transmission mode selection information when receiving the L-Header. Consequently, when receiving the EDMG-STF, the receiving device 200 is able to specify the transmission mode (format) to use for the fields from the EDMG-STF, and thus is able to receive the frame correctly.

Specifically, the receiving device 200 decodes the L-Header and obtains the DMG MCS and the DMG PSDU Length.

Subsequently, the receiving device 200 computes the value of Info by deducting the remainder of dividing the DMG PSDU Length by (L_CW×R/8) from the value of (L_CW×R/8). Note that in the case in which the above deducted value is not an integer, the receiving device 200 computes the value of Info by discarding the portion after the decimal point (that is, by using the floor function). In the case in which the DMG MCS is 1 or an even number, the above deducted value always becomes an integer.

For example, in the case in which DMG MCS=MCS2, and DMG PSDU Length=80, the remainder of dividing 80 by 42 is 38, and 42-38 is 4. Thus, the value of Info is 4. Similarly, for example, in the case in which DMG MCS=MCS5, and DMG PSDU Length=398, the remainder of dividing 398 by 68.25 is 56.75, 68.25-56.75 is 11.5, and the portion of 11.5 after the decimal point is discarded to obtain 11. Thus, the value of Info is 11.

On the other hand, the receiving device 300 (legacy terminal) decodes the L-Header and obtains the DMG MCS and the DMG PSDU Length.

Subsequently, the receiving device 300 uses the DMG MCS and the DMG PSDU Length to perform CCA detection and a packet receiving process. By performing CCA detection and the packet receiving process, the receiving device 300 reports the CCA as receiving during the process of receiving a radio signal from the transmitting device 100. Alternatively, the receiving device 300 may compute the packet length of the radio signal from the transmitting device 100 on the basis of the DMG MCS and the DMG PSDU Length, and report the CCA in a segment corresponding to the computed packet length.

Next, a specific example of the value of Info illustrated in FIG. 6 will be described.

<CB Field>

For example, a value of bit0=0 in the CB field indicates that channel bonding is inactive, while bit0=1 indicates that the field from the EDMG-STF field (see FIG. 1) will be transmitted by channel bonding (channel bonding: active).

For example, in the case in which channel bonding is active, the receiving device 200 switches parameters such as the filter coefficients of the radio frequency (RF) circuit, the operating mode of the correlator, the beamforming settings (the sector or antenna weight vector (AWV)), the sampling rate of the A/D converter, and the like.

With this arrangement, the receiving device 200 is able to specify the presence of channel bonding in the fields from the EDMG-STF with the CB field included in the DMG PSDU Length of the L-Header. Thus, from the beginning part of the EDMG-STF, the receiving device 200 is able to switch the receive configuration (parameters), and correctly receive the frame according to the presence or absence of channel bonding.

<CA Field>

For example, a value of bit1=0 in the CA field indicates that channel aggregation is inactive, while bit1=1 indicates that channel aggregation is active.

For example, in the case of channel bonding, the transmitting device 100 transmits the EDMG-STF and the EDMG-CEF, whereas in the case of channel aggregation, by not transmitting the EDMG-STF and the EDMG-CEF, the transmission efficiency during channel aggregation may be improved.

With this arrangement, the receiving device 200 is able to specify the presence of channel aggregation in the CA field included in the DMG PSDU Length of the L-Header. Thus, before receiving the EDMG-STF, the receiving device 200 is able to switch the receive configuration (parameters), and correctly receive the frame according to the presence or absence of channel aggregation.

Also, the receiving device 200 is able to use one or both of the WB field and the CA field to determine whether or not the packet being received is transmitted by channel bonding or channel aggregation. In other words, the transmitting device 100 is able to perform packet transmission while switching between channel bonding and channel aggregation for each packet. With this arrangement, for example, the transmitting device 100 may communicate at higher speeds by using channel bonding in the case in which the EDMG PSDU Length is long, and improve the transmission efficiency by using channel aggregation in the case in which the EDMG PSDU Length is short.

<MIMO Field>

For example, a value of (bit2, bit3)=00 in the MIMO field indicates Single Input Single Output (SISO) transmission, (bit2, bit3)=01 indicates SU-MIMO transmission, (bit2, bit3)=10 indicates MU-MIMO transmission, and (bit2, bit3)=11 indicates an area reserved for future extensions.

For example, the transmitting device 100 does not have to transmit the EDMG-STF and the EDMG-CEF in the case of non-MIMO transmission (SISO transmission or diversity transmission).

With this arrangement, the receiving device 200 is able to specify the presence of MIMO transmission in the MIMO field included in the DMG PSDU Length of the L-Header. Thus, before receiving the EDMG-STF, the receiving device 200 is able to switch the receive configuration (parameters), and correctly receive the frame according to the presence or absence of MIMO transmission.

Also, the receiving device 200 is able to use the MIMO field to determine whether or not the packet being received is transmitted by MIMO. In other words, the transmitting device 100 is able to perform packet transmission while switching between MIMO transmission and non-MIMO transmission for each packet. With this arrangement, for example, the transmitting device 100 may communicate at higher speeds by using MIMO transmission in the case in which the EDMG PSDU Length is long, and improve the transmission efficiency by using non-MIMO transmission in the case in which the EDMG PSDU Length is short.

<OF Field>

For example, a value of bit4=0 in the OF field indicates SC transmission, while bit4=1 indicates OFDM transmission.

In the case of SC transmission, the transmitting device 100 may use a single carrier-modulated pattern with respect to the EDMG-CEF, and in the case of OFDM transmission, the transmitting device 100 may use an OFDM-modulated pattern with respect to EDMG-CEF. With this arrangement, the reception quality at the receiving device 200 may be improved in SC transmission and OFDM transmission.

With this arrangement, the receiving device 200 is able to specify SC transmission or OFDM transmission before receiving the EDMG-CEF with the OF field included in the DMG PSDU Length of the L-Header. Thus, from the beginning part of the EDMG-CEF, the receiving device 200 is able to switch the receive configuration (CEF pattern), and correctly receive the frame according to the transmission class. [Specific example of DMG PSDU Length]

Next, an example of computing the DMG PSDU Length in the transmitting device 100 described above will be described.

Figure 8:
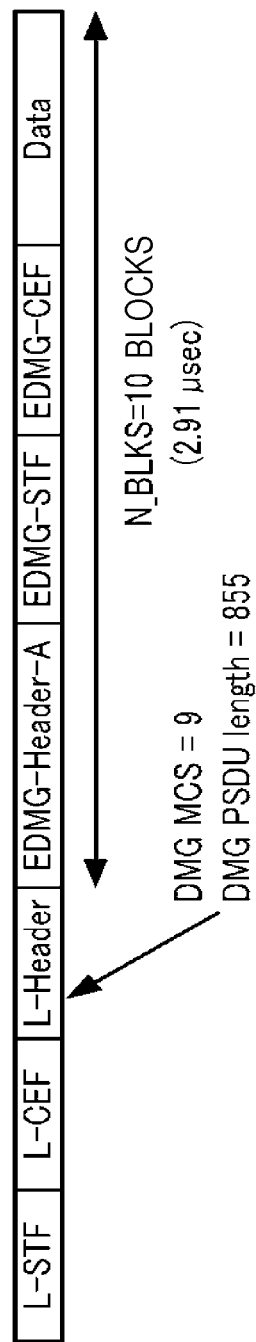
FIG. 8 is a diagram illustrating a specific example of the frame format of the 11ay standard according to Embodiment 1.

FIG. 8 illustrates the frame format of this specific example.

In FIG. 8, the length (packet length) of the EDMG-Header-A, the EDMG-STF, the EDMG-CEF, and the Data field is 2.91 μsec. Accordingly, the transmitting device 100 converts the packet length (2.91 μsec) into a number of symbol blocks (1 symbol block: 291 nsec), and obtains N_BLKS=10 (=2910 nsec/291 nsec) blocks. Also, in FIG. 8, the transmitting device 100 sets the DMG MCS to MCS9 (that is, according to FIG. 7, N_CBPB=896, R=13/16).

FIG. 9 illustrates the value of the Info field in this specific example. Info illustrated in FIG. 9 indicates active channel bonding (bit0=1, bit1=0), non-MIMO transmission (bit2=0, bit3=0), SC transmission (bit4=0), and the reserved bit bit5=0. In other words, the value of Info is "100000" (binary notation), "0x20" (hexadecimal notation), or 32 (decimal notation).

FIG. 10 illustrates the relationship between DMG PSDU Length and N_BLKS for MCS9 in NPL 1. In FIG. 10, each DMG PSDU Length ("Length") is associated with a number of symbol blocks (N_BLKS) for each predetermined range. Note that FIG. 10 illustrates an example of MCS9, but similarly for other MCS, the DMG PSDU Length is associated with a number of symbol blocks (N_BLKS) for each predetermined range according to the DMG MCS.

Namely, in the case of MCS9 and N_BLKS=10 blocks, the transmitting device 100 needs to set the DMG PSDU Length from 820 to 887 bytes. In other words, the transmitting device 100 decides the DMG PSDU Length so that the packet length corresponding to the DMG MCS and the DMG PSDU Length becomes equal to N_BLKS=10 symbol blocks.

For example, the transmitting device 100 computes the DMG PSDU Length as follows, according to Formula (1). Note that the transmitting device 100 may also obey Formula (2).

$DMG\ PSDU$ Length = floor(N_BLKS × N_CBPB − mod(N_BLKS × N_CBPB, L_CW) × R/8) − Info $= \text{floor}(10 \times 896 - \text{mod}(10 \times 896, 672) \times 13/16/8) - \text{Info}$ $= 887 - \text{Info}$ $= 887 - 32$ $= 855$ In other words, the transmitting device 100 generates the DMG PSDU Length indicating the value (855) obtained by subtracting Info=32 from the base value L_BASE=887 of the DMG PSDU Length. The DMG PSDU Length=855 computed in this way becomes a value inside the range (820 to 887) of values that the DMG PSDU Length may take in the case of N_BLKS=10 of MCS9 illustrated in FIG. 10, or in other words, becomes an appropriate value. With this arrangement, the transmitting device 100 stores a legacy header signal, which includes DMG MCS=9 and DMG PSDU=855, in the L-Header, and transmits to the receiving device 200.

Meanwhile, in the case of receiving a packet of the frame format illustrated in FIG. 8, the receiving device 200 extracts the value (MCS9) of the DMG MCS and the value (855) of the DMG PSDU Length inside the L-Header.

Next, since the code rate corresponding to MCS9 is R=13/16 according to FIG. 7, the receiving device 200 divides the DMG PSDU Length=855 by (L_CW×R/8) =68.25, deducts the remainder (=36) from (L_CW×R/8) =68.25 to obtain 32.25, and discards the portion of the above deducted value after the decimal point to compute the value of 32 as the value of Info.

With this arrangement, the receiving device 200 is able to specify that the Info field (32 in decimal notation, "100000" in binary notation) indicates active channel bonding (bit0=1, bit1=0), non-MIMO transmission (bit2=0, bit3=0), and SC transmission (bit4=0).

Herein, the value of L_BASE=887 (the value of "floor (N_BLKS×N_CBPB−mod(N_BLKS×N_CBPB, L_CW)× R/8)" in the case of Info=0 in Formula (1)) corresponds to the maximum value of the range (820 to 887) of the DMG PSDU Length associated with N_BLKS=10 blocks for MCS9 illustrated in FIG. 10.

In other words, the transmitting device 100 computes the value obtained by subtracting the value Info of the transmission mode selection information from the maximum value L_BASE of the range of the DMG PSDU Length associated with the decided DMG MCS and N_BLKS as the DMG PSDU Length.

For example, in the case of N_BLKS=10 blocks for MCS9 illustrated in FIG. 10, the range of the DMG PSDU Length is from 820 to 887, and inside this range, the value of N_BLKS does not change. In other words, the transmitting device 100 is able to include the value of Info in the PSDU Length according to the width of the range of the DMG PSDU Length (in the case of N_BLKS=10 blocks for MCS9, the width 67 of the range from 820 to 887) associated with the data length (number of symbol blocks) after the L-Header.

In the specific example, Info is expressed in 6 bits, with a maximum value of 63 in decimal notation ("111111" in binary notation). Thus, even if the transmitting device 100 generates DMG PSDU Length=824 by subtracting the maximum value 63 of Info from L_BASE=887, the corresponding N_BLKS=10 does not change. In other words, no matter how the transmitting device 100 sets the transmission mode selection information Info, number of symbol blocks (N_BLKS) corresponding to the DMG PSDU Length that the transmitting device 100 transmits in the L-Header is 10 blocks.

Herein, in the case in which the receiving device 300 (11ad terminal) receives a packet in the frame format illustrated in FIG. 8, based on the value (855) of the DMG PSDU Length in the L-Header, the receiving device 300 specifies that the fields after the L-Header (from the EDMG-STF to the Data field) are 10 blocks, and enters a standby state in which the specified segment is treated as a transmission-prohibited segment.

In other words, the receiving device 300 is able to receive the packet transmitted by the transmitting device 100 (11ay terminal) and correctly specify the frame length corresponding to the fields after the L-Header, and thus is able to issue the CCA notification correctly. Thus, even if the transmitting device 100 transmits the DMG PSDU Length in the L-Header with embedded information which is not used by the receiving device 300, namely transmission mode selection information (dummy information with respect to the receiving device 300) which is identifiable by an 11ay terminal, the transmitting device 100 does not adversely affect the communication process of the receiving device 300.

The above describes a specific example. Note that herein, although MCS9 is described, the transmitting device 100 and the receiving device 200 operate similarly for other MCS.

In this way, according to the present embodiment, the transmitting device 100 transmits transmission mode selection information Info, which indicates the transmission mode of the EDMG-STF and the EDMG-CEF (extension preamble), included in the DMG PSDU Length (data length information) that indicates the data length after the L-Header (legacy header). With this arrangement, the receiving device 200 is able to specify the receive configuration based on the transmission mode selection information before receiving the EDMG-STF, and thus is able to determine the class of the transmission mode (format) prior to receiving the EDMG-STF, and appropriately switch the configuration of the reception filter 201 and the synchronizer 202. Thus, according to the present embodiment, the transmitting device 100 appropriately reports the transmission mode selection information, and packets may be received correctly at the receiving device 200.

Furthermore, according to the present embodiment, it is not necessary to issue an advance notification of the transmission mode selection information from the transmitting device 100 to the receiving device 200, and the transmitting device 100 is able to transmit a packet having a different transmission mode (format) every single packet. With this arrangement, the transmitting device 100 is able to select the optimal format according to the radio conditions or the amount of data to transmit. With this arrangement, a shortening of the transmission time, an improvement in the data rate, and a decrease in the power consumption of the transmitting device 100 and the receiving device 200 may be achieved.

Note that when computing the DMG PSDU Length, the transmitting device 100 may use either Formula (1) or Formula (2), and may also compute the DMG PSDU Length on the basis of another formula. In other words, it is sufficient for the formula to be a formula that computes the value obtained by subtracting Info from the maximum value in the range that may be taken by the DMG PSDU Length, which is set according to the decided DMG MCS and N_BLKS.

Also, in the present embodiment, Formula (1) and Formula (2) are given as examples of a formula that computes the value obtained by subtracting Info from the maximum value (L_BASE) in the range that may be taken by the DMG PSDU Length, which is set according to the decided DMG MCS and N_BLKS, but an aspect of the present disclosure is not limited thereto. For example, the transmitting device 100 may also generate the DMG PSDU Length indicating the value obtained by adding the value of Info to the minimum value of the range of the DMG PSDU Length associated with N_BLKS for the decided DMG MCS.

Embodiment 2

In the formula for computing the DMG PSDU Length for each MCS in Formula (3), the value multiplied by N_BLKS is one of 2/3, 4/3, or 8/3 (that is, a value with a denominator of 3). In other words, in the case in which the value of N_BLKS is a multiple of 3, Formula (3) is able to omit the floor function in Formula (1).

Accordingly, in the present embodiment, the case of limiting the value of N_BLKS to a multiple of 3 will be described. With this arrangement, Formula (1) may be simplified, and the transmitting device 100 is able to reduce the amount of computation.

Note that since the transmitting device and the receiving device according to the present embodiment share the basic configuration of the transmitting device 100 and the receiving device 200 according to Embodiment 1, FIGS. 2 and 3 will be cited for the description.

Figure 11:
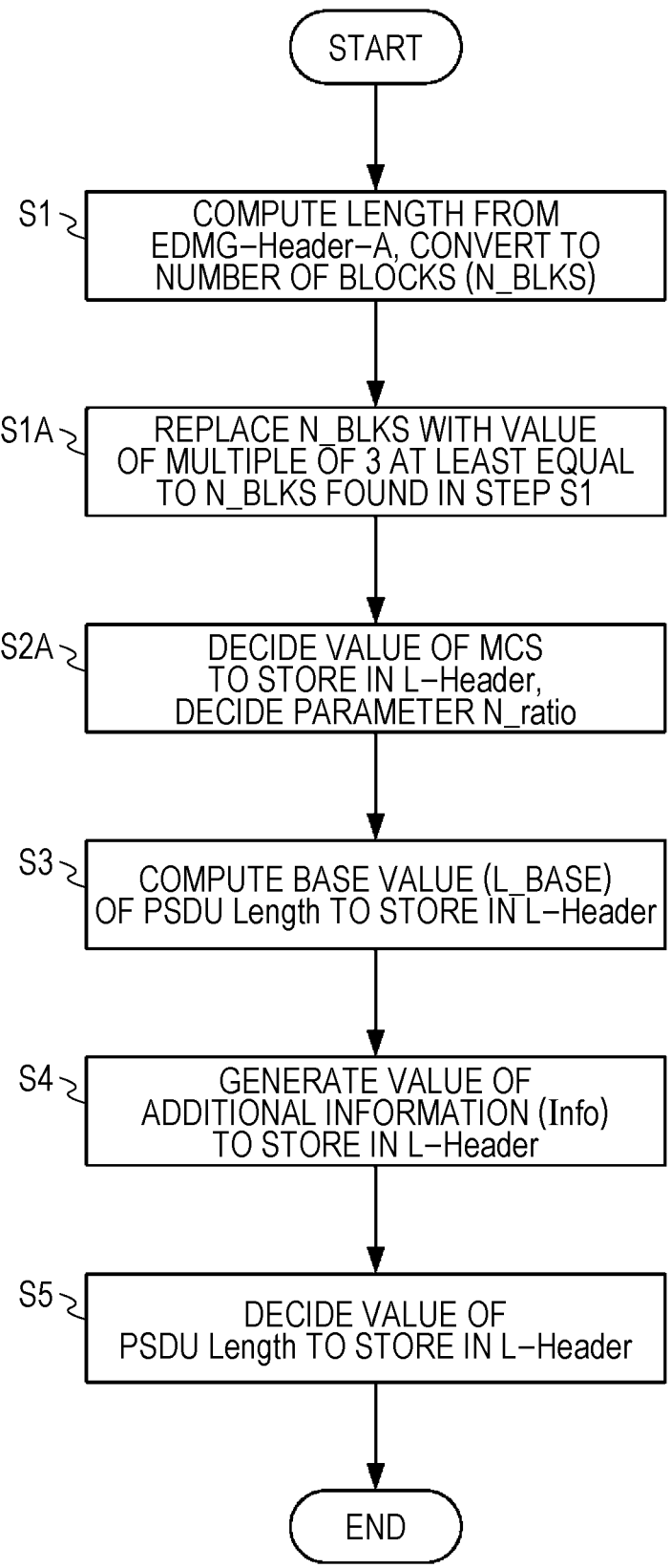
FIG. 11 is a flowchart illustrating operations of the transmitting device according to Embodiment 2.

FIG. 11 is a flowchart illustrating operations in the transmitting device 100 (L-Header generator 103). Note that in FIG. 11, the same processes as Embodiment 1 (FIG. 5) are denoted by the same signs, and description thereof will be omitted.

In FIG. 11, in step S1A, the transmitting device 100 replaces (corrects) the value of the number of symbol blocks (N_BLKS) with the value of a multiple of 3 that is equal to or greater than the value of N_BLKS computed in step S1.

Hereinafter, Methods 1 to 3 of correcting the value of N_BLKS in the case in which the number of symbol blocks (N_BLKS) computed in step S1 is not a multiple of 3 will be described.

Figure 12A:
FIG. 12A is a diagram illustrating exemplary operations of a Method 1 for adjusting the number of symbol blocks according to Embodiment 2.

[Method 1 (FIG. 12A)]

In Method 1, the transmitting device 100 corrects the number of symbol blocks by adding padding information after the Data field to make the number of symbol blocks (N_BLKS) a multiple of 3.

Figure 12B:
FIG. 12B is a diagram illustrating exemplary operations of a Method 2 for adjusting the number of symbol blocks according to Embodiment 2.

[Method 2 (FIG. 12B)]

In Method 2, the transmitting device 100 does not add padding bits, and instead computes the DMG PSDU Length by rounding up the number of symbol blocks (N_BLKS) to a multiple of 3.

Figure 12C:
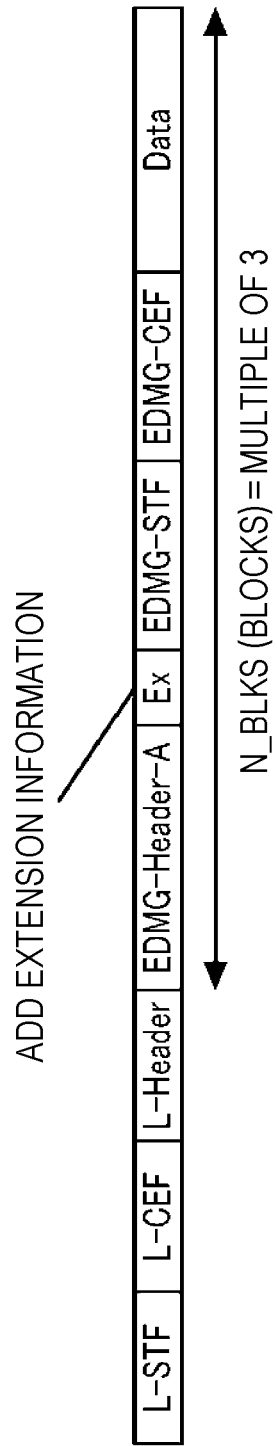
FIG. 12C is a diagram illustrating exemplary operations of a Method 3 for adjusting the number of symbol blocks according to Embodiment 2.

[Method 3 (FIG. 12C)]

In Method 3, the transmitting device 100 corrects the number of symbol blocks by placing extension information (an Ex field) immediately after the EDMG-Header-A (between the EDMG-Header-A and the EDMG-STF) to make the number of symbol blocks (N_BLKS) a multiple of 3. Note that the transmitting device 100 may also store the length of the Ex field in the Info field inside the L-Header. Also, the transmitting device 100 may store part of the Data in the Ex field.

The above describes Methods 1 to 3 of correcting the value of N_BLKS.

In step SA, the transmitting device 100 decides the value of the DMG MCS to store in the L-Header, and decides a parameter N_ratio according to the decided value of the DMG MCS. FIG. 13 illustrates an example of the correspondence relationship between the DMG MCS and the N_ratio. The N_ratio is a parameter obtained by removing the floor function included in the DMG PSDU Length formula in Formula (3). For example, in MCS1, if the floor function is removed, the formula becomes N_BLKS×(2/3)× 21−Info, that is, N_BLKS×14−Info, and N_ratio=14 is derived. The same applies to the other DMG MCS.

In steps S3 to S5, similarly to Embodiment 1, the transmitting device 100 decides the value of the DMG PSDU Length by using the base value (L_BASE) of the DMG PSDU Length and the value of Info. However, in the present embodiment, the transmitting device 100 computed the DMG PSDU Length in accordance with Formula (4) or Formula (5).

$$DMG\ PSDU\ \text{Length} = L\_BASE - \text{Info} \qquad \text{Formula (4)}$$
$$= N\_BLKS \times N\_\text{ratio} - \text{Info (for cases other than } MCS5)$$

$$DMG\ PSDU\ \text{Length} = L\_BASE - \text{Info} \qquad \text{Formula (5)}$$
$$= \text{floor}(N\_BLKS \times N\_\text{ratio}) - \text{Info (for cases other than } MCS5)$$

In Formula (4) and Formula (5), the transmitting device 100 decides the N_ratio according to the DMG MCS illustrated in FIG. 13. In the case of MCS5, the N_ratio (=45.5) is not an integer, and thus the transmitting device 100 computes the DMG PSDU Length by using Formula (5) which still includes the floor function.

Also, in Formula (4) and Formula (5), similarly to Embodiment 1, the value of Info is a value that is 0 or greater but less than N_Info, as illustrated in FIG. 13.

On the other hand, the receiving device 200 decodes the L-Header transmitted from the transmitting device 100, and obtains the DMG MCS and the DMG PSDU Length.

Subsequently, the receiving device 200 computes the value of Info by deducting the remainder of dividing the DMG PSDU Length by the N_ratio from the value of the N_ratio. Note that in the case in which the above deducted value is not an integer, the receiving device 200 computes the value of Info by discarding the portion after the decimal point (that is, by using the floor function). In the case in which the DMG MCS is other than 5, the above deducted value is an integer.

For example, for DMG MCS=MCS2 and DMG PSDU Length=80, the remainder of dividing 80 by N_ratio=28 is 24, and 28-24 is 4. Thus, the value of Info is 4. Similarly, for example, for DMG MCS=MCS5 and DMG PSDU Length=398, the remainder of dividing 398 by 45.5 is 34, 45.5-34 is 11.5, and the portion of 11.5 after the decimal point is discarded to obtain 11. Thus, the value of Info is 11.

In this way, according to the present embodiment, the transmitting device 100 is able to decrease the amount of computation for including the transmission mode selection information in the DMG PSDU Length inside the L-Header compared to Embodiment 1 (Formula (1) or Formula (2)).

Embodiment 3

Since the transmitting device and the receiving device according to the present embodiment share the basic configuration of the transmitting device 100 and the receiving device 200 according to Embodiment 1, FIGS. 2 and 3 will be cited for the description.

In the 11ad standard, the value of PSDU Length is prescribed to be 18 bits or less, that is, 262143 or less. FIG. 14 illustrates the maximum value that the number of symbol blocks (N_BLKS) may take for each MCS in the case in which the PSDU Length is 262134 or less (Condition 1).

Namely, in the case in which the value of the DMG MCS reported in the L-Header is fixed, a case may occur in which the value of the DMG PSDU Length is not expressed correctly due to the packet length of the fields after the L-Header. For example, in the case of using MCS9, it is difficult for the transmitting device 100 to express the DMG PSDU Length indicating a packet length longer than N_BLKS=2881.

Also, for the MCS of 5 or less (MCS1 to MCS5), in the case of calculating N_BLKS in accordance with the 11ad standard, the remainder of dividing N_BLKS by 3 does not become a value of 1. As an example, FIG. 15 illustrates the relationship between DMG PSDU Length and N_BLKS for MCS2 in NPL 1. In FIG. 15, none of the N_BLKS corresponding to any value of the DMG PSDU Length becomes a value (1, 4, 7, 10, . . . ) giving a remainder of 1 when divided by 3. The same applies to the other MCS1 and MCS3 to MCS5 not illustrated.

Thus, in the case of generating the DMG PSDU Length for transmitting the transmission mode selection information in the L-Header, to ensure compatibility with the 11ad standard, the transmitting device 100 needs to not set the N_BLKS of the MCS of 5 or less (MCS1 to MCS5) to a value giving a remainder of 1 when divided by 3 (that is, N_BLKS=3N+1; where N is an integer) (Condition 2 in FIG. 14).

Accordingly, in the present embodiment, the transmitting device 100 switches the DMG MCS to use to store the transmission mode selection information Info in the L-Header according to the computed number of symbol blocks (N_BLKS), and corrects the number of symbol blocks.

For example, in the case in which the number of symbol blocks corresponding to the packet length of the EDMG-Header-A, the EDMG-STF, the EDMG-CEF, and the Data field is a predetermined threshold value or less, the transmitting device 100 uses a first MCS and the number of symbol blocks to generate the DMG PSDU Length (data length information) including the transmission mode selection information. On the other hand, in the case in which the number of symbol blocks corresponding to the packet length of the EDMG-Header-A, the EDMG-STF, the EDMG-CEF, and the Data field exceeds the predetermined threshold value, the transmitting device 100 corrects the number of symbol blocks to the value of a multiple of 3 that is equal to or greater than the number of symbol blocks, and uses a second MCS and the corrected number of symbol blocks to generate the DMG PSDU Length including the transmission mode selection information.

Figure 16:
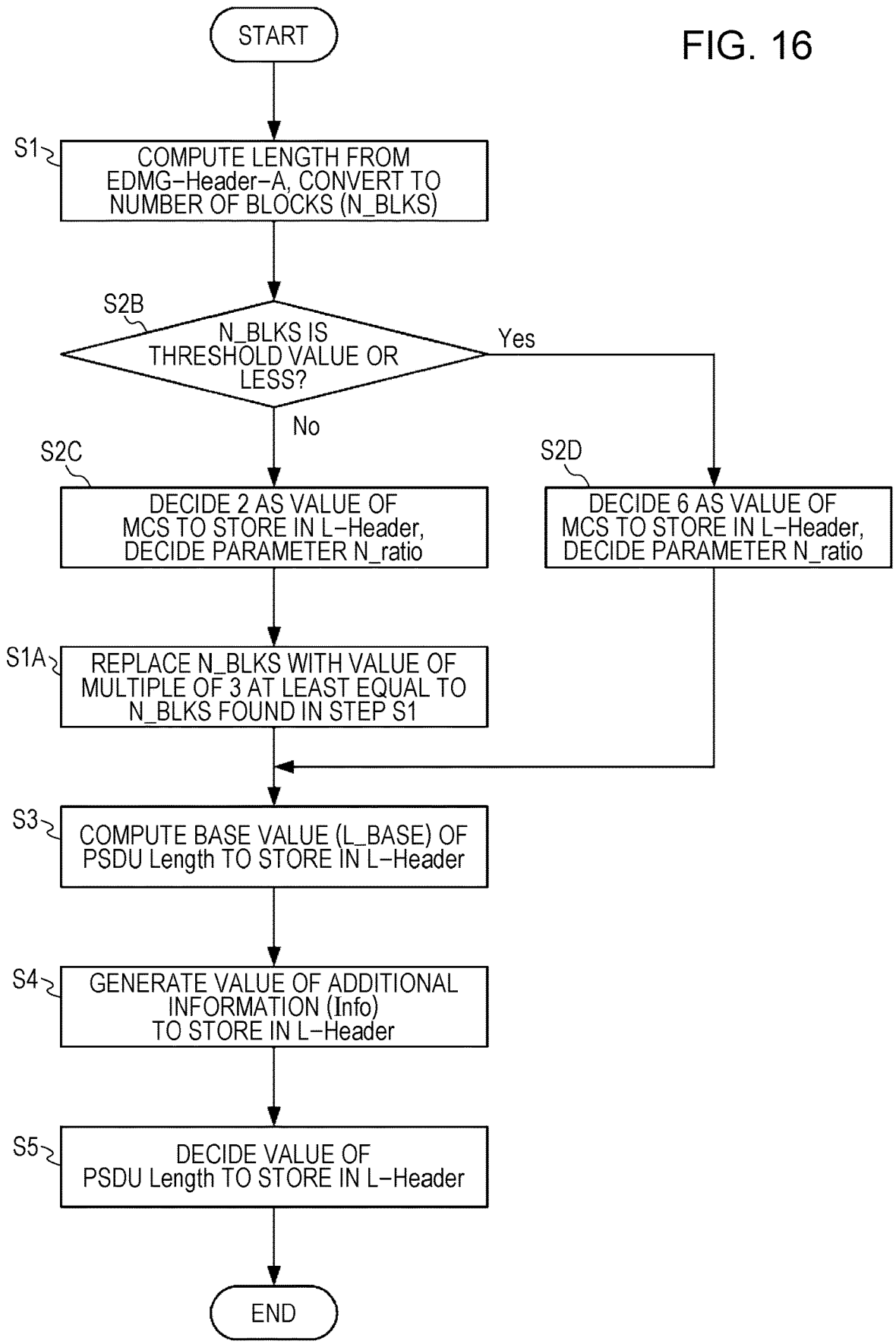
FIG. 16 is a flowchart illustrating operations of the transmitting device according to Embodiment 3.

FIG. 16 is a flowchart illustrating operations in the transmitting device 100 (L-Header generator 103). Note that in FIG. 16, the same processes as Embodiment 1 (FIG. 5) or Embodiment 2 (FIG. 11) are denoted by the same signs, and description thereof will be omitted.

Hereinafter, as an example, the transmitting device 100 sets the predetermined threshold value to N_BLKS=4682, which corresponds to MCS6 illustrated in FIG. 14. Also, the transmitting device 100 sets the first MCS to MCS6, and the second MCS to MCS2.

In step S2B, the transmitting device 100 determines whether or not the number of symbol blocks (N_BLKS) computed in step S1 is the threshold value (4682) or less.

In the case in which N_BLKS exceeds the threshold value (step S2B: No), in step S2C, the transmitting device 100 decides MCS2 as the DMG MCS to store in the L-Header. Also, similarly to Embodiment 2, the transmitting device 100 decides the parameter N_ratio according to MCS2. Also, similarly to Embodiment 2, the transmitting device 100 replaces the value of the number of symbol blocks (N_BLKS) with the value of a multiple of 3 that is equal to or greater than the value of N_BLKS computed in step S1 (step S1A).

In other words, in FIG. 14, it is necessary to satisfy Condition 1 and Condition 2 in the case in which N_BLKS exceeds 4682, but by using MCS2, the transmitting device 100 becomes able to express packet lengths up to N_BLKS=9363 (satisfying Condition 1). Note that in this case, it is difficult for the transmitting device 100 to express packet lengths exceeding N_BLKS=9363. However, as illustrated in FIG. 7, the maximum number of bits in the Info field of MCS2 (5 bits) is greater than the maximum number of bits in the Info field of MCS1 (4 bits). Thus, by using the MCS, the transmitting device 100 is able to transmit a broader range of information regarding both the packet length and the transmission mode selection information Info.

In the case in which the maximum packet length of 11ay is prescribed by a standard, it is sufficient for the transmitting device 100 to choose an MCS capable of expressing the prescribed maximum length as the second MCS. For example, in the 11ad standard, the maximum packet length is prescribed to be 2 ms. Even for the 11ay standard, in the case in which the maximum packet length is prescribed to be the same 2 ms, the transmitting device 100 is able to express a packet length of 2 ms by using MCS3 and below.

In the case in which a shorter maximum packet length is prescribed, the transmitting device 100 is able to increase the number of bits in Info by using MCS5, for example.

Also, by correcting the value of N_BLKS to a multiple of 3 before computing the L_BASE in step S3, the transmitting device 100 avoids having N_BLKS become 3N+1 (satisfying Condition 2).

With this arrangement, in the case in which N_BLKS exceeds the threshold value, the transmitting device 100 sets parameters that satisfy Condition 1 and Condition 2 in FIG. 14.

On the other hand, in the case in which N_BLKS is the threshold value or less (step S2B: Yes), in step S2D, the transmitting device 100 decides MCS6 as the DMG MCS to store in the L-Header. Also, similarly to Embodiment 2, the transmitting device 100 decides the parameter N_ratio according to MCS6.

In other words, in FIG. 14, it is necessary to satisfy Condition 1 in the case in which N_BLKS is 4682 or less, but by using MCS6 for which the maximum value of N_BLKS is 4682, the transmitting device 100 becomes able to express any packet length (satisfying Condition 1). With this arrangement, in the case in which N_BLKS is the threshold value or less, the transmitting device 100 sets parameters that satisfy Condition 1 in FIG. 14. Note that as illustrated in FIG. 7, the maximum number of bits in the Info field of MCS6 is 5 bits.

With this arrangement, in the case in which the packet length is short (N_BLKS≤threshold value), the transmitting device 100 is able to set the value of the DMG PSDU Length while omitting correction (for example, padding), and thus the transmission efficiency may be improved. On the other hand, even in the case in which the packet length is long (N_BLKS>threshold value), the transmitting device 100 is able to set the value of the DMG PSDU Length appropriately according to the packet length.

Also, according to the present embodiment, even in the case in which the MCS is 5 or less (N_BLKS>threshold value; MCS1 to MCS5), the transmitting device 100 is able to use the DMG PSDU Length corresponding to the 11ad standard to transmit the transmission mode selection information Info. Consequently, by receiving a packet transmitted by the transmitting device 100, an 11ad terminal is able to correctly determine the packet length of the packet.

Note that, like in Embodiment 2, even in the case of limiting N_BLKS to a multiple of 3, the transmitting device 100 is able to ensure compatibility with the 11ad standard and transmit the transmission mode selection information in the L-Header.

Note that in the second MCS, the transmitting device 100 may also add padding to avoid N_BLKS=3N+1 instead of limiting N_BLKS to a multiple of 3. In other words, the transmitting device 100 may also use 3N+2 in addition to 3N (where N is an integer). Note that, similarly to Embodiment 1, the transmitting device 100 calculates each Length.

Embodiment 4

Since the transmitting device and the receiving device according to the present embodiment share the basic configuration of the transmitting device 100 and the receiving device 200 according to Embodiment 1, FIGS. 2 and 3 will be cited for the description.

The transmitting device 100 (L-Header generator 103) generates a DMG PSDU Length in which a bit pattern in part of the DMG PSDU Length stored in the L-Header becomes identical to the bit pattern indicating the transmission mode selection information Info. In other words, the bit pattern of the generated DMG PSDU Length contains the bit pattern of the transmission mode selection information Info.

Specifically, the transmitting device 100 adds an offset to the value of the transmission mode selection information Info, and uses the value with the added offset (hereinafter, Info') to compute the value of the DMG PSDU Length. For example, the transmitting device 100 computes the DMG PSDU Length in accordance with one of Formula (6) to Formula (9).

$$DMG\ PSDU\ \text{Length} = L\_BASE - \text{Info} \quad \text{Formula (6)}$$

$$= \text{floor}((N\_BLKS \times N\_CBPB - \text{mod}(N\_BLKS \times N\_CBPB, L\_CW) \times R/8) - \text{Info}'$$

$$DMG\ PSDU\ \text{Length} = L\_BASE - \text{Info} \quad \text{Formula (7)}$$

$$= \text{floor}(\text{floor}(N\_BLKS \times N\_CBPB / L\_CW) \times L\_CW \times R/8) - \text{Info}'$$

(Case in which N_BLKS is a multiple of 3)

$$DMG\ PSDU\ \text{Length} = L\_BASE - \textit{Info}' \quad \text{Formula (8)}$$

$$= N\_BLKS \times N\_\text{ratio} - \text{Info}'\ (\text{for cases other than } MCS5)$$

$$DMG\ PSDU\ \text{Length} = L\_BASE - \textit{Info}' \quad \text{Formula (9)}$$

$$= \text{floor}(N\_BLKS \times N\_\text{ratio}) - \text{Info}'\ (\text{for case of } MCS5)$$

Herein, Info' is computed in accordance with Formula (10). Formula (10)

$$\text{Info}' = \text{mod}(-\text{Info} + \text{Offset}, 2^{info\_bits})$$

Also, Offset is computed in accordance with Formula (11).

$$\text{Offset} = \text{mod}(L\_BASE, 2^{Info\_bits}) \quad \text{Formula (11)}$$

Info_bits expresses the number of bits in the Info field.

With this arrangement, the bit pattern of Info is contained in the computed bit pattern of the DMG PSDU Length. Thus, in the case of receiving the L-Header, the receiving device 200 may omit computational processing, and simply extract the portion corresponding to the Info field from the DMG PSDU Length inside the received L-Header.

Figure 17:
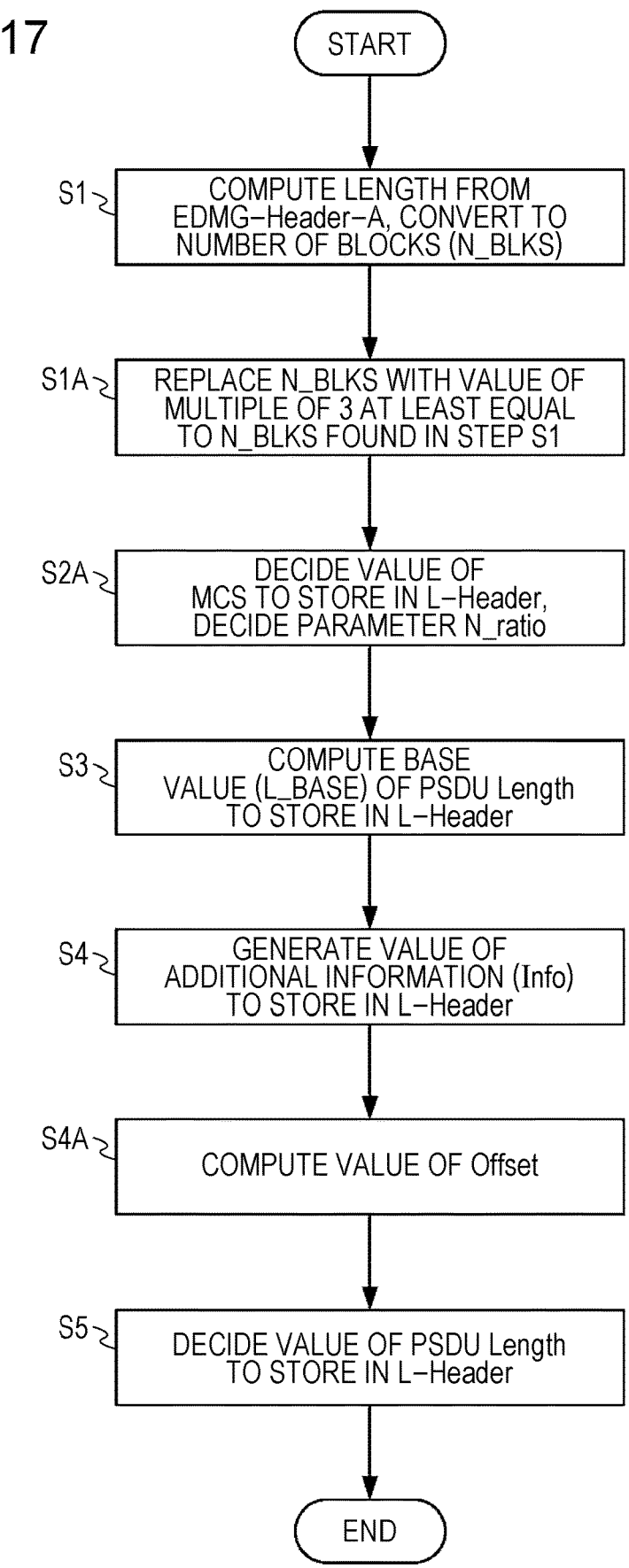
FIG. 17 is a flowchart illustrating operations of the transmitting device according to Embodiment 4.

FIG. 17 is a flowchart illustrating operations in the transmitting device 100 (L-Header generator 103). Note that in FIG. 17, the same processes as Embodiment 1 (FIG. 5) or Embodiment 2 (FIG. 11) are denoted by the same signs, and description thereof will be omitted.

Also, in the following, as a specific example, the number of symbol blocks N_BLKS=12, Info=25 (decimal notation)

="11001" (binary notation), and Info_bits=5 bits. Also, the transmitting device 100 sets the DMG MCS to MCS2 (N_CBPB=448, R=1/2).

In this case, since N_BLKS=12 is a multiple of 3, the transmitting device 100 does not execute the processing of step S1A, decides the parameter N_ratio=28 in step S2A, and computes L_BASE=336(=12×28-0; for example, see Formula (8)) in step S3.

In step S4A, the transmitting device 100 uses the value of L_BASE computed in step S3 to compute the value of Offset in accordance with Formula (11). For example, since L_BASE=336 and Info_bits=5, the transmitting device 100 computes Offset=mod(336, $2^5$)=16.

In step S5, the transmitting device 100 uses the L_BASE computed in step S3, the Info generated in step S4, and the Offset computed in step S4A to decide the DMG PSDU Length to store in the L-Header. For example, since Info=25, Offset=16, and Info_bits=5, the transmitting device 100 computes Info'=mod(-25+16, $2^5$)=mod(-9, 32)=23, in accordance with Formula (10). Additionally, the transmitting device 100 computes the DMG PSDU Length=N_BLKS×N_ratio−Info'=12×28−23=313 in accordance with Formula (8), for example.

Herein, in the relationship between the PSDU Length and N_BLKS for the case of MCS2 illustrated in FIG. 15, PSDU Length=313 exists inside the range for the case of N_BLKS=12. Thus, it is demonstrated that the DMG PSDU Length=313 computed as above is set appropriately with respect to N_BLKS=12.

Figure 18:
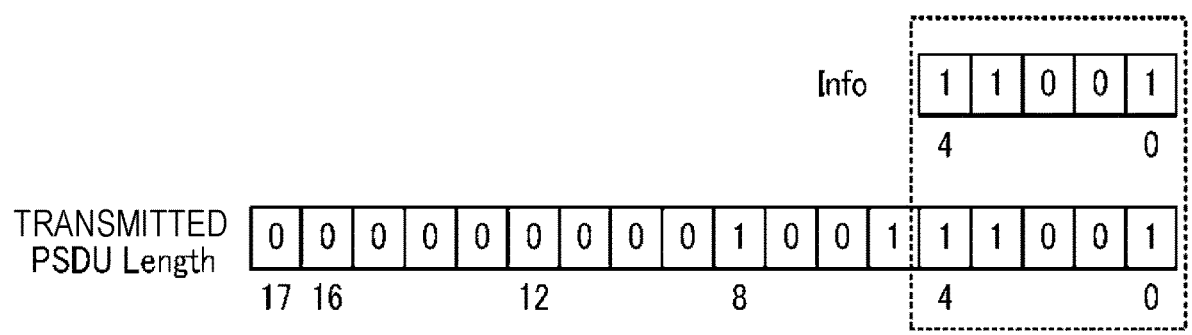
FIG. 18 is a diagram illustrating an example of generating the PSDU Length according to Embodiment 4.

FIG. 18 illustrates the bit pattern ("11001") of Info=25 used in the above specific example, and the bit pattern of the computed DMG PSDU Length=313. As illustrated in FIG. 18, in the bit pattern of the DMG PSDU Length, the lower 5 bits DMG PSDU Length[4:0] ("11001") is identical to the bit pattern of Info=25. Thus, if the receiving device 200 receives the PSDU Length information illustrated in FIG. 18, by extracting the lower 5 bits DMG PSDU Length[4:0] without executing computational processing, the receiving device 200 is able to acquire the transmission mode selection information Info.

In this way, according to the present embodiment, the transmitting device 100 transmits the transmission mode selection information with an added offset included in the DMG PSDU Length inside the L-Header. With this arrangement, by extracting part of the DMG PSDU Length inside the received L-Header, the receiving device 200 is able to acquire the transmission mode selection information, and the amount of processing by the receiving device 200 may be decreased.

Figure 19A:
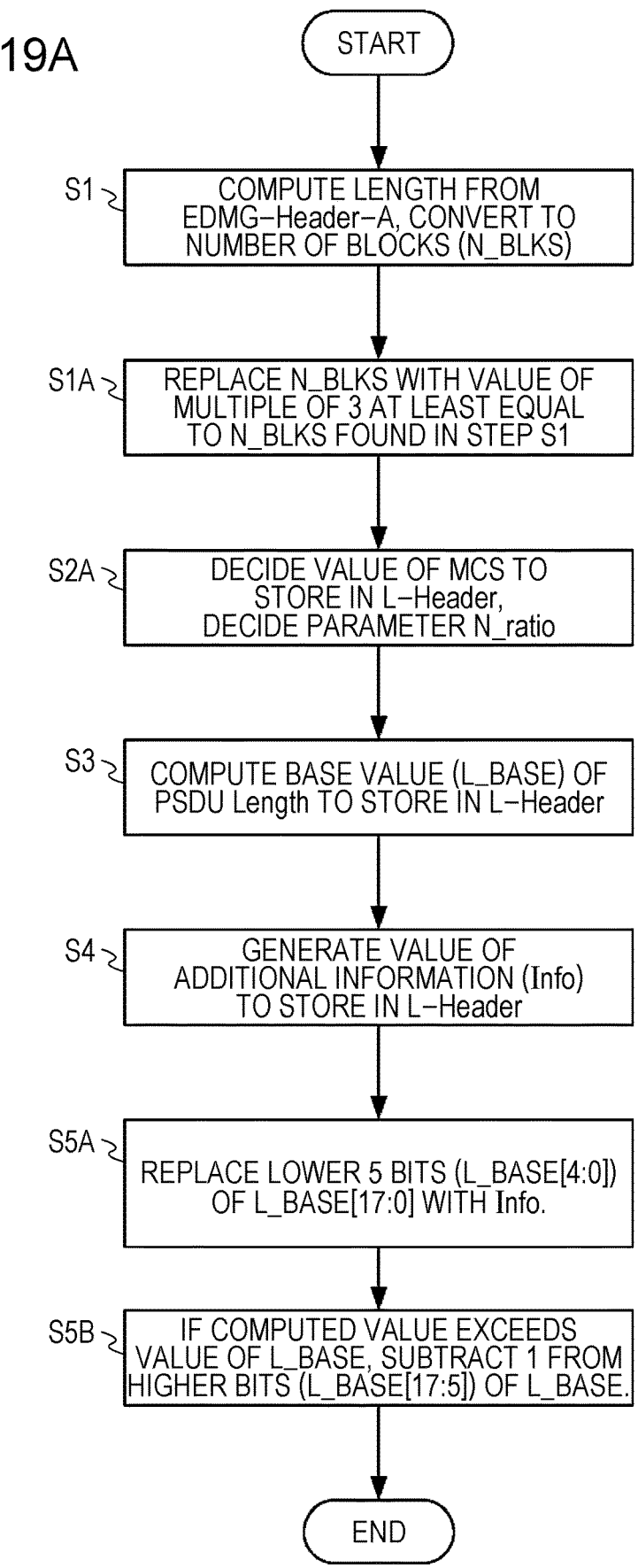
FIG. 19A is a flowchart illustrating an example of operations of the transmitting device according to a variation of Embodiment 4.

Note that the transmitting device 100 may also execute the process illustrated in FIG. 19A instead of the process illustrated in FIG. 17. FIG. 19A is a flowchart illustrating operations in the L-Header generator 103 of the transmitting device 100. Note that in FIG. 19A, the same processes as FIG. 17 are denoted by the same signs, and description thereof will be omitted. Specifically, in FIG. 19A, the method of computing the DMG PSDU Length in step S5A and step S5B is different from FIG. 17.

Figure 20:
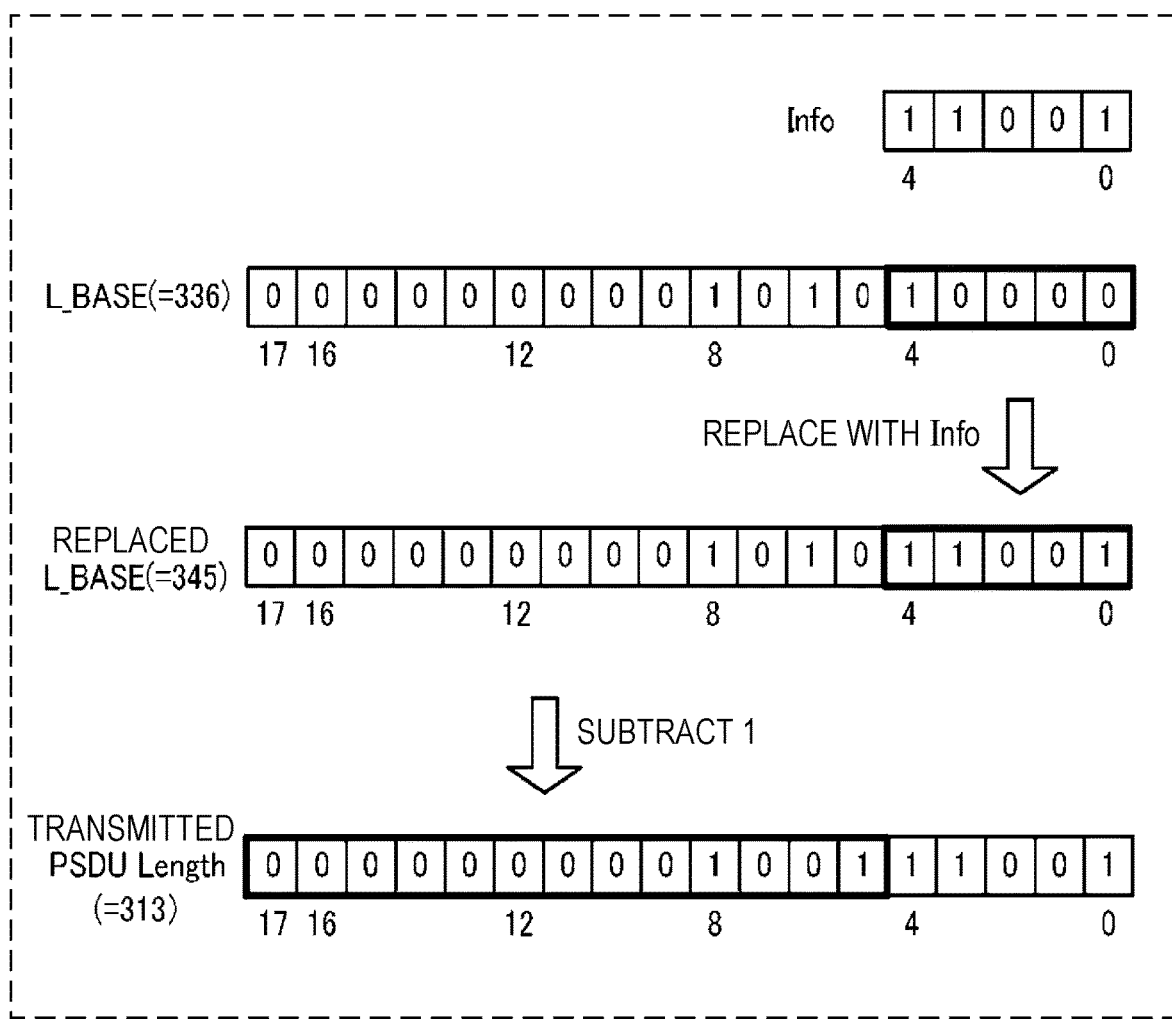
FIG. 20 is a diagram illustrating an example of generating the PSDU Length according to a variation of Embodiment 4.

Also, in the following, as a specific example similar to the above, L_BASE=336 ("00 0000 0001 0101 0000"), Info=25 ("11001"), and Info_bits=5. FIG. 20 illustrates the bit pattern generated in this specific example by the receiving device 200.

In step S5A, from among L_BASE (18 bits; hereinafter designated L_BASE[17:0]), the transmitting device 100 replaces the lower 5 bits (L_BASE[4:0]) with the value of Info ("11001"). With this arrangement, the replaced L_BASE[17:0] becomes "00 0000 0001 0101 1001".

In step S5B, in the case in which the value computed in step S5A exceeds the value of L_BASE, the transmitting device 100 subtracts 1 from the higher bits (L_BASE[17:5]) of the replaced L_BASE. In FIG. 20, the replaced L_BASE "00 0000 0001 0101 1001" is 345 in decimal notation while the original L_BASE "00 0000 0001 0101 0000" is 336 in decimal notation, and thus the replaced L_BASE exceeds the value of the original L_BASE.

Accordingly, the transmitting device 100 subtracts 1 from the replaced L_BASE[17:5]="0 0000 0000 1010" (10 in decimal notation), and L_BASE[17:5] becomes "0 0000 0000 1001" (9 in decimal notation). Subsequently, the transmitting device 100 generates the bit pattern "00 0000 0001 0011 1001" (313 in decimal notation), which is made up of L_BASE[17:5] subtracted by 1 and L_BASE[4:0] in which Info is stored, as the DMG PSDU Length inside the L-Header.

Figure 19B:
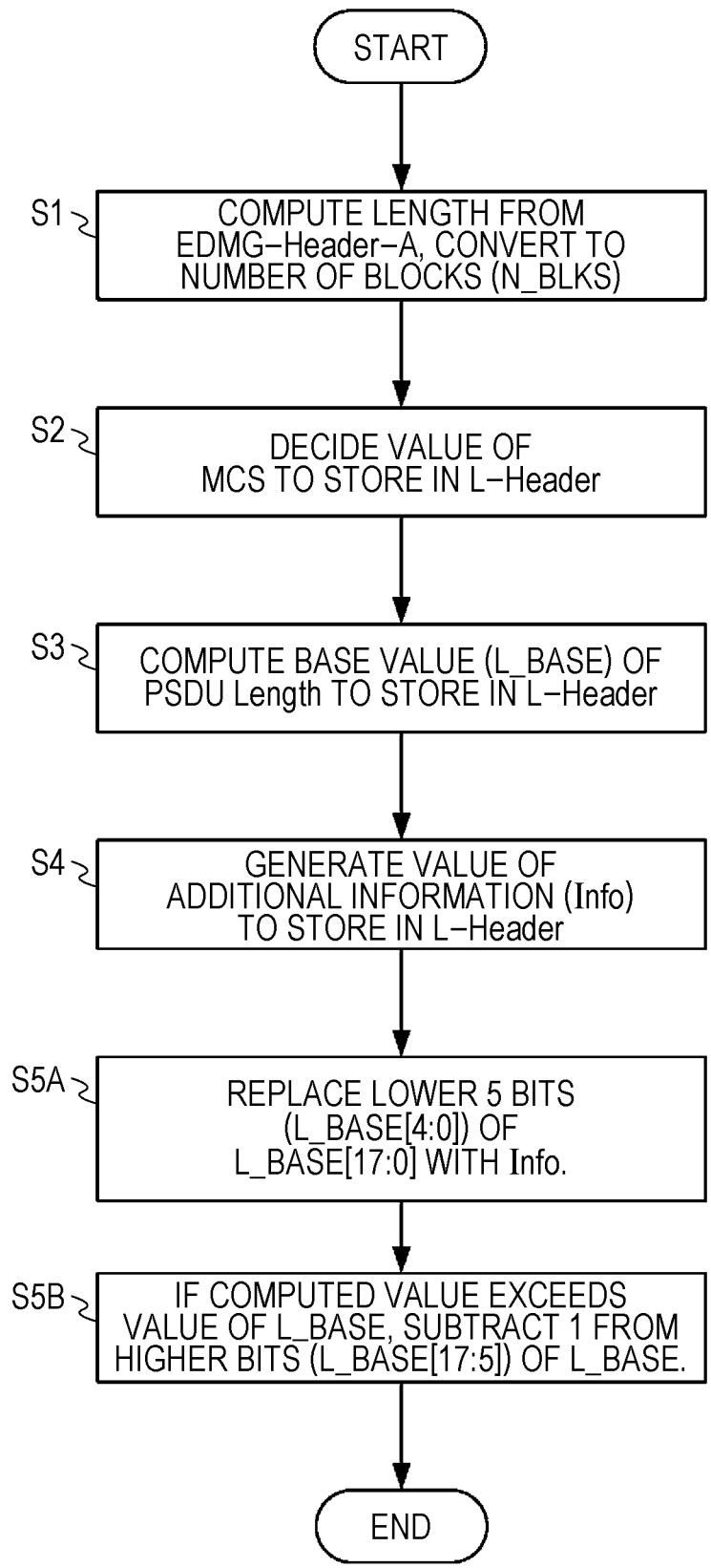
FIG. 19B is a flowchart illustrating another example of operations of the transmitting device according to a variation of Embodiment 4.

Note that the method of steps S5A and S5B in FIG. 19A may be used without being limited to the case of limiting N_BLKS to a multiple of 3. As illustrated in FIG. 19B, the transmitting device 100 executes the process from steps S1 to S4 without limiting N_BLKS to a multiple of 3 similarly to FIG. 5, and after that, applies the process of steps S5A and S5B similarly to FIG. 19A. With this arrangement, the advantageous effects in FIG. 5 are obtained.

In other words, the packet length may be computed correctly, irrespectively of whether or not the receiving device supports the 11ay standard, and in addition, a terminal supporting the 11ay standard is able to obtain the Info information. Furthermore, the advantageous effects described in FIG. 18 are obtained.

In other words, the value of Info may be retrieved directly from the PSDU Length field, and the configuration of the transmitting device and the receiving device may be simplified. Also, in step S5B, since numerical values are compared, and 1 is subtracted depending on the result, PSDU Length calculation using the Offset value in FIG. 17 is unnecessary, and the configuration of the transmitting device may be simplified.

Embodiment 5

Foundation of Embodiment 5

Figure 21:
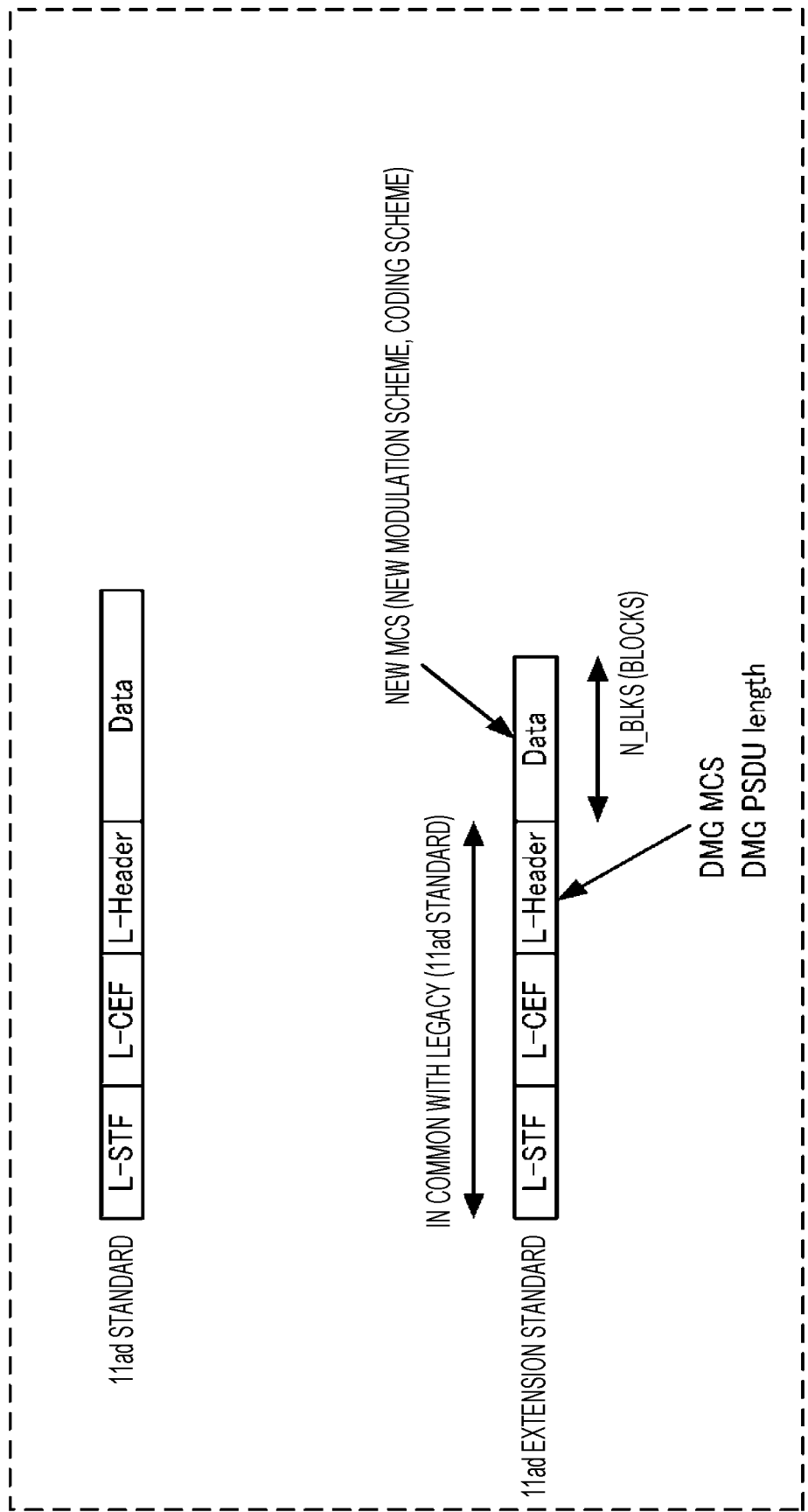
FIG. 21 is a diagram illustrating an example of the frame formats of the 11ad standard and the 11ad extension standard.

FIG. 21 illustrates an example of the frame formats of the 11ad standard and the 11ad extension standard.

The 11ad extension standard has the same basic frame format as the 11ad standard, but the Data field is modulated and coded using new MCS not defined in the 11ad standard. For example, π/2-64QAM and LDPC codes with a code rate of 7/8 are used.

In the 11ad extension standard, the transmitting device reports that the Data field is transmitted using a newly defined MCS by a combination of the reserved bits and the value of the MCS field. For example, in the case of using the newly defined MCS12.1 (π/2-16QAM, code rate 13/16), the transmitting device sets a predetermined bit of the reserved bits to 1, and sets the MCS field to 5 (in the 11ad standard, π/2-BPSK, code rate 13/16).

In the 11ad extension standard, additionally, the Length field in the L-Header is set to enable a terminal conforming to the 11ad standard to compute the correct packet length. Herein, between a π/2-QPSK packet and a π/2-BPSK packet of the same data length (PSDU Length), there is roughly a 4× difference in the length (time) of the Data field. Consequently, in MCS12.1, the transmitting device sets a value of 1/4 the actual data length in the Length field. For this reason, a receiving device supporting the 11ad extension standard is able to compute the actual data length by multiplying the value set in the Length field by 4.

However, in the actual packet process, for example, since LDPC coding every 672 bits, a process of inserting a guard interval (GI) every 448 symbols, or the like is executed, setting 1/4 the data length may produce error in the packet length.

On the other hand, since the 11ad extension standard does not have an extension header like the EDMG-Header-A, in the case of setting a Length expressing the correct packet length in the Length field of the L-Header, similarly to the method for 11ay described above, it is difficult to transmit information expressing the actual data length.

Hereinafter, Embodiment 5 of the present disclosure will be described in detail and with appropriate reference to the drawings.

Configuration of Embodiment 5

The transmitting device and the receiving device according to Embodiment 5 will be described for the case of adapting the transmitting device 100 and the receiving device 200 according to Embodiment 1 to the transmission and reception of the 11ad extension standard, and for the portions shared in common with Embodiment 1, the same signs will be used, and description will be omitted.

Figure 22:
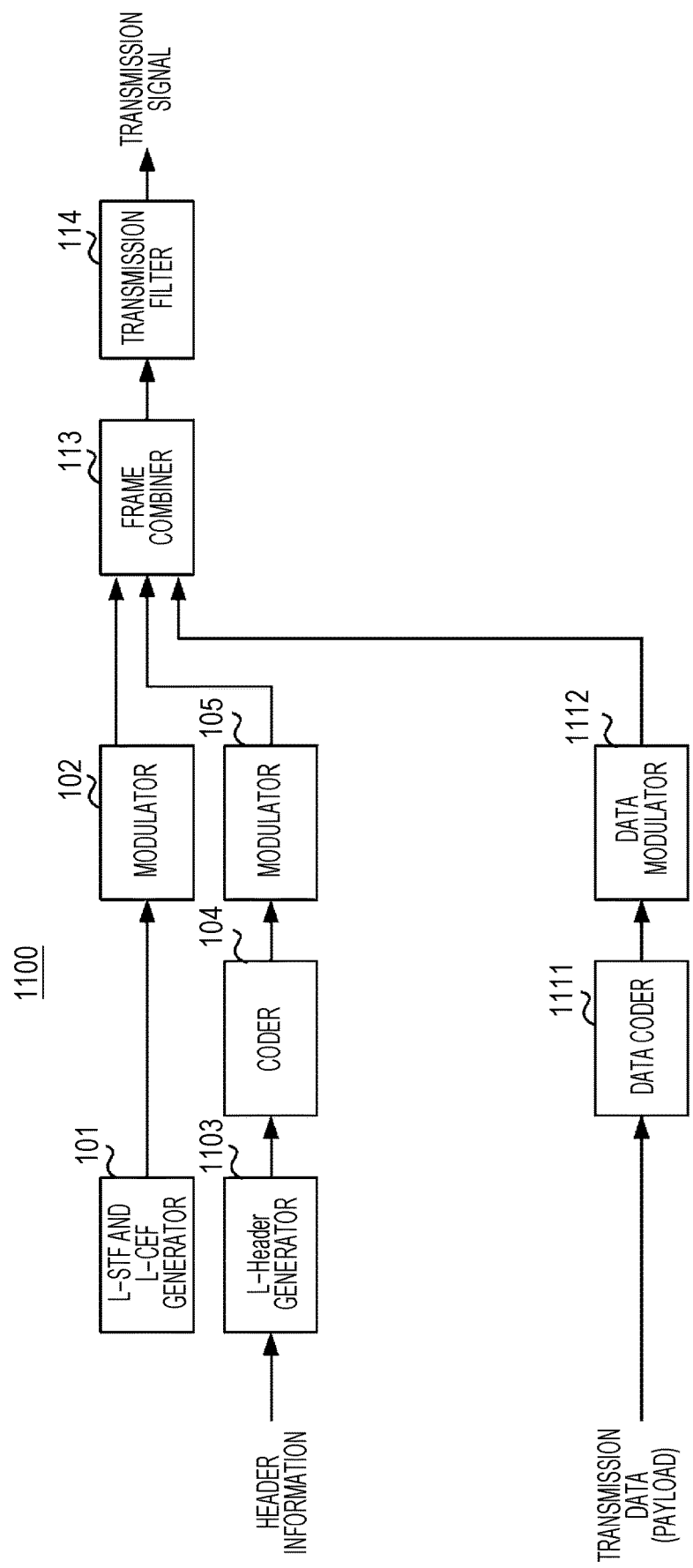
FIG. 22 is a diagram illustrating an exemplary configuration of a transmitting device according to Embodiment 5.

FIG. 22 is a diagram illustrating an example of the configuration of the transmitting device according to Embodiment 5.

In FIG. 22, the L-Header generator 1103 (corresponding to the L-Header generator 103 (header generator) in FIG. 2) generates PSDU Header (L-Header) data (a legacy header signal) in accordance with the format prescribed in the 11ad standard or the 11ad extension standard, on the basis of input header information.

However, in the case of transmitting by the 11ad extension standard, the legacy header signal is a value that does not directly express the MCS and PSDU Length in the 11ad extension standard, or in other words, is a value replaced with a value of the 11ad standard according to a fixed rule. For example, in the case of transmitting by the 11ad extension standard, from among the information to include in the L-Header, the L-Header generator 1103 sets a predetermined bit of the reserved bits to 1.

Also, the value of the MCS is replaced according to a fixed rule from the value of the MCS in the 11ad extension standard. For example, a correspondence table is prescribed in advance, so that MCS12.1 (11ad extension standard) is replaced with MCS5 (11ad standard), and MCS12.2 (11ad extension standard) is replaced with MCS10 (11ad standard).

Additionally, the L-Header generator 1103 sets the value of the PSDU Length as the data length of the Data field. Also, the L-Header generator 1103 includes, in the PSDU Length, PSDU Length correction information (hereinafter also designated "Info") for the 11ad extension standard. Note that the details of the method of setting the values of the MCS and the PSDU Length in the L-Header generator 1103 will be described later (see FIG. 24).

The Data coder 1111 is able to select the coding schemes defined in the 11ad standard, as well as additional coding schemes (for example, LDPC codes with a code rate of 7/8) defined in the 11ad extension standard, as the operating mode.

The Data modulator 1112 is able to select the modulation schemes defined in the 11ad standard, as well as additional modulation schemes (for example, π/2-64QAM) defined in the 11ad extension standard, as the operating mode.

Figure 23:
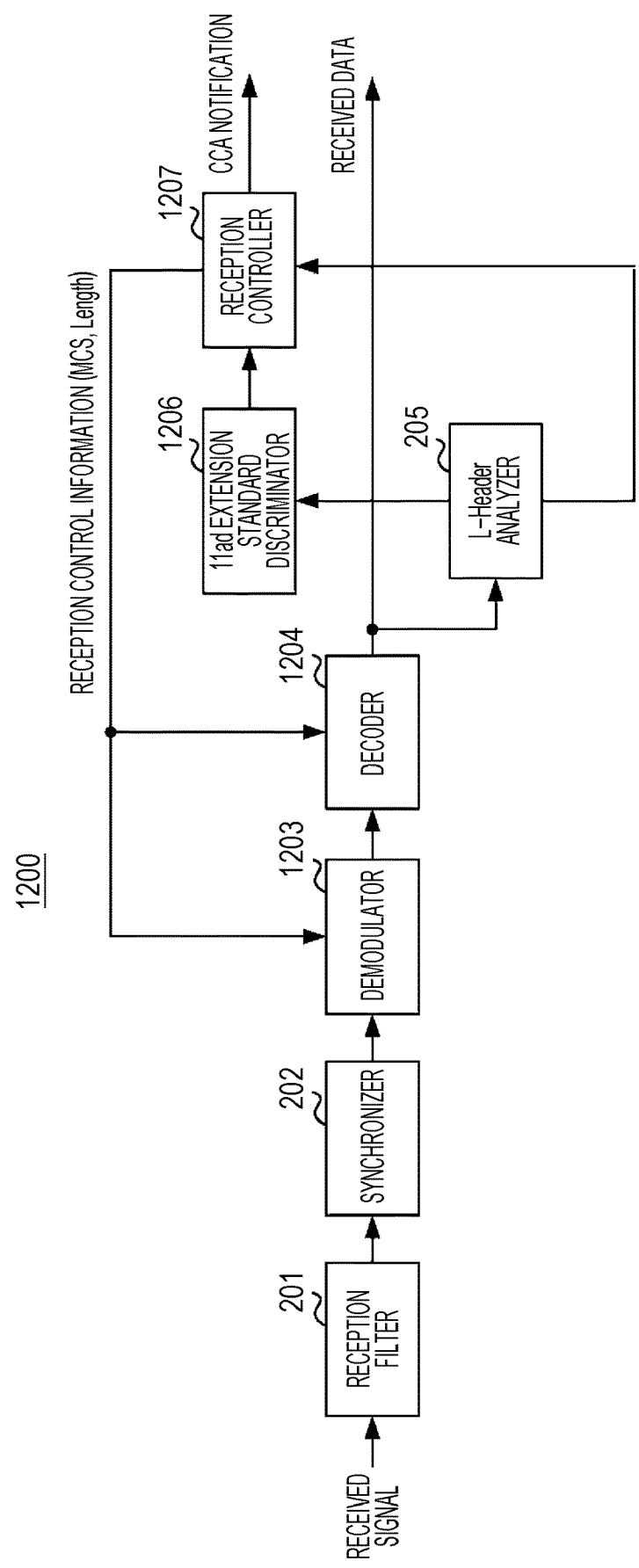
FIG. 23 is a diagram illustrating an exemplary configuration of a receiving device according to Embodiment 5.

FIG. 23 is a diagram illustrating an example of the configuration of the receiving device according to Embodiment 5.

The demodulator 1203 is able to select a demodulation process for a signal modulated by the modulation schemes defined in the 11ad standard, as well as additional modulation schemes (for example, π/2-64QAM) defined in the 11ad extension standard, as the operating mode.

The decoder 1204 is able to select a decoding process for a signal coded by the coding schemes defined in the 11ad standard, as well as additional coding schemes (for example, LDPC codes with a code rate of 7/8) defined in the 11ad extension standard, as the operating mode.

The 11ad extension standard discriminator 1206 discriminates, from the reserved bits included in the L-Header, whether a received packet conforms to the 11ad standard or the 11ad extension standard. In the case in which the packet is discriminated to be the 11ad extension standard, the 11ad extension standard discriminator 1206 discriminates the modulation scheme and the code rate of the 11ad extension standard from the value of the MCS field. Additionally, the 11ad extension standard discriminator 1206 computes the PSDU Length in the 11ad extension standard by using each of the values of the MCS, the PSDU Length, and the Scrambler Initialization fields in the L-Header (see FIG. 25).

The reception controller 1207 calculates the frame length on the basis of the MCS and Length information input from the 11ad extension standard discriminator 1206, and asserts a Clear Channel Assessment (CCA) signal over the period in which the frame is being received. Note that the CCA is a process of determining and reporting whether or not a signal of a fixed level or greater is being received on the receive channel. In the case in which the received packet is in the format of the 11ad extension standard, the reception controller 1207 notifies the demodulator 1203 and the decoder 1204 to perform demodulation and decoding processes on the received packet.

Note that in the case in which a legacy terminal receives a signal from the transmitting device 1100, the processes disclosed in Embodiments 1 to 3 are executed. For this reason, since an unknown coding method or modulation method has been applied to the Data field, it is difficult for the legacy terminal to decode the data in the Data field, but since the L-Header may be decoded, the data length may be detected correctly, and the CCA may be asserted correctly.

Figure 24:
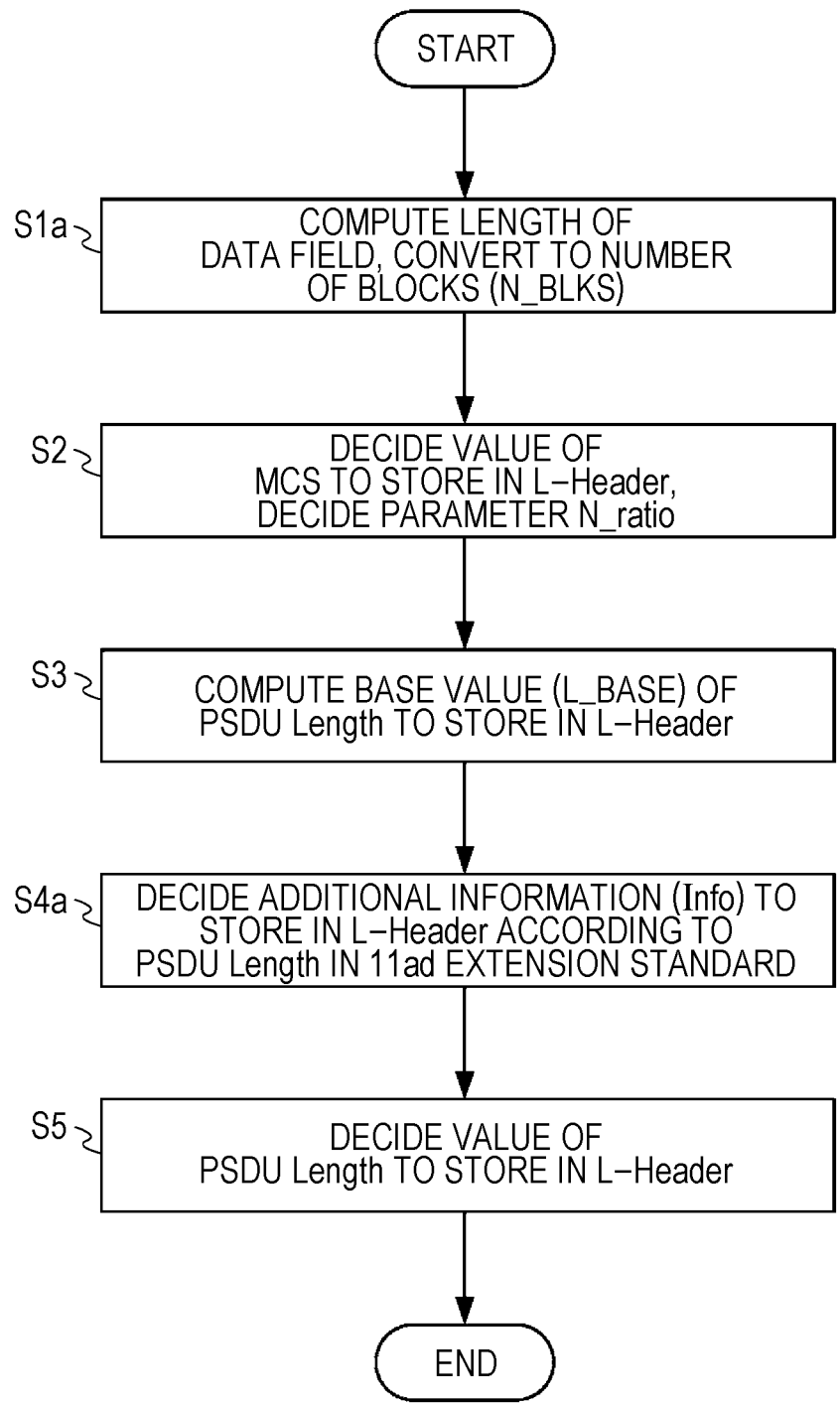
FIG. 24 is a flowchart illustrating an example of operations of the transmitting device according to Embodiment 5.

FIG. 24 is a flowchart illustrating operations in the transmitting device 1100 (L-Header generator 1103) according to Embodiment 5. Note that in FIG. 24, the same operations as the operations illustrated in FIG. 5 are denoted with the same signs, and description thereof will be omitted.

In step S1$a$ of FIG. 24, the transmitting device 1100 computes the packet length of the Data field (that is, the duration of the Data field). Subsequently, the transmitting device 1100 converts the computed packet length into a number (N_BLKS) of 11ad SC PHY symbol blocks.

At this point, as prescribed in NPL 1, a single symbol block includes 448 symbols of data and a guard interval (GI) of 64 symbols, for a total of 512 symbols, which is approximately 291 nsec in time.

In step S4$a$, the transmitting device 1100 generates the value of the PSDU Length correction information (additional information; designated "Info") to store in the L-Header.

Figure 25:
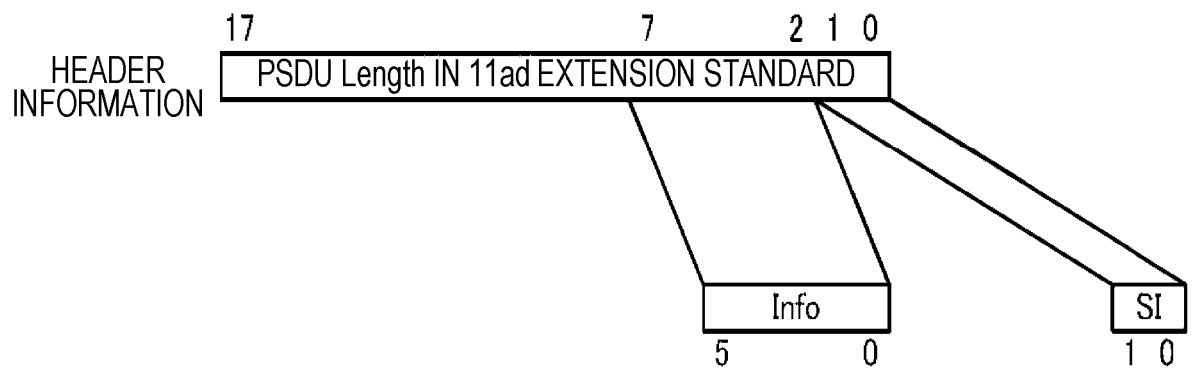
FIG. 25 is a diagram illustrating an example of transmission mode selection information according to Embodiment 5.

FIG. 25 illustrates an example of the PSDU Length correction information Info. Herein, the maximum number of bits in the Info field is 6 bits (bit0 to bit5).

For example, among the value expressing the PSDU Length of the 11ad extension standard included in the header information (that is, the amount of data which is actually transmitted), the transmitting device 1100 retrieves and stores the information from bits 2 to 7 as the value of Info. Also, although not illustrated in FIG. 24, for example, the transmitting device 1100 may also store information about bits 0 and 1 of the PSDU Length of the 11ad extension standard in the lower 2 bits of the Scrambler Initialization (SI) field in the L-Header. At this time, the actual scrambler initialization value is limited to 5 bits, and stored in the higher 5 bits (not illustrated) of the Scrambler Initialization field.

Figure 26:
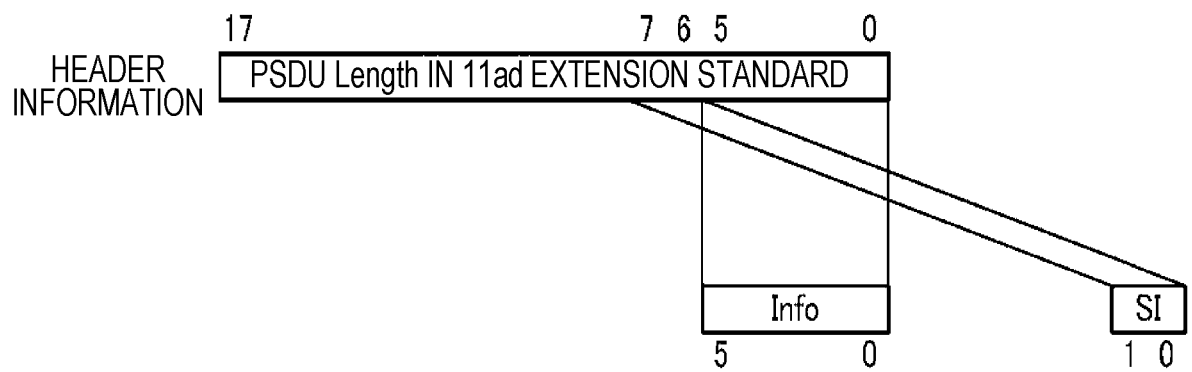
FIG. 26 is a diagram illustrating another example of transmission mode selection information according to Embodiment 5.

FIG. 26 illustrates another example of the PSDU Length correction information Info. Like in FIG. 26, the transmitting device 1100 may also do the reverse of FIG. 25 with respect to the information to retrieve as the 5 bits of Info and the 2 bits of the SI from among the PSDU Length of the 11ad extension standard.

Figure 27:
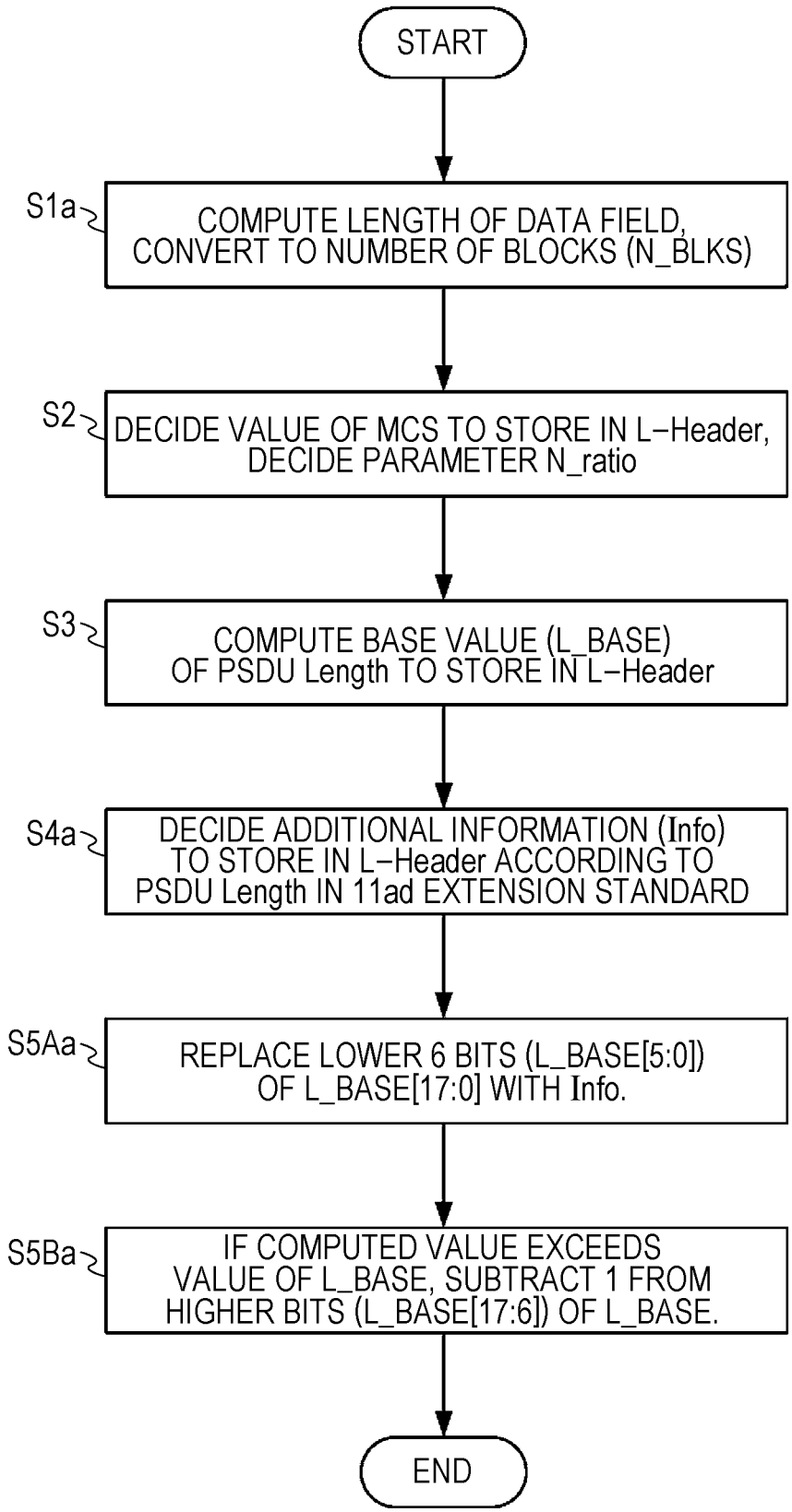
FIG. 27 is a flowchart illustrating another example of operations of the transmitting device according to Embodiment 5.

FIG. 27 is a flowchart illustrating another example of operations of the transmitting device 1100 supporting the 11ad extension standard. In FIG. 27, similarly to FIG. 19B, the transmitting device 1100 executes the processes from steps S1 to S4 without limiting N_BLKS to a multiple of 3 similarly to FIG. 5.

A legacy terminal executes the change using the Data field in step S1$a$, and in step S4$a$, executes the change of deciding Info based on the PSDU Length for the 11ad extension standard (for example, the method illustrated in FIG. 25 or 26), and is thereby able to support the 11ad extension standard. Note that in FIGS. 11 and 16, steps S1 to S4 may be executed without limiting N_BLKS to a multiple of 3, similarly to FIGS. 19B and 27.

Figure 28:
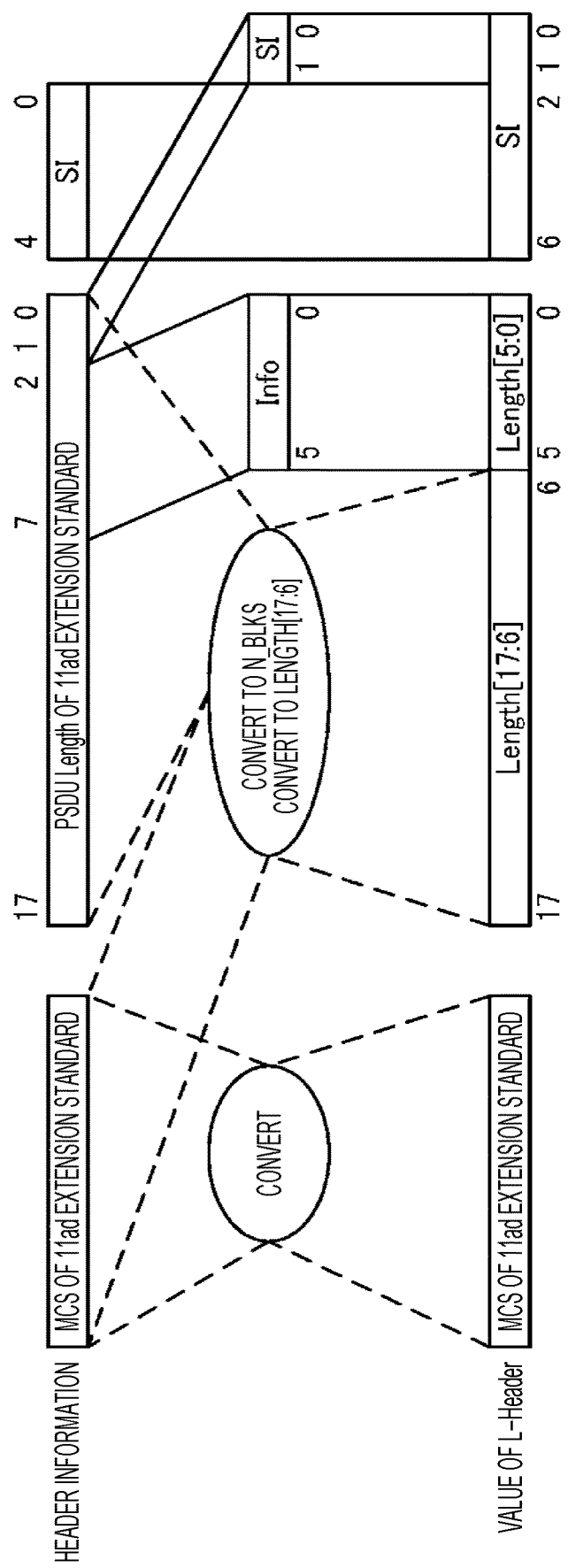
FIG. 28 is a diagram illustrating an example of a method of generating the value of the L-Header according to Embodiment 5.

FIG. 28 is a diagram illustrating an example of a method by which the transmitting device 1100 (L-Header generator 1103) applying the operations of FIG. 27 generates the value of the L-Header.

In step S4$a$, similarly to FIG. 25, for example, from among the value expressing the PSDU Length of the 11ad extension standard (that is, the amount of data which is actually transmitted), the information in bits 2 to 7 corresponds to the value of Info, and the transmitting device 1100 stores this information in the PSDU Length (Length[5:0]).

Although not illustrated in FIG. 27, the transmitting device 1100 may also convert the MCS in the L-Header from the MCS of the 11ad extension standard on the basis of a fixed rule, and store the converted MCS in the MCS field of the L-Header. Also, for example, the transmitting device 1100 may also store information about bits 0 and 1 of the PSDU Length of the 11ad extension standard in the lower 2 bits of the Scrambler Initialization (SI) field (SI[1:0]) in the L-Header. At this time, the scrambler initialization value may be limited to 5 bits, and stored in the higher 5 bits (SI[6:2]) of the Scrambler Initialization field.

In the following, an example will be given to describe the legacy header signal. For example, the value of the MCS of the 11ad extension standard is 12.6 as prescribed in NPL 4, the modulation scheme is $\pi/2$-64QAM, the coding scheme is LDPC codes with a code rate of 7/8 (using the puncturing scheme described in NPL 4), and the value of the PSDU Length of the 11ad extension standard is 1141.

In FIG. 27, in step S1$a$, since the number of code words N_CW is computed to be 17 (=ceiling(1141×8/546)), N_BLKS is computed to be 4 (=ceiling(17×624/2668)).

In step S2, the transmitting device 1100 sets the MCS of the L-Header to 12, in accordance with NPL 4.

In step S3, the transmitting device 1100 uses the formula of MCS12 in Formula (3) and also sets Info=0 to compute L_BASE as follows.

$$MCS12 : DMG \ PSDU \ \text{Length} = \text{floor}(N\_BLKS \times 8/3) \times 63 - \text{Info}$$
$$= \text{floor}(4 \times 8/3) \times 63 - 0 = 630$$

In other words, L_BASE is 0x276 in hexadecimal notation, or 00 0000 0010 0111 0110 in binary notation.

The value of the PSDU Length (as an example, 1141) of the 11ad extension standard becomes 0x475 when expressed in hexadecimal, and 00 0000 0100 0111 0101 in binary notation (with bit0 as the right-most bit (LSB)). In step S4$a$, the transmitting device 1100 retrieves bits 2 to 7 of the PSDU Length as the value of Info. Info is "0111 01" in binary notation, or in other words, 29 in decimal notation. Note that the transmitting device 1100 retrieves bits 0 and 1 of the PSDU Length as the two bits to embed in the SI, and sets the value to "01" in binary notation.

In step S5Aa, the transmitting device 1100 replaces the lower 6 bits of L_BASE with Info (0111 01). With this arrangement, the replaced L_BASE[17:0] becomes "00 0000 0010 0101 1101", or in other words, 605 in decimal notation.

In step S5Ba, since the value "605" of the replaced L_BASE does not exceed the value "630" of L_BASE, the transmitting device 1100 decides 605 to be the set value of the DMG PSDU Length.

Next, FIG. 28 will be used to describe the method by which the receiving device 1200 (11ad extension standard discriminator 1206) of FIG. 23 computes the PSDU Length of the 11ad extension standard from the received value of the L-Header.

The received value is MCS12, and a PSDU Length of 605. Also, the lower 2 bits of SI are "01" in binary notation. Consequently, by extracting and joining the lower 6 bits (Info) of the PSDU Length and the lower 2 bits of SI, the lower 8 bits of the value of the PSDU Length of the 11ad extension standard are decided to be "0111 0101". Also, from the received MCS value, the receiving device 1200 understands that the MCS in the 11ad extension standard is 12.6.

Next, the receiving device 1200 computes N_BLKS. N_BLKS is computed from the received MCS (12) and the PSDU Length (605), on the basis of the 11ad standard. In the above example, the N_BLKS value of "4" is obtained.

Next, the receiving device 1200 computes the maximum number of code words (N_CW max) from the obtained N_BLKS. For MCS12.6 in the 11ad extension standard, there are 2688 symbols of data symbols per block, and a single code word is 624 bits. Consequently, N_CW max is computed as follows.

$$N\_CW\_\text{max} = \text{floor}(NBLKS \times 2688/624)$$
$$= \text{floor}(4 \times 2688/624)$$
$$= 17$$

Next, the receiving device 1200 computes the maximum Length that may be taken, namely L_max. For MCS12.6 in the 11ad extension standard, since a single code word contains 546 bits (68.25 bytes) of information bits, L_max is computed as follows. L_max=floor(N_CW max×68.25)=1160

The receiving device 1200 replaces the lower bits of L_max with the lower 8 bits obtained previously to set a provisional Length (L_tmp). If the provisional Length is greater than L_max, the receiving device 1200 subtracts 256 from L_tmp. Herein, the reason for subtracting 256 is that since the lower 8 bits are already settled, it is sufficient to adjust the Length in units of 256 (=2 to the 8th power). In one example, each value is expressed in binary notation as follows.

L_max=00 0000 0100 1000 1000=1160
Obtained lower bits 0111 0101=117
L_tmp 00 0000 0100 0111 0101=1141

Since L_tmp is smaller than L_max, 1141 is the finally computed PSDU Length in the 11ad extension standard.

According to Embodiment 5, the transmitting device 1100 is able to transmit the PSDU Length (data length, number of data bytes) of the 11ad extension standard without using many reserved bits.

Also, according to Embodiment 5, even in the case in which the receiving device does not support the 11ad extension standard, the transmitting device 1100 is able to transmit the packet length (time) correctly.

Embodiment 6

Figure 29:
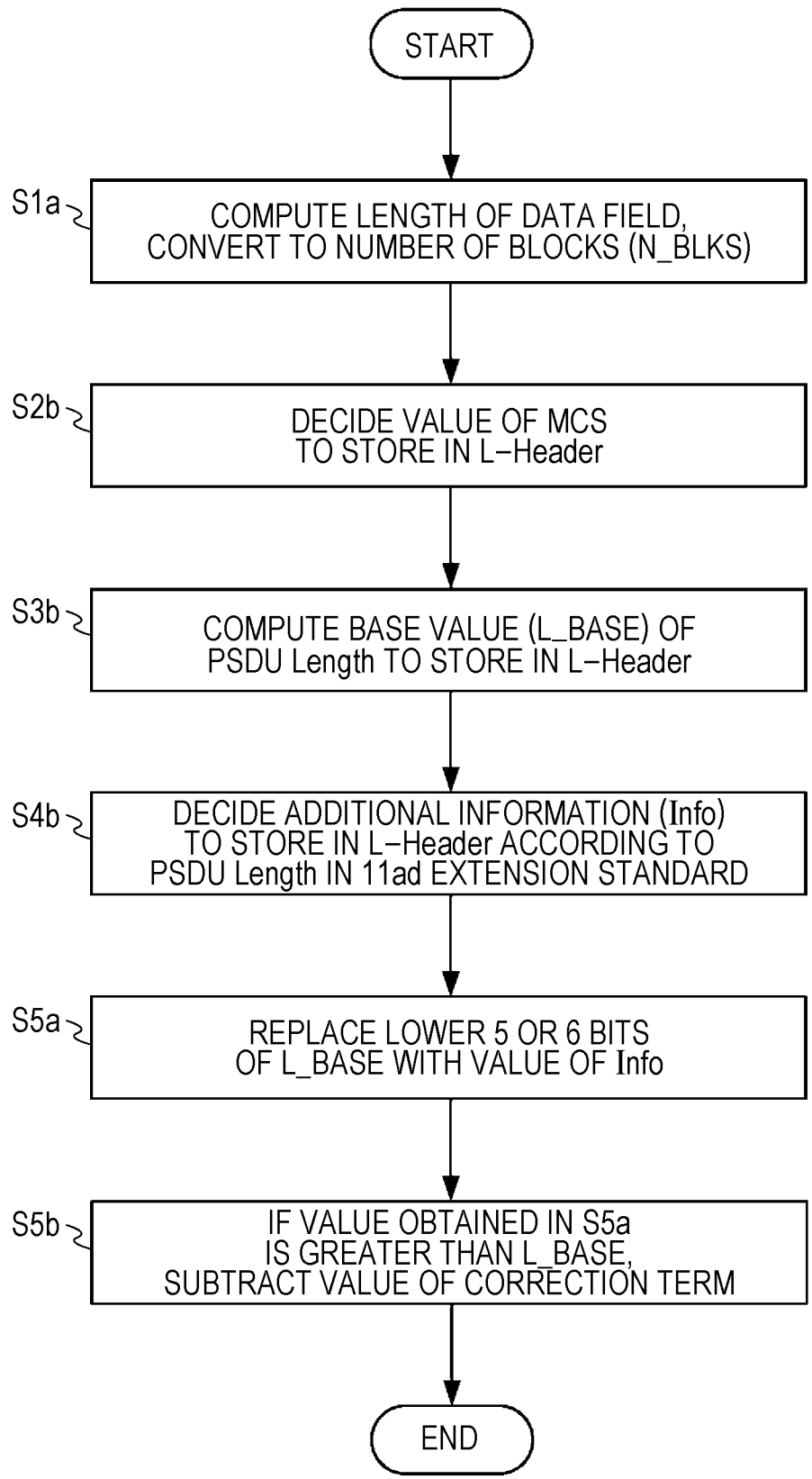
FIG. 29 is a flowchart illustrating operations of the transmitting device according to Embodiment 6.

FIG. 29 is a flowchart illustrating operations in the transmitting device 1100 (L-Header generator 1103) according to Embodiment 6. Note that in FIG. 29, the same operations as the operations illustrated in FIG. 24 are denoted with the same signs, and description thereof will be omitted.

FIG. 30 is a diagram illustrating the relationship between the extension MCS number, the base length formula, the number of substitute bits, the correction term, and the value of the MCS field.

In step S1a, the transmitting device 1100 computes the packet length of the Data field (that is, the duration of the Data field). Subsequently, the transmitting device 1100 converts the computed packet length into a number (N_BLKS) of 11ad SC PHY symbol blocks.

In step S2b, the transmitting device 1100 decides the value of the MCS to store in the L-Header, namely the "value of the MCS field", on the basis of FIG. 30. For example, in the case in which the MCS of the 11ad extension standard, namely the "extension MCS number", is 12.4, the value of the MCS field to store in the L-Header is set to 10. Unlike NPL 4, in FIG. 30, the values of the MCS field to store in the L-Header are all 6 or greater. As described earlier, in the case in which the value of the MCS field to store in the L-Header is 5 or less, the value of N_BLKS does not become 3n+1 (where n is a non-negative integer), making it difficult to express TXTIME correctly. Consequently, the correspondence between the MCS of the 11ad extension standard and the "extension MCS number" is decided so that the value of the MCS becomes 6 or greater.

In step S3b, the transmitting device 1100 computes the base value (L_BASE) of the PSDU Length to store in the L-Header on the basis of the "Base length formula" illustrated in FIG. 30. In the case in which the value of the MCS field of the L-Header is from 6 to 9, the transmitting device 1100 uses the L_BASE formula derived with reference to Formula (3) similarly to Embodiment 5. In the case in which the value of the MCS field to store in the L-Header is from 10 to 12, the transmitting device 1100 uses a partial modification of Formula (3).

Namely, in Formula (3), the numerator of the fraction inside the floor function is N_BLKS×8, but in the Base Length formula of FIG. 30, the numerator of the fraction inside the floor function is set to N_BLKS×4, and the multiplier following the floor function is doubled from the case of Formula (3), yielding 84 (value of MCS field=10), 105 (value of MCS field=11), and 126 (value of MCS field=12). In this way, by causing the calculation inside the floor function to be shared in common among all the MCS, the calculations in the transmitting device 1100 may be simplified, and the circuit scale as well as the amount of memory used may be reduced.

In step S4b, the transmitting device 1100 decides the additional information (Info) to store in the L-Header according to the PSDU Length in the 11ad extension standard and the "number of bits to replace" in FIG. 30.

In the case in which the "number of bits to replace" in FIG. 30 is 5 (that is, in the case in which the value of the MCS field is 6, 7, 8, or 9), the Length value of the L-Header is computed by replacing the lower 5 bits of L_BASE with Info. In other words, Info is 5 bits. For example, when the PSDU Length is expressed in bits (binary notation), the value of Info is the value of bits 3 to 7 (herein, bit0 is the LSB).

In the case in which the "number of bits to replace" in FIG. 30 is 6 (that is, in the case in which the value of the MCS field is 10, 11, or 12), the Length value of the L-Header is computed by replacing the lower 6 bits of L_BASE with Info. In other words, Info is 6 bits. For example, when the PSDU Length is expressed in bits (binary notation), the value of Info is the value of bits 3 to 8.

In step S5a, the transmitting device 1100 replaces the lower 5 or 6 bits of L_BASE with the value of Info, according to the "number of bits to replace" in FIG. 30.

In step S5b, in the case in which the value obtained in step S5a is greater than the value of L_BASE, the transmitting device 1100 subtracts the value of the "correction term" in FIG. 30.

In step S5a, in the case in which a larger value than L_BASE is obtained by replacing the lower bits of L_BASE with Info, the N_BLKS calculated by treating the value obtained in step S5a as the Length of the L-Header becomes larger than the N_BLKS calculated in step S1a, and the TXTIME of the packet is not expressed correctly. Accordingly, in step S5b, by subtracting the value of the correction term from the value obtained in step S5a, the transmitting device 1100 is able to obtain a value of the Length corresponding to an N_BLKS which is equal to the N_BLKS calculated in step S1a.

The transmitting device 1100 sets the value obtained as above in the Length field of the L-Header, and transmits the MCS of the 11ad extension standard.

Note that, for example, the transmitting device 1100 may also store information about bits 0 to 2 of the PSDU Length of the 11ad extension standard in the lower 3 bits of the Scrambler Initialization (SI) field (SI[2:0]) in the L-Header. At this time, the scrambler initialization value may be limited to 4 bits, and stored in the higher 4 bits (SI[6:3]) of the Scrambler Initialization field.

The receiving device 1200 (11ad extension standard discriminator 1206) of FIG. 23 computes the PSDU Length of the 11ad extension standard from the value of the received L-Header by a method similar to the method described in Embodiment 5. The difference between the present embodiment and Embodiment 5 is that whereas the information of bits 0 and 1 of the PSDU Length are transmitted using the SI in Embodiment 5, the information of bits 0 to 2 of the PSDU Length are transmitted using the SI in the present embodiment.

According to Embodiment 6, the transmitting device 1100 is able to transmit the PSDU Length (data length, number of data bytes) of the 11ad extension standard without using many reserved bits.

Also, according to Embodiment 6, even in the case in which the receiving device does not support the 11ad extension standard, the transmitting device 1100 is able to transmit the packet length (time) correctly.

Embodiment 7

Figure 31:
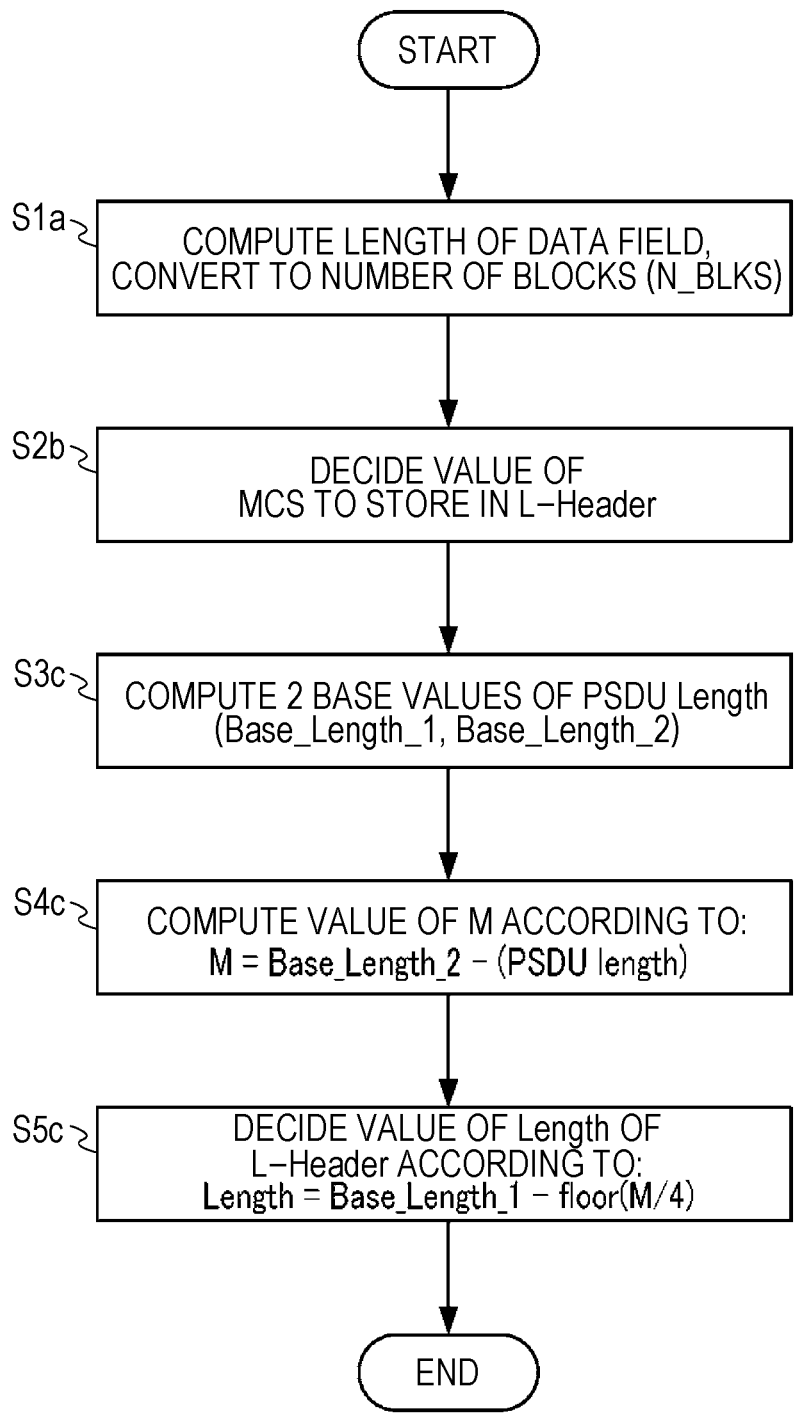
FIG. 31 is a flowchart illustrating operations of the transmitting device according to Embodiment 7.

FIG. 31 is a flowchart illustrating operations in the transmitting device 1100 (L-Header generator 1103) according to Embodiment 7. Note that in FIG. 31, the same operations as the operations illustrated in FIG. 24 are denoted with the same signs, and description thereof will be omitted.

In step S1$a$ of FIG. 31, the transmitting device 1100 computes the packet length of the Data field (that is, the duration of the Data field). Subsequently, the transmitting device 1100 converts the computed packet length into a number (N_BLKS) of 11ad SC PHY symbol blocks.

In step S2$b$ of FIG. 31, the transmitting device 1100 decides the value of the MCS to store in the L-Header, on the basis of FIG. 32. FIG. 32 is a diagram illustrating the relationship between the extension MCS number, Base_Length_1, Base_Length_2, and the value of the MCS field. The correspondence between the MCS of the 11ad extension standard (extension MCS number) and the MCS set in the L-Header (value of the MCS field) illustrated in FIG. 32 is the same as the table in FIG. 30.

In step S3$c$, the transmitting device 1100 computes two base values of the PSDU Length (Base_Length_1, Base_Length_2) on the basis of the formulas indicated by "Base_Length_1" and "Base_Length_2" in FIG. 32. Herein, Base_Length_1 corresponds to one of the values of the Length at which N_BLKS becomes a desired value (that is, the value computed in step S1$a$) in the case of being computed on the basis of the MCS indicated in the L-Header (the MCS of the 11ad standard; the value of the MCS field), similarly to L_BASE of Embodiment 6. Also, Base_Length_2 corresponds to one of the values of the Length at which N_BLKS becomes a desired value (that is, the value computed in step S1$a$) in the case of being computed on the basis of the MCS of the 11ad extension standard (extension MCS number).

The following is a general formula for computing Base_Length_1.

$$\text{Base\_Length\_1} = \text{floor}((\text{floor}(N\_BLKS \times N\_CBPB / L\_CW) \times L\_CW \times R/8) \quad \text{Formula (12)}$$

In Formula (12), N_CBPB (the number of coded bits per symbol block) and R (the code rate) are values determined according to the value of the MCS field in the L-Header (that is, the MCS selected in step S2$b$). Specific values have already been illustrated in FIG. 7. Also, as prescribed in NPL 1, L_CW (the code word length) is 672.

The following is a general formula for computing Base_Length_2.

$$\text{Base\_Length\_2} = \text{floor}((\text{floor}(N\_BLKS \times N\_CBPB\_E / L\_CW) \times L\_CW \times R\_E/8) \quad \text{Formula (13)}$$

In Formula (13), N_CBPB_E and R_E are the value of N_CBPB (the number of coded bits per symbol block) and the value of R (the code rate) determined according to the value of the MCS of the 11ad extension standard (extension MCS number). For example, the values of N_CBPB and R with respect to the value of the MCS of the 11ad extension standard (extension MCS number) are as illustrated in FIG. 33.

Inserting numerical values into Formula (12) and Formula (13) and simplifying the formulas results in the formulas indicated by "Base_Length_1" and "Base_Length_2" in FIG. 32. However, as described in Embodiment 6, to make the simplification of the formulas shared in common among the MCS, a transformation that takes the coefficient inside the floor function to the outside of the floor function is applied to the value of some of the MCS fields (for example, Base_Length_1 of MCS 10 to 12). When the transformation is applied, the value of the Length of the L-Header obtained by the procedure in FIG. 31 no longer corresponds to the correct value of N_BLKS in some cases, but for all formulas illustrated in FIG. 32, it has been confirmed that the correct value of N_BLKS is obtained for all anticipated values of the PSDU Length (1 to 262143).

In step S4$c$ of FIG. 31, the transmitting device 1100 computes the value of M according to the following formula.

$$M = \text{Base\_Length\_2} - \text{PSDU\_Length} \quad \text{Formula (14)}$$

In step S5$c$ of FIG. 31, the transmitting device 1100 computes the value of the Length of the L-Header according to the following formula.

$$\text{Length} = \text{Base\_Length\_1} - \text{floor}(M/4) \quad \text{Formula (15)}$$

In other words, Formula (15) is a formula that applies Formula (1) or Formula (2) of Embodiment 1 while treating the portion of M excluding the lower 2 bits as the value of Info.

Note that, for example, the transmitting device 1100 may also store information about the lower 2 bits of the value of M in the lower 2 bits of the Scrambler Initialization (SI) field (SI[1:0]) in the L-Header. At this time, the scrambler initialization value may be limited to 5 bits, and stored in the higher 5 bits (SI[6:2]) of the Scrambler Initialization field.

Figure 34:
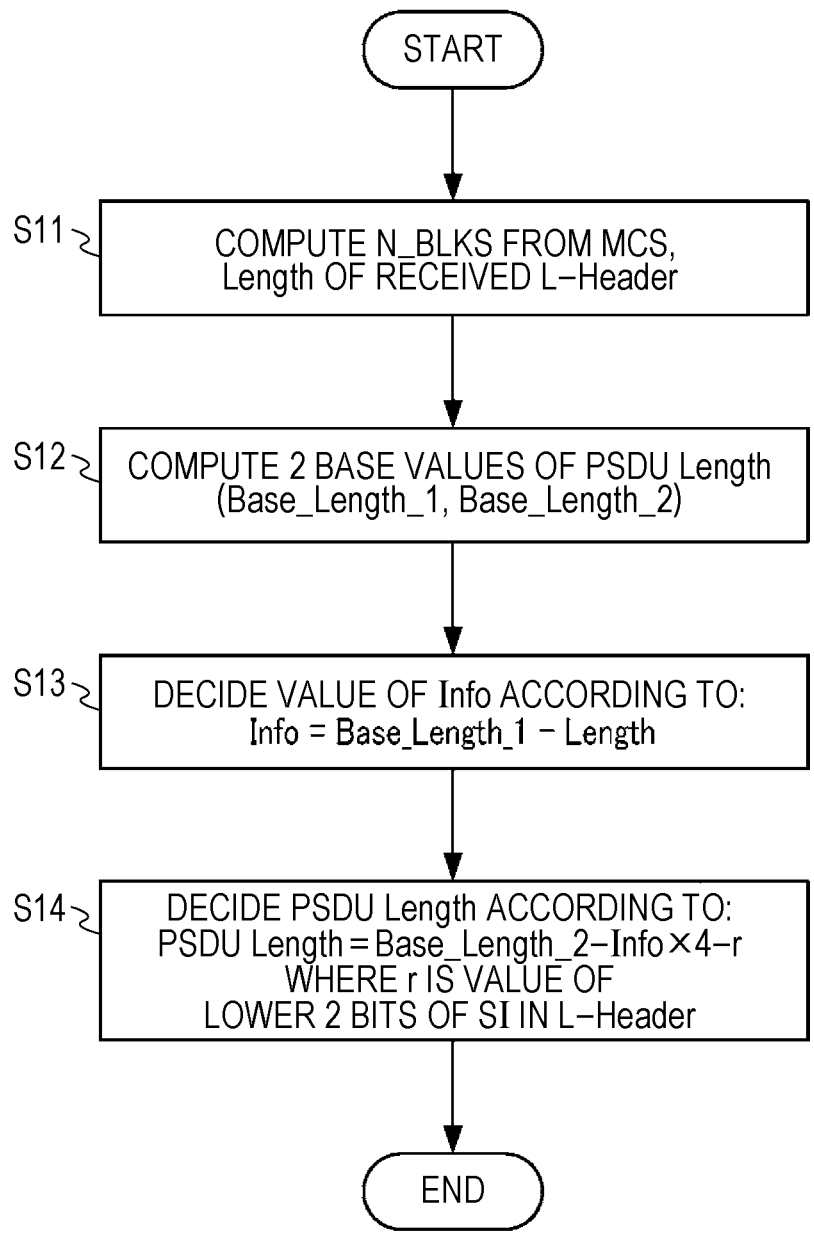
FIG. 34 is a flowchart illustrating the operation of computing the PSDU Length of the 11ad extension standard of the receiving device according to Embodiment 7.

Next, FIG. 34 will be used to describe the method by which the receiving device 1200 (11ad extension standard discriminator 1206) of FIG. 23 computes the PSDU Length of the 11ad extension standard from the received value of the L-Header.

In step S11, the receiving device 1200 computes the value of N_BLKS from the MCS (the value of the MCS field) and the Length (the value of the Length field) in the received L-Header.

In step S12, the receiving device 1200 uses FIG. 32 to compute two base values of the PSDU Length (Base_Length_1, Base_Length_2).

In step S13, the receiving device 1200 decides the value of Info according to the following formula.

$$\text{Info} = \text{Base\_Length\_1} - \text{Length} \quad \text{Formula (16)}$$

In step S14, the receiving device 1200 decides the PSDU Length according to the following formula.

$$\text{PSDU Length} = \text{Base\_Length\_2} - \text{Info} \times 4 - r \quad \text{Formula (17)}$$

In Formula (17), r is the value of the lower 2 bits of the SI in the L-Header.

By the above procedure, the receiving device 1200 is able to acquire the value of the PSDU Length, even if a field storing the value of the PSDU Length is not provided in the MCS of the 11ad extension standard (extension MCS number).

According to Embodiment 7, the transmitting device 1100 is able to transmit the PSDU Length (data length, number of data bytes) of the 11ad extension standard without using many reserved bits.

Also, according to Embodiment 7, even in the case in which the receiving device does not support the 11ad extension standard, the transmitting device 1100 is able to transmit the packet length (time) correctly.

Embodiment 8

The present embodiment describes the case of applying channel bonding to the above Embodiments 1 to 7.

Figure 35:
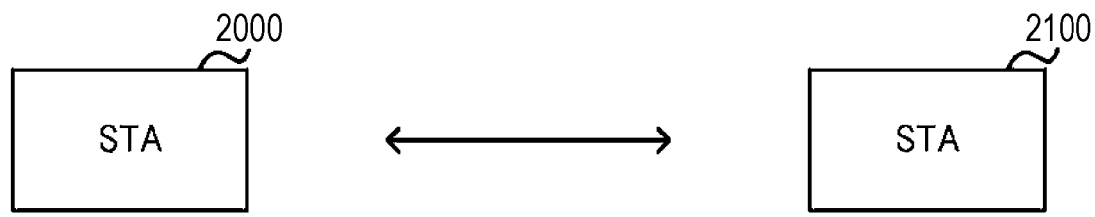
FIG. 35 is a diagram illustrating the transmitting device (STA) according to Embodiment 8.

FIG. 35 is a diagram illustrating STA2000 and STA2100, which are transmitting devices of the present embodiment.

Figure 36:
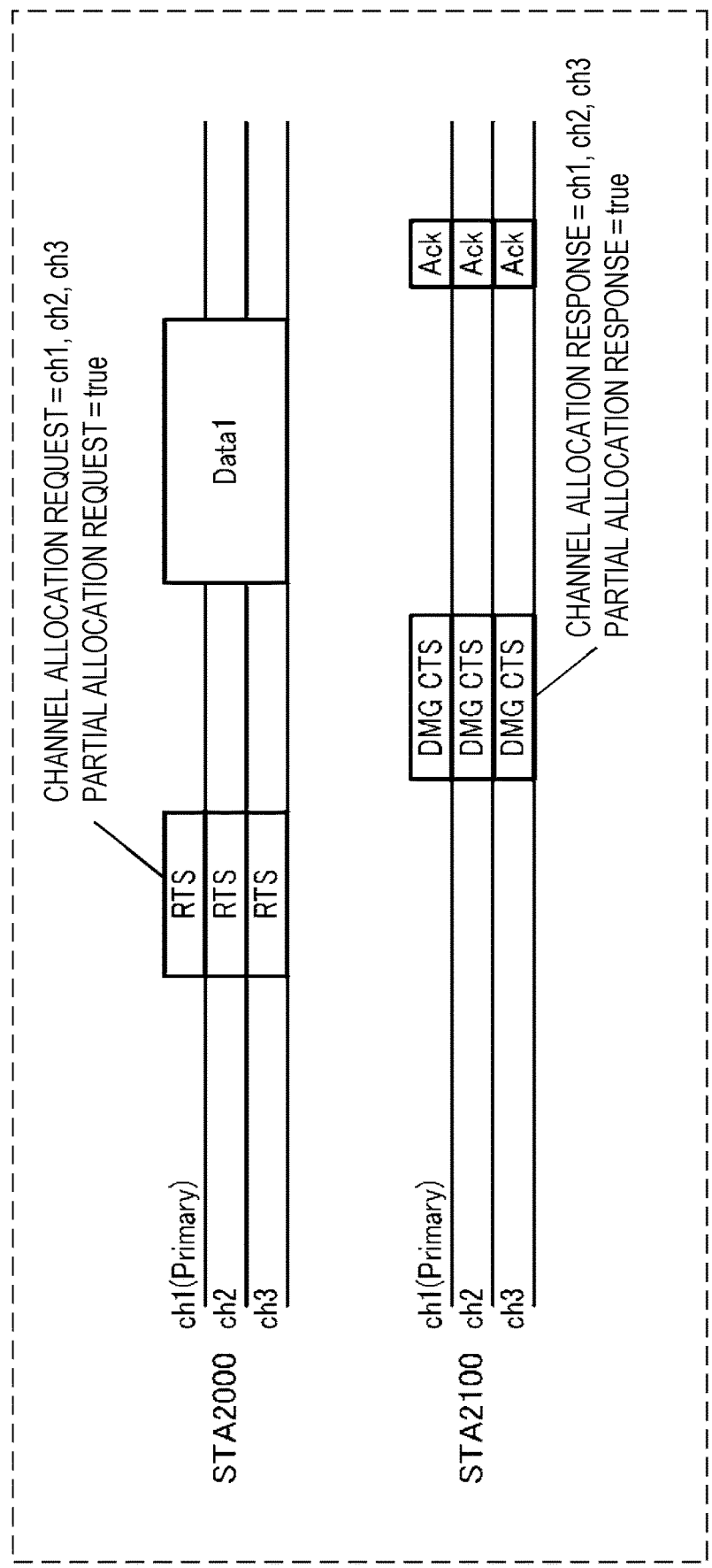
FIG. 36 is a diagram illustrating a transmission procedure of a data packet according to Embodiment 8.

FIG. 36 is a diagram illustrating a procedure in which STA2000 uses three channels (ch1 to ch3) to transmit a data packet (Data1) applying channel bonding to STA2100. Herein, ch1 is the primary channel.

STA2000 transmits a Request to Send (RTS) frame using ch1 to ch3. The RTS frame is transmitted by duplicating a single-channel frame over the three channels, without using channel bonding. Note that STA2000 may also transmit the RTS frame on the primary channel (ch1), without transmitting on ch2 and ch3.

The RTS frame includes information indicating a channel allocation request for ch1, ch2, and ch3. In other words, STA2000 uses the RTS frame to notify STA2100 and other nearby STA (not illustrated) of a request to communicate (transmit and receive) with STA2100 utilizing ch1, ch2, and ch3.

Also, the RTS frame includes information indicating a partial allocation request.

After receiving the RTS frame, STA2100 transmits a DMG CTS frame using ch1 to ch3. STA2100 transmits the DMG CTS frame by duplicating a single-channel frame over the three channels, without using channel bonding. Note that STA2100 may also transmit the DMG CTS frame on the primary channel (ch1), without transmitting on ch2 and ch3.

The DMG CTS frame includes response information granting channel allocation to ch1, ch2, and ch3 in response to the channel allocation request for ch1, ch2, and ch3. In other words, STA2100 uses the DMG CTS frame to notify STA2000 and other nearby STA (not illustrated) that STA2100 has determined that communicating (transmitting and receiving) with STA2000 utilizing ch1, ch2, and ch3 is possible.

Also, the DMG CTS frame includes response information granting the partial allocation request.

Since the channel allocation request for ch1, ch2, and ch3 is granted by STA2100, STA2000 is able to use all of ch1, ch2, and ch3 to transmit to STA2100 using channel bonding or channel aggregation. Also, since the partial allocation request is granted by STA2100, STA2000 is able to use all or some of ch1, ch2, and ch3 to transmit to STA2100 using channel bonding or channel aggregation.

Note that, similarly to STA2000, STA2100 also is able to use all or some of ch1, ch2, and ch3 to transmit to STA2000 using channel bonding or channel aggregation.

For this reason, in FIG. 36, STA2000 uses all of ch1, ch2, and ch3 to transmit the data packet Data1 using channel bonding.

Figure 37:
FIG. 37 is a diagram illustrating the PHY frame configuration of the Data1 packet according to Embodiment 8.

FIG. 37 is a diagram illustrating the PHY frame configuration of the Data1 packet. L-STF is the same Short Training Field (STF) as the SC-PHY of the 11ad standard. L-CEF is the same Channel Estimation Field (CEF) as the SC-PHY of the 11ad standard. L-Header is a header field compatible with the SC-PHY of the 11ad standard. EDMG-Header-A is the header method field used in the 11ay standard. The portion from the L-STF to the EDMG-Header-A is transmitted by single-channel transmission. In other words, in each channel, each field from the L-STF to the EDMG-Header-A takes the same spectrum as a packet of the 11ad standard. Note that "EDMG-" is also denoted "E-" in some cases.

EDMG-STF is a field used in the 11ay standard. EDMG-CEF is a field used in the 11ay standard. The Payload field includes the transmission data.

In a packet that uses channel bonding, the EDMG-STF, the EDMG-CEF, and the Payload are transmitted in a signal band that depends on the number of channels in the channel bonding. In a packet that uses channel aggregation, the EDMG-STF, the EDMG-CEF, and the Payload are modulated by single channel, and transmitted through the channels used by the channel aggregation. Also, in the case of using channel aggregation but not using MIMO transmission, the EDMG-STF and EDMG-CEF fields may be omitted, and the Payload may be transmitted immediately after the EDMG-Header-A.

In this way, the transmission signal from the EDMG-STF is different depending on information about whether or not channel bonding is used, whether or not channel aggregation is used, which channels are used, and whether or not MIMO is used. In other words, before starting to receive the EDMG-STF, it is necessary for the receiving device to discriminate the type of the transmission signal of the EDMG-STF, and switch the settings of the receiving device.

The EDMG-Header-A is LDPC coded, and since a delay is produced by decoding, in the case in which the information described above is included in the EDMG-Header-A, it is difficult for the receiving device to discriminate the information described above before starting to receive the EDMG-STF. Herein, in the case in which the information described above is included in the L-Header, even when accounting for the delay produced by the decoding process, the receiving device is able to discriminate the presence or absence of the EDMG-STF and the signal type of the EDMG-STF before starting to receive the EDMG-STF.

FIG. 38 is a diagram illustrating the format of the L-Header of Embodiment 8. Description will be omitted for fields having the same field name and purpose as in the 11ad standard.

STA2000 (data transmission) sets the MCS field to MCS6 in the case in which the packet length N_BLKS corresponds to 4682 or less. STA2000 sets the MCS field to MCS2 in the case in which the packet length N_BLKS corresponds to a length exceeding 4682. The reason for this has been described in Embodiment 3, and thus a description is omitted here.

STA2000 (data transmission) sets the Channel Aggregation field to 1 in the case of using channel aggregation, and to 0 otherwise. In FIG. 37, since STA2000 (the transmitting device) uses channel bonding on the Data1 packet and is not using channel aggregation, the Channel Aggregation (CA) field is set to 0.

The Channel Occupation1 field indicates whether or not the packet is using the lowest channel (the channel in the lowest frequency band) among the channels decided for allocation by the RTS and the DMG CTS. In FIG. 36, the allocation of ch1, ch2, and ch3 has been decided by the RTS and the DMG CTS. Among these, the lowest channel is ch1.

Since STA2000 (the transmitting device) is using ch1 as a part of the channel bonding, STA2000 sets the Channel Occupation1 field to 1 in the Data1 packet.

The Channel Occupation2 field indicates whether or not the packet is using the second-lowest channel among the channels decided for allocation by the RTS and the DMG CTS. In FIG. 36, the allocation of ch1, ch2, and ch3 has been decided by the RTS and the DMG CTS. Among these, the second-lowest channel is ch2. Since STA2000 (the transmitting device) is using ch2 as a part of the channel bonding, STA2000 sets the Channel Occupation2 field to 1 in the Data1 packet.

The Channel Occupation3 field indicates whether or not the packet is using the third-lowest channel among the channels decided for allocation by the RTS and the DMG CTS. In FIG. 36, the allocation of ch1, ch2, and ch3 has been decided by the RTS and the DMG CTS. Among these, the third-lowest channel is ch3. Since STA2000 (the transmitting device) is using ch3 as a part of the channel bonding, STA2000 sets the Channel Occupation3 field to 1 in the Data1 packet.

The Channel Occupation4 field indicates whether or not the packet is using the fourth-lowest channel among the channels decided for allocation by the RTS and the DMG CTS. In FIG. 36, the allocation of ch1, ch2, and ch3 has been decided by the RTS and the DMG CTS. Since STA2000 (the transmitting device) transmits each field using an allocation of three channels, STA2000 sets the Channel Occupation4 field to 0.

From the above, in FIG. 37, STA2000 (the transmitting device) sets the value of the Channel Occupation (CO) field to 1110 in the L-Header with respect to the Data1 packet. (Hereinafter, the case of setting the values of Channel Occupation1, 2, 3, and 4 to 1, 1, 1, and 0 will be described as "setting the value of the CO field to 1110".)

In FIG. 38, the Length field is set to a value that correctly expresses the TXTIME of the packet. For example, in the case of setting the MCS field to 2, STA2000 (the transmitting device) treats the values of the Channel Aggregation field and the Channel Occupation1 to 4 fields as the value of Info, and computes the value of the Length field using FIG. 19A. Also, in the case of setting the MCS field to 6, STA2000 (the transmitting device) computes the value of the Length field using FIG. 19B.

The MIMO field of FIG. 38 indicates whether or not MIMO is being used for transmission (in other words, whether or not the packet is being transmitted in multiple streams). In FIG. 37, since STA2000 (the transmitting device) is not applying MIMO to the Data1 packet, STA2000 sets the MIMO field to 0.

Note that the EDMG Indication field is set to 1 in the case of an EDMG PHY frame of the 11ay standard.

With the L-Header field configuration in FIG. 38, STA2000 (the transmitting device) is able to report, by the L-Header, whether or not channel bonding is used, whether or not channel aggregation is used, which channels are used, and whether or not MIMO is used. With this arrangement, STA2100 (the receiving device) is able to switch the receiving device circuit appropriately at the time of starting to receive the EDMG-STF.

Figure 39:
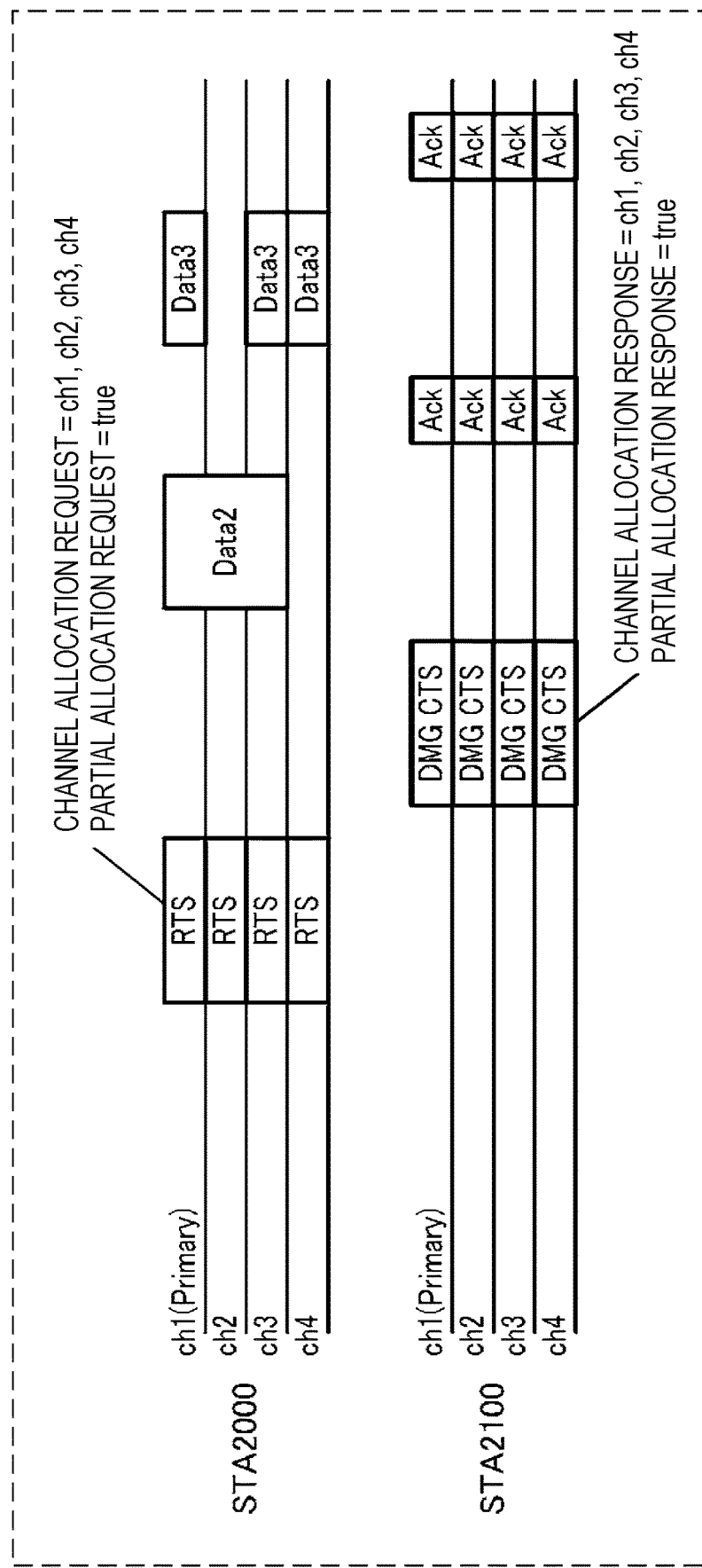
FIG. 39 is a diagram illustrating another example of a transmission procedure of a data packet according to Embodiment 8.
Figure 40:
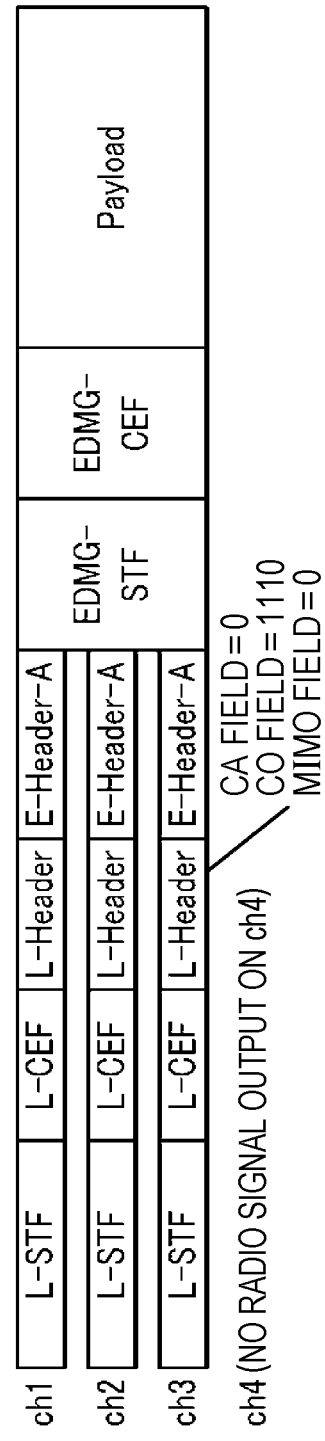
FIG. 40 is a diagram illustrating the PHY frame configuration of the Data2 packet according to Embodiment 8.

FIGS. 39 to 41 illustrate different examples. FIG. 39 is a diagram illustrating the procedure by which STA2000 transmits a data packet applying channel bonding and channel aggregation using four channels (ch1 to ch4). In FIG. 39, STA2000 and STA2100 have allocated the four channels ch1 to ch4 using the RTS and the DMG CTS. Also, in FIG. 39, partial allocation is active.

In FIG. 39, STA2000 decides to transmit a Data2 packet using the three channels ch1 to ch3. Since the decided channels are included among the channels allocated using the RTS and the DMG CTS, and since partial allocation is active, transmission using some of the channels like for the Data2 packet is possible.

The reason why STA2000 decides to transmit in channels ch1 to ch3 without using ch4 is because, for example, STA2000 executes carrier sensing before the transmission of the Data2 packet, and detects that another terminal (not illustrated) is transmitting on ch4. In this case, since the primary channel (ch1) of STA2000 is not included among the channels in which a signal was detected by carrier sensing, STA2000 is able to determine that the signal is not a transmission signal of the communication destination of STA2000, namely, STA2100. Consequently, STA2000 determines that it is possible to transmit the Data2 packet using other channels excluding ch4.

Another reason by which STA2000 decides to transmit on the channels ch1 to ch3 without using ch4 is because, for example, the amount of data (PSDU Length) to transmit in the Data2 packet is small. When the amount of data is small, it is difficult to shorten the packet length effectively even if the number of channels used in channel bonding is increased, and for this reason, transmitting on fewer channels makes it possible to reduce interference on ch4 and reduce power consumption.

In addition, the fewer channels used in channel bonding, the higher the transmitting device is able to raise the transmit power per channel. This applies in the case in which the total transmit power of the transmitting device is prescribed by regulations, or limited by the performance of the transmitting device, for example. By raising the transmit power per channel, the transmitting device is able to transmit with a reduced packet error rate and a higher MCS (higher-order modulation and code rate), and is able to reduce interference on other terminals and reduce the power consumption.

FIG. 40 is a diagram illustrating the PHY frame configuration of the Data2 packet by channel bonding. STA2000 transmits with the value of the CO field set to 1110 in the L-Header. In other words, since STA2000 (the transmitting device) does not transmit a radio signal on ch4, STA2000 sets the Channel Occupation4 field to 0.

STA2100 (the receiving device) references the values of the CA field, the CO field, the MIMO field, and the EDMG Indication of the received L-Header (see FIG. 38), and is able to learn that in the Data2 packet, the EDMG-STF bonded on ch1 to ch3 follows in the EDMG-Header-A. Consequently, STA2100 switches the configuration of the receiver to 3-channel bonding before receiving the EDMG-STF.

Also, in FIG. 39, STA2000 decides to transmit a Data3 packet using the three channels ch1, ch3, and ch4. Since the decided channels are included among the channels allocated using the RTS and the DMG CTS, and since partial allocation is active, STA2000 is able to transmit using some of the channels like for the Data3 packet.

FIG. 41 is a diagram illustrating the PHY frame configuration of the Data3 packet by channel aggregation. STA2000 transmits with the value of the CO field set to 1011 in the L-Header. In other words, since a radio signal is not transmitted in ch2, STA2000 sets the Channel Occupation2 field to 0. Also, since the channels to use are non-adjacent, and channel aggregation is used, STA2000 sets the CA field to 1. Since non-MIMO transmission is used, STA2000 sets the MIMO field to 0.

Also, the Data3 packet is a channel aggregation and a non-MIMO frame. Accordingly, STA2000 transmits by omitting the EDMG-STF and the EDMG-CEF fields. With this arrangement, the transmission efficiency and throughput may be raised.

STA2100 references the values of the CA field, the CO field, the MIMO field, and the EDMG Indication of the received L-Header (see FIG. 38), and is able to learn that in the Data3 packet, the channel-aggregated EDMG-STF on ch1, ch3, and ch4 does not follow in the EDMG-Header-A. Consequently, STA2100 switches the configuration of the receiver to a setting that receives channel aggregation, before receiving the Payload.

In FIG. 39, after receiving the Data2 packet, STA2100 transmits an Ack frame as a receive confirmation. STA2100 transmits the Ack frame on all channels allocated using the RTS and the DMG CTS, irrespectively of the channels used in the transmission of Data2. With this arrangement, STA2100 (the receiving device) is able to notify STA2000 and other nearby STA (not illustrated) that the channel allocation is ongoing.

Note that STA2100 (data reception) may also transmit the Ack frame by the channels used for the corresponding data frame (for example, ch1, ch2, and ch3 for the Data2 packet). With this arrangement, STA2100 (data reception) is able to reduce interference on other STA.

Note that in the case in which STA2100 (data reception) transmits the Ack frame by the channels used for the corresponding data frame, STA2000 (data transmission), STA2100 (data reception), and other STA may also consider that the channels in which the Ack is not transmitted to be released from allocation. With this arrangement, STA2000, STA2100, and other STA are able to transmit allocation requests with respect to the released channels. Also, with this arrangement, radio channels may be utilized efficiently.

Figure 42:
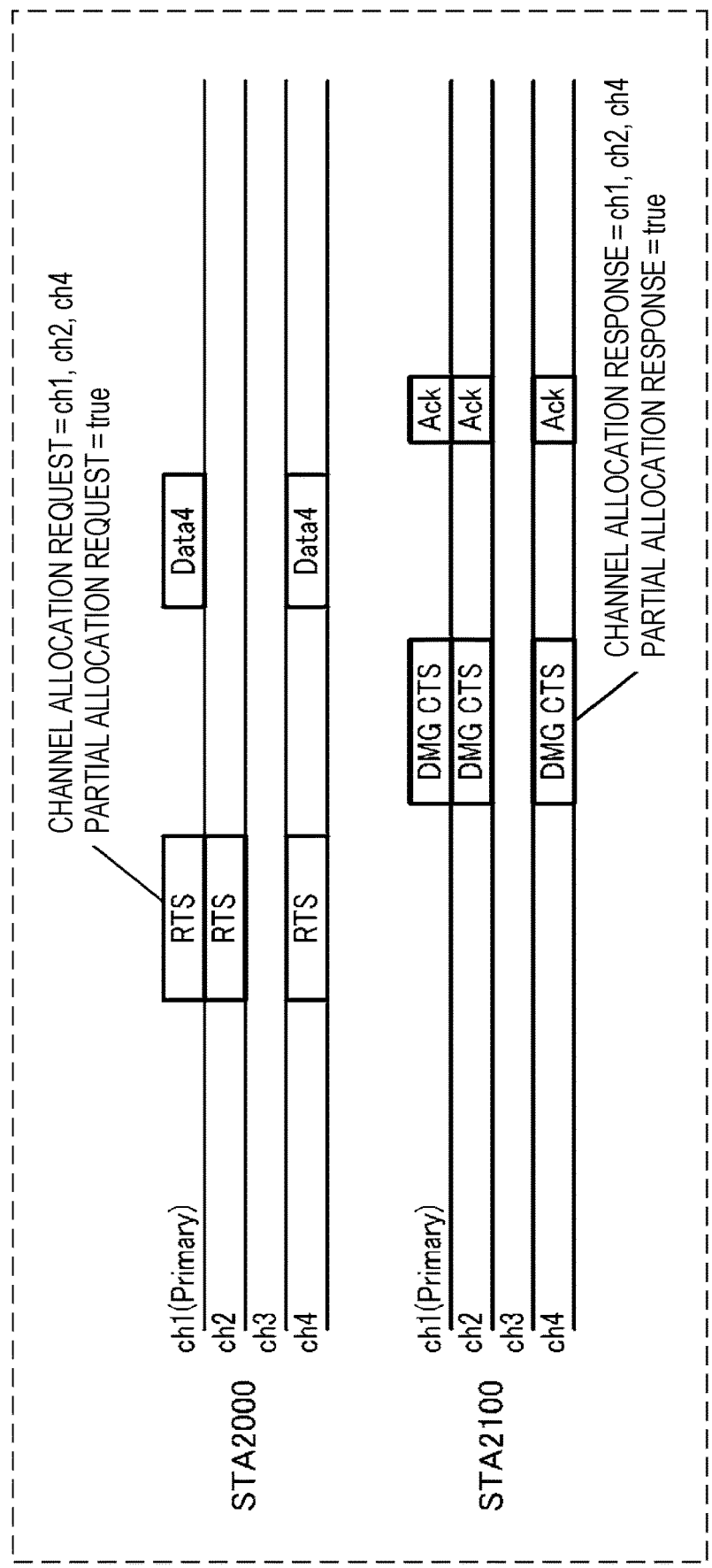
FIG. 42 is a diagram illustrating another example of a transmission procedure of a data packet according to Embodiment 8.

FIG. 42 is a diagram illustrating another procedure of transmitting a data packet applying channel aggregation. In FIG. 42, STA2000 and STA2100 allocate the three channels ch1, ch2, and ch4 using the RTS and the DMG CTS, and partial allocation is active.

The reason why STA2000 decides to allocate the channels ch1, ch2, and ch4 without allocating ch3 is because, for example, STA2000 has detected a large amount of interference on ch3. STA2000 (the transmitting device) is able to raise throughput by executing channel aggregation to avoid channels with high interference.

Note that in FIG. 42, STA2000 decides to transmit a Data4 packet using the two channels ch1 and ch4. Since the decided channels are included among the channels allocated using the RTS and the DMG CTS, and since partial allocation is active, STA2000 is able to transmit using some of the channels like for the Data4 packet.

Figure 43:
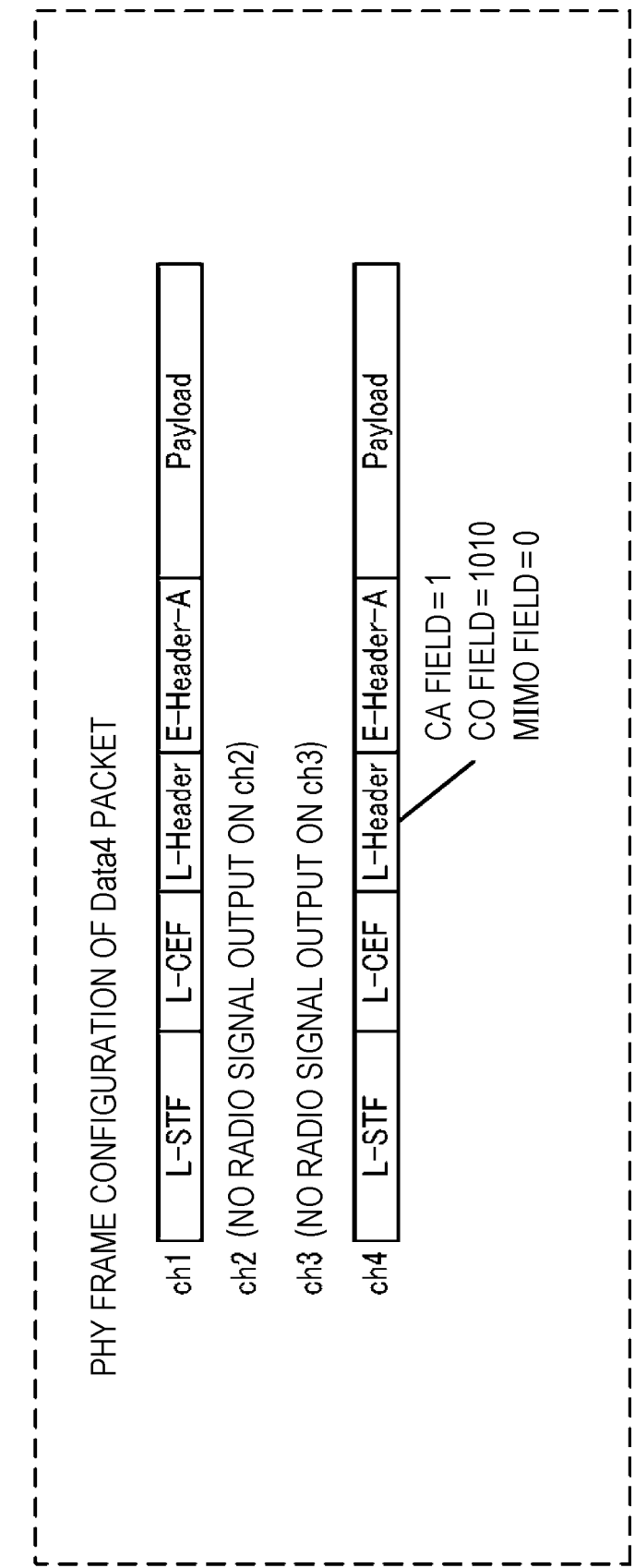
FIG. 43 is a diagram illustrating the PHY frame configuration of the Data4 packet according to Embodiment 8.

FIG. 43 is a diagram illustrating the PHY frame configuration of the Data4 packet by channel aggregation. STA2000 (the transmitting device) transmits with the value of the CO field set to 1010 in the L-Header. In other words, since a radio signal is not transmitted in ch2, the Channel Occupation2 field is set to 0. Herein, STA2000 (the transmitting device) does not set the value of the CO field to 1001, even though ch1 and ch4 are being used with respect to the Data4 packet. This is because Channel Occupation 1 to 4 do not correspond to the channel numbers, but instead represent channel numbers counting from the lowest among the allocated channels.

The effects of configuring the Channel Occupation 1 to 4 fields to represent channel numbers counting from the lower among the allocated channels will be described in detail.

FIG. 44 is a diagram illustrating combinations of channel allocation for single-channel transmission, channel bonding, and channel aggregation for up to a maximum of four usable channels. For example, in single-channel transmission, since any one from ch1 to ch4 is usable, the number of combinations is 4. In channel aggregation with two occupied channels, there are 6 possible channel combinations: (ch1, ch2), (ch1, ch3), (ch1, ch4), (ch2, ch3), (ch2, ch4), and (ch3, ch4). Since there are 19 possible combinations in total, 5-bit control information is needed to report which combination is selected.

FIG. 45 is a diagram illustrating combinations of channel allocation for single-channel transmission, channel bonding, and channel aggregation for up to a maximum of eight usable channels. However, the number of channels which may be used at the same time for channel bonding and channel aggregation is set to four channels.

According to FIG. 45, since there are 170 possible combinations in total, 8-bit control information is needed to report which combination is selected. In other words, depending on the number of usable channels, the number of selectable channel combinations increases, and control information having more bits is needed, making it difficult to store the control information in the L-Header.

On the other hand, in the present embodiment, first, the allocated channels are decided in advance using the RTS and the DMG CTS. In individual packets, 1 bit is used for the Channel Aggregation field, and 4 bits are used for the Channel Occupation 1 to 4 fields. In other words, by using a total of 5 bits, the combinations illustrated in FIGS. 44 and 45 may be expressed. In this way, by using the Channel Occupation fields in the L-Header to report the channels used for each packet with respect to channels allocated in advance using the RTS and the DMG CTS, the control information may be expressed in fewer bits, regardless of the maximum number of usable channels.

According to Embodiment 8, since the transmitting device 2000 transmits while changing the channel combination used for each packet, radio channels may be used efficiently.

Also, according to Embodiment 8, the transmitting device 2000 is able to convey the channel combination used for each packet with less control information.

Embodiment 9

The present embodiment illustrates a different method of communication between STA2000 and STA2100 in FIG. 35.

Figure 46:
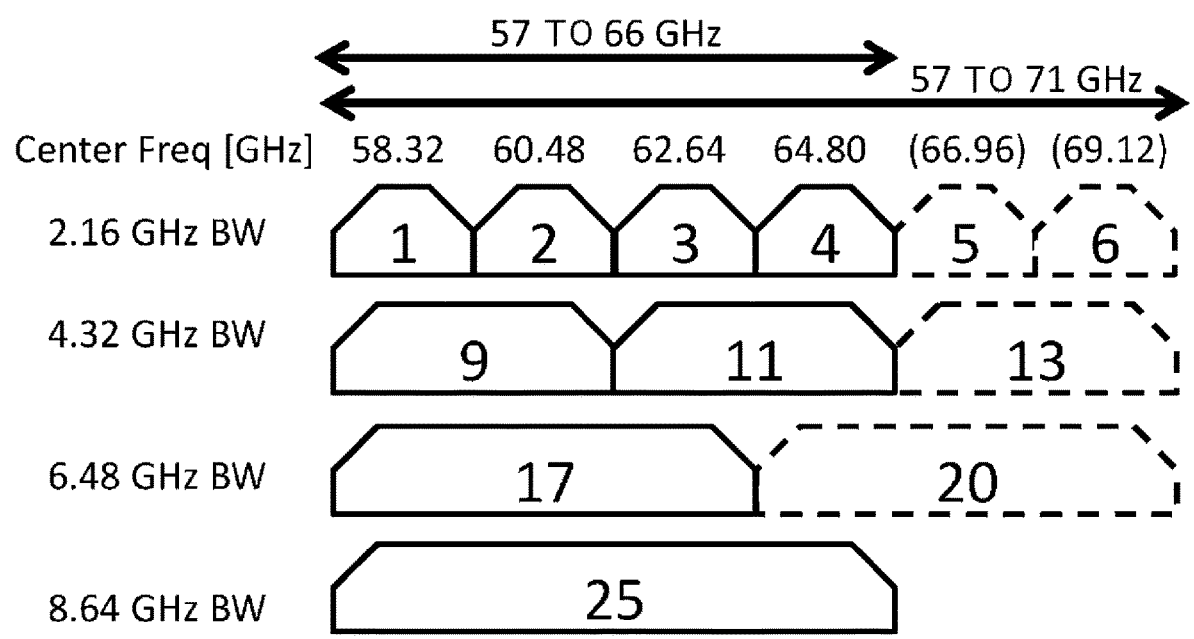
FIG. 46 is a diagram illustrating the channel numbers used by STA in Embodiment 9.

FIG. 46 illustrates channel numbers used by STA2000 and STA2100. In the case in which STA2000 transmits a packet by single-channel transmission or channel bonding, STA2000 uses any one channel number from the channel numbers 1 to 25 in FIG. 46.

In the case in which STA2000 transmits using the band from 57 GHz to 66 GHz, STA2000 uses the channel numbers indicated by the solid lines in FIG. 46 (for example, channel numbers 1 to 4, channel numbers 9 and 11, channel number 17, and channel number 25).

Also, in the case in which STA2000 transmits using the band from 57 GHz to 71 GHz, STA2000 uses the channel numbers indicated by the solid lines, as well as the channel numbers indicated by the dashed lines in FIG. 46 (for example, channel numbers 5 and 6, channel number 13, and channel number 20).

Channel numbers 1 to 6 represent single-channel transmission (channel bandwidth 2.16 GHz). Channel numbers 9, 11, and 13 represent channel bonding with a channel bandwidth of 4.32 GHz. Channel numbers 17 and 20 represent channel bonding with a channel bandwidth of 6.48 GHz. Channel number 25 represents channel bonding with a channel bandwidth of 8.64 GHz.

In the case in which STA2000 transmits a packet by channel aggregation, STA2000 uses two or more non-overlapping channels from among the channel numbers in FIG. 46.

In the present embodiment, STA2000 may execute channel aggregation using two non-overlapping channels from among channel numbers 1 to 6. For example, STA2000 may execute channel aggregation combining channel number 3 and channel number 5.

Additionally, STA2000 may also execute channel aggregation using two non-overlapping channels from among channel numbers 9, 11, and 13. Note that STA2000 may also execute channel aggregation by combining channels of different bandwidth whose occupied bands (the frequency bands occupied by the channels) do not overlap, such as channel number 3 (channel bandwidth 2.16 GHz) and channel number 9 (channel bandwidth 4.32 GHz).

FIG. 47 illustrates the frame format of the L-Header in the present embodiment. Unlike FIG. 38, the frame format in FIG. 47 has a 5-bit BW index field. Description will be omitted for fields in FIG. 47 which are the same as FIG. 38. In the frame format of FIG. 47, by using the methods disclosed in Embodiments 1 to 7, the 5 bits beginning from the start bit 12 may be used for a different purpose (herein, the BW index) than the Length in the 11ad standard.

FIG. 48A illustrates the value of the BW index field for single-channel transmission, channel bonding, and channel aggregation. Namely, for single-channel transmission and channel bonding, STA2000 sets the value of the BW index field from 0 to 11 according to the channel numbers listed in the "1st channel number" and "2nd channel number" columns in FIG. 48A. Also, for channel aggregation, STA2000 sets the value of the BW index field from 4 to 11 according to the channel numbers listed in the "1st channel number" and "2nd channel number" columns in FIG. 48A.

In FIG. 48A, "Occupied channel number" indicates the channel numbers of the channels in the 2.16 GHz (that is, the channels with the channel numbers from 1 to 6) which are occupied in the case of using the channels listed in "1st channel number" or "2nd channel number". For example, for channel bonding with channel number 17 in "1st channel number", the bands of channel number 1, channel number 2, and channel number 3 are occupied. For channel aggregation with channel number 9 in "1st channel number" and channel number 11 in "2nd channel number", the bands of channel number 1, channel number 2, channel number 3, and channel number 4 are occupied.

Also, in the case of transmitting by channel bonding, STA2000 transmits the L-Header in the channel numbers listed in the "Occupied channel number" column. For example, the packet in FIG. 37 corresponds to channel number 17 in FIG. 46. According to FIG. 48A, since the occupied channel numbers of the channel number 17 are channel number 1, channel number 2, and channel number 3, as illustrated in FIG. 37, the transmitting device (STA2000) transmits the L-Header in channel number 1, channel number 2, and channel number 3.

In the case of single-channel transmission, STA2000 sets the value of the BW index to 0 in the transmitted packet, regardless of the channel number actually transmitted.

When STA2100 receives a packet, STA2100 decodes the L-Header and obtains the value of the BW index field. In the case in which the value of the BW index field is 0, STA2100 determines that the received packet is transmitted by single-channel transmission.

According to FIG. 48A, in the case in which the value of the BW index is 0, the channel numbers which have a possibility of being used are any of those from 1 to 6. STA2100 determines the channel numbers in which a packet is transmitted according to the channels in which the L-Header is received (that is, the channels in which the BW index field is received). For example, when STA2100 receives the L-Header in channel number 3, and the value of the BW index field is 0, STA2100 determines that the received packet is transmitted by single-channel transmission on the channel number 3.

FIG. 48B illustrates the values 12 to 25 of the BW index field for channel aggregation with different channel bandwidths. Here, the values from 26 to 31 are reserved. In other words, for channel aggregation, STA2000 sets the value of the BW index field according to the combination of channel numbers listed in the "1st channel number" and "2nd channel number" columns in FIG. 48B.

In other words, in FIGS. 48A and 48B, the value of the BW index field is assigned with respect to combinations of non-overlapping occupied channel numbers.

For channel aggregation, STA2000 transmits with the L-Header included on multiple 2.16 GHz channels listed in the Occupied channel number.

Figure 49A:
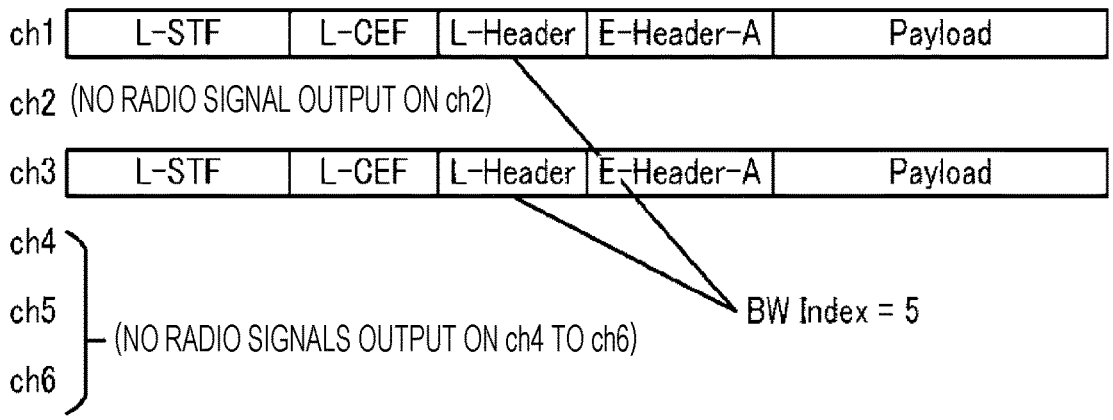
FIG. 49A is a diagram illustrating an example of packets by channel aggregation in Embodiment 9.

For example, for channel aggregation by the combination of channel number 1 as the 1st channel number and channel number 3 as the 2nd channel number, STA2000 transmits with the BW index field set to the value of 5 in the L-Header. FIG. 49A illustrates an example of a packet by channel aggregation, and illustrates the L-Header transmitted in channel number 1 and channel number 3.

Figure 49B:
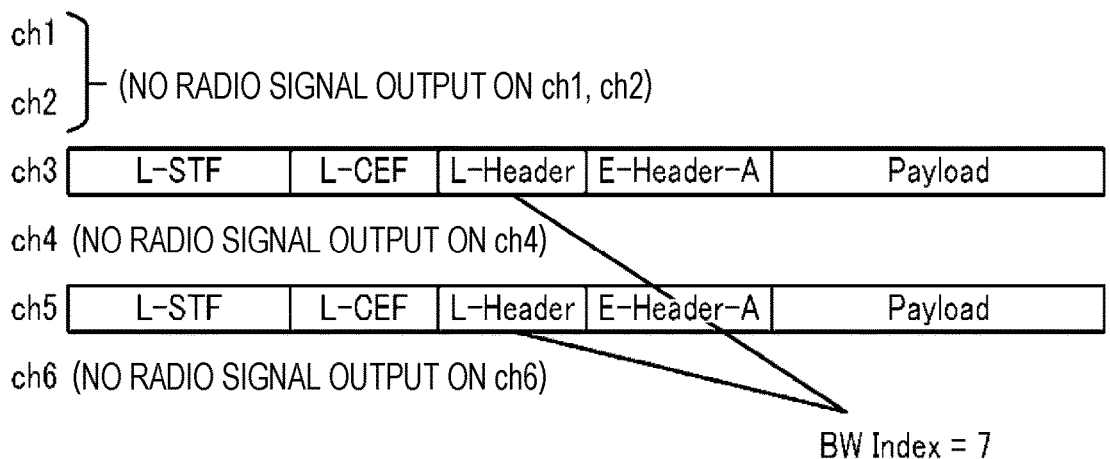
FIG. 49B is a diagram illustrating an example of packets by channel aggregation in Embodiment 9.

For channel aggregation by the combination of channel number 3 as the 1st channel number and channel number 5 as the 2nd channel number, STA2000 transmits with the BW index field set to the value of 7 in the L-Header. FIG. 49B illustrates an example of a packet by channel aggregation, and illustrates the L-Header transmitted in channel number 3 and channel number 5.

After receiving the L-Header in channel number 3, STA2100 decodes the L-Header and obtains the value of the BW index field. In the case in which the value of the BW index field is 5, for example, STA2100 determines that the received packet illustrated in FIG. 49A is transmitted by channel aggregation by the combination of channel number 1 and channel number 3.

Also, after receiving the L-Header in channel number 3, in the case in which the obtained value of the BW index field is 7, for example, STA2100 determines that the received packet illustrated in FIG. 49B is transmitted by channel aggregation by the combination of channel number 3 and channel number 5.

Figure 49C:
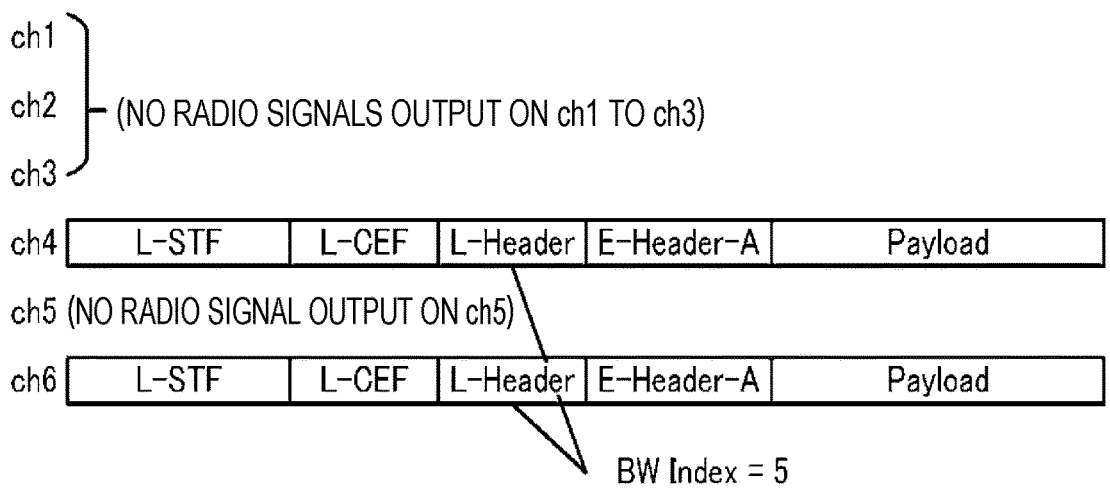
FIG. 49C is a diagram illustrating an example of packets by channel aggregation in Embodiment 9.

FIG. 49C illustrates a different example of a transmission frame by channel aggregation. FIG. 49C illustrates channel aggregation by the combination of channel number 4 and channel number 6, in which the occupied channel numbers used are different from FIG. 49A, but the BW index field is the same value of 5 as FIG. 49A.

Herein, in the case in which a different STA (STA2200) which is not illustrated receives the L-Header in channel number 4, and the value of the BW index field is 5, STA2200 determines that the packet is transmitted by channel aggregation by the combination of channel number 4 and channel number 6 illustrated in FIG. 49C.

In other words, even if the value of the BW index is the same (for example, 5) the receiving devices (STA2100 and STA2200) are able to determine the combination of channels in the channel aggregation of the received packet according to the channels in which the L-Header is received (any from channel number 1 to channel number 6).

Figure 50A:
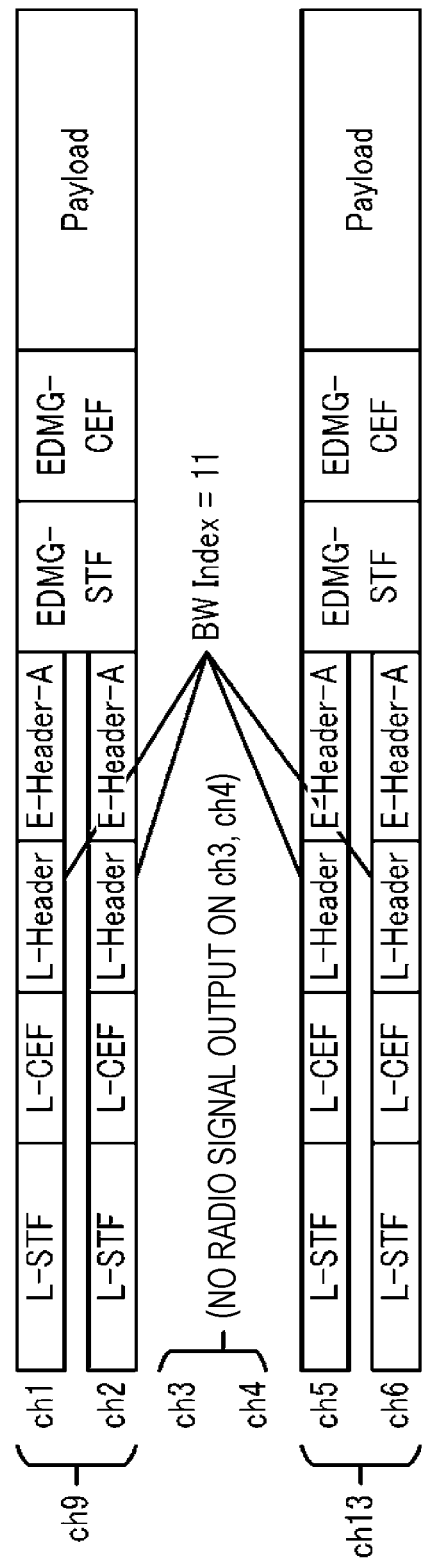
FIG. 50A is a diagram illustrating a different example of packets by channel aggregation in Embodiment 9.
Figure 50B:
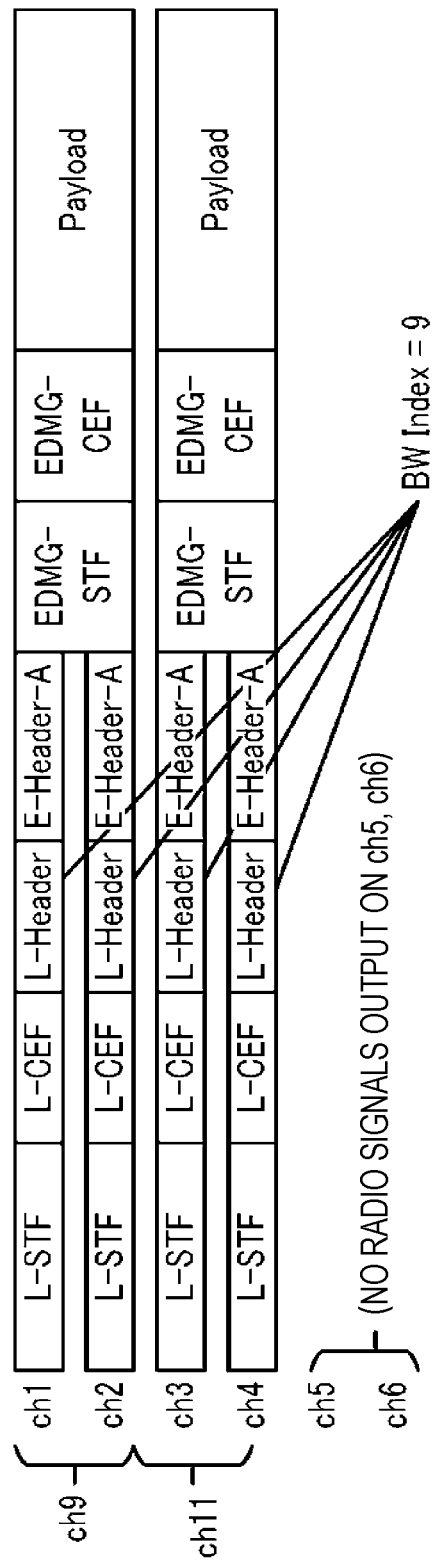
FIG. 50B is a diagram illustrating a different example of packets by channel aggregation in Embodiment 9.
Figure 50C:
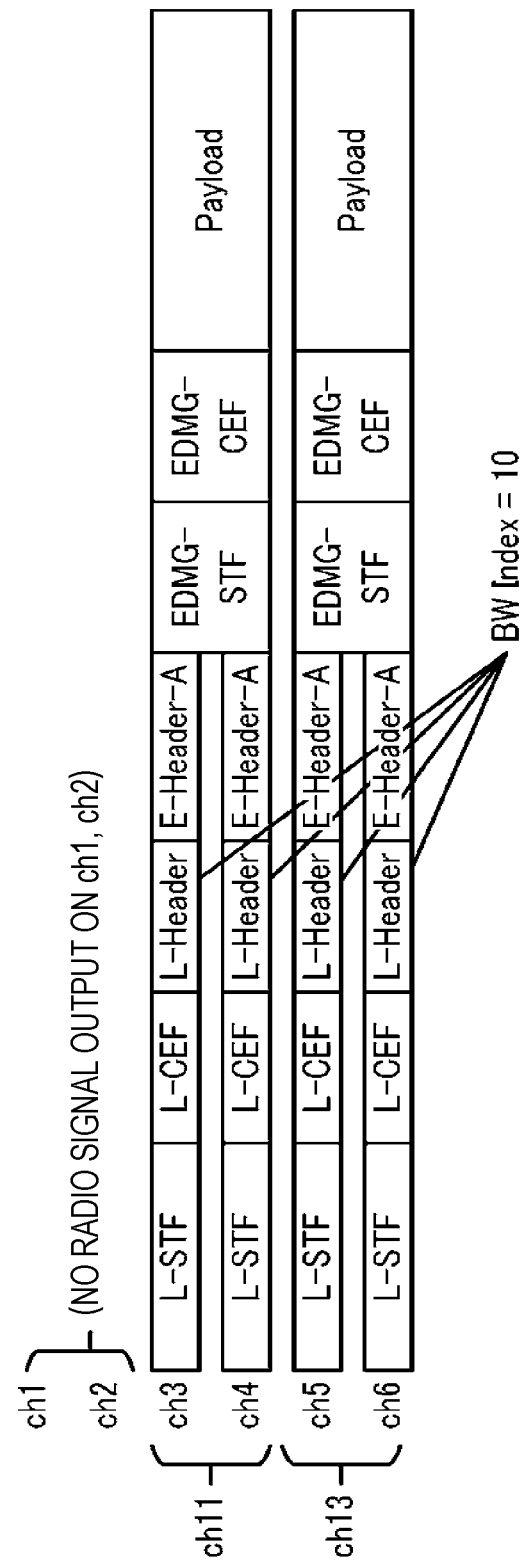
FIG. 50C is a diagram illustrating a different example of packets by channel aggregation in Embodiment 9.

FIGS. 50A, 50B, and 50C illustrate different examples of packets transmitted by channel aggregation. FIGS. 50A, 50B, and 50C illustrate packets applying channel aggregation by a combination of two channels of 4.32 GHz bandwidth.

In FIG. 50A, in the case in which STA2000 transmits a packet by channel aggregation by the combination of channel number 9 and channel number 13, on the basis of FIG. 48A, STA2000 sets the value of the BW index to 11, and places the L-Header in channel number 1, channel number 2, channel number 5, and channel number 6.

Also, in FIG. 50B, in the case in which STA2000 transmits a packet by channel aggregation by the combination of channel number 9 and channel number 11, on the basis of FIG. 48A, STA2000 sets the value of the BW index to 9, and places the L-Header in channel number 1, channel number 2, channel number 3, and channel number 4.

Also, in FIG. 50C, in the case in which STA2000 transmits a packet by channel aggregation by the combination of channel number 11 and channel number 13, on the basis of FIG. 48A, STA2000 sets the value of the BW index to 10, and places the L-Header in channel number 3, channel number 4, channel number 5, and channel number 6.

In the packet of FIG. 50A, the packet of FIG. 50B, and the packet of FIG. 50C, since the occupied channel numbers overlap, STA2000 assigns 11, 9, and 10 as the different values of the BW index, respectively.

In other words, in the case in which STA2100 receives the L-Header in channel number 2, and the value of the BW index field is 11, STA2100 is able to determine that the packet is transmitted by channel aggregation by the combination of channel number 9 and channel number 13 (see FIG. 50A).

Also, in the case in which STA2100 receives the L-Header in channel number 2, and the value of the BW index field is 9, STA2100 is able to determine that the packet is transmitted by channel aggregation by the combination of channel number 9 and channel number 11 (see FIG. 50B).

Also, in the case in which STA2200 receives the L-Header in channel number 4, and the value of the BW index field is 10, STA2200 is able to determine that the packet is transmitted by channel aggregation by the combination of channel number 11 and channel number 13 (see FIG. 50C).

Herein, FIG. 51 illustrates the correspondence between the number of combinations of all channels (channel numbers 1 to 6, 9, 11, 13, 17, 20, and 25) and the range of the BW index for each operating mode (type of packet).

For example, for single-channel transmission of 2.16 GHz bandwidth, there are 6 possible channel combinations, namely, the 6 possibilities from channel number 1 to channel number 6, which matches the number of combinations selecting one of the six channels. In contrast, the single value of "0" is assigned as the BW index for single-channel transmission of 2.16 GHz bandwidth (see FIG. 48A).

For example, for channel aggregation using two channels of 2.16 GHz bandwidth each, there are 15 possible channel combinations, which matches the number of combinations selecting two of the six channels from channel number 1 to channel number 6. In contrast, five possible values from "4" to "8" are assigned as the BW index for channel aggregation using two channels of 2.16 GHz bandwidth each (see FIG. 48A).

For example, for channel aggregation using two channels of 4.32 GHz bandwidth each, there are 3 possible channel combinations, which matches the number of combinations selecting two channels of non-overlapping bands from among the three channels of channel number 9, 11, and 13. In contrast, three possible values from "9" to "11" are assigned as the BW index for channel aggregation using two channels of 4.32 GHz bandwidth each (see FIG. 48A).

For example, for channel aggregation using a channel of 4.32 GHz bandwidth and a channel of 2.16 GHz bandwidth, there are 12 possible channel combinations. In contrast, six possible values from "12" to "17" are assigned as the BW index for channel aggregation using a channel of 4.32 GHz bandwidth and a channel of 2.16 GHz bandwidth (see FIG. 48B).

Totaling all the operating modes illustrated in FIG. 51 gives 50 as the number of all channel combinations. In other words, to discriminate the channel combinations by assigning a different value (index) in the control information for every channel combination, the control information will be expressed in 6 bits.

In contrast, the BW index illustrated in FIGS. 48A and 48B has a maximum value of 31, allowing the control information to be expressed in 5 bits. In other words, compared to a method of assigning an index to all channel combinations, in the present embodiment that uses the BW index, the size of the control information may be reduced by 1 bit.

Note that the transmitting device (STA2000) may also transmit with the 5-bit value of the BW index included in the lower bits of the Length field of the L-Header, as illustrated in Embodiments 1 to 7. With this arrangement, from the value of the BW index (FIGS. 48A and 48B) obtained by decoding the received L-Header, and the combination of channel numbers in which the L-Header is received, the receiving device (STA2100) is able to determine the channel numbers in which the packet is transmitted and the combination of channels used for channel aggregation.

Since STA2100 is able to determine the channel combination using the L-Header, similarly to Embodiment 8, the settings of the receiving device may be switched early, and packets may be received correctly, even in cases in which the channel combination is changed every packet.

Also, a receiving device (STA2300 not illustrated) which supports the 11ad standard but does not support the 11ay standard recognizes the portion combining the BW index field and the Length field in FIG. 47 as the Length field in the 11ad standard, and by also using the value of the MCS field, calculates the length of the packet. As illustrated in Embodiments 1 to 7, STA2000 sets the value of the Length field (the 13 bits starting from bit 17 in the L-Header) to enable a terminal of the 11ad standard to calculate the packet length correctly, irrespectively of the value of the BW index field. In this way, while retaining compatibility with the 11ad standard, STA2000 is able to transmit channel combination information using the L-Header.

Note that STA2100 may also receive the L-Header in the primary channel. With this arrangement, in the case of configuring STA2000 to transmit with L-Header included in the primary channel, STA2100 is able to receive the entire packet transmitted by STA2000.

Note that in the case in which the primary channel used by STA2000 and the primary channel used by STA2100 are different, for example, even in the case in which STA2000 and STA2100 belong to different BSS, the L-Header may be received in the primary channel of STA2100. Since the BW index of FIGS. 48A and 48B may be assigned irrespectively of the position of the primary channel, STA2100 is able to use the BW index and channel number in which the L-Header is received to detect the channel combination.

Note that STA2100 may also receive the L-Header in a channel other than the primary channel. Since the BW index of FIGS. 48A and 48B may be assigned irrespectively of the position of the primary channel, STA2100 is able to use the BW index and channel number in which the L-Header is received to detect the channel combination.

According to Embodiment 9, since the transmitting device 2000 transmits while changing the channel combination used for each packet, radio channels may be used efficiently.

Also, according to Embodiment 9, the transmitting device 2000 is able to convey the channel combination used for each packet with less control information.

Note that in FIGS. 48A and 48B, channel aggregation of channels with a channel bandwidth of 2.16 GHz each, channel aggregation of channels with a channel bandwidth of 4.32 GHz each, and channel aggregation of channels with two different bandwidths equal to or less than 6.48 GHz are described as examples, but an embodiment is not limited to these configurations of channel aggregation. For example, channel aggregation of a channel with a channel bandwidth of 6.48 GHz and a channel with a channel bandwidth of 8.64 GHz, and channel aggregation of a channel with a channel bandwidth of 2.16 GHz and a channel with a channel bandwidth of 8.64 GHz, are also acceptable. In other words, in channel aggregation, any channel numbers may be combined insofar as the occupied bands do not overlap.

Also, in FIGS. 48A and 48B, channel aggregation by two channel numbers is described as an example, but an embodiment is not limited to this configuration of channel aggregation. For example, channel aggregation by three channel numbers (for example, channel aggregation by the combination of channel number 1 as the 1st channel number, channel number 3 as the 2nd channel number, and channel number 5 as the 3rd channel number), and channel aggregation by four channel numbers (for example, channel aggregation by the combination of channel number 1 as the 1st channel number, channel number 3 as the 2nd channel number, channel number 5 as the 3rd channel number, and channel number 6 as the 4th channel number), are also acceptable. In other words, in channel aggregation, two or more channel numbers may be combined insofar as the occupied bands do not overlap.

Embodiment 10

The present embodiment illustrates a different method of communication between STA2000 and STA2100 in FIG. 35.

Figure 52:
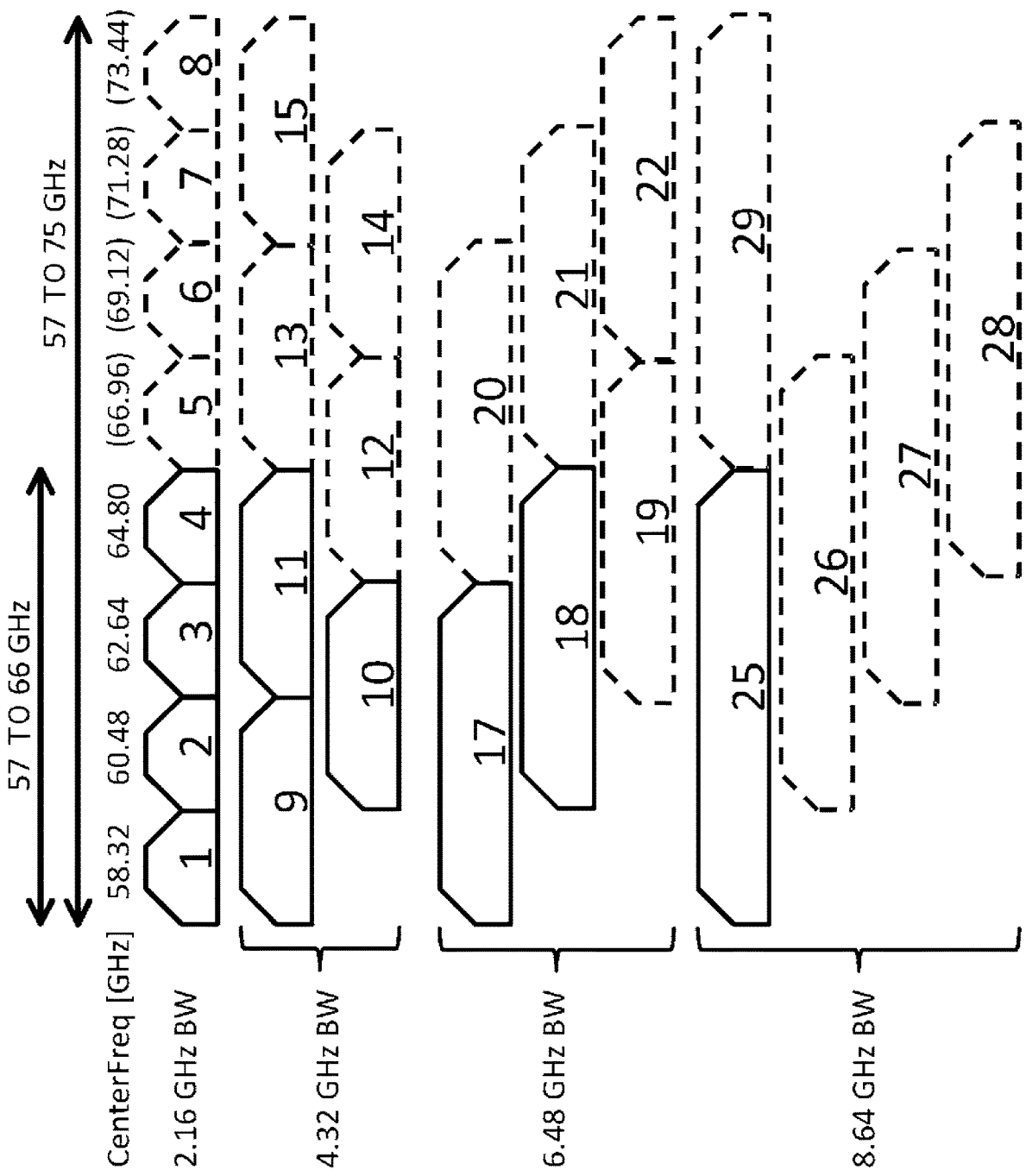
FIG. 52 is a diagram illustrating the channel numbers used by STA in Embodiment 10.

FIG. 52 illustrates channel numbers used by STA2000 and STA2100. In the case in which STA2000 transmits a packet by single-channel transmission or channel bonding, STA2000 uses any one channel number from the channel numbers 1 to 29 in FIG. 52. In FIG. 52, unlike FIG. 46, channel numbers of the same channel bandwidth whose occupied bands overlap other channel numbers have been added, such as the channel numbers 10, 12 and 14 with respect to the channel numbers 9, 11, 13, and 15.

In the case in which STA2000 transmits using the band from 57 GHz to 66 GHz, STA2000 uses the channel numbers indicated by the solid lines in FIG. 52 (for example, channel numbers 1 to 4, channel numbers 9 to 11, channel numbers 17 and 18, and channel number 25).

Also, in the case in which STA2000 transmits using the band from 57 GHz to 75 GHz, STA2000 uses the channel numbers indicated by the solid lines, as well as the channel numbers indicated by the dashed lines in FIG. 52 (for example, channel numbers 5 to 8, channel numbers 12 to 15, channel numbers 19 to 22, and channel numbers 26 to 29).

Channel numbers 1 to 8 represent single-channel transmission (channel bandwidth 2.16 GHz). Channel numbers 9 to 15 represent channel bonding with a channel bandwidth of 4.32 GHz. Channel numbers 17 to 22 represent channel bonding with a channel bandwidth of 6.48 GHz. Channel numbers 25 to 29 represent channel bonding with a channel bandwidth of 8.64 GHz.

In the case in which STA2000 transmits a packet by channel aggregation, STA2000 uses two or more non-overlapping channels from among the channel numbers in FIG. 52.

In the present embodiment, STA2000 may execute channel aggregation using two non-overlapping channels from among channel numbers 1 to 8. For example, STA2000 may execute channel aggregation combining channel number 3 and channel number 5.

Additionally, STA2000 may also execute channel aggregation using two channels whose occupied bands (the frequency bands occupied by the channels) do not overlap from among channel numbers 9 to 15. For example, STA2000 may execute channel aggregation combining channel number 11 and channel number 14. On the other hand, for example, the occupied bands of channel number 10 and channel number 11 overlap, and thus STA2000 does not use a combination whose occupied bands overlap for channel aggregation.

FIG. 53 illustrates the frame format of the L-Header in the present embodiment. Since each field is the same as FIG. 47, description will be omitted.

In the present embodiment, channel aggregation using channels of the same channel bandwidth will be described. Note that although a description of channel aggregation using channels of different channel bandwidths is omitted, the BW index may be assigned using the method described for channel aggregation using channels of the same channel bandwidth.

FIGS. 54A and 54B illustrate the value of the BW index field for channel aggregation. In other words, for channel aggregation, STA2000 sets the value of the BW index field according to the combination of channel numbers listed in the "1st channel number" and "2nd channel number" columns in FIGS. 54A and 54B.

FIG. 54A indicates channel aggregation by two 2.16 GHz channels, in which the value of the BW index is from 0 to 6. Also, FIG. 54B indicates channel aggregation by two 4.32 GHz channels, in which the value of the BW index is from 7 to 18. In FIG. 54B, the BW index values from 19 to 31 are reserved.

For channel aggregation, STA2000 transmits with the L-Header included on multiple 2.16 GHz channels listed in the Occupied channel number.

Figure 55A:
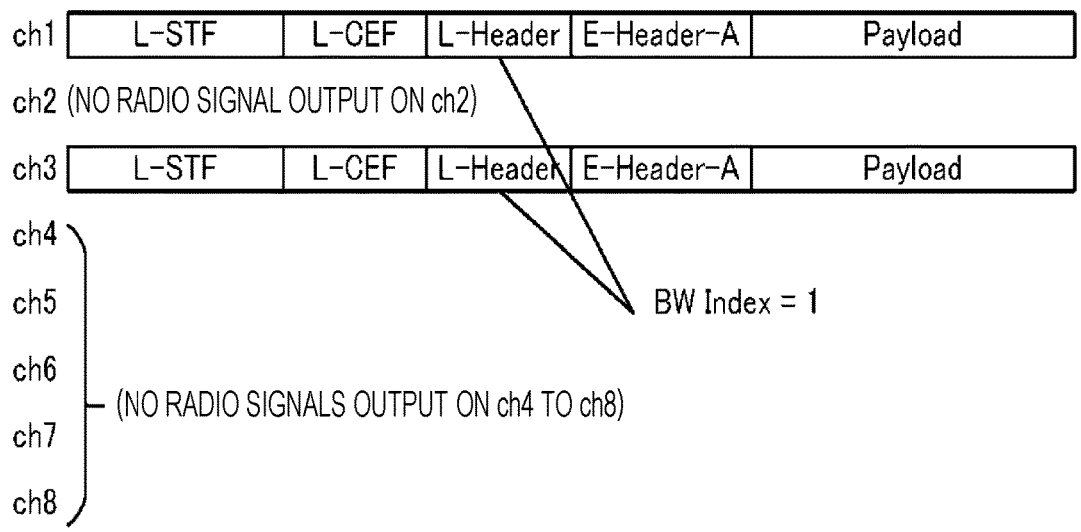
FIG. 55A is a diagram illustrating an example of packets by channel aggregation in Embodiment 10.

For example, for channel aggregation by the combination of channel number 1 and channel number 3, STA2000 transmits with the value 1 set in the BW index field of the L-Header. FIG. 55A illustrates an example of a packet by channel aggregation, and illustrates the L-Header transmitted in channel number 1 and channel number 3.

Figure 55B:
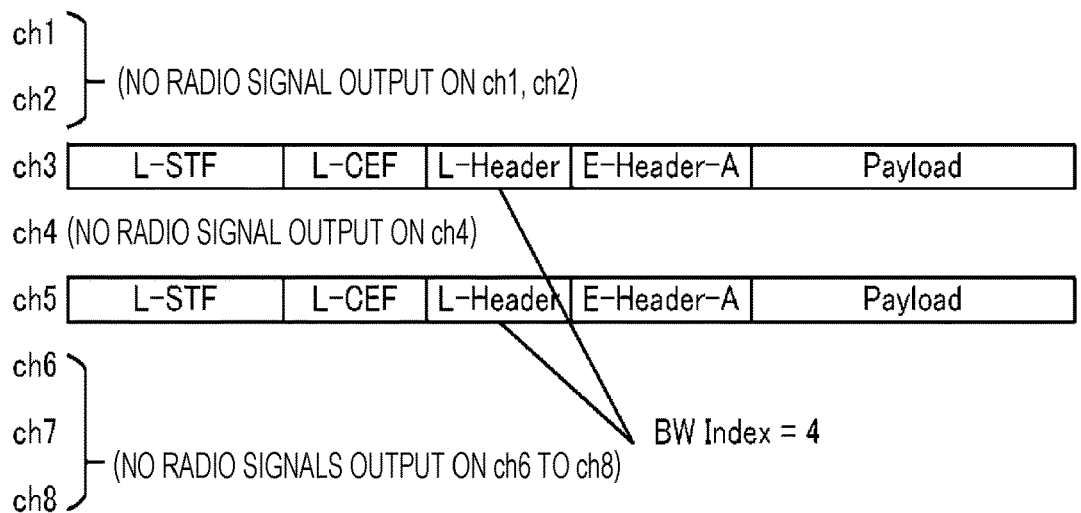
FIG. 55B is a diagram illustrating an example of packets by channel aggregation in Embodiment 10.

In the case of channel aggregation by the combination of channel number 3 and channel number 5, STA2000 transmits with the value 4 set in the BW index field of the L-Header. FIG. 55B illustrates an example of a packet by channel aggregation, and illustrates the L-Header transmitted in channel number 3 and channel number 5.

After receiving the L-Header in channel number 3, STA2100 decodes the L-Header and obtains the value of the BW index field. In the case in which the value of the BW index field is 1, for example, STA2100 determines that the received packet illustrated in FIG. 55A is transmitted by channel aggregation by the combination of channel number 1 and channel number 3.

Also, after receiving the L-Header in channel number 3, in the case in which the obtained value of the BW index field is 4, for example, STA2100 determines that the received packet illustrated in FIG. 55B is transmitted by channel aggregation by the combination of channel number 3 and channel number 5.

Figure 55C:
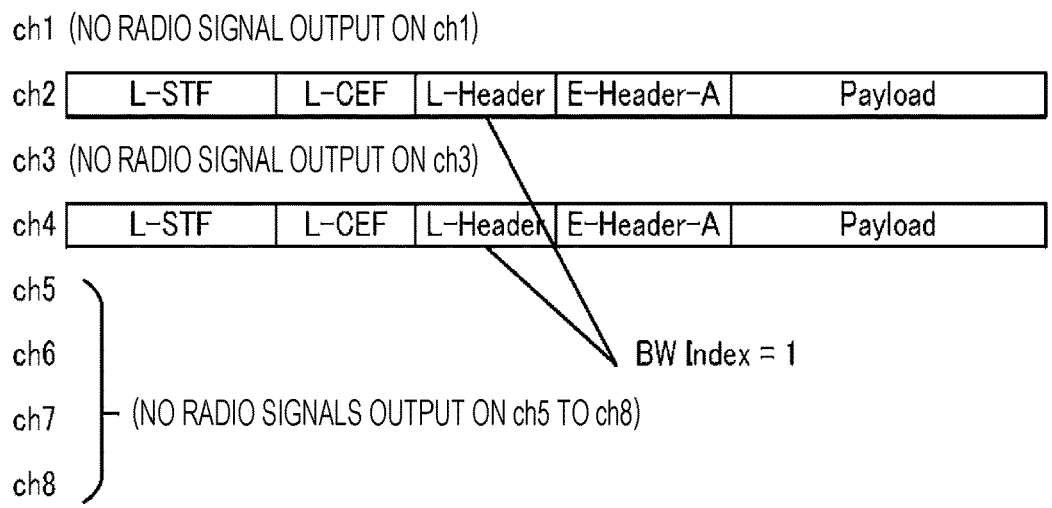
FIG. 55C is a diagram illustrating an example of packets by channel aggregation in Embodiment 10.

FIG. 55C illustrates a different example of a transmission frame by channel aggregation. FIG. 55C illustrates channel aggregation by the combination of channel number 2 and channel number 4, in which the occupied channel numbers used are different from FIG. 55A, but the BW index field is the same value of 1 as FIG. 55A.

Herein, in the case in which a different STA (STA2200) which is not illustrated receives the L-Header in channel number 4, and the value of the BW index field is 1, STA2200 determines that the packet is transmitted by channel aggregation by the combination of channel number 2 and channel number 4 illustrated in FIG. 55C.

In other words, even if the value of the BW index is the same (for example, 1) the receiving devices (STA2100 and STA2200) are able to determine the combination of channels in the channel aggregation of the received packet according to the channels in which the L-Header is received (any from channel number 1 to channel number 8).

Figure 56A:
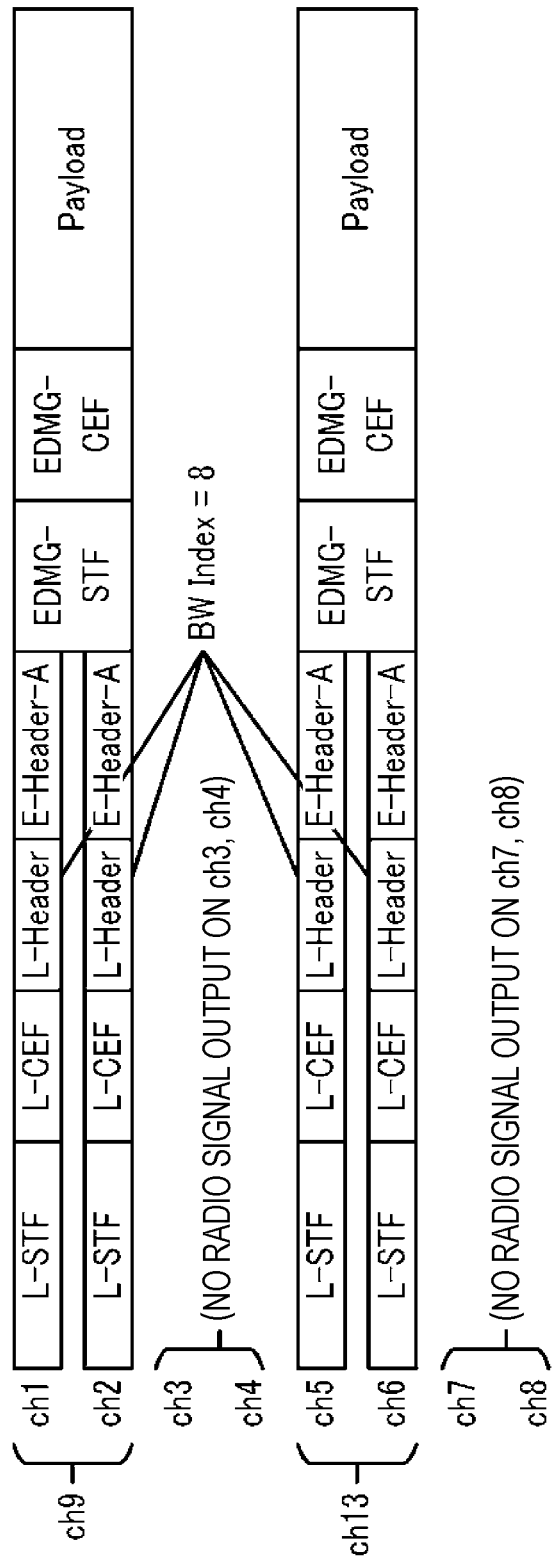
FIG. 56A is a diagram illustrating a different example of packets by channel aggregation in Embodiment 10.
Figure 56C:
FIG. 56C is a diagram illustrating a different example of packets by channel aggregation in Embodiment 10.

FIGS. 56A, 56B, and 56C illustrate different examples of packets transmitted by channel aggregation. FIGS. 56A, 56B, and 56C illustrate packets applying channel aggregation by a combination of two channels of 4.32 GHz bandwidth.

In FIG. 56A, in the case in which STA2000 transmits a packet by channel aggregation by the combination of channel number 9 and channel number 13, on the basis of FIG. 54B, STA2000 sets the value of the BW index to 8, and places the L-Header in channel number 1, channel number 2, channel number 5, and channel number 6.

Also, in FIG. 56B, in the case in which STA2000 transmits a packet by channel aggregation by the combination of channel number 9 and channel number 14, on the basis of FIG. 54B, STA2000 sets the value of the BW index to 11, and places the L-Header in channel number 1, channel number 2, channel number 6, and channel number 7.

Also, in FIG. 56C, in the case in which STA2000 transmits a packet by channel aggregation by the combination of channel number 11 and channel number 15, on the basis of FIG. 54B, STA2000 sets the value of the BW index to 8, and places the L-Header in channel number 3, channel number 4, channel number 7, and channel number 8.

Herein, in the packet of FIG. 56A and the packet of FIG. 56C, since the occupied channel numbers do not overlap, STA2000 assigns the same value of 8 as the BW index.

On the other hand, in the packet of FIG. 56A and the packet of FIG. 56B, since the occupied channel numbers overlap, STA2000 assigns 8 and 11 as the different values of the BW index.

In other words, in the case in which STA2100 receives the L-Header in channel number 2, and the value of the BW index field is 8, STA2100 is able to determine that the packet is transmitted by channel aggregation by the combination of channel number 9 and channel number 13 (see FIG. 56A).

Also, in the case in which STA2100 receives the L-Header in channel number 2, and the value of the BW index field is 11, STA2100 is able to determine that the packet is transmitted by channel aggregation by the combination of channel number 9 and channel number 14 (see FIG. 56B).

Also, in the case in which STA2200 receives the L-Header in channel number 4, and the value of the BW index field is 8, STA2200 is able to determine that the packet is transmitted by channel aggregation by the combination of channel number 11 and channel number 15 (see FIG. 56C).

Herein, FIG. 57 illustrates the correspondence between the number of combinations of all channels (channel numbers 9 to 15 and 17 to 22) and the range of the BW index for each operating mode (type of packet) using channels of the same channel bandwidth.

For example, for channel aggregation using two channels of 2.16 GHz bandwidth each, there are 28 possible channel combinations, which matches the number of combinations selecting two of the eight channels from channel number 1 to channel number 8. In contrast, seven possible values from "0" to "6" are assigned as the BW index for channel aggregation using two channels of 2.16 GHz bandwidth each (see FIG. 54A).

For example, for channel aggregation using two channels of 4.32 GHz bandwidth each, there are 15 possible channel combinations, which matches the number of combinations selecting two channels of non-overlapping bands from among the seven channels from channel number 9 to channel number 15. In contrast, twelve possible values from "7" to "18" are assigned as the BW index for channel aggregation using two channels of 4.32 GHz bandwidth each (see FIG. 54B).

Totaling all of the operating modes illustrated in FIG. 57 gives 43 as the number of all channel combinations. In other words, to discriminate the channel combinations by assigning a different value (index) in the control information for every channel combination, 6 bits of control information are needed.

In contrast, the BW index illustrated in FIGS. 54A and 54B has a maximum value of 18, allowing the control information to be expressed in 5 bits. In other words, compared to a method of assigning an index to all channel combinations, in the present embodiment that uses the BW index, the size of the control information may be reduced by 1 bit. Note that in the present embodiment, although a description of channel bonding is omitted, by using a BW index for a combined selection of non-overlapping channel numbers in the same way as for channel aggregation, the size of the control information may be reduced.

Note that the transmitting device (STA2000) may also transmit with the 5-bit value of the BW index included in the lower bits of the Length field of the L-Header, as illustrated in Embodiments 1 to 7. With this arrangement, from the value of the BW index (FIGS. 54A and 54B) obtained by decoding the received L-Header, and the combination of channel numbers in which the L-Header is received, the receiving device (STA2100) is able to determine the channel numbers in which the packet is transmitted and the combination of channels used for channel aggregation.

Since STA2100 is able to determine the channel combination using the L-Header, similarly to Embodiment 8, the settings of the receiving device may be switched early, and packets may be received correctly, even in cases in which the channel combination is changed every packet.

Also, a receiving device (STA2300 not illustrated) which supports the 11ad standard but does not support the 11ay standard recognizes the portion combining the BW index field and the Length field in FIG. 53 as the Length field in the 11ad standard, and by also using the value of the MCS field, calculates the length of the packet. As illustrated in Embodiments 1 to 7, STA2000 sets the value of the Length field (the 13 bits starting from bit 17 in the L-Header) to enable a terminal of the 11ad standard to calculate the packet length correctly, irrespectively of the value of the BW index field. In this way, while retaining compatibility with the 11ad standard, STA2000 is able to transmit channel combination information using the L-Header.

Note that STA2100 may also receive the L-Header in the primary channel. With this arrangement, in the case of configuring STA2000 to transmit with L-Header included in the primary channel, STA2100 is able to receive the entire packet transmitted by STA2000.

Note that in the case in which the primary channel used by STA2000 and the primary channel used by STA2100 are different, for example, even in the case in which STA2000 and STA2100 belong to different BSS, the L-Header may be received in the primary channel of STA2100. Since the BW index of FIGS. 54A and 54B may be assigned irrespectively of the position of the primary channel, STA2100 is able to use the BW index and channel number in which the L-Header is received to detect the channel combination.

Note that STA2100 may also receive the L-Header in a channel other than the primary channel. Since the BW index of FIGS. 54A and 54B may be assigned irrespectively of the position of the primary channel, STA2100 is able to use the BW index and channel number in which the L-Header is received to detect the channel combination.

According to Embodiment 10, since the transmitting device 2000 transmits while changing the channel combination used for each packet, radio channels may be used efficiently.

Also, according to Embodiment 10, the transmitting device 2000 is able to convey the channel combination used for each packet with less control information.

Note that in FIGS. 54A and 54B, channel aggregation of channels with a channel bandwidth of 2.16 GHz each and channel aggregation of channels with a channel bandwidth of 4.32 GHz each are described as examples, but an embodiment is not limited to these configurations of channel aggregation. For example, channel aggregation of a channel with a channel bandwidth of 6.48 GHz and a channel with a channel bandwidth of 8.64 GHz, and channel aggregation of a channel with a channel bandwidth of 2.16 GHz and a channel with a channel bandwidth of 8.64 GHz, are also acceptable. In other words, in channel aggregation, any channel numbers may be combined insofar as the occupied bands do not overlap.

Embodiment 11

The present embodiment illustrates a different method of communication between STA2000 and STA2100 in FIG. 35.

FIG. 58 illustrates the frame format of the L-Header in the present embodiment. Unlike FIG. 38, the frame format in FIG. 58 includes a 4-bit BW index_L with respect to the Scrambler initialization of the 11ad standard, and also includes a 4-bit BW index H field and a 1-bit Channel Aggregation field with respect to the Length field of the 11ad standard. Description will be omitted for fields in FIG. 58 which are the same as FIG. 38.

In the present embodiment, the control information (BW index) indicating the channel combination is 8 bits. The transmitting device (STA2000) includes the value of the higher 4 bits of the BW index in the BW index_H field, and includes the value of the lower 4 bits of the BW index in the BW index L field. Also, STA2000 sets the Channel Aggregation field to 0 for single-channel transmission and channel bonding, and sets the Channel Aggregation field to 1 for channel aggregation.

Figure 59A:
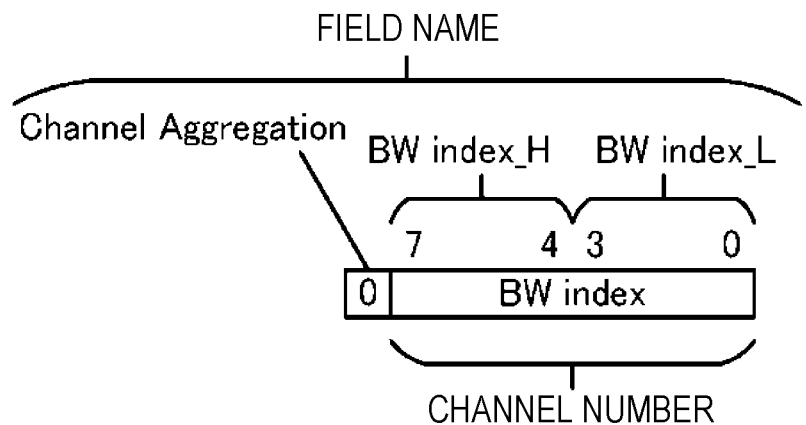
FIG. 59A is a diagram illustrating a method of setting the value of the BW index for single-channel transmission and channel bonding in Embodiment 10.

FIG. 59A illustrates a method of setting the value of the BW index for single-channel transmission and channel bonding.

In single-channel transmission and channel bonding, STA2000 uses the channel numbers in FIG. 52 as the value of the BW index. For example, in the case in which STA2000 transmits a packet by channel bonding using channel number 28, since the value of the BW index is 28, STA2000 sets the value of the BW index L field to 12 and the value of the BW index H field to 1 in the L-Header. Also, the value of the Channel Aggregation field is 0.

Figure 59B:
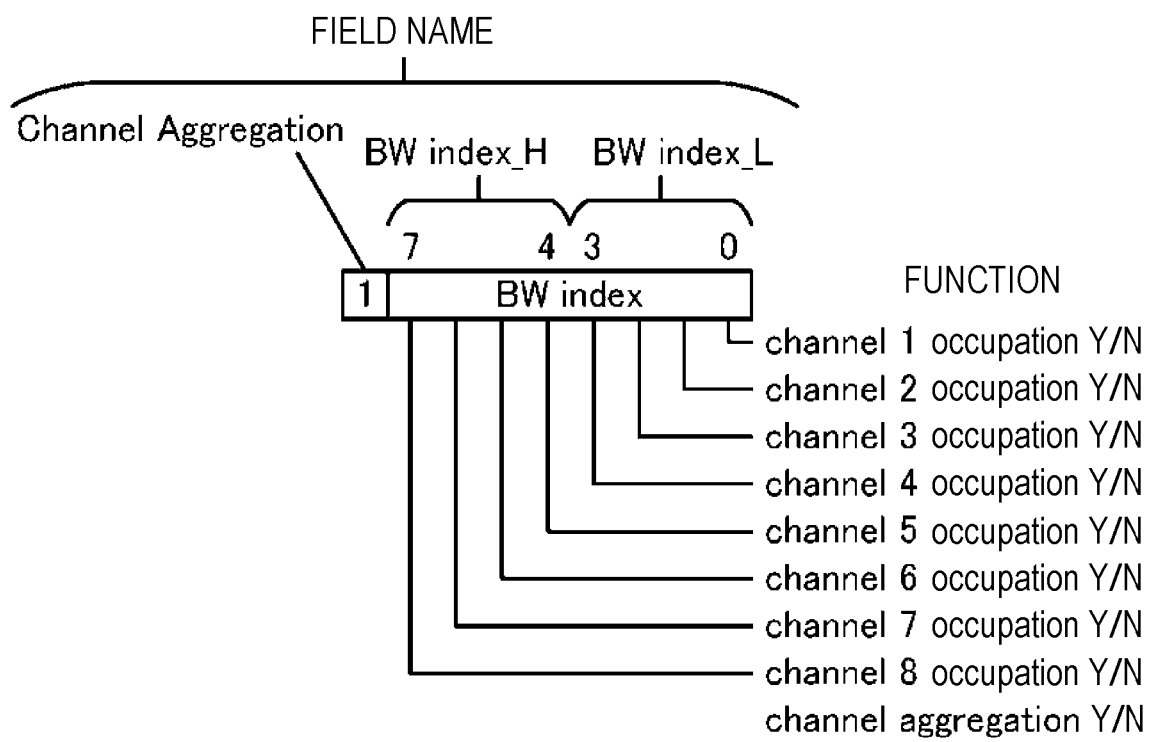
FIG. 59B is a diagram illustrating a method of setting the value of the BW index for channel aggregation in Embodiment 11.

FIG. 59B illustrates a method of setting the value of the BW index for channel aggregation.

In channel aggregation, STA2000 uses the value of a bitmap indicating the occupation or of each channel from channel number 1 to channel number 8 as the value of the BW index. The LSB (bit number 0) corresponds to channel number 1, while the MSB (bit number 7) corresponds to channel number 8.

For example, in the case in which STA2000 transmit a channel aggregation packet by the combination of channel number 1 and channel number 4, STA2000 sets bit0 (LSB) and bit3 of the BW index to 1, and sets the other bits to 0. In other words, STA2000 sets the value of the BW index_L field to 1001 (binary notation) and the value of the BW index H field to 0000 (binary notation) in the L-Header. Also, the value of the Channel Aggregation field is 1.

Also, for example, in the case in which STA2000 transmits a channel aggregation packet by the combination of channel number 9 and channel number 14, since channel number 1, channel number 2, channel number 6, and channel number 7 will be occupied, STA2000 sets bit0, bit1, bit5, and bit6 of the BW index to 1, and sets the other bits to 0. In other words, STA2000 sets the value of the BW index_L field to 0011 (binary notation) and the value of the BW index_H field to 0110 (binary notation) in the L-Header. Also, the value of the Channel Aggregation field is 1.

Figure 60A:
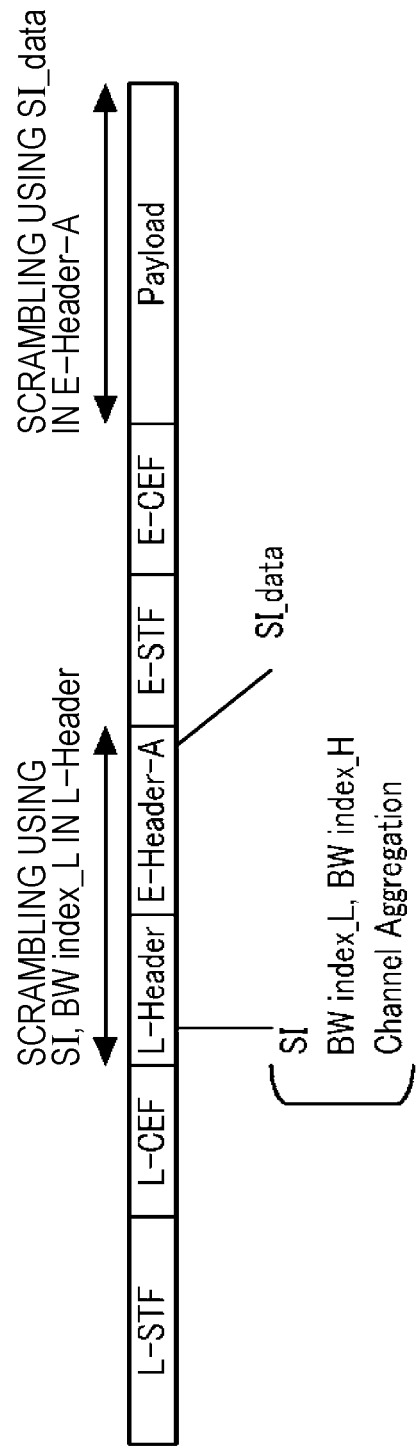
FIG. 60A is a diagram illustrating the PHY frame format for single-user transmission in Embodiment 11.

FIG. 60A illustrates the PHY frame format in the case of single-user transmission, that is, when the destination is a single terminal. Since each field is similar to FIG. 37, description will be omitted.

The PHY frame of the present embodiment includes at least a Scrambler Initialization (SI) field, the BW index_L and BW index_H fields, and the Channel Aggregation field in the L-Header. Also, an SI data field is included in an E-Header-A.

In the case of transmitting the PHY frame of FIG. 60A, STA2000 uses the values of the SI field and the BW index_L field in the L-Header (that is, the 7 bits corresponding to the SI field of the 11ad standard) to scramble the data of the L-Header and the E-Header-A.

Also, in the case of transmitting the PHY frame of FIG. 60A, STA2000 uses the value of the SI_data field in the E-Header-A to scramble the data of the Payload.

Figure 60B:
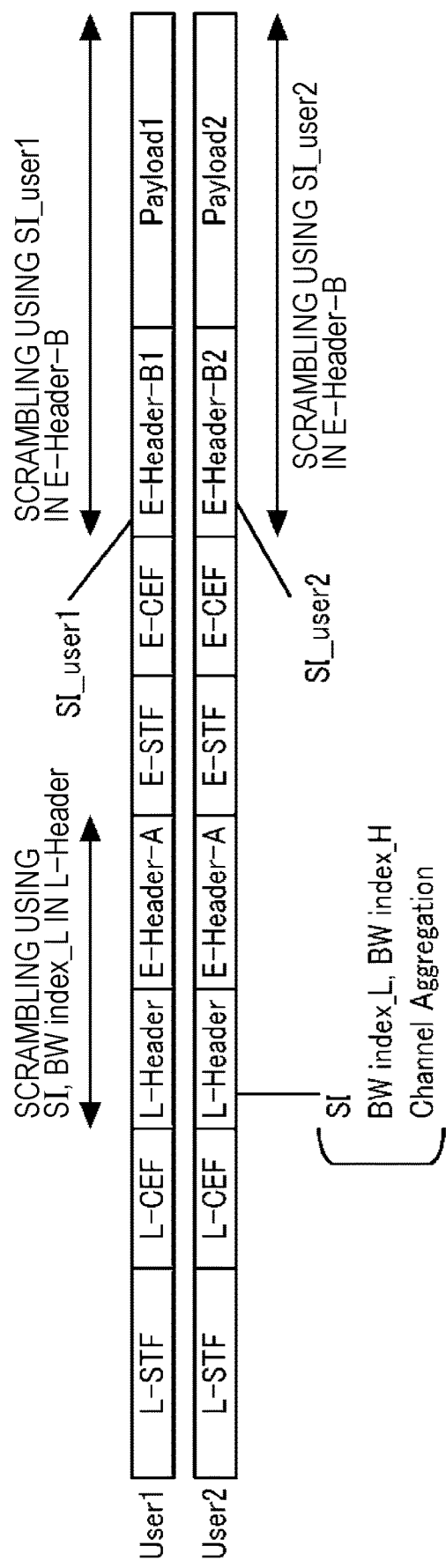
FIG. 60B is a diagram illustrating the PHY frame format for multi-user transmission in Embodiment 11.

FIG. 60B illustrates the PHY frame format in the case of multi-user transmission, that is, when the destinations are multiple terminals. Multi-user transmission refers to multi-user MIMO (MU-MIMO), for example. FIG. 60B illustrates a 2-stream MU-MIMO packet. In other words, User1 is the first MIMO stream, and User2 is the second MIMO stream. Description will be omitted for fields which are the same as FIG. 37.

The PHY frame in FIG. 60B includes an E-Header-B field. The E-Header-B is called the EDMG-Header-B in some cases. Whereas the E-Header-A includes control information common to each user, the E-Header-B is used to include control information that is different for each user. The E-Header-B1 in FIG. 60B is the E-Header-B addressed to User1, while the E-Header-B2 is the E-Header-B addressed to User2. The values included in the E-Header-B1 and the values included in the E-Header-B2 are different. Note that values included in the E-Header-B1 and values included in the E-Header-B2 may also be the same.

The E-Header-B includes different scrambler initialization values (SI_user1 and SI_user2) for each user. By transmitting with value of SI_user1 and SI_user2 changed for each user and for each packet, STA2000 is able to reduce the probability of the same data pattern or highly-correlated data patterns (for example, including patterns that cancel each other out when the data for different users is added together after modulation) occurring between users.

In the case of transmitting the PHY frame of FIG. 60B, STA2000 uses the values of the SI field and the BW index_L field in the L-Header (that is, the 7 bits corresponding to the SI field of the 11ad standard) to scramble the data of the L-Header and the E-Header-A.

Also, in the case of transmitting the PHY frame of FIG. 60B, STA2000 uses the scrambling value (SI_user1) in the E-Header-B1 to scramble the E-Header-B1 and the data of the Payload (Payload1), and uses the scrambling value (SI_user2) in the E-Header-B2 to scramble the E-Header-B2 and the data of the Payload (Payload2).

In FIGS. 60A and 60B, a method is described in which STA2000 uses an SI value in the L-Header to scramble the L-Header and the E-Header-A, and uses one or more SI values (SI_data or SI_user1 and SI_user2) in the E-Header-A (FIG. 60A) or the E-Header-B (FIG. 60B) to scramble the payload data.

Note that the E-Header-A includes control information common to each user, such as the primary channel number, the address of User1 and User2 (in other words, each stream), and the like, for example. Note that SI_data, SI_user1, and SI_user2 are values not prescribed in the 11ad standard.

Following the L-Header format illustrated in FIG. 58, STA2000 assigns the 4 bits that had been the lower 4 bits of the SI field of the 11ad standard to the value of the BW index_L. On the other hand, when transmitting a packet, STA2000 uses the combined 7 bits of the SI field and the BW index_L field in FIG. 58 as the scrambler initialization value, and scrambles the L-Header and the like.

When transmitting a packet, to lower the probability of an undesirable data pattern (for example, the repetition of a specific data pattern, such as a succession of the value 0), STA2000 changes the value of the SI for every transmission. In the 11ad standard, since the SI field is 7 bits, 127 possible scrambler initialization values may be specified, excluding the value 0000000 (binary notation) which is unusable as the scrambler initialization value.

Note that in the format of FIG. 58, when the channel combination is not changed, the value of the 4 bits of the BW index_L will not change, and there are 7 possible scrambler initialization values which may be selected by the STA2000.

Herein, since the data length of the L-Header and the E-Header-A is short compared to the Payload, the probability of an undesirable data pattern occurring is low. For this reason, by using 7 possible scrambler initialization values, it is possible to keep the probability of an undesirable data pattern occurring sufficiently low.

On the other hand, since the data length of the Payload is long, it is desirable to be able to select a value from a greater variety of scrambler initialization values. Herein, for the single-user transmission of FIG. 60A, since STA2000 transmits with the SI value (SI_data) included in the E-Header-A, and uses SI_data to scramble the Payload, it is possible to keep the probability of an undesirable data pattern occurring sufficiently low. The SI_data field is 7 bits, for example.

Also, for the multi-user transmission of FIG. 60B, since STA2000 transmits with the SI values (SI_user1, SI_user2) included in the E-Header-B, and uses SI_user1 and SI_user2 to scramble Payload1 and Payload2, respectively, it is possible to keep the probability of an undesirable data pattern occurring sufficiently low. The SI_user1 and SI_user2 fields are 7 bits each, for example.

In FIGS. 60A and 60B, since STA2000 uses the SI and the value of the BW index_L in the L-Header to scramble the L-Header and the E-Header-A, in both single-user transmission and multi-user transmission, the modulation and coding processes may be shared in common with the L-Header and the E-Header-A, thereby reducing the circuit scale and lowering the power consumption.

Also, the demodulation and decoding processes may be shared in common with the L-Header and the E-Header-A in the receiving device (STA2100), thereby reducing the circuit scale and lowering the power consumption.

Since STA2100 is able to determine the channel combination using the L-Header, similarly to Embodiment 8, the settings of the receiving device may be switched early, and packets may be received correctly, even in cases in which the channel combination is changed every packet.

According to Embodiment 11, since the transmitting device 2000 transmits while changing the channel combination used for each packet, radio channels may be used efficiently.

Embodiment 12

The present embodiment illustrates an example in which the transmitting device 100 of FIG. 2, or a transmitting device having the same basic configuration as FIG. 2, uses a different frame format from Embodiments 1 to 11. Also, a method by which the receiving device 200 of FIG. 3 (illustrated in greater detail in FIGS. 64B and 64C) receives these frames will be described in detail.

Figure 61A:
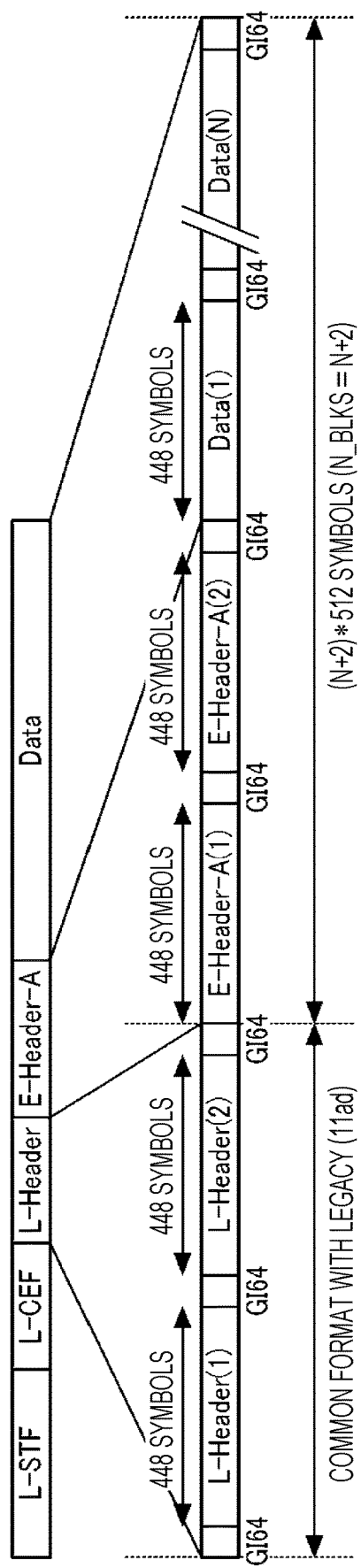
FIG. 61A is a diagram illustrating an example of the frame format of a PHY frame in Embodiment 12.
Figure 61B:
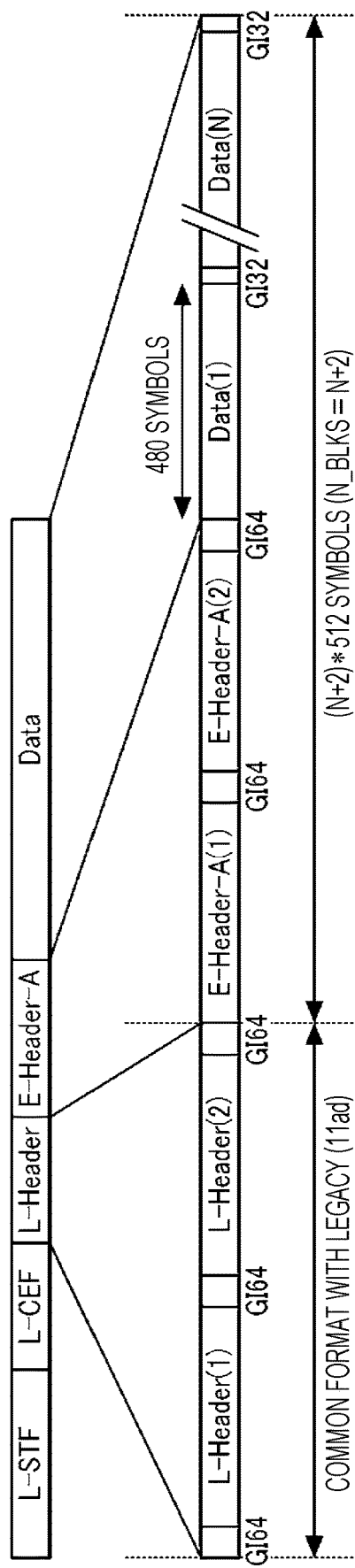
FIG. 61B is a diagram illustrating an example of the frame format of a PHY frame in Embodiment 12.
Figure 61C:
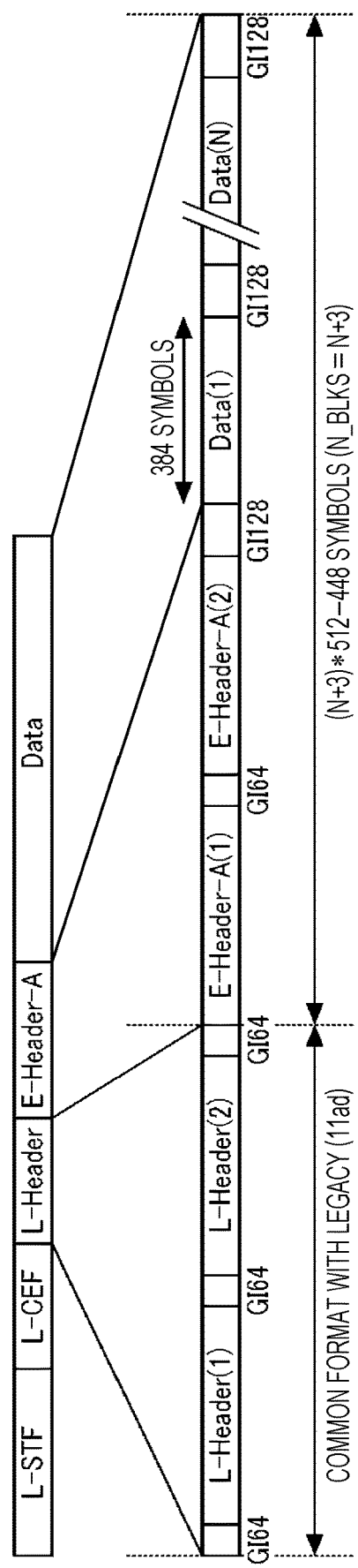
FIG. 61C is a diagram illustrating an example of the frame format of a PHY frame in Embodiment 12.

FIGS. 61A, 61B, and 61C are diagrams illustrating examples of the frame format of a PHY frame in the present embodiment. Unlike the frame format in FIG. 8, the frame formats in FIGS. 61A, 61B, and 61C do not include the EDMG-STF field and the EDMG-CEF field. Description will be omitted for the fields which are the same as FIG. 8. Also, the EDMG-Header-A is denoted the E-Header-A.

FIG. 62 is a diagram illustrating the format of the L-Header in the frame formats of FIGS. 61A, 61B, and 61C. Description will be omitted for fields in FIG. 62 which are the same as FIGS. 47 and 53.

In FIG. 62, a Compressed BW field indicates information corresponding to the channel numbers in which the packets in FIGS. 61A, 61B, and 61C are transmitted, similarly to the Channel Occupation1 to Channel Occupation4 fields and the Channel Aggregation field in FIG. 38, and also similarly to the BW index field in FIGS. 47 and 53.

FIGS. 63A, 63B, and 63C are diagrams illustrating an example of the value of the Compressed BW field. For the Compressed BW field, similarly to the value of the BW index in FIGS. 54A and 54B, values of the Compressed BW field are assigned with respect to combinations of non-overlapping occupied channel numbers.

For example, in 4.32 GHz channel bonding (hereinafter designated 4.32 GHz CB), the transmitting device 100 assigns the value 1 in the Compressed BW field with respect to combinations of non-overlapping occupied channel numbers. Also, in 4.32 GHz CB, the transmitting device 100 assigns the value 2 in the Compressed BW field with respect to other combinations of non-overlapping occupied channel numbers (see FIG. 63A).

The transmitting device 100 may also decide in advance the occupied channels to use in 8.64 GHz channel bonding (hereinafter designated 8.64 GHz CB). For example, the transmitting device 100 decides the combination of ch1, ch2, ch3, and ch4 as the occupied channels to use in 8.64 GHz CB.

The transmitting device 100 may also decide the occupied channels to use in 8.64 GHz CB, and transmit to the receiving device 200 with the decided channels included in the RTS frame and the DMG CTS frame.

The transmitting device 100 may also decide the occupied channels to use in 8.64 GHz CB on the basis of information reported by another transmitting device 400 (for example, an access point not illustrated). For example, the transmitting device 400 may decide the occupied channels to use in 8.64 GHz CB, and report the decided channels using a DMG Beacon frame. In the case of receiving the DMG Beacon, the transmitting device 100 may decide that the occupied channels to be used by the transmitting device 100 are the same channels as the occupied channels to use in 8.64 GHz CB decided by the transmitting device 400.

In the case of deciding in advance the occupied channels to use in 8.64 GHz CB, the transmitting device 100 may assign the value "5" in the Compressed BW field with respect to the combinations of overlapping occupied channels corresponding to 8.64 GHz CB (see FIG. 63A).

Additionally, the transmitting device 100 may also decide in advance the occupied channels to use in 8.64 GHz CB, and use a subset of the occupied channels to be used in 8.64 GHz CB to execute 6.48 GHz channel bonding (called 6.48 GHz CB).

For example, in the case in which the occupied channels to use in 8.64 GHz CB is the combination of ch1, ch2, ch3, and ch4, the transmitting device 100 executes 6.48 GHz CB using ch1, ch2, and ch3 as the occupied channels, and 6.48 GHz CB using ch2, ch3, and ch4 as the occupied channels.

To execute 6.48 GHz CB using ch1, ch2, and ch3 as the occupied channels and 6.48 GHz CB using ch2, ch3, and ch4 as the occupied channels, the transmitting device 100 assigns separate values (3 and 4) in the Compressed BW field (see FIG. 63A). Also, in the case in which the occupied channels to use in 8.64 GHz CB is the combination of ch1, ch2, ch3, and ch4, the transmitting device 100 does not execute 6.48 GHz CB using ch4, ch5, and ch6 as the occupied channels. In this case, the transmitting device 100 may assign the same value of the Compressed BW field (namely, 3) to 6.48 GHz CB using ch1, ch2, and ch3 as the occupied channels and 6.48 GHz CB using ch3, ch4, and ch5 as the occupied channels (see FIG. 63A).

Additionally, the transmitting device 100 may also decide in advance the occupied channels to use in 8.64 GHz CB, and use a subset of the occupied channels to be used in 8.64 GHz CB to execute channel aggregation using two 2.16 GHz channels (called 2.16+2.16 GHz CA).

Similarly to the case of 6.48 GHz CB, in the case in which the combination of occupied channels may be distinguished according to the occupied channels to use in 8.64 GHz CB, the transmitting device 100 may assign values (6 and 7) in the Compressed BW field with respect to the combinations of overlapping occupied channel numbers corresponding to 2.16+2.16 GHz CA (see FIG. 63B).

Also, in 2.16+2.16 GHz CA, in the case in which the two 2.16 GHz channels are separated by four or more channels (in FIG. 63B, see the case for the Compressed BW value of 8), and in the case in which the two 2.16 GHz channels are adjacent (in FIG. 63B, see the case for the Compressed BW value of 9), the transmitting device 100 may decide the occupied channels in advance.

In the case of deciding in advance the occupied channels to use in 2.16+2.16 GHz CA, the transmitting device 100 may assign values in the Compressed BW field with respect to the combinations of overlapping occupied channels corresponding to 2.16+2.16 GHz CA (in FIG. 63B, see the case for the Compressed BW values of 8 and 9).

In addition, the transmitting device 100 may also decide in advance the occupied channels for channel aggregation using two 4.32 GHz channels (called 4.32+4.32 GHz CA).

In the case of deciding in advance the occupied channels to use in 4.32+4.32 GHz CA, the transmitting device 100 may assign a value in the Compressed BW field with respect to the combinations of overlapping occupied channels corresponding to 4.32+4.32 GHz CA (see FIG. 63C).

In FIG. 62, the transmitting device 100 sets to 0 a Reserved field with the start bit of 16.

In FIG. 62, the 5 bits combining the Compressed BW field and the Reserved field with the start bit of 16 correspond to Info in Embodiments 1 to 5. In other words, the transmitting device 100 decides the value of Info on the basis of the value of the Compressed BW field and the value of the Reserved field with the start bit of 16, and computes the value of the Length (that is, the DMG PSDU Length) by any of the methods indicated in Embodiments 1 to 5.

In the case in which the Data field in the PHY frames of FIGS. 61A, 61B, and 61C is single-carrier (SC) modulated, the transmitting device 100 sets the IsSC field in FIG. 62 to 1, whereas in the case in which the Data field is OFDM modulated, the transmitting device 100 sets the IsSC field in FIG. 62 to 0.

Note that the IsSC field is a field that carries the same meaning as the inverse of 0 and 1 for the value of the OF field in FIG. 6.

In the case of single-stream transmission of the PHY frames of FIGS. 61A, 61B, and 61C, the transmitting device 100 sets the IsSISO field in FIG. 62 to 1, whereas in the case of MIMO transmission, the transmitting device 100 sets the IsSISO field in FIG. 62 to 0.

Note that the IsSISO field is a field that carries the same meaning as setting the IsSISO field to 1 in the case in which the value of the MIMO field in FIG. 6 is 00, and setting the IsSISO field to 0 in the case in which the value of the MIMO field is other than 00.

FIG. 63D is a diagram illustrating an example of the value of the GI/CP Length field in Embodiment 12.

In the case of setting the GI length of the Data field to 64 symbols (called the Normal GI), the transmitting device 100 sets the value of the GI/CP Length field in FIG. 62 to 1. In the case of single-stream transmission (that is, a value of 1 in the IsSISO field) and 2.16 GHz single-channel transmission (that is, a value of 0 in the Compressed BW field) and the Normal GI (that is, a value of 1 in the GI/CP Length field), the transmitting device 100 transmits a PHY frame using the frame format of FIG. 61A.

In the case of setting the GI length of the Data field to 32 symbols (called the Short GI), the transmitting device 100 sets the value of the GI/CP Length field in FIG. 62 to 0. In the case of single-stream transmission (that is, a value of 1 in the IsSISO field) and 2.16 GHz single-channel transmission (that is, a value of 0 in the Compressed BW field) and the Short GI (that is, a value of 0 in the GI/CP Length field), the transmitting device 100 transmits a PHY frame using the frame format of FIG. 61B.

In the case of setting the GI length of the Data field to 128 symbols (called the Long GI), the transmitting device 100 sets the value of the GI/CP Length field in FIG. 62 to 2. In the case of single-stream transmission (that is, a value of 1 in the IsSISO field) and 2.16 GHz single-channel transmission (that is, a value of 0 in the Compressed BW field) and the Long GI (that is, a value of 2 in the GI/CP Length field), the transmitting device 100 transmits a PHY frame using the frame format of FIG. 61C.

The frame format of FIG. 61A will be described in detail.

In the frame format of FIG. 61A, the L-Header field includes an L-Header(1) block and an L-Header(2) block. The transmitting device 100 executes coding and modulation obeying the 11ad standard on the content of the L-Header field in FIG. 62, and generates a 448-symbol L-Header(1) block and a 448-symbol L-Header(2) block. The L-Header field includes a 64-symbol GI (hereinafter designated the GI64) before and after the L-Header(1) block and the L-Header(2) block.

In the frame format of FIG. 61A, the EDMG-Header-A (E-Header-A) field includes an E-Header-A(1) block and an E-Header-A(2) block. The E-Header-A(1) block and the E-Header-A(2) block include 448 symbols modulated by π/2-BPSK. The E-Header-A field includes the GI64 after the E-Header-A(1) block and the E-Header-A(2).

In the frame format of FIG. 61A, the Data field includes 448-symbol data blocks (from Data(1) to Data(N), where N is the number of data blocks). The Data field includes the GI64 after each data block.

In the case of transmitting the PHY frame of FIG. 61A, the transmitting device 100 may use the procedure in FIG. 5 to decide the length of the DMG PSDU Length to store in the L-Header. In the frame format of FIG. 61A, since the Data field includes two E-Header-A blocks and N Data blocks, in step S1 of FIG. 5, the transmitting device 100 sets the value of N_BLKS to N+2. Also, in the procedure of FIG. 5, the transmitting device 100 may decide the value of Info on the basis of the value of the Compressed BW field and the Reserved field with the start bit of 16.

The transmitting device 100 may also use any of the procedures in FIG. 11, FIG. 16, FIG. 17, FIG. 19A, and FIG. 19B to decide the value of the PSDU Length to store in the L-Header. In step S1 of each procedure, the transmitting device 100 may set the value of N_BLKS to N+2, and decide the value of Info on the basis of the value of the Compressed BW field and the Reserved field with the start bit of 16.

In the frame format of FIG. 61B, the L-Header field and the EDMG-Header-A field are the same as the frame format in FIG. 61A. However, in the L-Header of FIG. 61B, the transmitting device 100 sets the value of the GI/CP Length to 0 (Short GI).

In the frame format of FIG. 61B, the Data field includes 480-symbol data blocks (from Data(1) to Data(N), where N is the number of data blocks). The Data field includes a GI with a length of 32 symbols (hereinafter designated the GI32) after each data block.

In the case of transmitting the PHY frame of FIG. 61B, the transmitting device 100 may also use any of the procedures in FIG. 5, FIG. 11, FIG. 16, FIG. 17, FIG. 19A, and FIG. 19B to decide the value of the DMG PSDU Length to store in the L-Header. In the frame format of FIG. 61B, since the Data field includes two E-Header-A blocks and N Data blocks, in step S1 of FIG. 5, FIG. 11, FIG. 16, FIG. 17, FIG. 19A, and FIG. 19B, the transmitting device 100 sets the value of N_BLKS to N+2.

In the frame format of FIG. 61C, the L-Header field and the EDMG-Header-A field are the same as the frame format in FIG. 61A. However, in the L-Header of FIG. 61C, the transmitting device 100 sets the value of the GI/CP Length to 2 (Long GI).

In the frame format of FIG. 61C, the Data field includes 384-symbol data blocks (from Data(1) to Data(N), where N is the number of data blocks). The Data field includes a GI with a length of 128 symbols (hereinafter designated the GI128) after each data block.

In the frame format of FIG. 61C, unlike the frame formats of FIGS. 61A and 61B, the GI after the E-Header-A(2) block is the GI128 rather than the GI64. In other words, in the case in which the number of Data blocks is N, in the frame format of FIG. 61C, the EDMG-Header-A field is 64 symbols longer than FIGS. 61A and 61B.

In the case of transmitting the PHY frame of FIG. 61C, the transmitting device 100 may also use any of the procedures in FIG. 5, FIG. 11, FIG. 16, FIG. 17, FIG. 19A, and FIG. 19B to decide the value of the DMG PSDU Length to store in the L-Header.

In the case of transmitting the PHY frame of FIG. 61C, since the GI after the E-Header-A(2) block is the GI128 rather than the GI64, whereas N_BLKS=N+2 in FIGS. 61A and 61B, the transmitting device 100 may set N_BLKS=N+3 in step S1 of FIG. 5, FIG. 11, FIG. 16, FIG. 17, FIG. 19A, and FIG. 19B.

Figure 64A:
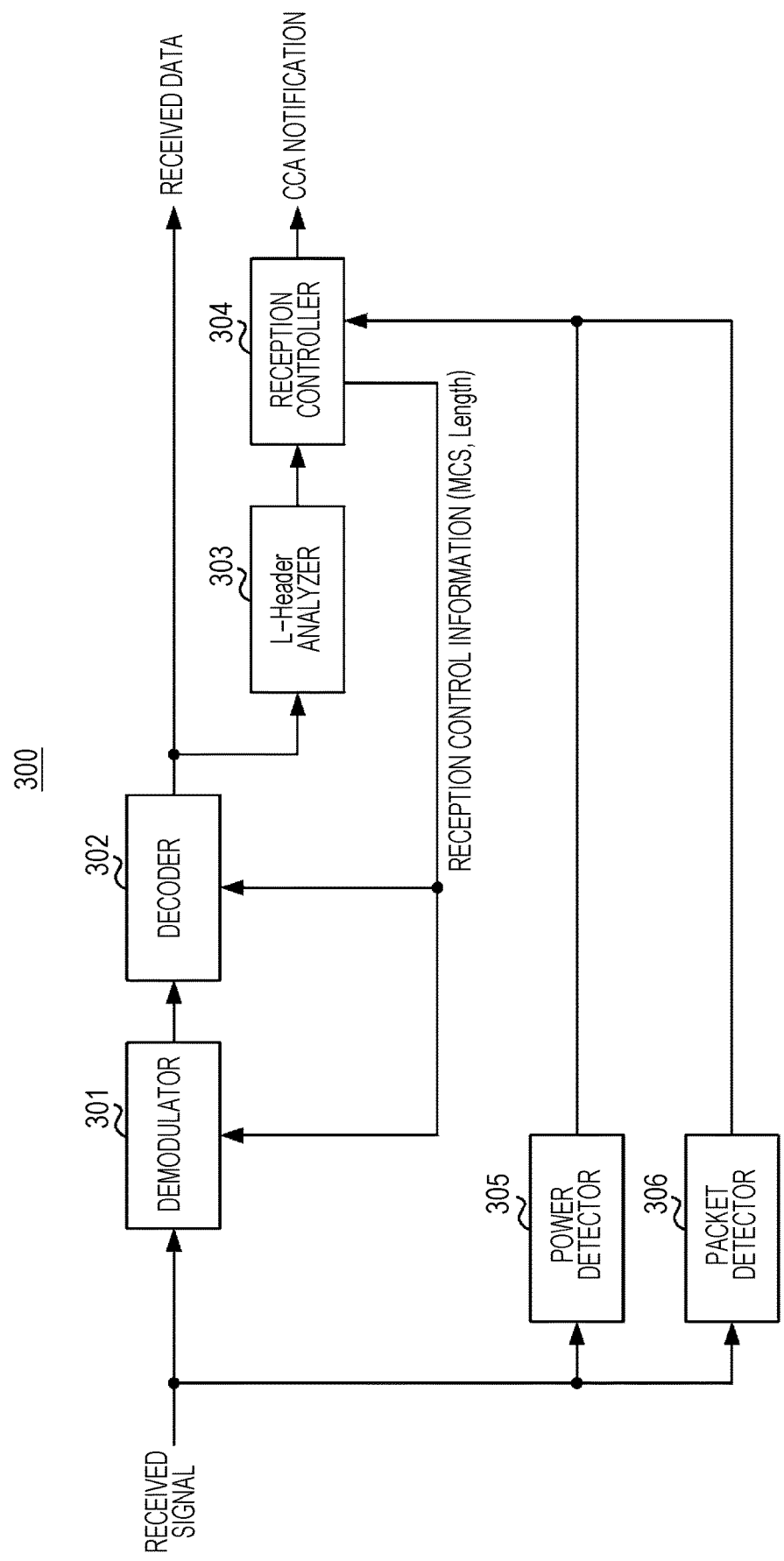
FIG. 64A is a diagram illustrating an example of the configuration of the receiving device in Embodiment 12.

FIG. 64A will be used to describe the operation in the case in which a legacy terminal of the 11ad standard, namely the receiving device 300 (see FIG. 4), receives the PHY frames of FIGS. 61A and 61B. FIG. 64A is a diagram illustrating an example of the configuration of the receiving device 300 in FIG. 4. Blocks which are the same as FIG. 4 are denoted with the same numbers, and the description thereof will be omitted.

A power detector 305 determines whether or not the received signal exceeds a receive power threshold value, and notifies the reception controller 304. The receive power threshold value is prescribed to be −48 dBm (15.8 nanowatts) in the 11ad standard, for example.

A packet detector 306 determines whether or not a PHY frame is included in the received signal. For example, the packet detector 306 is provided with a correlator, and detects a PHY frame by detecting the pattern of the L-STF field (see FIG. 1) in a frame of the 11ad standard. Through pattern detection using the correlator, the receiving device 300 is able to detect a PHY frame with a receive power that is lower than the receive power threshold (−48 dBm). For example, the 11ad standard prescribes that in the case in which the received signal has a power of −68 dBm (0.16 nanowatts) or greater (a value lower than the receive power threshold value), the receiving device detects a PHY frame. Herein, by detecting the L-STF using pattern detection, the receiving device 300 is able to detect a PHY frame of −68 dBm or greater, which is lower than the receive power threshold value.

In the case in which the power detector 305 detects a power that exceeds the receive power threshold value, and in the case in which the packet detector 306 detects a PHY frame, the reception controller 304 issues a CCA notification to a MAC controller (not illustrated). Note that issuing the CCA notification after the power and PHY frame is detected is called asserting the CCA.

In the case of asserting the CCA, or in other words, since a signal exceeding the receive power threshold value is being received, the receiving device 300 determines that another STA (for example, the transmitting device 100) is transmitting a signal, an 11ad terminal that includes the receiving device 300 controls the transmitting device (not illustrated) of the 11ad terminal not to transmit.

The reception controller 304 continues to assert the CCA while the power detector 305 detects a power exceeding the receive power threshold value.

Also, in the case in which the packet detector 306 detects a PHY frame of the 11ad standard, the reception controller 304 continues to assert the CCA while the PHY frame continues. The reception controller 304 may also compute the length of the PHY frame on the basis of the packet length output by the L-Header analyzer 303, and decide the time during which to assert the CCA.

In the case in which the packet detector 306 detects a PHY frame of the 11ay standard (see FIG. 1), the reception controller 304 continues to assert the CCA while the PHY frame continues.

Note that since the receiving device 300 is a receiving device supporting the 11ad standard and has difficulty demodulating and decoding the EDMG-Header-A of the 11ay standard, the receiving device 300 may determine that the PHY frame being received is an unknown frame, switch from packet detection to power detection, and assert the CCA while the PHY frame continues.

Herein, in the case in which the receive power of the PHY frame is lower than the receive power threshold value, the receiving device 300 may have difficulty in continuing to assert the CCA in some cases. For this reason, by using the PHY frames of FIGS. 61A and 61B which include the L-STF, L-CEF, and L-Header similar to the 11ad standard, the receiving device 300 supporting the 11ad standard is able to demodulate and decode part of the PHY frame, and thereby becomes able to continue asserting the CCA, even in the case in which the receive power of the PHY frame is lower than the receive power threshold value.

In the case in which the packet detector 306 detects the PHY frame of FIGS. 61A and 61B which include the L-STF, L-CEF, and L-Header similar to the 11ad standard, the reception controller 304 continues to assert the CCA while the PHY frame continues. The reception controller 304 may also compute the length of the PHY frame on the basis of the packet length output by the L-Header analyzer 303, and decide the time during which to assert the CCA.

As described above, the transmitting device 100 sets and transmits the Length in the L-Header of the PHY frames of FIGS. 61A and 61B to enable a receiving device supporting the 11ad standard (for example, the receiving device 300) to calculate the PHY frame length.

For this reason, even if the receiving device 300 is unable to demodulate and decode the EDMG-Header-A field and the Data field, the receiving device 300 is able to compute the length of the PHY frames of FIGS. 61A and 61B, and is able to assert the CCA. With this arrangement, the receiving device 300 is able to assert the CCA correctly compared to a CCA based on power detection.

For this reason, the 11ad terminal which includes the receiving device 300 is able to decrease transmission by the transmitting device (not illustrated) of the 11ad terminal due to non-detection of the CCA, and is able to decrease interference on other STA (for example, the transmitting device 100, and the receiving device 200 receiving packets being transmitted by the transmitting device 100).

In the case of receiving the PHY frame of FIG. 61C, the receiving device 300 uses the value of the Length field included in the L-Header to compute the length of the PHY frame which is 448 symbols longer than the PHY frame of FIG. 61C. The receiving device 300 may also assert the CCA on the basis of the computed PHY frame length.

The receiving device 300 is able to compute the length of the PHY frame which is 448 symbols longer than the PHY frame of FIG. 61C without receiving the EDMG-Header-A field and the Data field, and is able to assert the CCA. With this arrangement, the receiving device 300 is able to decrease transmission due to non-detection of the CCA, and is able to decrease interference on other STA (for example, the transmitting device 100, and the receiving device 200 receiving packets being transmitted by the transmitting device 100).

FIG. 64B is a diagram illustrating an example of the configuration of the receiving device 200. Blocks which are the same as FIG. 3 described earlier are denoted with the same numbers, and the description thereof will be omitted. Note that the blocks added to FIG. 64B may be added to FIG. 3 and implemented.

A power detector 208 determines whether or not the received signal exceeds a receive power threshold value, and notifies the reception controller 207. The receive power threshold value is prescribed to be −48 dBm (15.8 nanowatts) in the 11ad standard, for example.

Also, a power detector 208 measures the receive power of the received signal, and notifies an AGC controller 210.

On the basis of the value of the receive power of the received signal reported by the power detector 208, the AGC controller 210 adjusts the gain of an RF receiving device circuit (not illustrated), controlling the gain so that the received signal input into the reception filter 201 becomes a suitable amplitude (such control is called automatic gain control (AGC)).

A packet detector 209 determines whether or not a PHY frame is included in the received signal. For example, the packet detector 209 is provided with a correlator, and detects a PHY frame by detecting the pattern of the L-STF field (see FIG. 1).

In the case in which the power detector 208 detects a power that exceeds the receive power threshold value, and in the case in which the packet detector 209 detects a PHY frame, the reception controller 207 issues a CCA notification to a MAC controller (not illustrated).

In the case of asserting the CCA, receiving device 200 determines that another STA (for example, the transmitting device 100) is transmitting a signal, and the 11ay terminal which includes the receiving device 200 controls the transmitting device 100 of the 11ay terminal not to transmit.

The reception controller 207 continues to assert the CCA while the power detector 208 detects a power exceeding the receive power threshold value.

Also, in the case in which the packet detector 209 detects a PHY frame, the reception controller 207 continues to assert the CCA while the PHY frame continues. The reception controller 207 may also compute the length of the PHY frame on the basis of the packet length output by the EDMG-Header-A analyzer 206, and decide the time during which to assert the CCA.

Figure 64C:
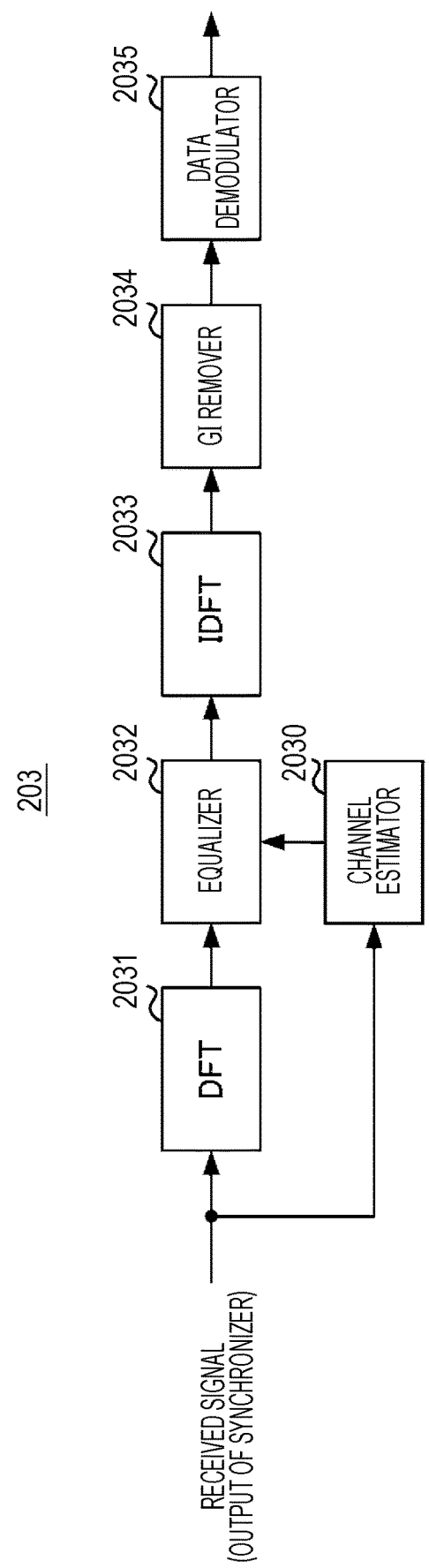
FIG. 64C is a diagram illustrating an example of the demodulator of the receiving device in Embodiment 12.

FIG. 64C is a diagram illustrating an example of the demodulator 203 of the receiving device 200 in FIG. 3. The demodulator 203 includes a channel estimator 2030, a discrete Fourier transform (DFT) 2031, an equalizer 2032, an IDFT 2033, a GI remover 2034, and a data demodulator 2035.

The channel estimator 2030 uses the received signal of the L-CEF field to estimate the frequency response of the channel (radio channel).

The DFT 2031 applies the discrete Fourier transform to the time-domain received signal output by the synchronizer 202, converting the signal into a frequency-domain signal.

The equalizer 2032 corrects the frequency-domain signal, improving the signal-to-noise ratio (SNR) and the signal-to-interference-plus-noise ratio (SINR). The method used by the equalizer 2032 may be the zero forcing (ZF) method, the minimum mean square error (MMSE) method, the maximum likelihood detection (MLD) method, or the like.

The IDFT 2033 applies the inverse discrete Fourier transform to the frequency-domain signal output by the equalizer 2032, converting the signal into a time-domain signal (called a received symbol signal).

The GI remover 2034 removes the received symbols corresponding to the GI from the received symbol signal, and inputs the received symbol signal corresponding to the L-Header, the E-Header-A, and the Data into the data demodulator 2035.

The data demodulator 2035 executes a demodulation process corresponding to the modulation scheme in each field with respect to the received symbol signal corresponding to the L-Header, the EDMG-Header field, and the Data field, and generates a likelihood value signal (called the log-likelihood ratio (LLR)). The decoder 204 of FIG. 3 executes error-correcting decoding using the likelihood value signal, and generates a received bit sequence corresponding to the L-Header field, the EDMG-Header field, and the Data field.

Next, the operation of the DFT 2031 will be described using FIGS. 65A, 65B, and 65C.

Figure 65A:
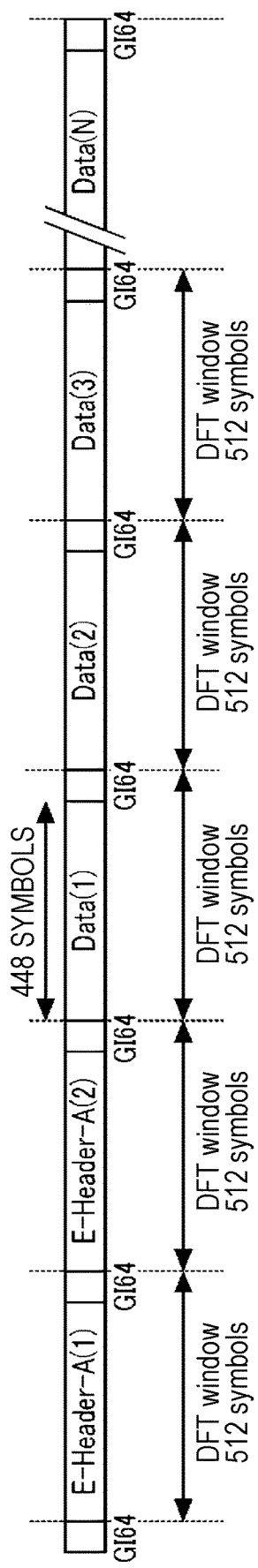
FIG. 65A is a diagram illustrating an example of the EDMG-Header-A field and the Data field received by the receiving device in Embodiment 12.

FIG. 65A is a diagram illustrating an example of the EDMG-Header-A field and the Data field (the time-domain received signal output by the synchronizer 202) from among the PHY frame (Normal GI) of FIG. 61A received by the receiving device 200.

The DFT 2031 executes a 512-point DFT process that takes the 448-symbol E-Header-A(1) block and the 64-symbol GI64 as input. The 512 symbols input into the DFT 2031 are called the DFT window.

The start symbol of the E-Header-A(1) block in the time-domain received signal is decided by the synchronizer 202. For example, in the case in which the received signal includes a direct wave and a reflected wave, the receive start time of the EDMG-Header-A(1) block of the direct wave and the receive start time of the EDMG-Header-A(1) block of the reflected wave may be different. For this reason, the synchronizer 202 may treat the receive start time of the EDMG-Header-A(1) block of the direct wave as a reference to decide the start symbol of the E-Header-A(1) block.

The DFT 2031 executes a 512-point DFT process that takes the subsequent E-Header-A(2) block and the GI64 as input. In other words, in the case of deciding the DFT window that includes the E-Header-A(2) following the DFT window that includes the E-Header-A(1), the interval between the DFT window that includes the E-Header-A(1) and the DFT window that includes the E-Header-A(2) is 0 symbols.

Note that to correct the misalignment between the symbol clocks of the transmitting device 100 and the receiving device 200 (called symbol synchronization), the DFT 2031 may also insert one or more symbols in between the DFT window and the next DFT window. In other words, the interval between DFT windows may also be 1 or greater.

In addition, to achieve symbol synchronization, the DFT 2031 may also duplicate one or more symbols between the DFT window and the next DFT window. In other words, the interval between DFT windows may also be −1 or less.

Hereinafter, description regarding symbol synchronization will be omitted, but the same applies.

In FIG. 65A, the DFT 2031 decides the 448-symbol Data(1) block and the 64-symbol GI64 to be the next DFT window, and executes the DFT process. Similarly, the DFT 2031 decides each Data block from Data(2) to Data(N) and each GI64 to be respective DFT windows, and executes the DFT process.

Figure 65B:
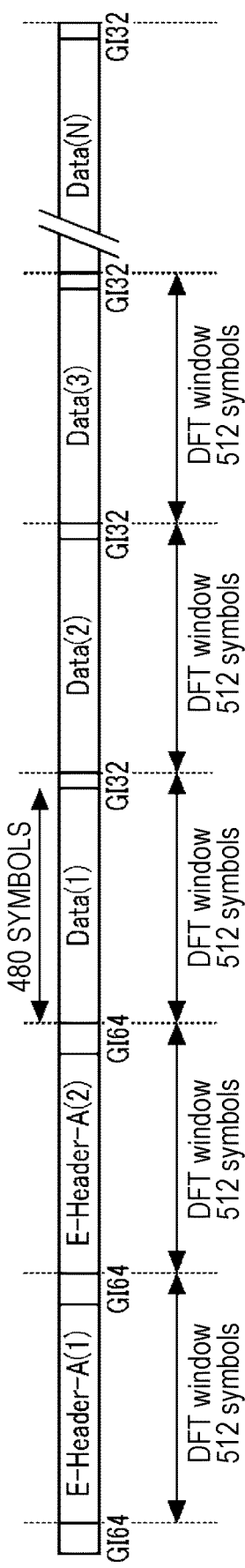
FIG. 65B is a diagram illustrating an example of the EDMG-Header-A field and the Data field received by the receiving device in Embodiment 12.

FIG. 65B is a diagram illustrating an example of the EDMG-Header-A field and the Data field from among the PHY frame (Short GI) of FIG. 61B received by the receiving device 200.

The format of the EDMG-Header-A in FIG. 65B is the same as FIG. 65A. Also, in FIG. 65B, the total length of the 480-symbol Data block and the 32-symbol GI32 is 512 symbols, the same number of symbols as FIG. 65A. Similarly to FIG. 65A, the DFT 2031 decides the DFT window with respect to the E-Header-A field and the Data field, and executes the DFT process.

Figure 65C:
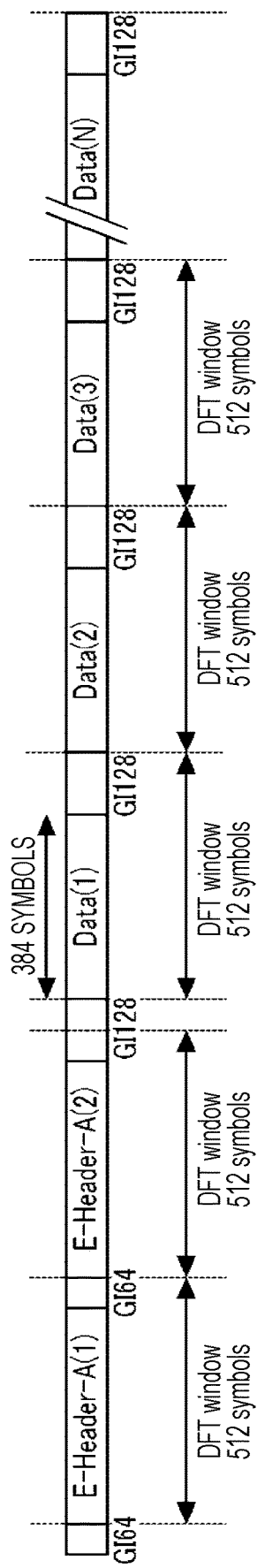
FIG. 65C is a diagram illustrating an example of the EDMG-Header-A field and the Data field received by the receiving device in Embodiment 12.

FIG. 65C is a diagram illustrating an example of the EDMG-Header-A field and the Data field from among the PHY frame (Long GI) of FIG. 61C received by the receiving device 200.

In the format of the EDMG-Header-A in FIG. 65C, the GI after the E-Header-A(2) block is 128 symbols (that is, GI128). The DFT 2031 sets the E-Header-A(2) block and the first 64 symbols of the GI128 following the E-Header-A(2) block as the DFT window, and executes the DFT process.

The transmitting device 100 may also transmit the first 64 symbols of the GI128 and the GI64 as the same pattern. In this case, in the DFT window that includes the E-Header-A(2), the receiving device 200 executes the DFT and equalization similarly to the case in which the DFT window includes the E-Header-A(2) block and the GI64 in FIG. 65A.

In FIG. 65C, the DFT 2031 decides the 384-symbol Data(1) block and the 128-symbol GI128 to be the next DFT window, and executes the DFT process.

In other words, in FIGS. 65A and 65B, the interval between the DFT window that includes the E-Header-A(2) block and the DFT window that includes the Data(1) block is 0, but in FIG. 65C, the interval between the DFT window that includes the E-Header-A(2) block and the DFT window that includes the Data(1) block is 64.

By the time the received signal of the DFT window that includes the E-Header-A(2) block is completely input into the DFT 2031, the receiving device 200 completes the decoding of the L-Header, acquires the values of the received Compressed BW field, IsSC field, IsSISO field, and GI/CP Length field, and determines whether the received PHY frame is in the format of FIG. 65A, 65B, 65C, or a different format. Hereinafter, the determination of the PHY frame will be described in detail.

The L-Header analyzer 205 of FIG. 64B acquires, from the decoded L-Header (the received bit sequence corresponding to the L-Header), the values of the Compressed BW field, the IsSC field, the IsSISO field, and the GI/CP Length field, and forwards the acquired values to the reception controller 207.

FIG. 66 is a diagram illustrating an example of criteria by which the reception controller 207 determines the format. In the case in which the Compressed BW field input by the L-Header analyzer 205 has a value of 0, the IsSC field has a value of 1, the IsSISO field has a value of 1, and the GI/CP Length field has a value of 0, the reception controller 207 determines that the PHY frame being received by the receiving device 200 is in the format of FIGS. 61B and 65B.

In the case in which the Compressed BW field input by the L-Header analyzer 205 has a value of 0, the IsSC field has a value of 1, the IsSISO field has a value of 1, and the GI/CP Length field has a value of 1, the reception controller 207 determines that the PHY frame being received by the receiving device 200 is in the format of FIGS. 61A and 65A.

In the case in which the Compressed BW field input by the L-Header analyzer 205 has a value of 0, the IsSC field has a value of 1, the IsSISO field has a value of 1, and the GI/CP Length field has a value of 2, the reception controller 207 determines that the PHY frame being received by the receiving device 200 is in the format of FIGS. 61C and 65C.

In the case in which the combination of the value of the Compressed BW field, the value of the IsSC field, the value of the IsSISO field, and the value of the GI/CP Length field input by the L-Header analyzer 205 is none of the above, the reception controller 207 determines that the PHY frame being received by the receiving device 200 is in none of the formats of FIG. 61A (FIG. 65A), FIG. 61B (FIG. 65B), or FIG. 61C (FIG. 65C) (or in other words, another format).

The reception controller 207 reports the determination result to the demodulator 203 and the DFT 2031. In the case in which the determined format is FIG. 65A or FIG. 65B, the DFT 2031 sets the interval between the DFT window that includes the E-Header-A(2) block and the DFT window that includes the Data(1) block to 0, and applies the DFT to the DFT window that includes the Data(1) block.

In the case in which the determined format is FIG. 65C, the DFT 2031 sets the interval between the DFT window that includes the E-Header-A(2) block and the DFT window that includes the Data(1) block to 64, and applies the DFT to the DFT window that includes the Data(1) block.

Note that in the case in which the value of the Compressed BW field is from 6 to 9, or in other words, in the case of 2.16+2.16 GHz CA, the transmitting device 100 uses the frame format illustrated in FIG. 55A. The frame format on each channel (in FIG. 55A, ch1 and ch3) is the same as FIGS. 61A, 61B, and 61C.

In other words, in the case of 2.16+2.16 GHz CA, the transmitting device 100 transmits using two channels with the same frame format as FIGS. 61A, 61B, and 61C. In the two channels, the transmitting device 100 may transmit with the same data included in the L-Header and the EDMG-Header-A. Also, in the two channels, the transmitting device 100 may transmit with different data included in the Data field.

In the case of 2.16+2.16 GHz CA (that is, the value of the Compressed BW field is from 6 to 9), the receiving device 200 may decide the DFT window similarly to the case of 2.16 GHz single-channel transmission (that is, the value of the Compressed BW field is 0).

Since the transmitting device 100 of the present embodiment transmits with the Compressed BW field, the IsSC field, the IsSISO field, and the GI/CP Length field included in the L-Header, the receiving device 200 is able to decode and analyze the L-Header during the time from receiving the L-Header until the Data(1) block is input into the DFT 2031, and change the operation of the DFT 2031 on the basis of the determined frame format.

Since the transmitting device 100 of the present embodiment is configured to transmit with Info included in the lower bits of the Length field in the L-Header, it is possible to transmit with the Compressed BW field, the IsSC field, the IsSISO field, and the GI/CP Length field included in the L-Header.

Note that in FIGS. 65A, 65B, and 65C, the DFT 2031 sets each data block (L-Header(1), L-Header(2), E-Header-A(1), E-Header-A(2), and Data(1) to Data(N)) and each GI following each data block as a DFT window. In other words, the DFT 2031 decides the DFT window so that the end of the GI matches the end of the DFT window.

Figure 67A:
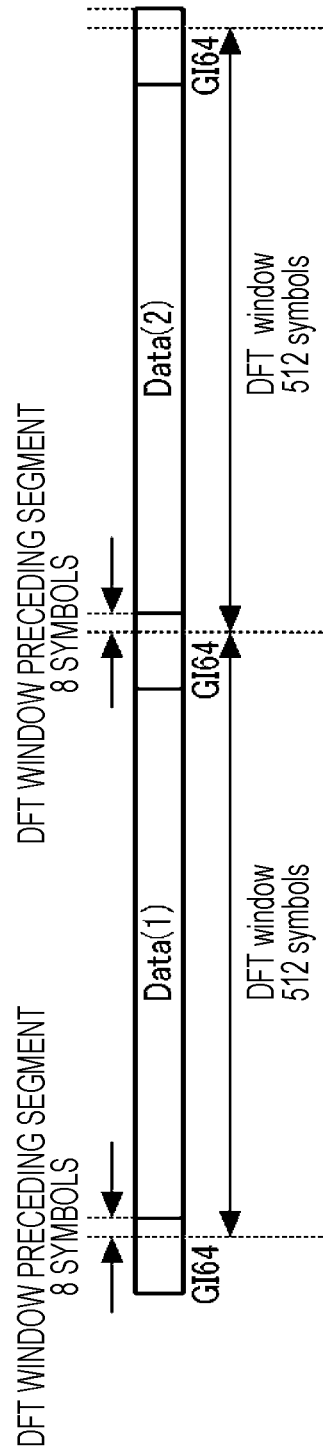
FIG. 67A is a diagram illustrating a different method by which the DFT decides the DFT window in Embodiment 12.
Figure 67B:
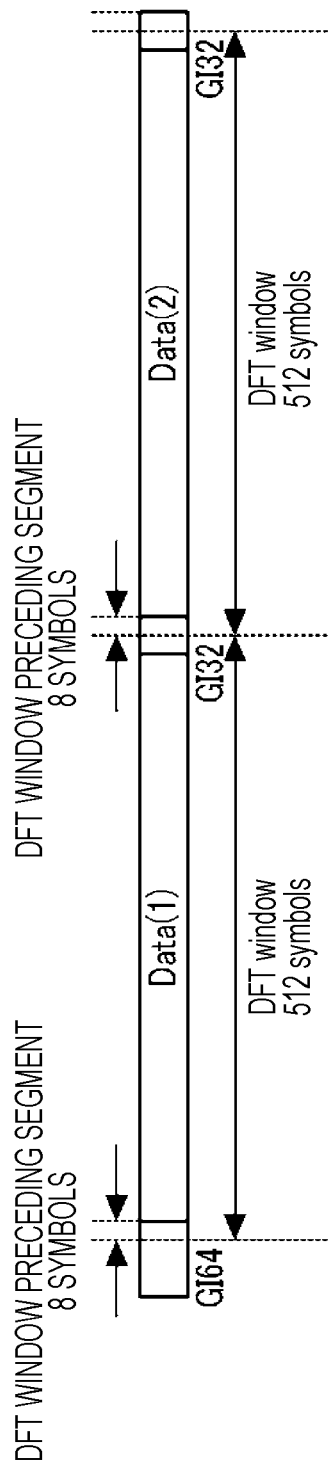
FIG. 67B is a diagram illustrating a different method by which the DFT decides the DFT window in Embodiment 12.
Figure 67C:
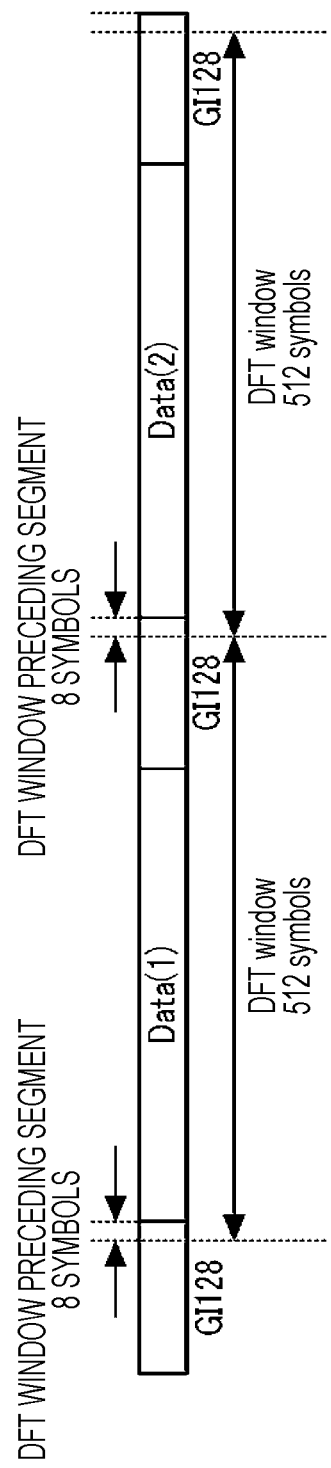
FIG. 67C is a diagram illustrating a different method by which the DFT decides the DFT window in Embodiment 12.

FIGS. 67A, 67B, and 67C are diagrams illustrating a different method by which the DFT 2031 decides the DFT window. In FIGS. 67A, 67B, and 67C, the receiving device 200 receives a packet in the same frame format as FIGS. 65A, 65B, and 65C, respectively.

In FIGS. 67A, 67B, and 67C, the DFT 2031 of the receiving device 200 sets the DFT window earlier compared to FIGS. 65A, 65B, and 65C by a DFT window preceding segment. Herein, the DFT window preceding segment is 8 symbols, for example.

By setting the DFT window preceding segment to be 1 or more symbols, in the case in which the received signal includes a preceding wave with respect to a direct wave, equalization with the preceding wave included in the DFT window may be executed, and the received signal quality may be increased.

Note that the receiving device 200 may set the DFT window preceding segment as the same number of symbols in the L-Header field, the EDMG-Header-A field, and the Data field. In FIGS. 67A, 67B, and 67C, the interval between the DFT window that includes the E-Header-A(1) and the DFT window that includes the E-Header-A(2) is the same as FIGS. 65A, 65B, and 65C, respectively.

Additionally, the receiving device 200 may also set the DFT window preceding segment of the Data field as a different number of symbols from the DFT window preceding segment of the L-Header field and the EDMG-Header-A field. In this case, the receiving device 200 adjusts the interval between the DFT window that includes the E-Header-A(1) and the DFT window that includes the E-Header-A(2) according to the DFT window preceding segment.

Also, the receiving device 200 may set the DFT window preceding segment as a different number of symbols depending on the length of the GI.

For example, the receiving device 200 may set the DFT window preceding segment of the Data field to 8 symbols for the Normal GI, set the DFT window preceding segment of the Data field to 4 symbols for the Short GI, set the DFT window preceding segment of the Data field to 16 symbols for the Long GI, and set the DFT window preceding segment of the L-Header field and the EDMG-Header-A field to 8 regardless of the length of the GI of the Data field.

In this case, the interval between the DFT window that includes the E-Header-A(1) and the DFT window that includes the E-Header-A(2) is 0 for the Normal GI, 4 for the Short GI, and 56 for the Long GI.

The receiving device 200 may also use FIG. 66 to decide the interval between the DFT window that includes the E-Header-A(1) and the DFT window that includes the E-Header-A(2) and decide the DFT window that includes the Data(1) block from the decoding result of the L-Header.

Note that in the present disclosure, the Compressed BW field, the IsSC field, the IsSISO field, and the GI/CP Length field are all included in the "L-Header", but in a case in which none of the Compressed BW field, the IsSC field, the IsSISO field, and the GI/CP Length field is included in the "L-Header", and the Compressed BW field, the IsSC field, the IsSISO field, and the GI/CP Length field are all included in the "EDMG-Header-A", since the interval between the DFT window that includes the E-Header-A(2) block and the DFT window that includes the Data(1) block is 0 or 64, it is difficult to decode the EDMG-Header-A before the Data(1) block is input into the DFT 2031. In other words, it is difficult to determine the frame format before the Data(1) block is input into the DFT 2031.

Note that in each embodiment of the present disclosure, the Compressed BW field, the IsSC field, the IsSISO field, and the GI/CP Length field are all included in the "L-Header", but the Compressed BW field, the IsSC field, the IsSISO field, and the GI/CP Length field may also all be included in the "EDMG-Header-A".

In this case, by saving the Data(1) block in memory (not illustrated), and delaying the timing of inputting the Data(1) block into the DFT 2031, it is possible to execute the DFT process on the Data(1) block after the frame format is determined.

However, the use of memory causes increased processing delay, circuit scale, and power consumption for the receiving of packets at the receiving device. Also, reducing the size of the memory in the receiving device requires speeding up the demodulator and decoder for demodulating and decoding the L-Header to reduce the delay. For this reason, in the receiving device, raising the operating clock of the circuit increases power consumption, while increasing the degree of parallelism of the circuit increases the circuit scale and the power consumption.

In contrast, the transmitting device 100 of Embodiment 12 includes the values of the Compressed BW field, the IsSC field, the IsSISO field, and the GI/CP Length field in the L-Header, and transmits a portion of these included in the lower bits of the Length field of the L-Header. For this reason, the receiving device 200 is able to decide the DFT window corresponding to the PHY frame format, and the processing delay, the circuit scale, and the power consumption may be reduced.

Also, the transmitting device 100 of Embodiment 12 includes the values of the Compressed BW field, the IsSC field, the IsSISO field, and the GI/CP Length field in the L-Header, and transmits a portion of these included in the lower bits of the Length field of the L-Header. For this reason, a legacy terminal of the 11ad standard, namely the receiving device 300, is able to compute the packet length without decoding the EDMG-Header-A and the Data field, and is able to assert the CCA, thereby reducing power consumption and reducing interference on other terminals.

Also, since the 11ay terminal of Exemplary embodiment 12, namely the receiving device 200, receives a packet by changing the timing of the DFT window according to the value of the received L-Header, the circuit scale and the power consumption may be reduced.

Modification of Embodiment 12

Figure 68A:
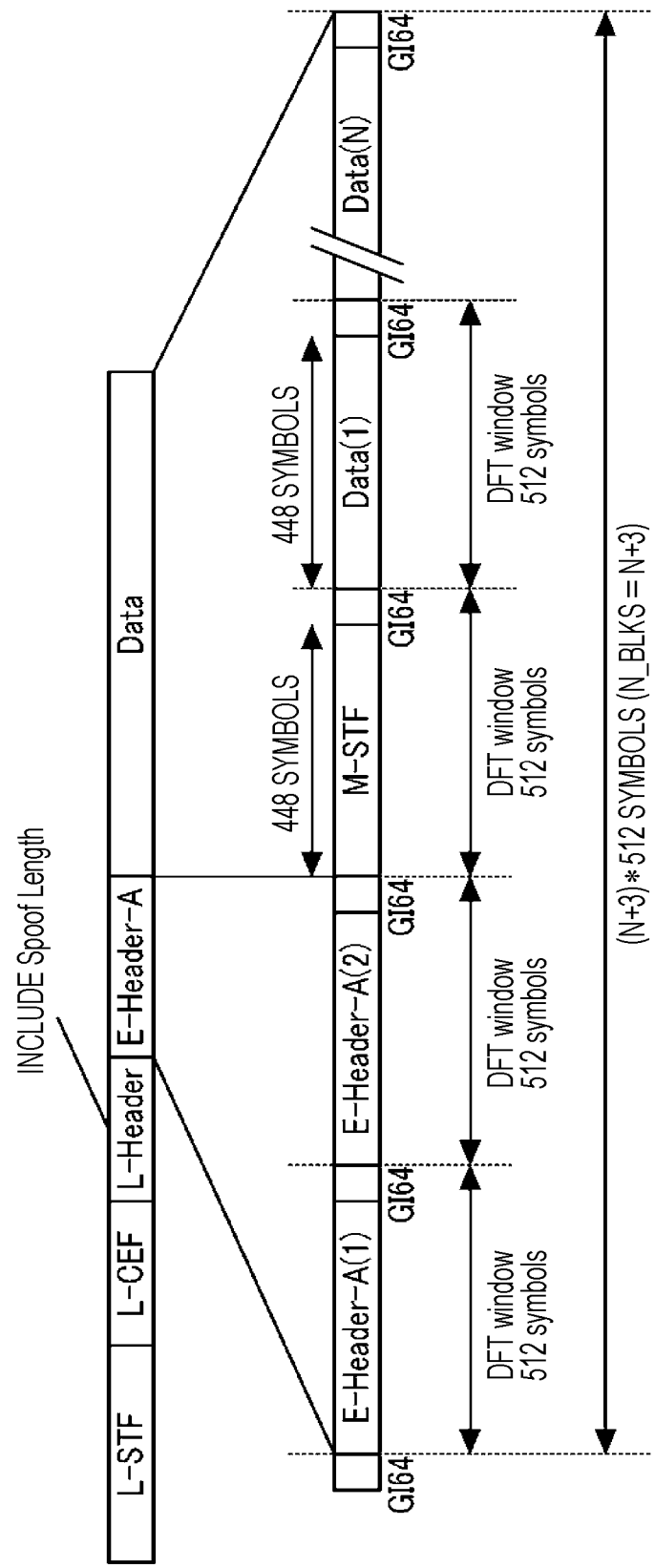
FIG. 68A is a diagram illustrating an example of the frame format in a modification of Embodiment 12.
Figure 68B:
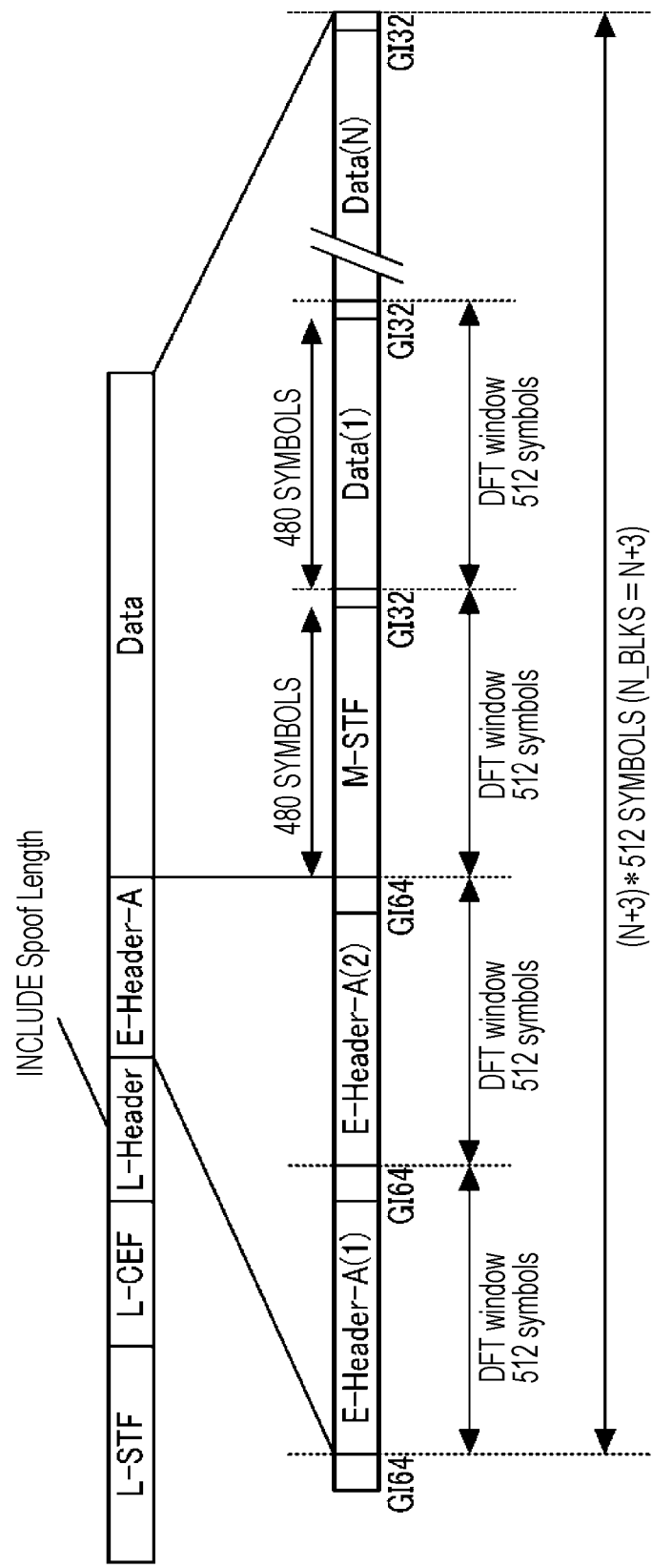
FIG. 68B is a diagram illustrating an example of the frame format in a modification of Embodiment 12.
Figure 68C:
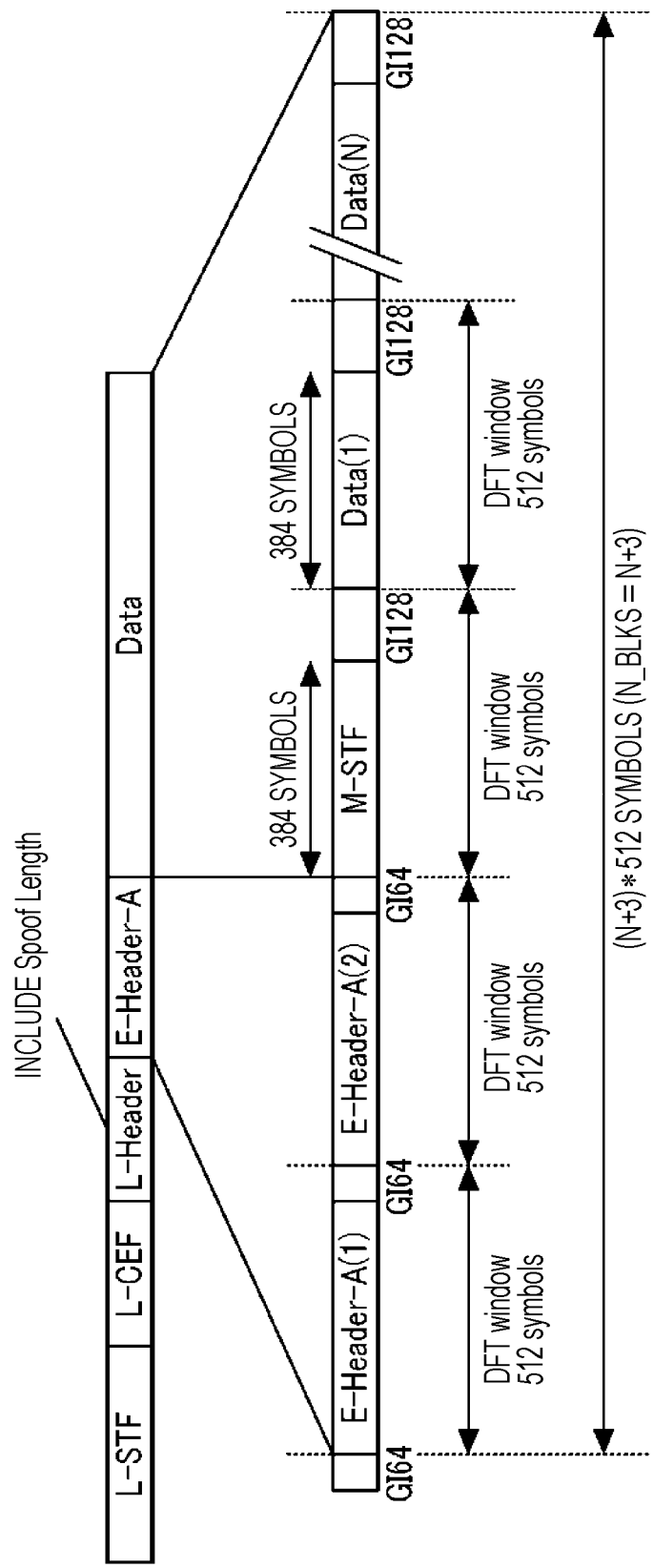
FIG. 68C is a diagram illustrating an example of the frame format in a modification of Embodiment 12.

FIGS. 68A, 68B, and 68C correspond to FIGS. 61A, 61B, and 61C, respectively, and are diagrams illustrating example of frame formats of a modification of Embodiment 12.

In the case of using the frame formats of FIGS. 68A, 68B, and 68C, unlike the case of using FIGS. 61A, 61B, and 61C, the transmitting device 100 transmits with a midamble STF (M-STF) block and the GI inserted at the beginning of the Data field (that is, before the Data(1) block).

The M-STF block includes the same number of symbols as the Data(1) block, and is 448 symbols for the Normal GI (FIG. 68A), 480 symbols for the Short GI (FIG. 68B), and 384 symbols for the Long GI (FIG. 68C).

Also, in the frame format of FIG. 68C, unlike FIG. 61C, the GI after E-Header-A(2) is the GI64.

In FIGS. 68A, 68B, and 68C, the length of the portion combining the EDMG-Header-A field and the Data field is (N+3)×512 symbols. In other words, unlike FIGS. 61A, 61B, and 61C, the length is the same regardless of the GI length.

In the case of transmitting the PHY frames of FIGS. 68A, 68B, and 68C, the transmitting device 100 may also use any of the procedures in FIG. 5, FIG. 11, FIG. 16, FIG. 17, FIG. 19A, and FIG. 19B to decide the value of the DMG PSDU Length to store in the L-Header. In the frame formats of FIGS. 68A, 68B, and 68C, since the Data field includes two E-Header-A blocks, one M-STF block, and N Data blocks, in step S1 of FIG. 5, FIG. 11, FIG. 16, FIG. 17, FIG. 19A, and FIG. 19B, the transmitting device 100 sets the value of N_BLKS to N+3.

In the case in which a legacy terminal of the 11ad standard, namely the receiving device 300 (see FIG. 4), receives the PHY frames of FIGS. 68A, 68B, and 68C, the receiving device 300 uses the value of the Length field included in the L-Header to compute the length of the PHY frame. The receiving device 300 may also assert the CCA on the basis of the computed PHY frame length.

In other words, in the case in which the receiving device 300 receives the PHY frame of FIG. 68C, unlike FIG. 61C, the PHY frame length may be computed correctly.

In the case in which the receiving device 200 receives the PHY frames of FIGS. 68A, 68B, and 68C, the interval between the DFT window that includes the E-Header-A(2) block and the DFT window that includes the M-STF block is 0 in each of FIGS. 68A, 68B, and 68C.

Also, in the case in which the receiving device 200 receives the PHY frames of FIGS. 68A, 68B, and 68C, the interval between the DFT window that includes the M-STF block and the DFT window that includes the Data block is 0 in each of FIGS. 68A, 68B, and 68C.

In other words, in the case in which the receiving device 200 receives the PHY frames of FIGS. 68A, 68B, and 68C, it is not necessary to switch the method of deciding the DFT window depending on the length of the GI. In other words, the operation of the DFT 2031 is fixed regardless of the length of the GI.

The reception controller 207 of the receiving device 200 controls the GI remover 2034 according to the length of the GI (the value of the GI/CP Length field). The receiving device 200 completes the decoding and analysis of the L-Header before executing the GI removal process on the Data(1) block.

The receiving device 200 may also decode the L-Header while executing the DFT process, the equalization process, and the IDFT process on the Data(1) block. In other words, in Embodiment 12, the time which may be used to decode the L-Header is increased compared to the case of completing the decoding of the L-Header before the DFT process on the Data block. With this arrangement, the operating clock and the degree of parallelism may be lowered in the decoder 204 of the receiving device 200, and the circuit scale and power consumption may be reduced.

M-STF Working Example 1

Figure 69A:
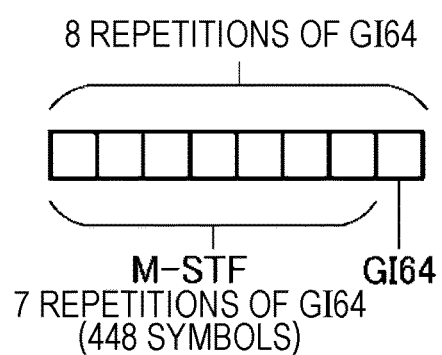
FIG. 69A is a diagram illustrating an example of the M-STF and the GI that follows the M-STF in M-STF Working Example 1.
Figure 69B:
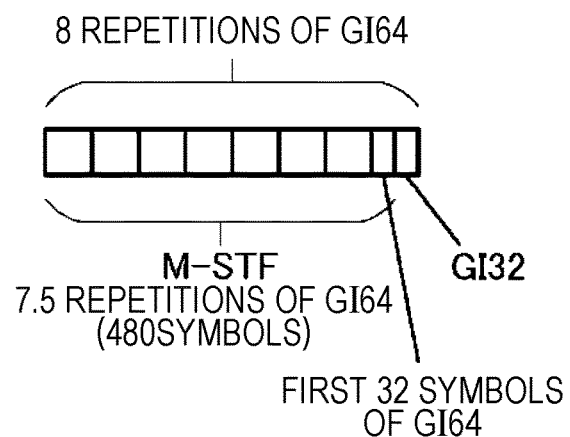
FIG. 69B is a diagram illustrating an example of the M-STF and the GI that follows the M-STF in M-STF Working Example 1.
Figure 69C:
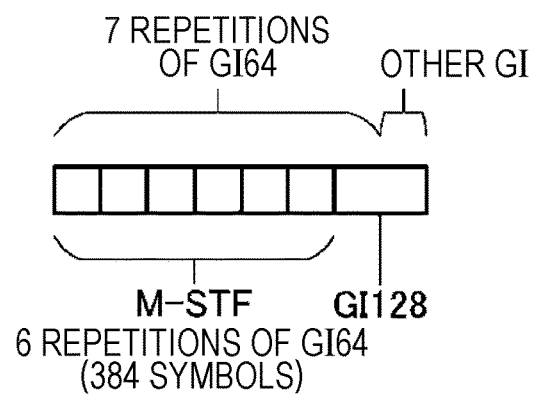
FIG. 69C is a diagram illustrating an example of the M-STF and the GI that follows the M-STF in M-STF Working Example 1.

FIGS. 69A, 69B, and 69C are diagrams illustrating an example of the M-STF and the GI that follows the M-STF in M-STF Working Example 1.

For a PHY frame with the Normal GI (FIG. 68A), the transmitting device 100 generates a 448-symbol M-STF field by repeating the pattern of the GI64 7 times (FIG. 69A). In a PHY frame with the Normal GI, combining the M-STF and the GI that follows the M-STF corresponds to a pattern that repeats the GI64 8 times.

For a PHY frame with the Short GI (FIG. 68B), the transmitting device 100 generates a 480-symbol M-STF field by repeating the pattern of the GI64 7 times, and also adding the first 32 symbols of the GI64 (FIG. 69B). In a PHY frame with the Short GI, in the case in which the first 32 symbols of the GI64 and the pattern of the GI32 are identical, combining the M-STF and the GI that follows the M-STF corresponds to a pattern that repeats the GI64 8 times.

For a PHY frame with the Long GI (FIG. 68C), the transmitting device 100 generates a 384-symbol M-STF field by repeating the pattern of the GI64 6 times (FIG. 69C). In a PHY frame with the Long GI, in the case in which the first 64 symbols of the GI128 and the pattern of the GI64 are identical, combining the M-STF and the GI that follows the M-STF corresponds to a pattern that repeats the GI64 7 times, and adds a different pattern of 64 symbols (the first 64 symbols of the GI128).

In M-STF Working Example 1, since the transmitting device 100 is able to generate the M-STF pattern by repeating the GI64 pattern, patterns may be generated with a simple circuit, and the circuit scale may be reduced.

The receiving device 200 may also execute AGC in the case of receiving the M-STF of M-STF Working Example 1. The receiving device 200 may also execute an AGC rough adjustment using the L-STF, and execute an AGC fine adjustment using the M-STF.

Additionally, the receiving device 200 may use information decoded from the L-Header to change the target amplitude of AGC, and execute an AGC fine adjustment using the M-STF.

Since FIGS. 69A, 69B, and 69C are patterns in which the first 448 symbols are shared in common for each GI, the receiving device 200 is able to execute the AGC process using the M-STF by the same process regardless of the GI length.

Herein, to raise the receiving sensitivity of the L-STF, L-CEF, L-Header, and E-Header-A of a channel bonding packet (for example, see FIG. 40), the receiving device 200 may set the filter coefficients of the RF circuit to values suited to channel bonding, decide the AGC target amplitude, and execute AGC for the L-STF.

The receiving device 200 may also decode the L-Header, determines the occupied channels of the PHY frame from the value of the Compressed BW field, sets the filter coefficients of the RF circuit while receiving the M-STF to values suited to the occupied channels of the PHY frame, and change the AGC target amplitude.

By switching the filter coefficients of the RF circuit while receiving the M-STF, the quality of the symbols being received may be damaged in some cases, but even if some symbols of the M-STF are damaged, the receiving device 200 is able to limit damage to the Data.

M-STF Working Example 2

Figure 70A:
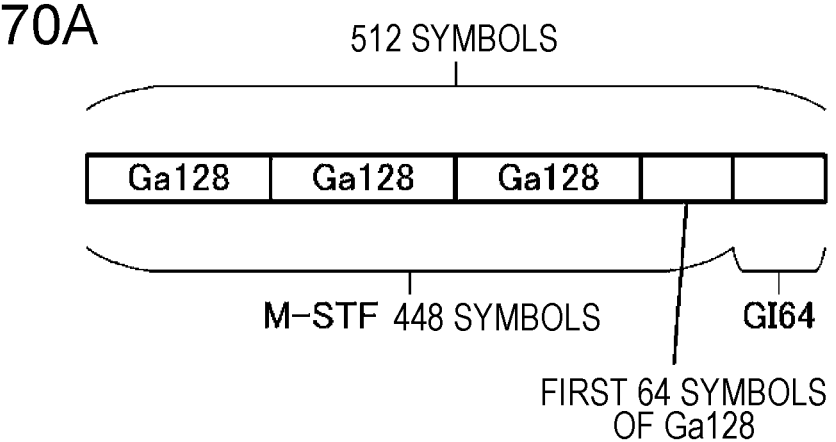
FIG. 70A is a diagram illustrating an example of the M-STF and the GI that follows the M-STF in M-STF Working Example 2.
Figure 70B:
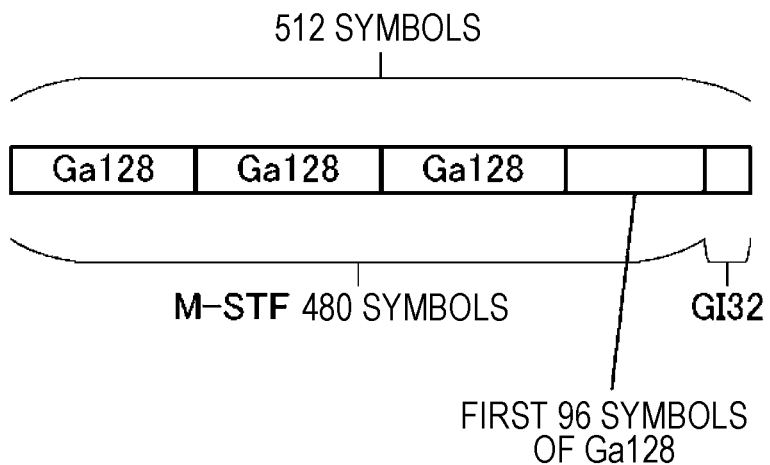
FIG. 70B is a diagram illustrating an example of the M-STF and the GI that follows the M-STF in M-STF Working Example 2.
Figure 70C:
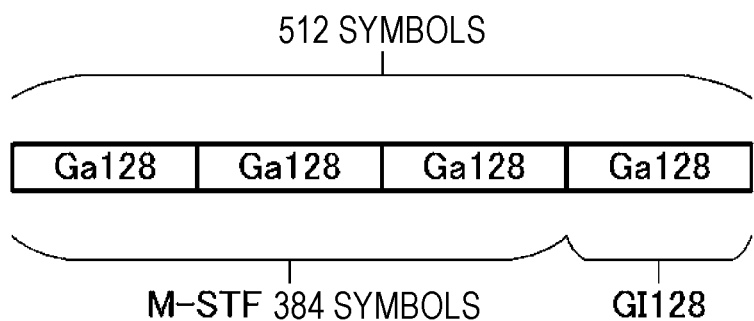
FIG. 70C is a diagram illustrating an example of the M-STF and the GI that follows the M-STF in M-STF Working Example 2.

FIGS. 70A, 70B, and 70C are diagrams illustrating an example of the M-STF and the GI that follows the M-STF in M-STF Working Example 2. Unlike FIGS. 69A, 69B, and 69C in which the pattern of the GI64 is repeated, the M-STF is formed by repeating a 128-symbol pattern (Ga128).

The transmitting device 100 may also use the pattern of the Ga128 included in the L-STF as the Ga128 in FIGS. 70A, 70B, and 70C. Note that in the 11ad standard, the transmitting device 100 generates the L-STF by repeating the Ga128 16 times and adding a sign-inversed −Ga128.

The transmitting device 100 may also use the same pattern as the GI128 as the Ga128 in FIGS. 70A, 70B, and 70C.

For a PHY frame with the Normal GI (FIG. 68A), the transmitting device 100 generates a 448-symbol M-STF field by using three of the Ga128 and the first 64 symbols of the Ga128 (FIG. 70A).

For a PHY frame with the Short GI (FIG. 68B), the transmitting device 100 generates a 480-symbol M-STF field by using three of the Ga128 and the first 96 symbols of the Ga128 (FIG. 70B).

For a PHY frame with the Long GI (FIG. 68C), the transmitting device 100 generates a 384-symbol M-STF field by using three of the Ga128 (FIG. 70C).

In M-STF Working Example 2, since the transmitting device 100 is able to generate the M-STF by using the Ga128, the M-STF may be generated with a simple circuit, and the circuit scale may be reduced.

Also, in FIGS. 70A, 70B, and 70C, since 512 symbols are formed by having GIs of different lengths follow the M-STF, the receiving device 200 is able to execute the AGC process using the M-STF by the same process regardless of the GI length.

Figure 71A:
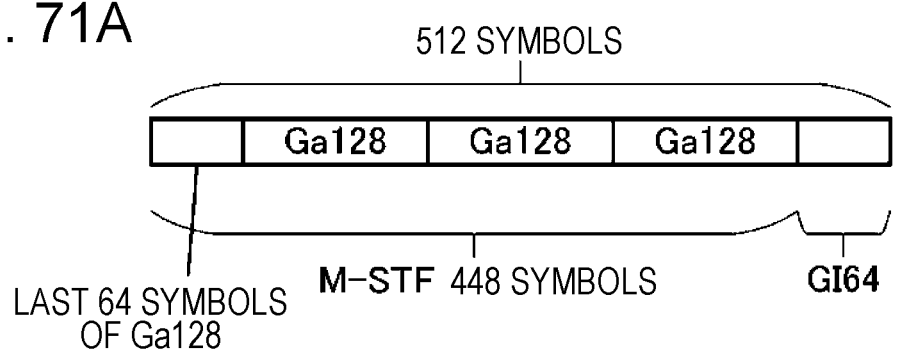
FIG. 71A is a diagram illustrating another example of the M-STF and the GI that follows the M-STF in M-STF Working Example 2.
Figure 71B:
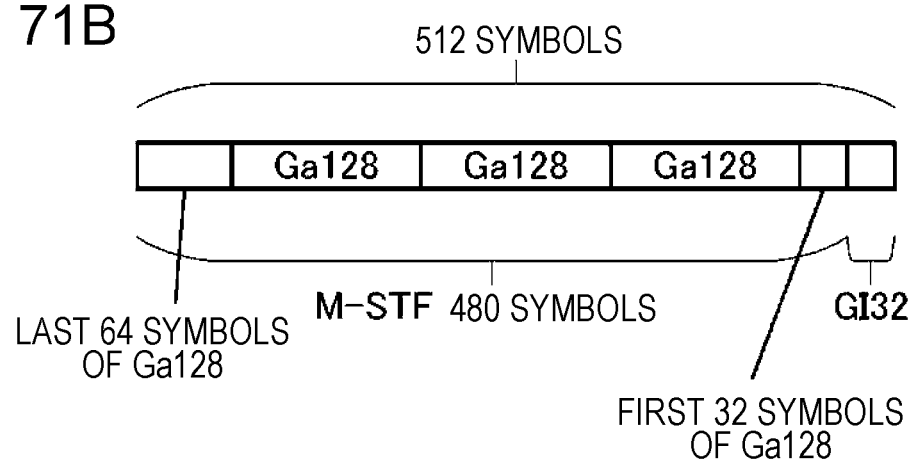
FIG. 71B is a diagram illustrating another example of the M-STF and the GI that follows the M-STF in M-STF Working Example 2.
Figure 71C:
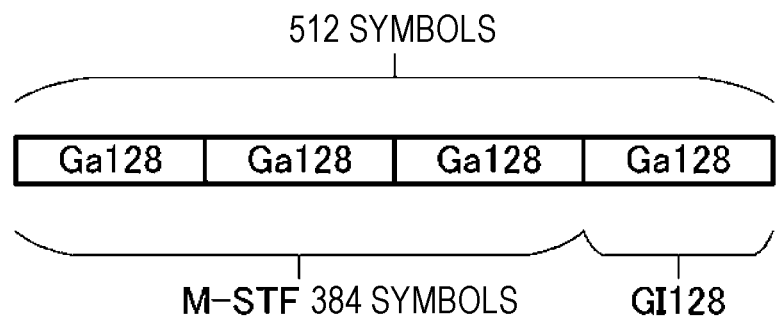
FIG. 71C is a diagram illustrating another example of the M-STF and the GI that follows the M-STF in M-STF Working Example 2.

FIGS. 71A, 71B, and 71C are respective modifications of the patterns in FIGS. 70A, 70B, and 70C, and namely are another example of diagrams illustrating an example of the M-STF and the GI that follows the M-STF in M-STF Working Example 2.

For a PHY frame with the Normal GI (FIG. 68A), the transmitting device 100 generates a 448-symbol M-STF field by using the last 64 symbols of the Ga128 and three of the Ga128 (FIG. 71A).

For a PHY frame with the Short GI (FIG. 68B), the transmitting device 100 generates a 480-symbol M-STF field by using the last 64 symbols of the Ga128, three of the Ga128, and the first 32 symbols of the Ga128 (FIG. 71B).

For a PHY frame with the Long GI (FIG. 68C), the transmitting device 100 generates a 384-symbol M-STF field by using three of the Ga128 (FIG. 71C). The pattern in FIG. 71C is the same as FIG. 70C.

In the case in which the pattern of the GI64 is the same as the first 64 symbols of the GI128, the pattern in FIG. 71A corresponds to a pattern obtained by cyclically shifting the pattern in FIG. 71C by 64 symbols.

Also, in the case in which the pattern of the GI64 is the same as the first 64 symbols of the GI128, and the pattern of the GI32 is the same as the last 32 symbols of the GI64, the pattern of FIG. 71A and the pattern of FIG. 71B corresponds to a pattern obtained by cyclically shifting the pattern in FIG. 71C by 64 symbols.

By using the Ga128, the transmitting device 100 is able to generate the M-STF of FIGS. 71A, 71B, and 71C, and thus the M-STF may be generated with a simple circuit, and the circuit scale may be reduced.

Also, in FIGS. 71A, 71B, and 71C, since the M-STF is a cyclic shifting of symbols from a common pattern, the receiving device 200 is able to execute the AGC process using the M-STF by the same process regardless of the GI length.

M-STF Working Example 3

Figure 72A:
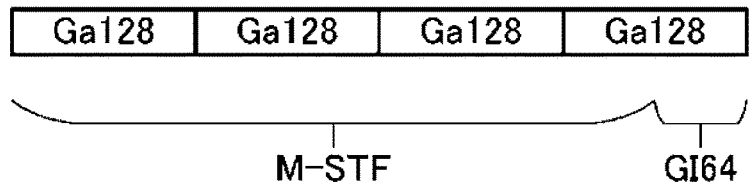
FIG. 72A is a diagram illustrating an example of the M-STF and the GI that follows the M-STF in M-STF Working Example 3.
Figure 72B:
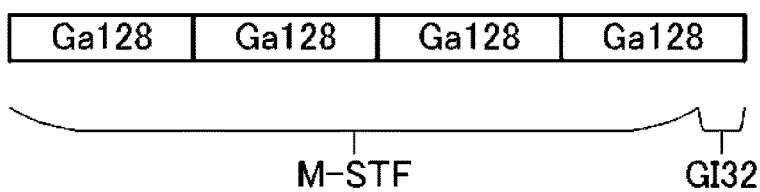
FIG. 72B is a diagram illustrating an example of the M-STF and the GI that follows the M-STF in M-STF Working Example 3.
Figure 72C:
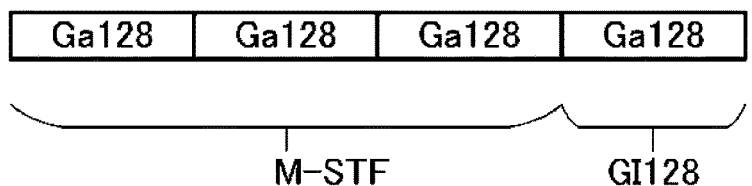
FIG. 72C is a diagram illustrating an example of the M-STF and the GI that follows the M-STF in M-STF Working Example 3.

FIGS. 72A, 72B, and 72C are diagrams illustrating an example of the M-STF and the GI that follows the M-STF in M-STF Working Example 3. FIGS. 72A, 72B, and 72C are cases of changing the GI pattern in FIGS. 70A, 70B, and 70C, respectively.

Figure 73:
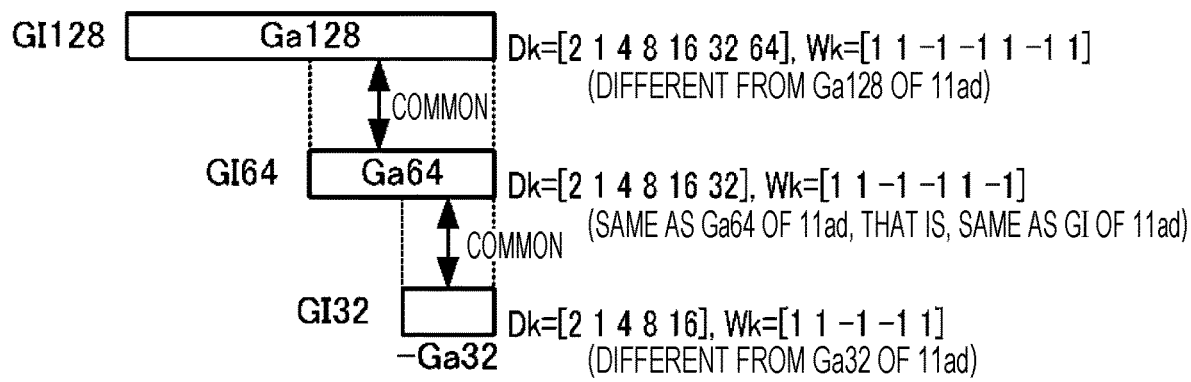
FIG. 73 is a diagram illustrating an example of a method of generating Ga128, GI128, GI64, and GI32 in M-STF Working Example 3.

FIG. 73 is a diagram illustrating an example of a method of generating the Ga128, GI128, GI64, and GI32 in each of FIGS. 72A, 72B, and 72C.

The method of generating Golay sequences that include the Ga128 is prescribed in 11ad, and is computed according to Formula (18) using the vectors $D_k$ and $W_k$.

$$A_0(n)=\delta(n)$$

$$B_0(n)=\delta(n)$$

$$A_k(n)=W_k A_{k-1}(n)+B_{k-1}(n-D_k)$$

$$B_k(n)=W_k A_{k-1}(n)-B_{k-1}(n-D_k) \quad \text{Formula (18)}$$

In Formula (18), for n=0, $\delta(n)=1$, whereas for n≠0, $\delta(n)=0$. Also, for n<0 and n≥$2^k$, $A_k(n)=0$ and $B_k(n)=0$.

The Ga128 in FIG. 73 is computed according to Formula (18) using the vectors $D_k$ and $W_k$ defined in Formula (19).

$$D_k=[2\ 1\ 4\ 8\ 16\ 32\ 64]$$

$$W_k=[1\ 1\ -1\ -1\ 1\ -1\ 1] \quad \text{Formula (19)}$$

From $A_k(n)$ computed according to Formula (18), Ga128 (n)=$A_7$(128−n). Note that the vectors $D_k$ and $W_k$ in Formula (19) are different from the Ga128 generation method in the 11ad standard.

Using the computed Ga128, the transmitting device 100 uses all symbols of the Ga128 as the GI128, uses the 64 symbols from the 65th symbol to the 128th symbol of the Ga128 as the GI64, and uses the 32 symbols from the 97th symbol to the 128th symbol of the Ga128 as the GI32 (see FIG. 73).

In the case of generating the Ga128 using the vectors $D_k$ and $W_k$ in Formula (19), the 64 symbols from the 65th symbol to the 128th symbol of the Ga128 are the same as the Ga64 of the 11ad standard. In other words, the GI64 of FIG. 73 is the same as the GI of the 11ad standard.

Figure 74:
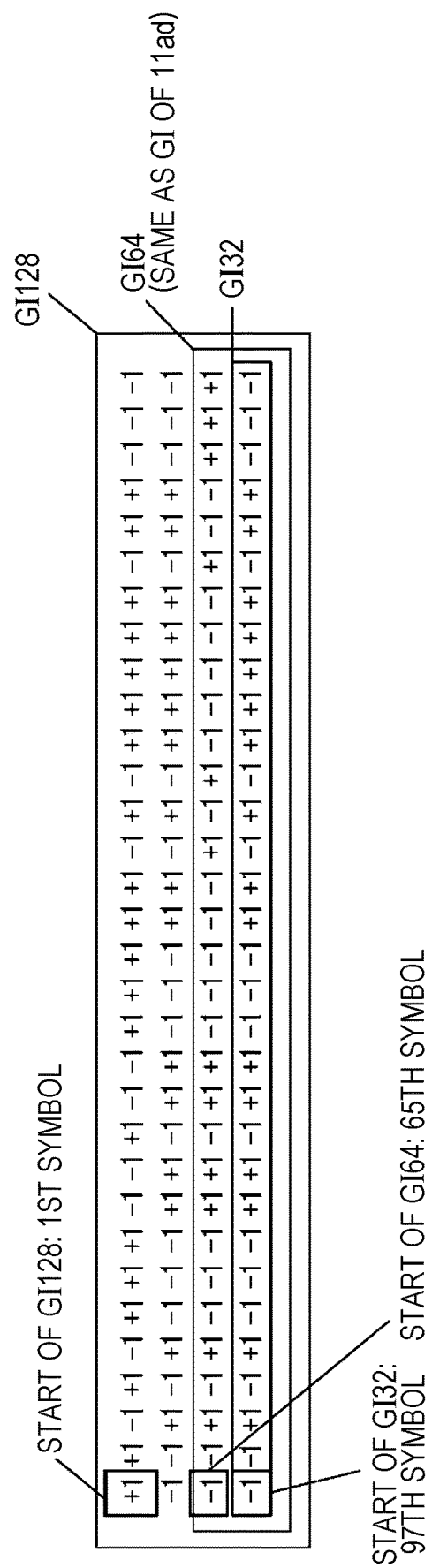
FIG. 74 is a diagram illustrating an example of the patterns of GI128, GI64, and GI32 in M-STF Working Example 3.

FIG. 74 is a diagram illustrating an example of the patterns of the GI128, GI64, and GI32 in FIG. 73.

Note that the pattern of the GI64 may be computed by Ga64(n)=$A_6$(64−n), where $A_k$(n) is computed using $D_k$ and $W_k$ in Formula (20).

$$D_k=[2\ 1\ 4\ 8\ 16\ 32]$$

$$W_k=[1\ 1\ -1\ -1\ 1\ -1] \quad \text{Formula (20)}$$

The GI64 in FIG. 74 and the Ga64(n) computed using Formula (20) are the same pattern. Also, the vectors $D_k$ and $W_k$ in Formula (20) are the same as the Ga64 generation method in the 11ad standard.

Note that for the pattern of the GI32, $A_k$(n) may be computed using $D_k$ and $W_k$ in Formula (21), substituted into Ga32(n)=$A_5$(32−n), and the sign of the computed Ga32 may be inversed (that is, GI32(n)=−Ga32(n)).

$$D_k=[2\ 1\ 4\ 8\ 16]$$

$$W_k=[1\ 1\ -1\ -1\ 1] \quad \text{Formula (21)}$$

The GI32 in FIG. 74 and the −Ga32(n) computed using Formula (21) are the same pattern. Also, the vectors $D_k$ and $W_k$ in Formula (21) are different from the Ga32 generation method in the 11ad standard.

The receiving device 200 may also apply a 512-point DFT to the patterns in FIGS. 72A, 72B, and 72C. Since the receiving device 200 uses the GI64 before the M-STF (see FIGS. 68A, 68B, and 68C) as the cyclic prefix in FIGS. 72A, 72B, and 72C, intersymbol interference may be reduced and the received signal of the M-STF may be converted into a frequency-domain signal.

The receiving device 200 may also use the received signal of the M-STF converted into a frequency-domain signal to compute the symbol synchronization residual error, the carrier frequency synchronization residual error, and the phase noise variance. With this arrangement, the accuracy of symbol synchronization with respect to data symbols, carrier frequency synchronization, and the suppression of phase noise may be increased, the received signal quality may be increased, and the error rate may be reduced.

M-STF Working Example 4

Figure 75A:
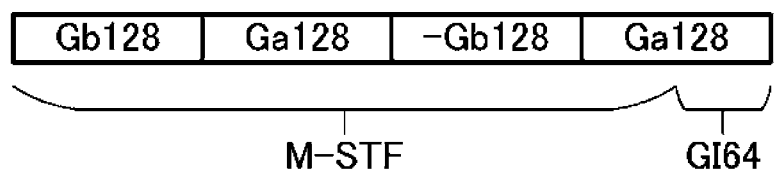
FIG. 75A is a diagram illustrating an example of the M-STF and the GI that follows the M-STF in M-STF Working Example 4.
Figure 75B:
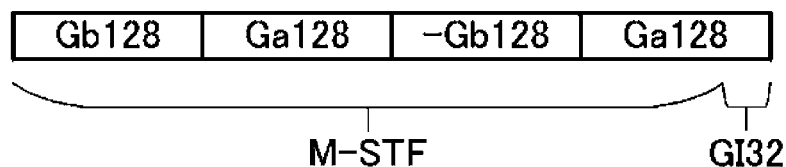
FIG. 75B is a diagram illustrating an example of the M-STF and the GI that follows the M-STF in M-STF Working Example 4.
Figure 75C:
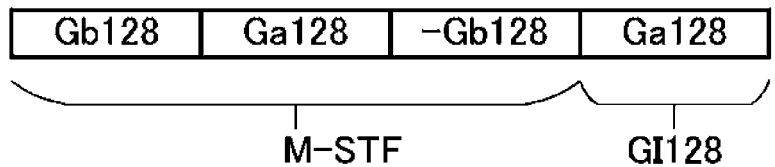
FIG. 75C is a diagram illustrating an example of the M-STF and the GI that follows the M-STF in M-STF Working Example 4.

FIGS. 75A, 75B, and 75C are diagrams illustrating an example of the M-STF and the GI that follows the M-STF in M-STF Working Example 4.

FIGS. 75A, 75B, and 75C use the same Ga128 as M-STF Working Example 3, and the patterns of the GI128, GI64, and GI32 are the same as M-STF Working Example 3 (see FIG. 73, FIG. 74, and Formula (19)).

In FIGS. 75A, 75B, and 75C, the pattern of Gb128 is computed using Formula (18) and Formula (19). Herein, Gb128(n)=$B_7$(128−n). In other words, the 64 bits from the 1st bit to the 64th bit of Gb128 is the sign-inversed pattern of the 64 bits from the 1st bit to the 64th bit of Ga128, and the 64 bits from the 65th bit to the 128th bit of Gb128 is the same pattern as the 64 bits from the 65th bit to the 128th bit of Ga128.

Figure 76:
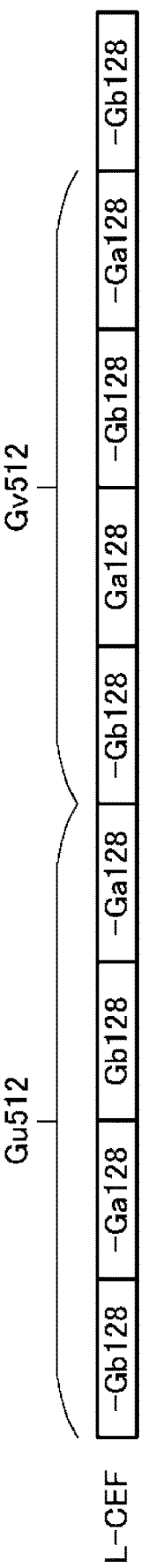
FIG. 76 is a diagram illustrating an example of a pattern of arranging Ga128 and Gb128 in M-STF Working Example 4.

In FIGS. 75A, 75B, and 75C, the examples of the patterns of placing the Ga128 and the Gb128 are the sign-inversed patterns of the Gu512, which is the first half of the CEF in the 11ad standard as illustrated in FIG. 76. Note that the formula (Formula (19)) for generating the Ga128 and Gb128 in FIGS. 75A, 75B, and 75C is different from FIG. 76.

By setting the channel estimator 2030 to use the Ga128 and Gb128 patterns different from the L-CEF, the receiving device 200 is able to use the M-STF field to execute channel estimation similarly to the case of using the Gu512 of the L-CEF. In other words, since the circuit of the channel estimator 2030 may be reused for channel estimation of the M-STF, increases in the circuit scale may be minimized, the channel estimation accuracy may be improved, and the received signal quality may be increased.

Since the receiving device 200 is able to execute channel estimation using the M-STF in addition to the L-CEF, the reception accuracy in the Data field may be increased. Also, since the patterns in FIGS. 75A, 75B, and 75C are 512 symbols regardless of the GI length, it is not necessary to change the DFT window timing according to the GI (see FIGS. 68A, 68B, and 68C), and the circuit scale of the receiving device circuit may be reduced.

Figure 77A:
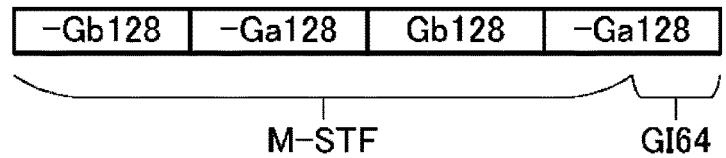
FIG. 77A is a diagram illustrating another example of the M-STF and the GI that follows the M-STF in M-STF Working Example 4.
Figure 77B:
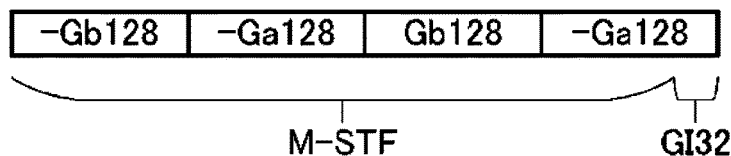
FIG. 77B is a diagram illustrating another example of the M-STF and the GI that follows the M-STF in M-STF Working Example 4.
Figure 77C:
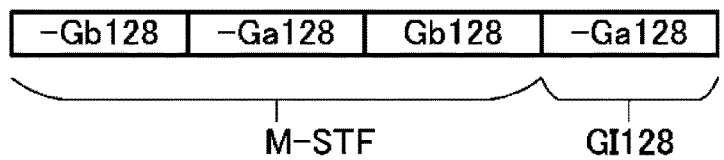
FIG. 77C is a diagram illustrating another example of the M-STF and the GI that follows the M-STF in M-STF Working Example 4.

FIGS. 77A, 77B, and 77C are other examples of the M-STF resembling FIGS. 75A, 75B, and 75C, respectively.

In FIGS. 77A, 77B, and 77C, the patterns of placing the Ga128 and the Gb128 are the same patterns as the Gu512, which is the first half of the CEF in the 11ad standard as illustrated in FIG. 76. Note that the formula for generating the Ga128 and Gb128 in FIGS. 77A, 77B, and 77C is different from FIG. 76.

The Ga128 and Gb128 used in FIGS. 77A, 77B, and 77C are computed similarly to FIG. 73, using $D_k$ and $W_k$ of Formula (22) instead of Formula (19).

$$D_k=[2\ 1\ 4\ 8\ 16\ 32\ 64]$$

$$W_k=[1\ 1-1\ -1\ 1\ 1\ -1\ -1] \quad \text{Formula (22)}$$

The difference between Formula (19) and Formula (22) is the value of $W_7$. In Formula (19), $W_7=1$, but in Formula (22), $W_7=-1$.

Figure 78:
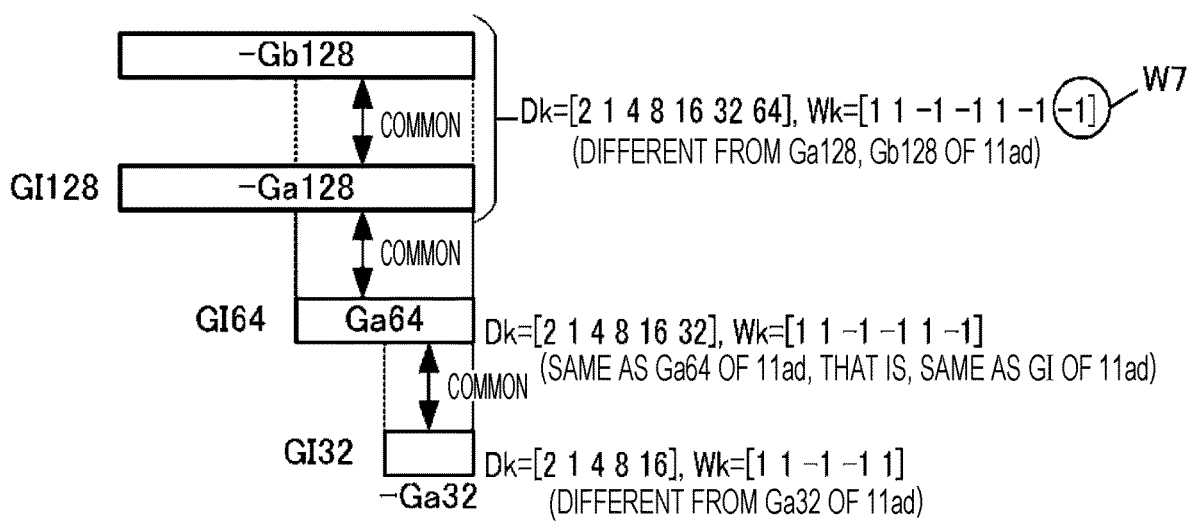
FIG. 78 is a diagram illustrating an example of a method of generating GI64 and GI32 in M-STF Working Example 4.

FIG. 78 is a diagram illustrating an example of a method of generating the Ga128, GI128, GI64, and GI32 used in each of FIGS. 77A, 77B, and 77C. The Ga128 computed using Formula (22) is used to set GI128=−Ga128. Also, the last 64 symbols of the GI128 (that is, −Ga128) is used as the GI64, and the last 32 symbols of the GI128 (that is, −Ga128) is used as the GI32.

Figure 79A:
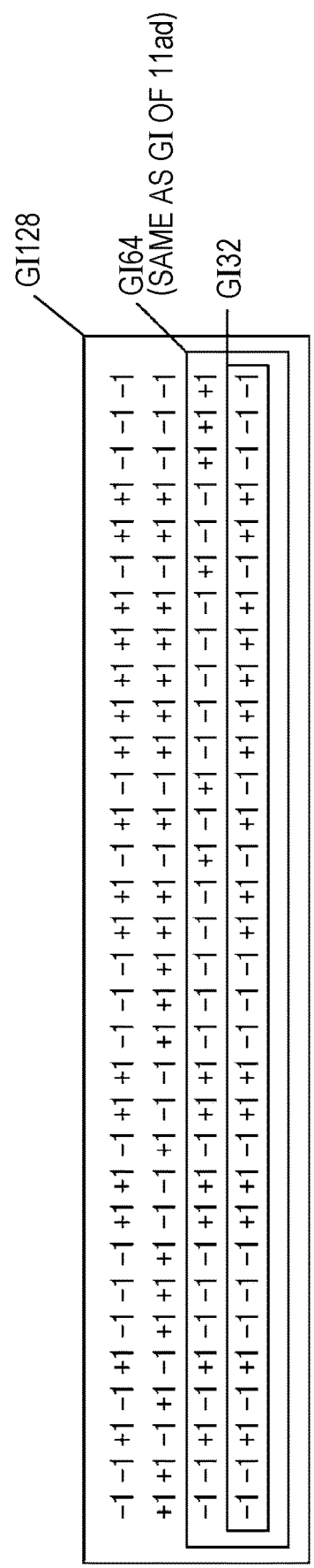
FIG. 79A is a diagram illustrating an example of the patterns of –Ga128 and GI128, GI64, and GI32 in M-STF Working Example 4.

The GI64 computed as above is the same as the GI of the 11ad standard. FIG. 79A is a diagram illustrating an example of the patterns of the −Ga128, Ga128, GI128, GI64, and GI32 used in each of FIGS. 77A, 77B, and 77C. Also, FIG. 79B is a diagram illustrating the pattern of the −Gb128 used in FIGS. 77A, 77B, and 77C.

The −Ga128 of FIG. 79A is a pattern obtained by swapping the first and second rows of the Ga128 in FIG. 74. Also, the −Gb128 of FIG. 79B is a pattern obtained by inverting the signs of the first 64 symbols of the −Ga128 in FIG. 79A.

Figure 79B:
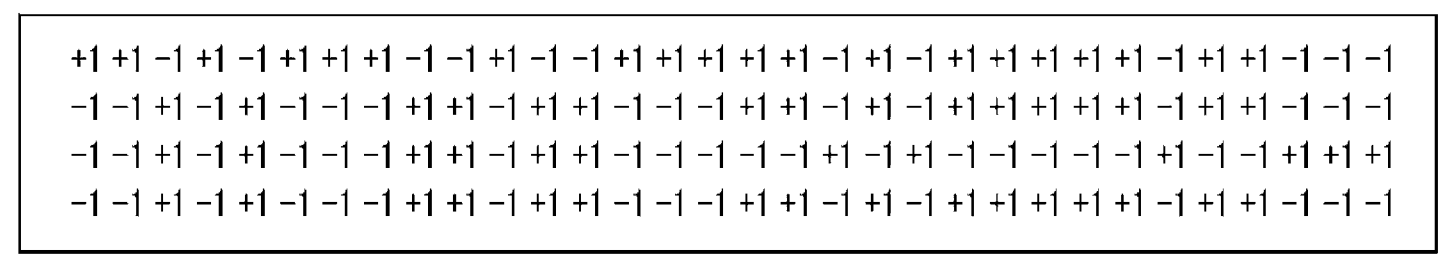

In the case of using the Ga128 and the Gb128 of FIGS. 79A and 79B, the receiving device 200 (11ay terminal) is able to utilize the GI before the M-STF as a cyclic prefix, and compute the DFT of the patterns in FIGS. 77A, 77B, and 77C. Consequently, similarly to FIGS. 75A, 75B, and 75C, the receiving device 200 is able to execute highly accurate channel estimation using the M-STF of FIGS. 77A, 77B, and 77C.

According to the modification of Embodiment 12, since the transmitting device 100 transmits with the M-STF inserted into the PHY frame, it is possible to reduce error in the computation of the PHY frame length using the Length of the L-Header in the receiving device 300 (11ad terminal).

Also, according to the modification of Embodiment 12, since the transmitting device 100 transmits with the M-STF inserted into the PHY frame, the adjustment of the DFT window interval in the receiving device 200 may be omitted, and the circuit scale of the receiving device may be reduced. Also, since the receiving device 200 is able to execute channel estimation using the M-STF, the circuit scale may be reduced and the received signal quality may be improved.

Modification of Embodiment 3

Figure 80A:
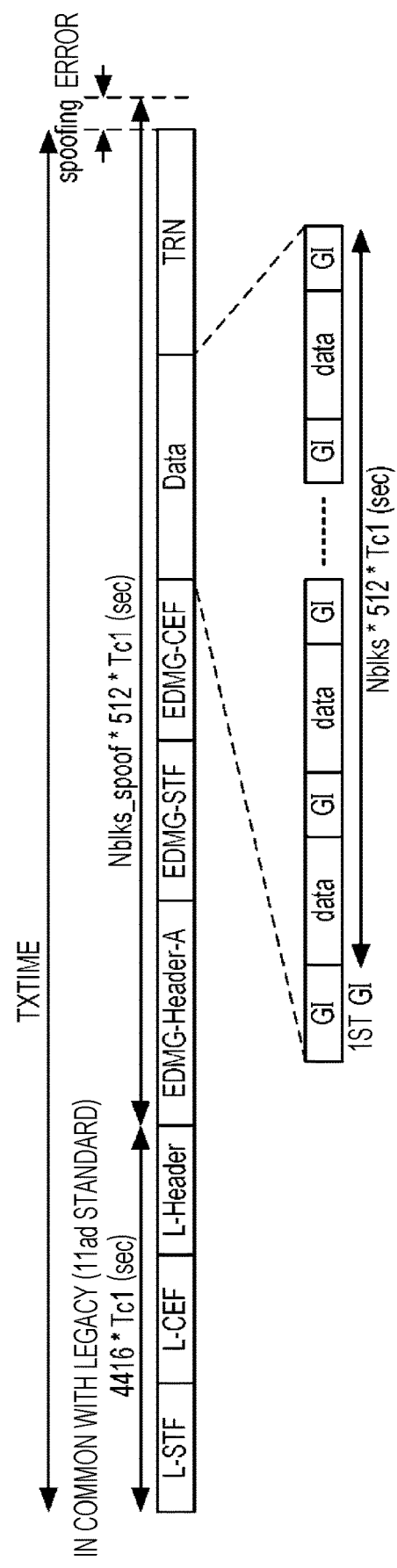
Figure 80B:
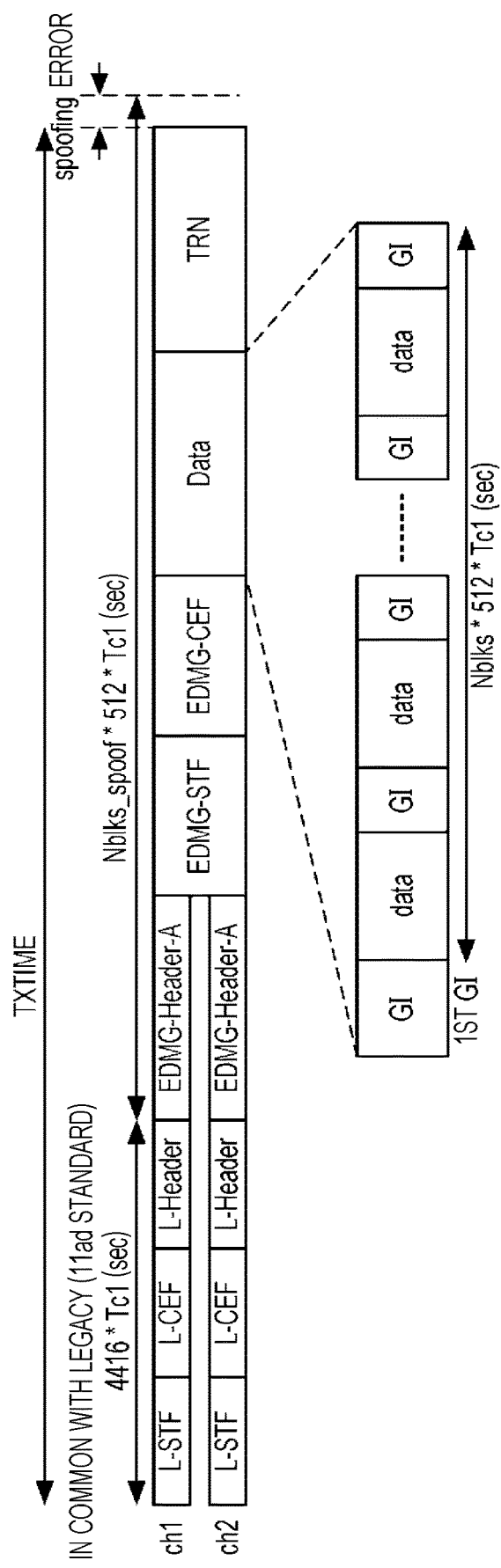

FIGS. 80A and 80B are diagrams illustrating examples of the PHY frame formats in a modification of Embodiment 3. FIG. 80A is a diagram illustrating an example of a PHY frame for single-channel transmission, that is, the case of not applying channel bonding. Also, FIG. 80B is a diagram illustrating an example of a PHY frame for the case of applying channel bonding.

The PHY frame includes the L-STF field, the L-CEF field, the L-Header field, the EDMG-Header-A field, the EDMG-STF field, the EDMG-CEF field, the Data field, and a TRN field. Also, the Data field includes GI blocks and data blocks. The GI block at the beginning of the Data field is called the 1st GI.

The number of data blocks included in the Data field is expressed as Nblks. Also, the length of the PHY frame (the time taken to transmit) is called the TXTIME. Also, the value obtained by converting TXTIME to the number of blocks in a PHY frame of the 11ad standard is called Nblks spoof. Nblks spoof is similar to N_BLKS in Embodiments 1 to 12, but is called Nblks spoof to distinguish from Nblks.

In FIG. 80A, the transmitting device 100 transmits using a format similar to the STF, CEF, and Header of the 11ad standard for each of the L-STF field, the L-CEF field, and the L-Header field.

In FIG. 80B, the transmitting device 100 transmits with each of the L-STF field, the L-CEF field, and the L-Header field duplicated in multiple channels used for channel bonding, in a format similar to the STF, CEF, and Header of the 11ad standard. FIG. 80B illustrates an example of the PHY frame by which channel bonding transmission is executed on two channels, namely ch1 and ch2.

The L-STF field, the L-CEF field, and L-Header field are 4416×Tc1 seconds in total. Herein, Tc1 is the symbol time of a single carrier in the 11ad standard, and is approximately 0.57 nanoseconds.

In the case of transmitting the PHY frames of FIGS. 80A and 80B, the transmitting device 100 sets the values of the MCS and Length fields (the value of the PSDU Length) in the L-Header to enable the receiving device 200 of the 11ad standard receiving the PHY frame to compute the value or an approximate value of TXTIME. As the procedure for setting the values of the MCS and Length fields in the L-Header, the methods illustrated in FIG. 5, FIG. 11, FIG. 16, FIG. 17, FIG. 19A, FIG. 19B, FIG. 24, FIG. 27, FIG. 29, and FIG. 31 may be used.

The difference between the TXTIME of the PHY frames in FIGS. 80A and 80B, and the TXTIME computed by the receiving device 200 of the 11ad standard (designated TXTIME spoof because this value differs from the actual TXTIME), is called the spoofing error.

The spoofing error (spoofing error) is determined by Formula (23).

$$\text{spoofing error}=\text{TXTIME spoof}-\text{TXTIME} \quad \text{Formula (23)}$$

In other words, when the spoofing error is a positive value, the TXTIME computed by the receiving device 200 of the 11ad standard from the value of the L-Header (TXTIME spoof) is longer than the actual TXTIME, whereas when the spoofing error is a negative value, the TXTIME computed by the receiving device 200 of the 11ad standard from the value of the L-Header (TXTIME spoof) is shorter than the actual TXTIME.

Figure 81:
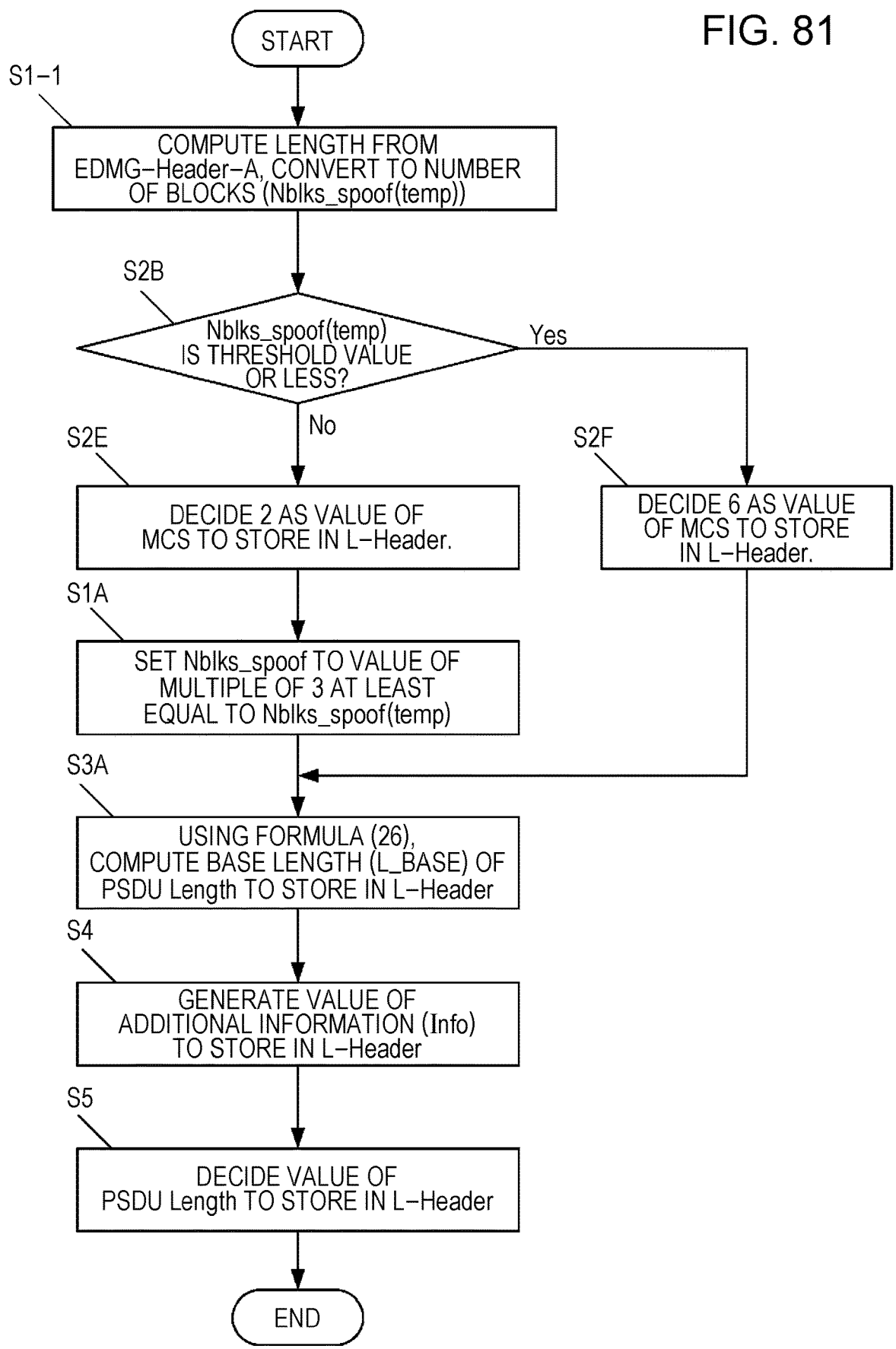

FIG. 81 is a flowchart illustrating the process of computing the values of the MCS and Length fields in the L-Header. Since the transmitting device 100 transmits the PHY frames in FIGS. 80A and 80B, the case of computing the values of the MCS and Length fields in the L-Header by using the procedure in FIG. 16 will be described in detail using FIG. 81. Note that in FIG. 81, Nblks spoof is denoted instead of N_BLKS in FIG. 16. Also, FIG. 81 includes steps S1-1, S2E, S2F, and S4A instead of steps S1, S2C, S2D, and S4 in FIG. 16. Unlike FIG. 16, the transmitting device 100 does not select the N_ratio in steps S2E and S2F.

(Step S1-1)

The transmitting device 100 computes the length from the EDMG-Header-A, and converts the computed length into a number of blocks (Nblks spoof). The transmitting device 100 may also compute the value of Nblks spoof using Formula (24).

$$Nblks\_spoof(temp)$$

$$= \text{ceiling}((TXTIME - 4416 * Tcl)/(512 * Tcl))$$
$$= \text{ceiling}((TXTIME/Tcl - 4416)/512)$$
$$= \text{ceiling}(TXTIME/Tcl/512 - 8.625)$$

Formula (24)

Note that since the transmitting device 100 replaces the value of Nblks spoof computed in step S1-1 with a different value in a later step (for example, step S1A) in some cases, the value computed in step S1-1 is distinguished by being designated Nblks_spoof(temp).

(Step S2B)

The transmitting device 100 determines whether or not the value of Nblks_spoof(temp) is a threshold value or less. As illustrated in Embodiment 3, in the case in which the MCS used in step S2F is 6, the transmitting device 100 may use 4682 as the threshold value. In addition, the transmitting device 100 may also use a value less than 4682 as the threshold value. For example, by using the value of a power of 2 that is less than 4682, such as 128, 256, 512, 1024, 2048, or 4096 as the threshold value, the transmitting device 100 is able to make the threshold value determination with a trivial calculation.

Note that in step S2B, the transmitting device 100 may also set 3428 as the threshold value with respect to the value of Nblks_spoof(temp). This is a result similar to the case of setting the threshold value of TXTIME to 1 millisecond. The reason for this is that the length of a PHY frame having an Nblks_spoof value of 3428 is approximately 1 millisecond.

Note that in step S2B, instead of making the threshold value determination with respect to the value of Nblks_spoof(temp), the transmitting device 100 may also determine whether or not TXTIME is a threshold value or less. For example, the transmitting device 100 may set the threshold value of TXTIME to 1 millisecond.

(Step S2F)

In the case of determining that Nblks_spoof(temp) is the threshold value or less in step S2B, the transmitting device 100 decides 6 as the MCS to store in the L-Header.

Note that in step S2F, the transmitting device 100 may also set the value of the MCS to store in the L-Header to a value of 7 or greater. In other words, in step S2F, the transmitting device 100 selects an MCS with no restrictions regarding the value of dividing Nblks_spoof by 3, labeled Condition 2 in FIG. 14.

In step S2F, the transmitting device 100 sets the value of Nblks_spoof to be a value equal to the value of Nblks_spoof (temp).

(Step S2E)

In the case of determining that Nblks_spoof(temp) is not the threshold value or less in step S2B, the transmitting device 100 decides 2 as the MCS to store in the L-Header.

Note that in step S2E, the transmitting device 100 may also set the value of the MCS to store in the L-Header to a value different from 2. In other words, in step S2E, the transmitting device 100 may set the value of the MCS to store in the L-Header so that the value of Nblks_spoof(temp) is smaller than the maximum value of N_BLKS labeled Condition 1 in FIG. 14.

(Step S1A)

In step S2E, in the case of selecting an MCS of 5 or less, the transmitting device 100 selects a multiple of 3 that is equal to or greater than Nblks_spoof(temp), and sets the selected value as the value of Nblks_spoof. The transmitting device 100 may also use Formula (25) to set the value of Nblks_spoof.

$$Nblks\_spoof = \text{ceiling}(Nblks\_spoof(temp)/3) \times 3$$

Formula (25)

For example, in the case in which the value of Nblks_spoof(temp) is 301, the transmitting device 100 may set the value of Nblks_spoof to 303.

With this arrangement, the transmitting device 100 is able to avoid setting a value whereby dividing the value of Nblks_spoof by 3 results in 1. In other words, Condition 2 in FIG. 14 is satisfied.

(Step S3A)

The transmitting device 100, using the value of Nblks_spoof and the value of the MCS to store in the L-Header, computes the base value (L_BASE) of the PSDU Length to store in the L-Header. The formula for computing L_BASE is as indicated in Formula (1) or Formula (2) illustrated in Embodiment 1. The formulas for each MCS to store in the L-Header are illustrated in Formula (26).

MCS1: $L\_BASE = \text{floor}(Nblks\_spoof \times 2/3) \times 21$

MCS2: $L\_BASE = \text{floor}(Nblks\_spoof \times 2/3) \times 42$

MCS3: $L\_BASE = \text{floor}(\text{floor}(Nblks\_spoof \times 2/3) \times 52.5)$ MCS4: $L\_BASE = \text{floor}(Nblks\_spoof \times 2/3) \times 63$ MCS5: $L\_BASE = \text{floor}(\text{floor}(Nblks\_spoof \times 2/3) \times 68.25)$ MCS6: $L\_BASE = \text{floor}(Nblks\_spoof \times 4/3) \times 42$ MCS7: $L\_BASE = \text{floor}(\text{floor}(Nblks\_spoof \times 4/3) \times 52.5)$ MCS8: $L\_BASE = \text{floor}(Nblks\_spoof \times 4/3) \times 63$ MCS9: $L\_BASE = \text{floor}(\text{floor}(Nblks\_spoof \times 4/3) \times 68.25)$ MCS10: $L\_BASE = \text{floor}(Nblks\_spoof \times 8/3) \times 42$ MCS11: $L\_BASE = \text{floor}(\text{floor}(Nblks\_spoof \times 8/3) \times 52.5)$ MCS12: $L\_BASE = \text{floor}(Nblks\_spoof \times 8/3) \times 63$ Formula (26)

Formula (26) is similar to the case of replacing the PSDU Length with L_BASE and removing the −Info term in Formula (3) illustrated in Embodiment 1.

Since step S4 and step S5 are similar to FIG. 16, a description is omitted.

Figure 82:
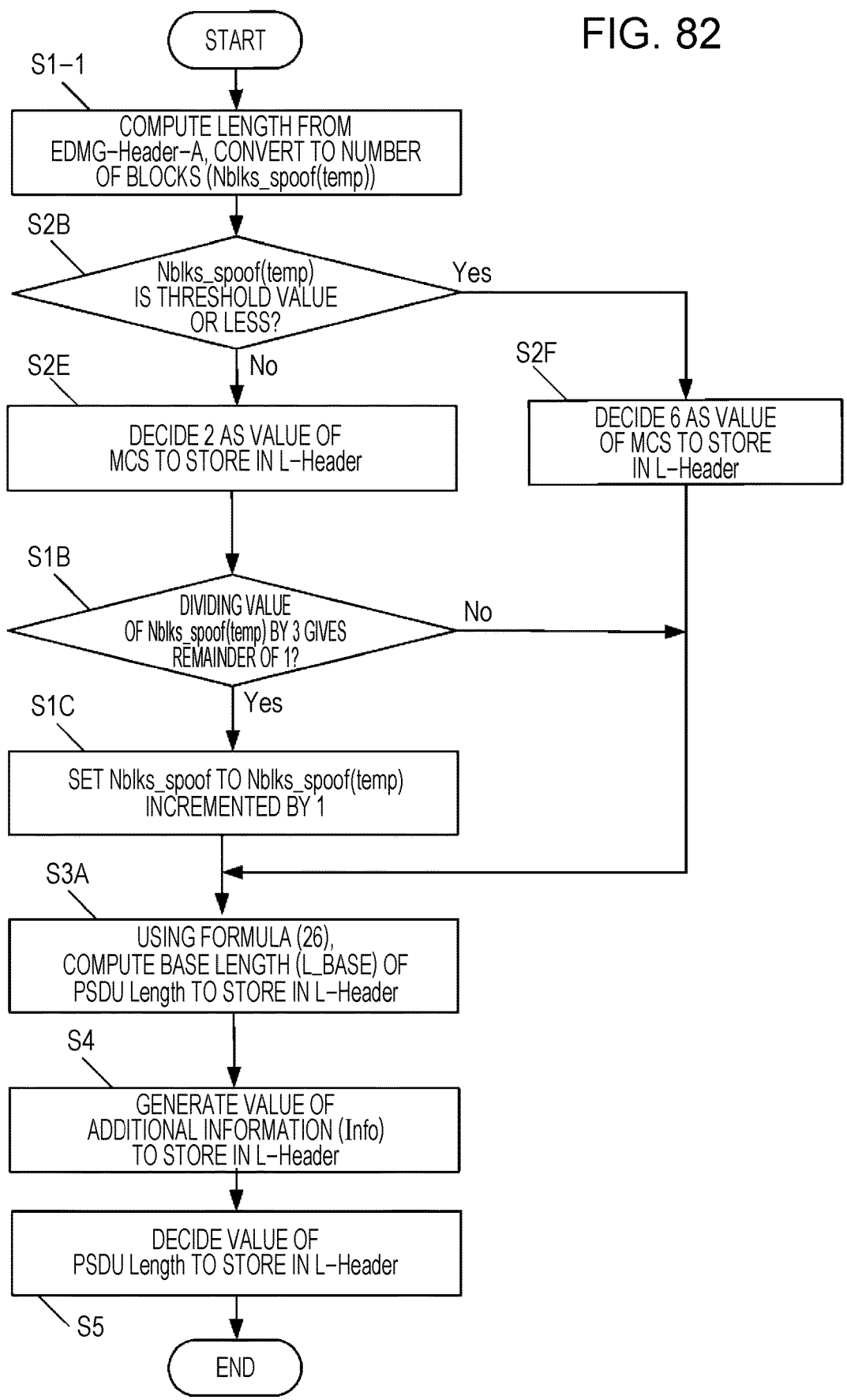

Note that in step S1A, to avoid a value whereby dividing the value of Nblks_spoof by 3 gives a remainder of 1, the transmitting device 100 is configured to replace the value of Nblks_spoof with the value of a multiple of 3 that is equal to or greater than Nblks_spoof(temp) computed in step S1-1, but a different method illustrated in FIG. 82 may also be used.

Compared to FIG. 81, FIG. 82 includes a step S1B and a step S1C instead of step S1A. Description will be omitted for the portions which are the same as FIG. 81.

(Step S1B)

In step S1B, the transmitting device 100 determines whether or not dividing the value of Nblks_spoof(temp) by 3 gives a remainder of 1. If the determination result is Yes, the process in step S1C is executed.

(Step S1C)

In step S1C, the transmitting device 100 sets the value obtained by adding 1 to Nblks_spoof(temp) as the value of Nblks_spoof. With this arrangement, in the case in which dividing the value of Nblks_spoof(temp) by 3 gives a remainder of 1, dividing the value of Nblks_spoof by 3 gives a remainder of 2.

In other words, in step S1A of FIG. 16 and FIG. 81, in the case in which dividing the value of Nblks_spoof(temp) gives a remainder of 1, the transmitting device 100 sets the value of Nblks_spoof to a multiple of 3 equal to or greater than Nblks_spoof(temp). This is equivalent to the transmitting device 100 setting the value obtained by adding 2 to the value of Nblks_spoof(temp) as the value of Nblks_spoof. In contrast, since the value of Nblks_spoof computed by the transmitting device 100 in step S1C of FIG. 82 is smaller than the value of Nblks_spoof computed by the transmitting device 100 in step S1A of FIG. 16 and FIG. 81, the spoofing error may be reduced.

Figure 83:
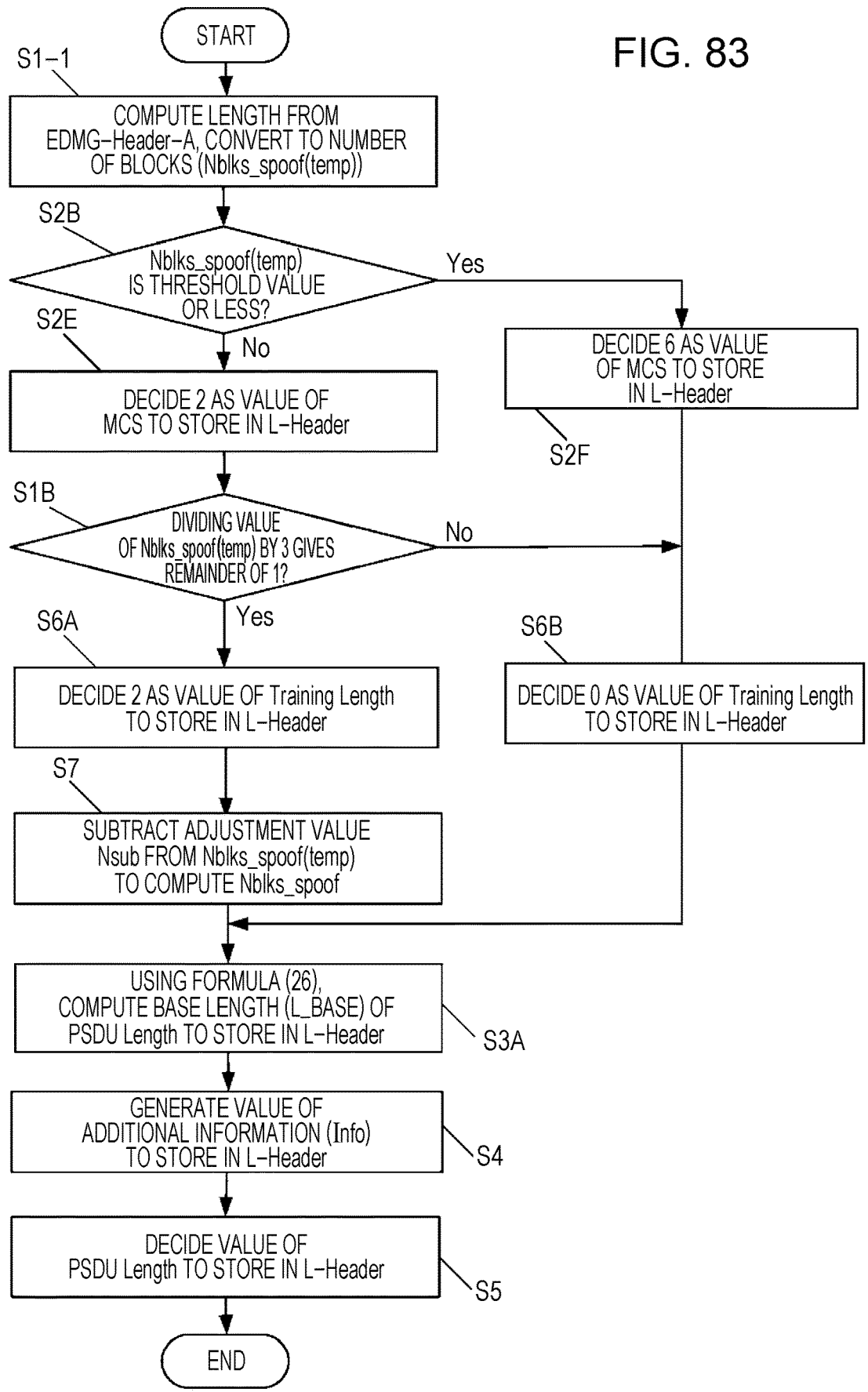

FIG. 83 is a flowchart illustrating another example of a process of computing the values of the MCS and Length fields in the L-Header.

In FIG. 83, unlike FIG. 82, to reduce the spoofing error, a value other than 0 is set in the Training Length (also called TRN_LEN) field of the L-Header (see FIG. 38) according to the value of Nblks_spoof (step S6A). Compared to FIG. 82, in FIG. 83, steps S6A and S7 are added after step S1B, and S6B is added after S2F. Description will be omitted for the portions which are the same as FIGS. 81 and 82.

Figure 84:
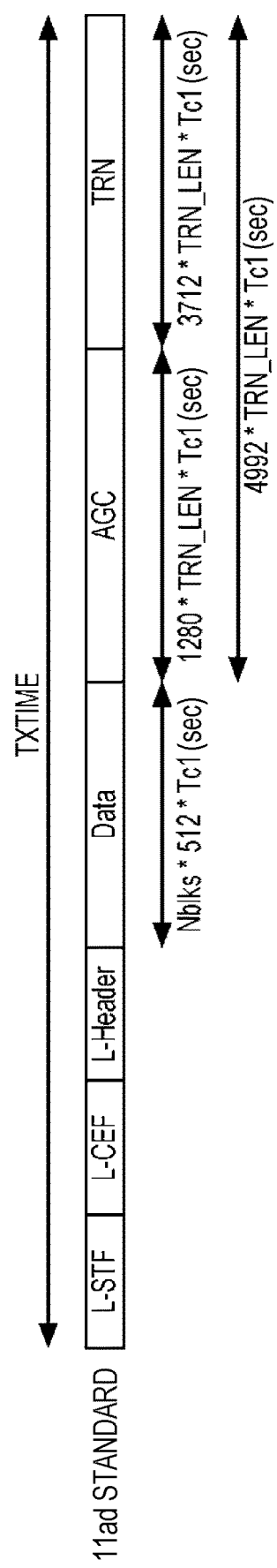

First, the PHY frame format will be described. FIG. 84 is a diagram illustrating an example of the PHY frame format in the 11ad standard. FIG. 84 is the PHY frame format in which the value of the Training Length (TRN_LEN) field is 1 or greater in the 11ad standard. The PHY frame in FIG. 84 is a frame in which an AGC field and a TRN field are added to the PHY frame in FIG. 1.

The length of the AGC field is determined according to the value of TRN_LEN, and is 1280×TRN_LEN×Tc1 seconds. Also, the length of the TRN field is determined according to the value of TRN_LEN, and is 3712×TRN_LEN×Tc1 seconds.

Since the sum of the AGC field and the TRN field is 4992×TRN_LEN×Tc1 seconds, adding 1 to the value of TRN_LEN causes the TXTIME of the PHY frame of the 11ad standard to increase 4992×TRN_LEN×Tc1 seconds.

In other words, by setting the value of the Training Length (TRN_LEN) field in the L-Header to a value other than 0, the transmitting device 100 is able to change the value of TXTIME spoof. Next, FIG. 83 will be used to describe a method by which the transmitting device 100 decides the value of TRN_LEN.

(Step S6A)

In step S2E, the transmitting device 100 decides the value of the MCS to store in the L-Header to be 5 or less (for example, 2), and in the case in which dividing the value of Nblks_spoof(temp) by 3 in step S1B results in a value of 1, the transmitting device 100 sets the value of the Training Length field in the L-Header to 2.

(Step S7)

In the case of deciding the value of the Training Length in the L-Header to be 2 in step S6A, the transmitting device 100 sets the value obtained by subtracting an adjustment value Nsub from Nblks_spoof(temp) as the value of Nblks_spoof.

In the case in which Nmin error computed according to Formula (27A) and Formula (27B) is less than 256, the transmitting device 100 sets the value of Nsub to 19. Also, in the case in which the value of Nmin error is 256 or greater, the transmitting device 100 sets the value of Nsub to 20.

$$Nrem=(TXTIME/Tc1 - 4416) \bmod 512 \quad \text{Formula (27A)}$$

$$Nmin\_error=(-Nrem) \bmod 512 \quad \text{Formula (27B)}$$

Nrem represents the value obtained by converting the length of the portion from the EDMG-Header-A in the 11ay PHY frame to a number of symbols in the 11ad standard (that is, dividing by Tc1), dividing by 512 (that is, the number of symbols in a symbol block of the 11ad standard), and taking the remainder. In other words, Nrem is the number of symbols expressing the fractional amount after converting the length of the 11ay PHY frame to a number of symbol blocks in an 11ad PHY frame, this fractional amount being difficult to convert into a number of symbol blocks because the length is shorter than the length of a symbol block.

In the case in which the transmitting device 100 sets the value of the TRN_LEN field to 0, the spoofing error is Nmin_error or greater.

In step S7 of FIG. 83, since the value of Nsub is set to 19 or 20 (that is, not a multiple of 3), in the case in which dividing the value of Nblks_spoof(temp) by 3 gives a remainder of 1, the value obtained by subtracting Nsub from Nblks_spoof(temp), namely Nblks_spoof, and dividing by 3 gives a remainder other than 1. In other words, Condition 2 in FIG. 14 is satisfied.

The reason why the transmitting device 100 sets the value of the Training Length field to 2 in step S2E and sets the value of Nsub to 19 or 20 in step S7 will be described.

Figure 85:
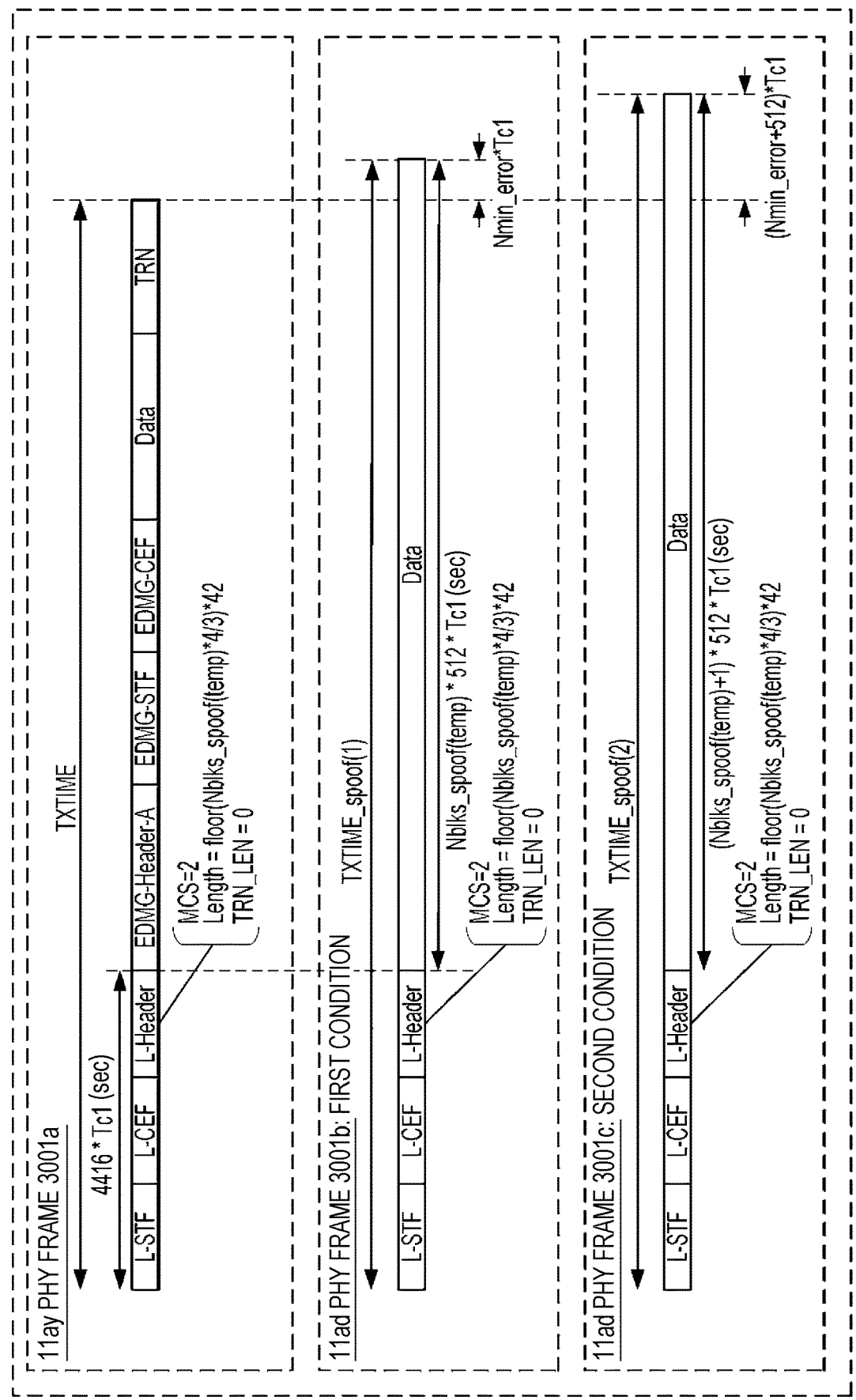

FIG. 85 is a diagram illustrating an example of the PHY frame format in the 11ay standard. The PHY frame 3001a in FIG. 85 is a PHY frame of the 11ay standard. The transmitting device 100 may also use the value of Nblks_spoof (temp) computed according to Formula (24) as the value of Nblks_spoof, and set the value of L_BASE computed according to Formula (26) as the value of the Length field in the L-Header.

(First Condition)

First, the case in which the value of the MCS field in the L-Header is 6 or greater, and the case in which the value of the MCS field in the L-Header is 5 or less and dividing Nblks_spoof(temp) by 3 gives a remainder other than 1, will be described.

In the first condition, in the case of receiving the PHY frame 3001a, the receiving device 200 of the 11ad standard assumes that a PHY frame in which the length of the Data field is "Nblks_spoof(temp)×512×Tc1" seconds (PHY frame 3001b of the 11ad standard) has been received, and calculates TXTIME. Provided that the TXTIME of the PHY frame 3001b is denoted TXTIME_spoof(1), TXTIME_spoof(1) becomes the value computed by Formula (27C).

$$TXTIME\_spoof(1)=(4416+Nblks\_spoof(temp) \times 512) \times Tc1 \quad \text{Formula (27C)}$$

The spoofing error of the PHY frame 3001a is "TXTIME_spoof(1)−TXTIME", and is equal to "Nmin_error×Tc1".

Note that in the case in which the MCS and Length values in the L-Header satisfy Condition 2 of FIG. 14, Nmin_error is at least 0 and less than 512.

(Second Condition)

The case in which the value of the MCS field in the L-Header is 5 or less and dividing Nblks_spoof(temp) by 3 gives a remainder of 1 will be described.

In the second condition, in the case of receiving the PHY frame 3001a, the receiving device 200 of the 11ad standard assumes that a PHY frame in which the length of the Data field is "(Nblks_spoof(temp)+1)×512×Tc1" seconds (PHY frame 3001c of the 11ad standard) has been received, and calculates TXTIME. Provided that the TXTIME of the PHY frame 3001c is denoted TXTIME_spoof(2), TXTIME_spoof(2) becomes the value computed by Formula (28).

$$TXTIME\_spoof(2)=(4416+(Nblks\_spoof(temp)+1)\times 512)\times Tc1 \quad \text{Formula (28)}$$

The spoofing error of the PHY frame 3001b is "TXTIME_spoof(2)−TXTIME", and is equal to "(Nmin_error+512)×Tc1".

In other words, in the case in which the transmitting device 100 transmits the PHY frame 3001a in the second condition, the spoofing error is large compared to the case of the first condition (see Embodiment 2).

Figure 86:
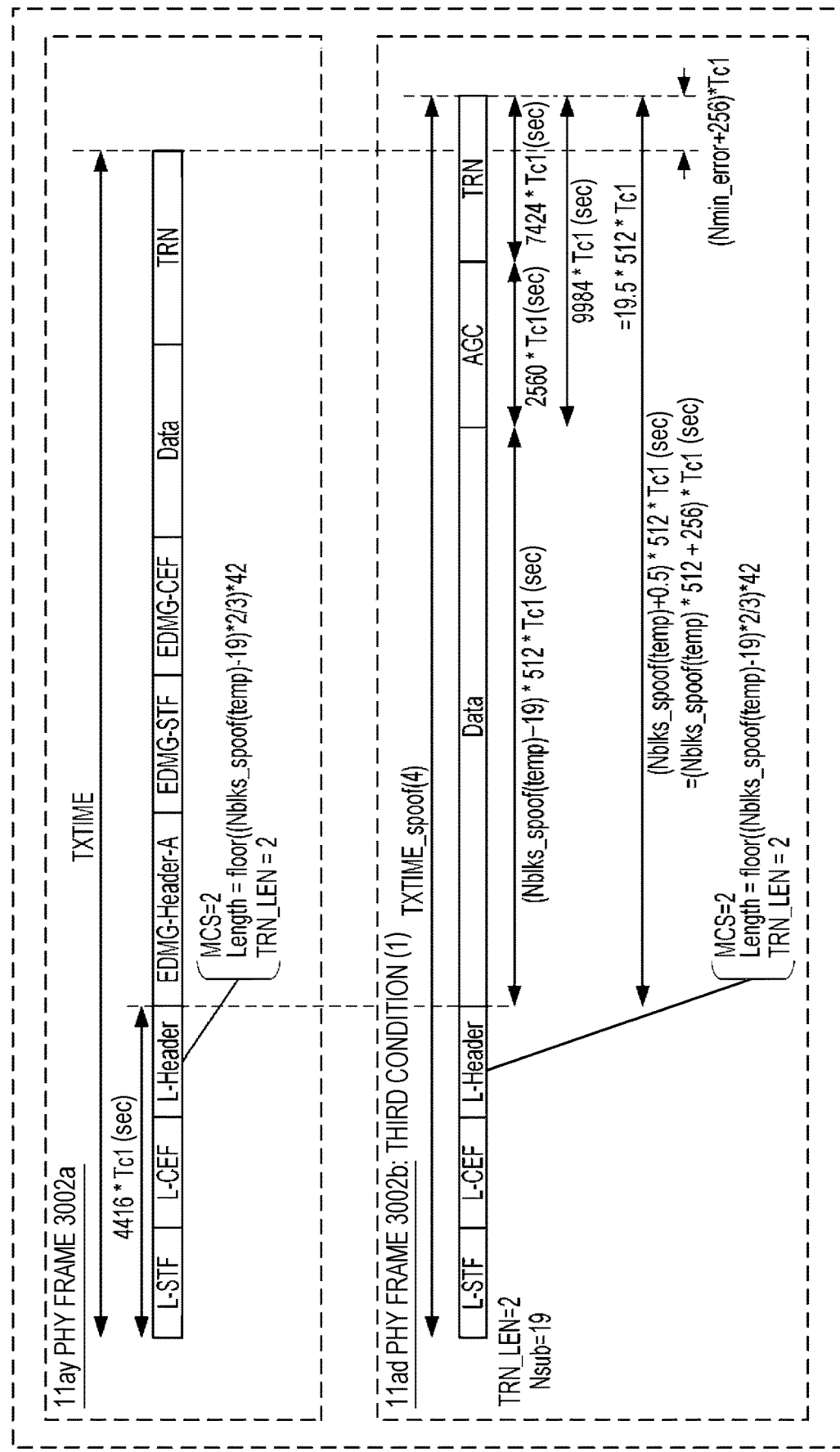

FIG. 86 is a diagram illustrating another example of the PHY frame format in the 11ay standard. The PHY frame 3002a in FIG. 86 is a PHY frame of the 11ay standard. The PHY frame 3002a is the PHY frame in the case in which the transmitting device 100 sets the value of TRN_LEN to 2 (step S6A in FIG. 83) and sets the value of Nsub to 19 (step S7 in FIG. 83). The PHY frame 3002a is equivalent to the PHY 3001a except for the values of the MCS, Length, and TRN_LEN in the L-Header.

(Third Condition (1))

The case in which the value of the MCS field in the L-Header is 6 or greater, and the case in which the value of the MCS field in the L-Header is 5 or less and dividing (Nblks_spoof(temp)−19) by 3 gives a remainder other than 1, will be described.

In the third condition (1), in the case of receiving the PHY frame 3002a, the receiving device 200 of the 11ad standard assumes that a PHY frame in which the length of the Data field is "(Nblks_spoof(temp)−19)×512×Tc1" seconds and the combined length of the AGC field and the TRN field is 9984Tc1 seconds (PHY frame 3002b of the 11ad standard) has been received, and calculates TXTIME. Provided that the TXTIME of the PHY frame 3002b is denoted TXTIME_spoof(3), TXTIME_spoof(3) becomes the value computed by Formula (29).

$$TXTIME\_spoof(3)=(4416+Nblks\_spoof(temp)\times 512+256)\times Tc1 \quad \text{Formula (29)}$$

The spoofing error of the PHY frame 3002a is "TXTIME_spoof(3)−TXTIME", and is equal to "(Nmin_error+256)×Tc1".

In other words, in the case in which the value of Nmin_error is at least 0 and less than 256 in the third condition (1), the transmitting device 100 sets the value of Nblks_spoof to Nblks_spoof(temp)−19 and sets the value of TRN_LEN to 2, and thereby is able to keep the spoofing error from 256Tc1 to less than 512Tc1.

Also, in the case in which dividing the value of Nblks_spoof(temp) by 3 gives a remainder of 1, dividing "Nblks_spoof(temp)−19" by 3 gives a remainder of 0. In other words, in the case in which the second condition holds, the third condition (1) also holds.

Note that in the case in which the third condition (1) does not hold, the transmitting device 100 may also transmit the PHY frame 3002a. In this case, the spoofing error becomes (Nmin_error+768)*Tc. Note that in the case in which the third condition (1) does not hold, since the first condition holds, the transmitting device 100 may transmit the PHY frame 3001a instead of the PHY frame 3002a.

Figure 87:
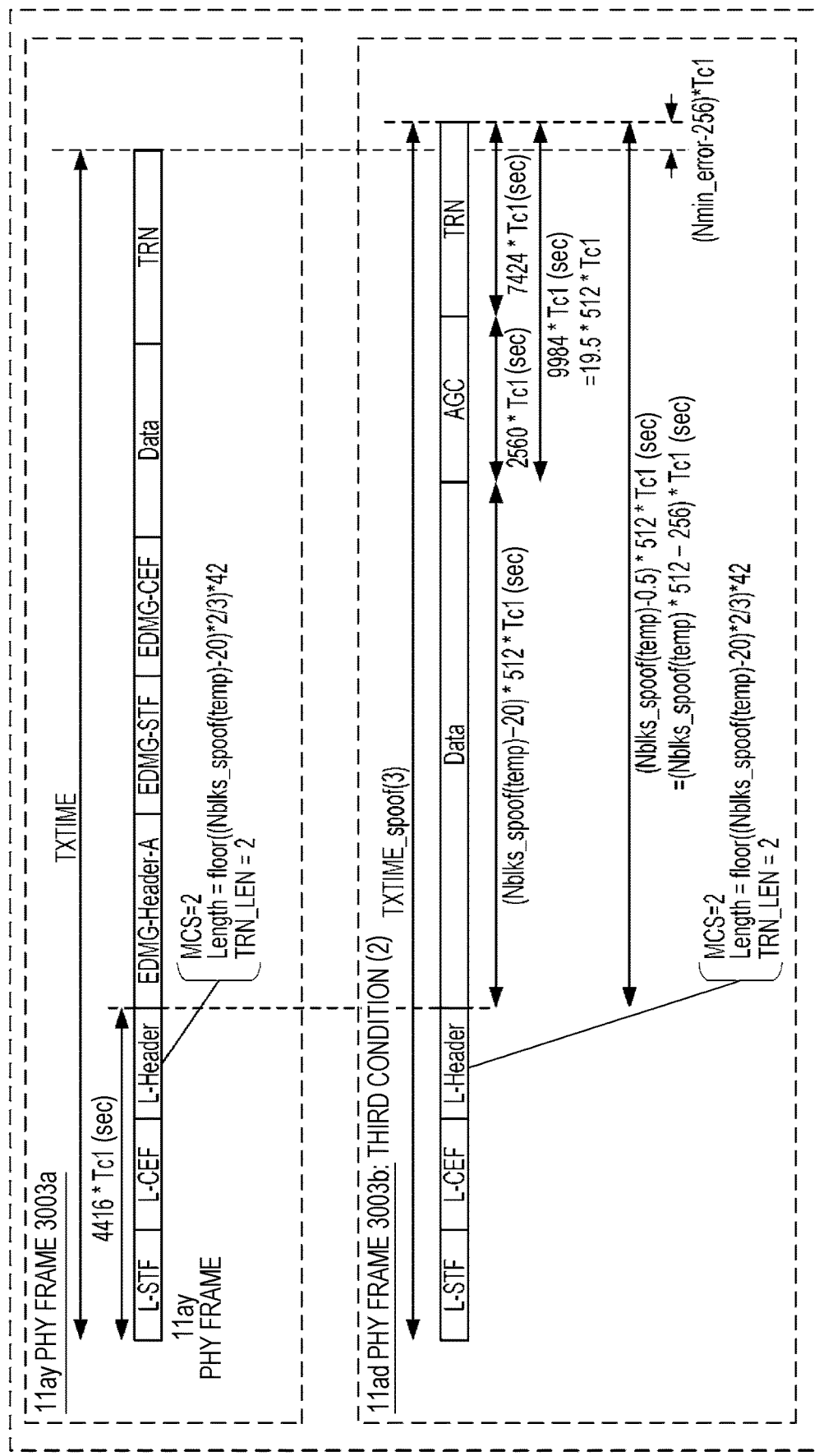

FIG. 87 is a diagram illustrating another example of the PHY frame format in the flay standard. The PHY frame 3003a in FIG. 87 is a PHY frame of the flay standard. The PHY frame 3003a is the PHY frame in the case in which the transmitting device 100 sets the value of TRN_LEN to 2 (step S6A in FIG. 83) and sets the value of Nsub to 20 (step S7 in FIG. 83). The PHY frame 3003a is equivalent to the PHY 3001a and the PHY frame 3002a except for the value of the L-Header.

(Third Condition (2))

The case in which the value of the MCS field in the L-Header is 6 or greater, and the case in which the value of the MCS field in the L-Header is 5 or less and dividing (Nblks_spoof(temp)−20) by 3 gives a remainder other than 1, will be described.

In the third condition (2), in the case of receiving the PHY frame 3003a, the receiving device 200 of the 11ad standard assumes that a PHY frame in which the length of the Data field is "(Nblks_spoof(temp)−20)×512×Tc1" seconds and the combined length of the AGC field and the TRN field is 9984Tc1 seconds (PHY frame 3003b of the 11ad standard) has been received, and calculates TXTIME. Provided that the TXTIME of the PHY frame 3003b is denoted TXTIME_spoof(4), TXTIME_spoof(4) becomes the value computed by Formula (30).

$$TXTIME\_spoof(4)=(4416+Nblks\_spoof(temp)\times 512-256)\times Tc1 \quad \text{Formula (30)}$$

The spoofing error of the PHY frame 3003a is "TXTIME_spoof(4)−TXTIME", and is equal to "(Nmin_error−256)×Tc1".

In other words, in the case in which the value of Nmin_error is at least 256 and less than 512 in the third condition (2), the transmitting device 100 sets the value of Nblks_spoof to Nblks_spoof(temp)−20 and sets the value of TRN_LEN to 2, and thereby is able to keep the spoofing error from 0Tc1 and less than 256Tc1.

In the case in which dividing the value of Nblks_spoof (temp) by 3 gives a remainder of 1, dividing "Nblks_spoof (temp)−20" by 3 gives a remainder of 2. In other words, in the case in which the second condition holds, the third condition (2) also holds.

Note that in the case in which the third condition (2) does not hold, the transmitting device 100 may also transmit the PHY frame 3003a. In this case, the spoofing error becomes (Nmin_error+256)*Tc. Note that in the case in which the third condition (2) does not hold, since the first condition holds, the transmitting device 100 may transmit the PHY frame 3001a instead of the PHY frame 3003a.

From the above, in the case in which the first condition holds, the transmitting device 100 may also set TRN_LEN to 0 like the PHY frame 3001a in FIG. 85 (step S6B in FIG. 83). Also, in the case in which the second condition holds, since the third condition (1) and the third condition (2) also hold, the transmitting device 100 may set TRN_LEN to 2 and set the value of Nsub to 19 or 20 according to the value of Nmin_error like the PHY frame 3002a in FIG. 86 and the PHY frame 3003a in FIG. 87 (step S7 in FIG. 83).

According to the above, irrespectively of whether or not the first condition holds, the transmitting device 100 is able to keep the spoofing error from at least 0 to less than 512Tc1. Since the spoofing error is at least 0, by calculating TXTIME using the MCS field, Length field, and Training Length field in the L-Header, the receiving device 200 of the 11ad standard is able to assert the CCA (determine that a signal is being received) while the PHY frame is being received, and is able to reduce power consumption compared to a method that executes power detection.

Also, the maximum spoofing error of 512Tc1 corresponds to approximately 0.29 microseconds. The spoofing error affects the delay in the CCA negation (stopping assertion: determining that a signal is not being received), but this delay is smaller than the delay anticipated in the CCA negation by power detection (for example, 1 microsecond). In other words, since the transmitting device 100 uses the procedure illustrated in FIG. 83 to set the values of the MCS, Length, and Training Length fields in the L-Header of the PHY frames 3001a, 3002a, and 3003a, the delay of the CCA negation may be shortened in the receiving device 200 of the 11ad standard. With this arrangement, the receiving device 200 is able to start the transmission process after CCA negation early and utilize radio resources effectively, thereby increasing the data throughput.

Also, in the 11ad standard, an integer value from 0 to 16 is set in the Training Length field of the L-Header, but in the procedure in FIG. 83, the transmitting device 100 is configured to select 0 or 2 according to the value of Nblks_spoof (temp). Also, in the case of setting the value of the Training Length field to 2, the value of Nsub is selected from two candidate values (20 and 19) according to the value of Nmin_error.

In other words, the process by which the transmitting device 100 selects a value according to the values of Nblks_spoof(temp) and Nmin_error has the following three cases: (1) the case of setting TRN_LEN to 0; (2) the case of setting TRN_LEN to 2 and setting Nsub to 20; and (3) the case of setting TRN_LEN to 2 and setting Nsub to 19.

In this way, since the transmitting device 100 decides the values of the MCS field, the Length field, and the Training Length field in the L-Header with little conditional branching, the calculation circuit and program may be simplified, and the circuit scale and power consumption may be reduced.

Note that in the procedure in FIG. 83, the transmitting device 100 is configured to set the value of TRN_LEN to 2 in the case of setting a value other than 0, but a different value may also be set. FIG. 88 is a diagram illustrating an example of the value of TRN_LEN and the value of Nsub.

In step S6A of FIG. 83, in the case in which the transmitting device 100 sets the value of TRN_LEN to 14, in step S7, the transmitting device 100 sets the value of Nsub to 136 or 137 according to the value of Nmin_error. Herein, TXTIME computed by the receiving device 200 is similar to Formula (29) and Formula (30). In other words, by deciding the value of Nsub on the basis of FIG. 88, the transmitting device 100 is able to keep the spoofing error from at least 0 to less than 512Tc 1, similarly to the case of setting TRN_LEN to 2. FIG. 88 is a diagram illustrating an example of the value of Nsub corresponding to the value of TRN_LEN.

Note that the value of Nblks_spoof is a positive integer. Consequently, the transmitting device 100 selects the value of TRN_LEN so that the value of Nblks_spoof-Nsub becomes 1 or greater. By setting TRN_LEN to 2, even if Nblks_spoof(temp) is a small value (for example, 59 or less), the transmitting device 100 is able to transmit the PHY frame 3002a and the PHY frame 3003a.

FIG. 89 illustrates another example of the value of Nsub with respect to the value of TRN_LEN. The spoofing error in the case in which the transmitting device 100 decides TRN_LEN and Nsub on the basis of FIG. 89 will be described.

In the case in which the value of Nmin_error is at least 0 and less than 128, the transmitting device 100 sets the value of Nsub to 9, 48, 87, or 126 according to the value of TRN_LEN. In this case, TXTIME_spoof becomes the value in Formula (31).

TXTIME_spoof(5)=(4416+(Nblks_spoof(temp)+384)   Formula (31)

In the case in which Nblks_spoof(temp) satisfies the first condition, the spoofing error of TXTIME_spoof(5) is (Nmin_error+384)×Tc, being at least 384Tc and less than 512Tc.

In the case in which Nblks_spoof(temp) does not satisfy the first condition, the spoofing error of TXTIME_spoof(5) is (Nmin_error+896)*Tc, being at least 896Tc and less than 1024Tc. In other words, since the value of Nsub is a multiple of 3, in the case in which dividing Nblks_spoof(temp) by 3 gives a remainder of 1, dividing Nblks_spoof(temp)−Nsub by 3 also gives a remainder of 1, and the increase in the spoofing error becomes 512Tc, similarly to the PHY frame 3001c in FIG. 85.

In the case in which the value of Nmin_error is at least 128 and less than 512, the transmitting device 100 sets the value of Nsub to 10, 49, 88, or 127 according to the value of TRN_LEN. In this case, TXTIME_spoof becomes the value in Formula (32).

TXTIME_spoof(6)=(4416+(Nblks_spoof(temp)−128)   Formula (32)

In the case in which the value of the MCS in the L-Header is 6 or greater, and dividing (Nblks_spoof(temp)−10) by 3 does not give a remainder of 1 (fifth condition), the spoofing error of TXTIME_spoof(6) is (Nmin_error−128)*Tc, being at least 0 and less than 384Tc.

In the case in which the value of Nblks_spoof(temp) satisfies the second condition, the fifth condition is also satisfied.

From the above, by using the values of TRN_LEN and Nsub in FIG. 89, in the case in which the value of Nmin_error is at least 128 and less than 512, the transmitting device 100 keeps the spoofing error from at least 0 to less than 384Tc.

FIG. 90 illustrates another example of the value of Nsub with respect to the value of TRN_LEN. The spoofing error in the case in which the transmitting device 100 decides TRN_LEN and Nsub on the basis of FIG. 90 will be described.

In the case in which the value of Nmin_error is at least 0 and less than 384, the transmitting device 100 sets the value of Nsub to 29, 68, 107, or 146 according to the value of TRN_LEN. In this case, TXTIME_spoof becomes the value in Formula (33).

TXTIME_spoof(7)=(4416+(Nblks_spoof(temp)+128)   Formula (33)

In the case in which Nblks_spoof(temp) satisfies the first condition, the spoofing error of TXTIME_spoof(7) is (Nmin_error+128)*Tc, being at least 128Tc and less than 512Tc.

In the case in which the value of the MCS in the L-Header is 6 or greater, and dividing (Nblks_spoof(temp)−29) by 3 does not give a remainder of 1 (sixth condition), the spoofing error of TXTIME_spoof(7) is (Nmin_error+128)*Tc, being at least 128Tc and less than 512Tc.

In the case in which the value of Nblks_spoof(temp) satisfies the second condition, the sixth condition is also satisfied.

In the case in which the value of Nmin_error is at least 384 and less than 512, the transmitting device 100 sets the value of Nsub to 30, 69, 108, or 147 according to the value of TRN_LEN. In this case, TXTIME_spoof becomes the value in Formula (34).

TXTIME_spoof(8)=(4416+(Nblks_spoof(temp)−384)  Formula (34)

In the case in which Nblks_spoof(temp) satisfies the first condition, the spoofing error of TXTIME_spoof(8) is (Nmin_error−384)*Tc, being at least 0 and less than 128Tc.

In the case in which Nblks_spoof(temp) does not satisfy the first condition, the spoofing error of TXTIME_spoof(8) is (Nmin_error+128)*Tc, being at least 512Tc and less than 640Tc. In other words, since the value of Nsub is a multiple of 3, in the case in which dividing Nblks_spoof(temp) by 3 gives a remainder of 1, dividing Nblks_spoof(temp)−Nsub by 3 also gives a remainder of 1, and the increase in the spoofing error becomes 512Tc, similarly to the PHY frame 3001c in FIG. 85.

From the above, by using the values of TRN_LEN and Nsub in FIG. 90, in the case in which the value of Nmin_error is at least 0 and less than 384, the transmitting device 100 is able to keep the spoofing error from at least 128Tc to less than 512Tc.

In the case in which dividing Nblks_spoof(temp) by 3 gives a remainder of 1, the transmitting device 100 may also combine FIGS. 88, 89, and 90 to select the value of TRN_LEN so that the value of Nsub becomes a value other than a multiple of 3.

For example, in the case in which the value of Nmin_error is at least 0 and less than 128, the transmitting device 100 may set the value of TRN_LEN to 3. In this case, the spoofing error becomes at least 128Tc and less than 256Tc (see FIG. 90 and Formula (33)). Also, in the case in which the value of Nmin_error is at least 128 and less than 256, the transmitting device 100 may set the value of TRN_LEN to 1. In this case, the spoofing error becomes at least 0 and less than 128Tc (see FIG. 89 and Formula (32)). Also, in the case in which the value of Nmin_error is at least 256 and less than 512, the transmitting device 100 may set the value of TRN_LEN to 2. In this case, the spoofing error becomes at least 0 and less than 256Tc (see FIG. 88 and Formula (30)).

As above, in the case in which dividing Nblks_spoof (temp) by 3 gives a remainder of 1, the transmitting device 100 is able to combine FIGS. 88, 89, and 90 to select a value of TRN_LEN so that the value of Nsub becomes a value other than a multiple of 3, and thereby is able to keep the spoofing error from at least 0 to less than 256Tc, and reduce the spoofing error.

Also, in the case of setting the value of the MCS field in the L-Header to 6 or greater, the transmitting device 100 may combine FIGS. 88, 89, and 90 to select a value of TRN_LEN so that the spoofing error becomes smaller.

FIG. 91 is a flowchart illustrating another example of a process of computing the values of the MCS and Length fields in the L-Header. FIG. 91 is a diagram illustrating a procedure of the transmitting device 100 derived from the above considerations. Processes which are the same as FIG. 83 are denoted with the same numbers, and the description thereof will be omitted.

(Step S1D)

The transmitting device 100 computes the length from the EDMG-Header-A or the TXTIME of the PHY frame, and computes Nblks_spoof(temp) and Nmin_error (see Formula (24) and Formula (27B)).

(Step S6C)

The transmitting device 100 decides the values of TRN_LEN and Nsub from the MCS to store in the L-Header, the value of the remainder from dividing Nblks_spoof(temp) by 3, and the value of Nmin_error. The transmitting device 100 may also decide the values of TRN_LEN and Nsub using the table illustrated in FIG. 92, for example. FIG. 92 is a diagram illustrating an example of combinations of the value of TRN_LEN and the value of Nsub with respect to the value of Nmin_error. FIG. 92 is a table created by combining FIGS. 88, 89, 90, and 93 so that the spoofing error becomes smaller.

FIG. 93 illustrates another example of the value of Nsub with respect to the value of TRN_LEN. FIG. 93 is a diagram illustrating the value of Nsub in the case in which TRN_LEN is a multiple of 4 (that is, a value of TRN_LEN not included in FIGS. 88, 89, and 90). In the case in which TRN_LEN is a multiple of 4, the spoofing error is the same as the case in which TRN_LEN is 0.

(Step S6C)

In the case of setting the value of the MCS in the L-Header to 6 or greater, or in other words, in the case of transmitting a short PHY frame, the transmitting device 100 is able to use FIG. 92 to keep the range of the spoofing error from at least 0 to less than 128Tc. In other words, the transmitting device 100 decides the value of TRN_LEN so that the formula minimizing the spoofing error may be selected from among Formula (27C), Formula (30), Formula (32), and Formula (34) according to the value of Nmin_error.

Also, in the case of setting the value of the MCS in the L-Header to 5 or less, or in other words, in the case of transmitting a long PHY frame, the transmitting device 100 is able to use FIG. 92 to keep the range of the spoofing error from at least 0 to less than 256Tc. In other words, the transmitting device 100 decides the value of TRN_LEN so that dividing Nblks_spoof(temp)−Nsub by 3 gives a remainder other than 1, and the formula minimizing the spoofing error may be selected from among Formula (27C) and Formulas (28) to (34), according to the values of Nblks_spoof(temp) and Nmin_error.

Note that, as an example, FIG. 92 is constructed by selecting and combining the small values (0 to 3) of TRN_LEN illustrated in FIGS. 88, 89, 90, and 93.

FIG. 94 is a diagram illustrating another example of combinations of the value of TRN_LEN and the value of Nsub with respect to the spoofing error. FIG. 94 illustrates an example of a table constructed by selecting and combining the large values (13 to 16) of TRN_LEN illustrated in FIGS. 88, 89, 90, and 93.

In step S2B of FIG. 91, the transmitting device 100 determines whether or not Nblks_spoof(temp) is a threshold value or less. In the case in which the transmitting device 100 selects MCS6 in step S2F, the threshold value in step S2B is 4682 or less.

In step S2B of FIG. 91, the transmitting device 100 may also determine whether or not Nblks_spoof is a threshold value or less. With this arrangement, Yes is determined in step S2B even with respect to larger values of Nblks_spoof (temp) in some cases, and since MCS6 becomes selected in more situations, the spoofing error may be decreased.

Note that since Nblks_spoof is a value computed in step S7, the value is indeterminate at the time of step S2B. Accordingly, in step S2B, the transmitting device 100 determines whether or not Nblks_spoof computed in S7 is expected to be the threshold value or less, and after computing Nblks_spoof in S7, the transmitting device 100 determines whether or not the expectation was correct. If the expectation was incorrect, the transmitting device 100 may return to step S2B and redo the process.

Also, in FIGS. 92 and 94, the transmitting device 100 may reference an MCS of "6 or greater" in the L-Header to decide Nsub (called the provisional Nsub) according to the value of Nmin_error, treat the value obtained by adding the provisional Nsub to Nblks_spoof(temp) as a provisional Nblks_spoof, and compare the provisional Nblks_spoof to a threshold value.

Also, in FIGS. 92 and 94, the transmitting device 100 may decide the minimum value of the candidate values of Nsub as the provisional Nsub, treat the value obtained by adding the provisional Nsub to Nblks_spoof(temp) as the provisional Nblks_spoof, and compare the provisional Nblks_spoof to a threshold value. For example, in FIG. 92, the transmitting device 100 may set the provisional Nsub to 0. As another example, in FIG. 94, the transmitting device 100 may set the provisional Nsub to 126.

By setting the provisional Nsub to compute the provisional Nblks_spoof, the determination in step S2B may be executed with a simple circuit and program.

In the case of using FIG. 94, since the value of Nsub is large compared to FIG. 92, the transmitting device 100 is able to reduce the spoofing error with respect to a large value of Nblks_spoof(temp). In other words, by using FIG. 94, the transmitting device 100 selects "MCS6 or greater" more often than in the case of using FIG. 92.

According to FIGS. 88, 89, 90, and 93, the spoofing error is the same in the case of adding 4 to the value of TRN_LEN and adding 39 to the value of Nsub. In other words, the transmitting device 100 may also select the value of TRN_LEN on the basis of a condition other than the value of TXTIME.

For example, in the case in which the PHY frame is single-carrier, the transmitting device 100 may decide the value of TRN_LEN by selecting from among 12, 13, 14, and 15, while in the case in which the PHY frame is OFDM, the transmitting device 100 may decide the value of TRN_LEN by selecting from among 8, 9, 10, and 11. A receiving device of the 11ay standard (for example, a receiving device 300 not illustrated) is able to reference the value of the TRN_LEN field in the L-Header of the received PHY frame, and determine whether the received PHY frame is single-carrier or OFDM.

The transmitting device 100 may also use FIG. 92 to decide the lower 2 bits of TRN_LEN in the L-Header on the basis of the MCS in the L-Header, the remainder from dividing Nblks_spoof(temp) by 3, and the value of Nmin_error, and transmit the PHY frame with different information included in the 3 bits from bits 2 to 4 of the TRN_LEN in the L-Header.

In other words, the value of Info described in Embodiment 1 may be extended to 8 bits to include more information.

FIG. 95 is a diagram illustrating an example of the relationship between the Length field and the Training field of the L-Header with respect to the Info field. The transmitting device 100 may include the lower 5 bits (bits 0 to 4) of the 8-bit extended Info in the lower 5 bits of the Length field (see Embodiment 3), and include the higher 3 bits (bits 5 to 7) of Info in bits 2 to 4 of the Training Length field.

The transmitting device 100 may also decide the lower 2 bits of the Training Length field in the L-Header on the basis of FIG. 92, include the higher 3 bits of Info in bits 2 to 4 of the Training Length field, and after deciding the value of the Training Length field, decide the value of Nsub using FIGS. 88, 89, 90, and 93.

Note that the transmitting device 100 may also compute the value of Nsub using Formula (35) and Formula (36).

$$N\text{sub}=\text{ceiling}(9.75 \times \text{TRN\_LEN}) \quad \text{Formula (35)}$$

$$N\text{sub}=\text{floor}(9.75 \times \text{TRN\_LEN}) \quad \text{Formula (36)}$$

In FIGS. 92 and 94, the transmitting device 100 may compute Nsub by using Formula (36) in the case in which the MCS is 5 or less, Nblks_spoof(temp) mod 3 is 1, and the range of value of Nmin_error is from at least 0 to less than 128 (the case of referencing Formula (33)), or by using Formula (35) in all other cases.

Note that the transmitting device 100 sets the value of bit5 to 0 in the case in which at least 1 bit from bits 0 to 4 in the Training Length field is 1. Also, the transmitting device 100 may set the value of bit5 to 1 in the case in which bits 0 to 4 in the Training Length field are all 0. With this arrangement, since the corresponding value of Nsub becomes a large value, MCS6 is selected in more situations, and the spoofing error may be decreased.

The transmitting device 100 may also include a bit indicating OFDM transmission or not, a field indicating the type of MIMO transmission, a field indicating bandwidth information for channel bonding and channel aggregation, and the like in the 8-bit extended Info (see Embodiments 1 to 12).

FIG. 96A is diagram illustrating another example of combinations of the value of TRN_LEN and the value of Nsub with respect to the value of Nmin_error. FIG. 96B is diagram illustrating another example of combinations of the value of TRN_LEN and the value of Nsub with respect to the value of Nmin_error.

FIGS. 96A and 96B are diagrams illustrating methods, different from FIGS. 92 and 94, by which the transmitting device 100 decides TRN_LEN and Nsub. FIGS. 96A and 96B are used in the case in which the transmitting device 100 allows the spoofing error to be from at least 0 to less than 512Tc. FIG. 94 is similar to the case of using FIG. 88 in the procedure of FIG. 83. In the case of using FIGS. 96A and 96B, the spoofing error increases compared to the case of using FIGS. 92 and 94, but the transmitting device 100 is able to reduce the amount of calculation, and the circuit scale and power consumption may be reduced.

Note that in the computation of Nsub in FIGS. 96A and 96B, the transmitting device 100 may use Formula (36) in the case in which the MCS is 5 or less, Nblks_spoof(temp) mod 3 is 1, and the range of value of Nmin_error is from at least 0 to less than 256 (the case of referencing Formula (29)), or use Formula (35) under all other conditions.

The transmitting device 100 may include the value of TRN_LEN decided using FIG. 96B in the lower 2 bits of the Training Length field in the L-Header, and include the value of Info in bits 2 to 4 of the Training Length field.

Note that instead of computing the value of Nmin_error using Formula (27B), the transmitting device 100 may also reference a table in which the value of Nmin_error is computed in advance depending on the packet type, and decide the value of Nmin_error.

FIG. 96C is a diagram illustrating the value of Nmin_error corresponding to the packet type.

In FIG. 96C, Packet Type represents the class of transmission, which may be Single-Input Single-Output (SISO; single-stream transmission), Single User Multi-Input Multi-Output (SU-MIMO; single-user MIMO), or Multi User MIMO (MU-MIMO). Also, Nss represents the number of MIMO streams. In the 11ay standard, Nss is an integer from 1 to 8.

In FIG. 96C, Ncb represents the number of bonded channels for channel bonding. The case in which Ncb is 1 represents 2.16 GHz bandwidth (single-channel) transmission. The cases in which Ncb is 2, 3, and 4 represent 4.32 GHz, 6.48 GHz, and 8.64 GHz bandwidth channel bonding, respectively.

In FIG. 96C, GI Type represents the length of the GI. Short represents the Short GI, in which the GI length is 32×Tc1 seconds. Normal represents the Normal GI, in which the GI length is 64×Tc1 seconds. Long represents the Long GI, in which the GI length is 128×Tc1 seconds.

In FIG. 96C, Number represents the row number in FIG. 96C.

In FIG. 96C, T_EDMGHeaderA, T_EDMGSTF, and T_EDMGCEF represent the lengths of the EDMG-Header-A, the EDMG-STF, and the EDMG-CEF, respectively. Also, T_GI1 represents the length of the GI included at the beginning of the Data field in the PHY frame (1st GI). As illustrated in FIG. 65B, the 1st GI is different from the length of the other GIs in the Data field in some cases.

In FIG. 96C, T_add is the sum of the values of T_EDMGHeaderA, T_EDMGSTF, T_EDMGCEF, and T_GI. Also, N_add and Nmin_error(0) are the values computed by Formula (37) and Formula (38), respectively.

$$N\_add = \operatorname{ceiling}(T\_add/Tc1/512) \quad \text{Formula (37)}$$

$$Nmin\_error(0) = (T\_add/Tc1) \bmod 512 \quad \text{Formula (38)}$$

The length of the 11ay PHY frame (TXTIME) is computed by Formula (39). In Formula (39), T_trn is the length of the TRN field in a PHY frame of the 11ay standard (for example, see PHY frame 3001a in FIG. 85).

$$TXTIME = 4416 \times Tc1 + T\_add + Nblks \times 512 \times Tc1 + T\_trn \quad \text{Formula (39)}$$

In Formula (39), Nblks is the number of symbol blocks in the PHY frame of the flay standard. Since a symbol block of the flay standard includes 512×Ncb symbols, and the length of one symbol is Tc1/Ncb, the length of a symbol block is (512×Ncb)×(Tc1/Ncb)=512×Tc1, the same length as a symbol block of the 11ad standard.

According to Formula (39) and Formula (27B), the transmitting device 100 may also compute the value of Nmin_error according to Formula (40).

$$\begin{aligned} Nmin\_error &= ((4416 \times Tcl + T\_add + Nblks \times 512 \times Tcl + \\ &= T\_trn)/Tcl - 4416) \bmod 512 \\ &= (T\_add/Tcl + T\_trn/Tcl) \bmod 512 \\ &= (Nmin\_error(0) \bmod 512 + \\ &\quad (T\_trn/Tcl) \bmod 512) \bmod 512 \end{aligned} \quad \text{Formula (40)}$$

According to Formula (40), the transmitting device 100 may use FIG. 96C to decide the value of Nmin_error(0) depending on the packet type, and add the value of (T_trn/Tc1) mod 512 to the value of Nmin_error(0) to thereby compute the value of Nmin_error.

Also, in the case in which the length of the TRN field of the 11ay standard is a multiple of the symbol block length, the value of Nmin_error is equal to the value of Nmin_error(0), and thus the transmitting device 100 may use FIG. 96C to decide the value of Nmin_error(0) (that is, the value of Nmin_error) depending on the packet type.

Also, instead of deciding the value of Nmin_error(0) by using FIG. 96C, the transmitting device 100 may also decide the value of a flag indicating whether or not the value of Nmin_error(0) is at least 256 depending on the packet type (see the Flag column in FIG. 96C). The transmitting device 100 may use the Flag value in combination with FIG. 96A or 96B to decide the values of TRN_LEN and Nsub.

Additionally, the transmitting device 100 may also decide, depending on the packet type, an index that indicates whether the value of Nmin_error(0) is at least 0 and less than 128, at least 128 and less than 256, at least 256 and less than 384, or at least 384 and less than 512 (see the Index column in FIG. 96C). The transmitting device 100 may use the Index value in combination with FIG. 92 or 94 to decide the values of TRN_LEN and Nsub.

The transmitting device 100 uses the table in FIG. 96C to decide the values of Nmin_error, Flag, and Index depending on the packet type, and decide the values of TRN_LEN and Nsub. Thus, the calculations for deciding the values of the Length and TRN_LEN in the L-Header become simple, and the circuit scale and power consumption may be reduced.

As above, in the modification of Embodiment 3, since the transmitting device 100 sets the values of the MCS field, the Length field, and the Training Length field in the L-Header according to the value of a provisional number of blocks (Nblks_spoof(temp)) converted from the PHY frame length, the spoofing error may be reduced, and the throughput may be improved.

Also, in the modification of Embodiment 3, since the transmitting device 100 sets the value of the MCS field, the Length field, and the lower bits of the Training Length field in the L-Header according to the value of a provisional number of blocks (Nblks_spoof(temp)) converted from the PHY frame length, and transmits the PHY frame with the additional information (Info) included in the higher bits of the Training Length field, the receiving device 300 of the 11ay standard is able to demodulate the PHY frame efficiently using the additional information.

Modification 2 of Embodiment 12

The present embodiment illustrates an example in which the transmitting device 100 of FIG. 2, or a transmitting device having the same basic configuration as FIG. 2, uses a different frame format from Embodiments 1 to 12. Also, a method by which the receiving device 200 of FIG. 3, FIG. 64B, and FIG. 64C receives these frames will be described.

FIG. 97 is a diagram illustrating an example of the frame format of a PHY frame (PHY frame 1000) in the present embodiment. Unlike the frame formats in FIGS. 61A, 61B, and 61C, the PHY frame 1000 includes multiple EDMG-Header-A fields and multiple Data fields.

A frame format in which a Header part (for example, the L-Header field) and a Data part (the Data field) alternately repeat is prescribed as an aggregate PHY protocol data unit (A-PPDU) in the 11ad standard.

In other words, the PHY frame 1000 is a PHY frame applying A-PPDU.

Unlike the A-PPDU of the 11ad standard, the PHY frame 1000 includes the L-Header field and the EDMG-Header-A field, and is a frame in which multiple EDMG-Header-A fields and Data fields alternately repeat.

It is sufficient for the transmitting device 100 to transmit at least one L-STF, L-CEF, and L-Header with respect to multiple Data fields, and in the case of transmitting multiple Data fields, the number of times that the L-STF, L-CEF, and L-Header are transmitted may be reduced, and the throughput may be improved.

In addition, since the transmitting device 100 transmits with parameters for coding and modulating the Data fields 1005, 1105, and 1205 (for example, the MCS, GI length, and number of MIMO streams) included in each of the E-Header-A fields 1004, 1104, and 1204, the transmitting device 100 is able to transmit while changing the coding and modulation parameters for each Data field. With this arrangement, the transmitting device 100 is able to transmit multiple pieces of data efficiently.

For example, with respect to retransmission data, the transmitting device 100 may transmit by applying a lower MCS than the initial transmission data (data which is not a retransmission). With this arrangement, the probability of multiple retransmissions occurring may be reduced, and the worst-case data delay may be improved.

FIG. 98 is a diagram illustrating an example of the E-Header-A field 1004, Data field 1005, E-Header-A field 1104, and Data field 1105 of the PHY frame 1000.

In FIG. 98, as an example, a case will be described in which the Data field 1005 includes the Short GI (GI length 32 symbols) and the Data field 1105 includes the Long GI (GI length 128 symbols). The transmitting device 100 may also use a different GI length for each Data field like in FIG. 98. Also, unlike FIG. 98, the transmitting device 100 may also use the same GI length in all Data fields. Note that in the Data field 1005, as illustrated in FIG. 67B, the first GI length is 64 symbols.

The E-Header-A field 1004 and the E-Header-A field 1104 include two symbol blocks (E-Header-A(1) and E-Header-A(2)), and for each symbol block, include the GI64 before the symbol block (see the description of FIGS. 61A, 61B, and 61C).

The signal indicating the GI length of the Data field 1005 may also be included in the E-Header-A field 1004. Note that in the case of using the same GI length in all Data fields, the signal indicating the GI length may also be included in the L-Header (see FIG. 62).

In the case in which the GI length of the Data field 1005 is 32, the GI64 is included at the beginning of the Data field 1005, and in addition, for each symbol block (for example, Data(1) and Data(2)), the GI32 is included after the symbol block (see FIG. 61A). In other words, in FIG. 98, the transmitting device 100 transmits with two GIs (GI32 and GI64) included between the symbol block Data(2) and the symbol block E-Header-A(1).

In this way, since the transmitting device 100 transmits with the GI of the GI length (for example, 32 symbols) in the Data field 1005 included at the end of the Data field 1005, and with the GI64 included at the beginning of the E-Header-A field 1104, at the receiving device 200 of the 11ay standard (see FIG. 3, FIG. 64B, and FIG. 64C), intersymbol interference may be reduced in the demodulation of the symbol block Data(2) and the demodulation of the symbol block E-Header-A(1).

FIG. 99 is a diagram illustrating another example of the PHY frame 1000.

In FIG. 99, the Data field 1005 with a GI length of 32 symbols includes a 480-symbol M-STF field at the beginning. In other words, similarly to Embodiment 12, the transmitting device 100 includes, between the E-Header-A field and the Data field, an M-STF field of a length corresponding to the GI length of the Data field.

For this reason, in the case in which the receiving device 200 of the 11ay standard receives the E-Header-A field 1004 and the Data field 1005 of FIG. 99, the intervals of the DFT window may be equalized.

In other words, the receiving device 200 of the 11ay standard is able to omit the adjustment of the DFT window for every field, and the circuit scale of the receiving device may be reduced.

Also, since the PHY frame in FIG. 99 includes the GI64 before and after the symbol block E-Header-A(2) of the E-Header-A field 1004, and includes the GI32 before and after the symbol block Data(1) of the Data field 1005, the receiving device 200 is able to reduce intersymbol interference and increase the received signal quality.

Also, since the receiving device 200 is able to execute channel estimation using the M-STF, increases in the circuit scale may be reduced and the received signal quality may be improved.

Additionally, the transmitting device 100 may transmit with the M-STF corresponding to the GI64 (for example, see FIG. 68A) included at the beginning of the second and subsequent E-Header-A (for example, the E-Header-A field 1104) in the PHY frame applying A-PPDU.

In FIG. 98, since the GI64 is included before the symbol block E-Header-A(1), spoofing error equivalent to 64 symbols may occur in some cases, but in FIG. 99, 512 symbols are included before the symbol block E-Header-A(1). Consequently, the number of symbols from the symbol block E-Header-A(1) of the E-Header-A field 1004 becomes a multiple of 512, and the value of Nmin_error computed by Formula (27B) becomes 0. With this arrangement, the spoofing error may be reduced.

In the case of receiving the PHY frame of FIG. 99, the receiving device 200 of the 11ay standard may use the M-STF field of the E-Header-A field 1104 to execute channel estimation, symbol timing synchronization, and frequency offset correction. With this arrangement, the receiving device 200 is able to increase the received signal quality of the E-Header-A field 1104 and the Data field 1105.

In addition, the transmitting device 100 may transmit the E-Header-A field 1004 and the Data field 1005 addressed to the receiving device 200, and transmit the E-Header-A field 1104 and the Data field 1105 addressed to a receiving device of the 11ay standard (for example, a receiving device 500 not illustrated) different from the receiving device 200.

For example, in the case in which the receiving device 200 is a short distance away from the transmitting device 100 and the receiving device 500 is a long distance away from the transmitting device 100, the transmitting device 100 may use a high MCS (fast data rate) and a short GI in the Data field 1005 addressed to the receiving device 200, while using a low MCS (slow data rate) and a long GI in the Data field 1105 addressed to the receiving device 500.

With this arrangement, in the case of transmitting data addressed to multiple receiving devices of varying received signal quality, the transmitting device 100 is able to skip transmitting the L-STF, L-CEF, and L-Header multiple times, and increase the data throughput.

Also, in the case in which the receiving device 500 a long distance away receives the E-Header-A field 1104 and the Data field 1105, the receiving device 500 is able to synchronize the symbol timing using the M-STF, and increase the received signal quality.

According to Modification 2 of Embodiment 12, since the transmitting device 100 transmits with the M-STF inserted into the PHY frame applying A-PPDU, it is possible to reduce error in the computation of the PHY frame length using the Length of the L-Header in the receiving device 300 (11ad terminal).

Also, according to Modification 2 of Embodiment 12, since the transmitting device 100 transmits with the M-STF inserted into the PHY frame applying A-PPDU, the adjustment of the DFT window interval in the receiving device 200 may be omitted, and the circuit scale of the receiving device may be reduced. Also, since the receiving device 200 is able to execute channel estimation using the M-STF, the circuit scale may be reduced and the received signal quality may be improved.

The above thus describes exemplary embodiments of the present disclosure.

Note that in the foregoing embodiments, the parameters used to compute the PSDU Length including transmission mode selection information are one example, and the configuration is not limited thereto.

Also, in the foregoing embodiments, during channel aggregation, the transmitting device 100 may also include the channel numbers actually being used inside the transmission mode selection information (Info). For example, in the case in which channels ch1 to ch3 are scheduled, the transmitting device 100 uses the channels ch1 and ch3 when a carrier is detected on the channel ch2.

Also, although the foregoing embodiments describe a case of using transmission mode selection information as the control information (Info) directed at an 11ay terminal to store in the PSDU Length of the L-Header, the control information (Info) directed at an 11ay terminal to store in the PSDU Length of the L-Header is not limited to the above, and may be control information related to the EDMG-STF and the EDMG-CEF.

Also, although the foregoing embodiments are described by taking the case of configuring an aspect of the present disclosure by hardware as an example, it is also possible to realize the present disclosure by software in conjunction with hardware.

In addition, each function block used in the description of the foregoing embodiments typically is realized as an integrated circuit, that is, an LSI chip. The integrated circuit controls each function block used in the description of the foregoing embodiments, and may be provided with input terminals and output terminals. The function blocks may be realized individually as separate chips, or as a single chip that includes some or all function blocks. Although LSI is discussed herein, the circuit integration methodology may also be referred to as IC, system LSI, super LSI, or ultra LSI, depending on the degree of integration.

Furthermore, the circuit integration methodology is not limited to LSI, and may be also be realized with special-purpose circuits or general-purpose processors. A field-programmable gate array (FPGA) capable of being programmed after fabrication of the LSI chip, or a reconfigurable processor whose circuit cell connections and settings inside the LSI chip may be reconfigured, may also be used.

Furthermore, if circuit integration technology that may be substituted for LSI appears as a result of progress in semiconductor technology or another derived technology, obviously the new technology may be used to integrate the function blocks. Biotechnology applications and the like are also a possibility.

A transmitting device of the present disclosure comprises: a header generator that generates a legacy header in which control information related to an extension preamble is added to data length information that indicates a data length of a transmission signal; a transmission signal generator that generates the transmission signal using a frame format arranged in order of the generated legacy header, an extension header, the extension preamble, and a data field; and a transmitter that transmits the generated transmission signal, wherein the data length of the transmission signal indicates a length obtained by adding up the extension header, the extension preamble, and the data field.

In the transmitting device of the present disclosure, the data length is associated with a number of symbol blocks in every predetermined range of the data length, and a number of bits of the control information is associated with the number of symbol blocks.

In the transmitting device of the present disclosure, the header generator generates the data length information by using a value obtained by subtracting a value of the control information from a maximum value of the predetermined range of the data length as the data length.

In the transmitting device of the present disclosure, the header generator generates the data length information by using a value obtained by adding a value of the control information to a minimum value of the predetermined range of the data length as the data length.

In the transmitting device of the present disclosure, the number of bits of the control information is associated with the number of symbol blocks adjusted to a value which is a multiple of 3.

In the transmitting device of the present disclosure, the header generator adjusts the number of symbol blocks by adding padding information after the data field.

In the transmitting device of the present disclosure, the header generator adjusts the number of symbol blocks by placing an extension field between the extension header and the extension preamble.

In the transmitting device of the present disclosure, data is stored in the extension field, and a length of the extension field is stored in the legacy header.

In the transmitting device of the present disclosure, the data length is associated with the number of symbol blocks in every predetermined range of the data length, in accordance with a plurality of MCS information related to coding and modulation schemes included in the legacy header, if the number of symbol blocks is a predetermined threshold value or less, the number of bits of the control information is associated with first MCS information and the number of symbol blocks, and if the number of symbol blocks exceeds the threshold value, the number of bits of the control information is associated with second MCS information and a number of symbol blocks adjusted to a value which is a multiple of 3.

In the transmitting device of the present disclosure, the header generator assigns a bit pattern of a part of the data length information to the control information.

A transmission method of the present disclosure comprises: generating a legacy header in which control information related to an extension preamble is added to data length information that indicates a data length of a transmission signal; generating the transmission signal using a frame format arranged in order of the generated legacy header, an extension header, the extension preamble, and a data field; and transmitting the generated transmission signal, wherein the data length of the transmission signal indicates a length obtained by adding up the extension header, the extension preamble, and the data field.

An aspect of the present disclosure is favorable for a communication system conforming to the 11ay standard.

What is claimed is:

1. A reception apparatus comprising:
reception circuitry which, in operation, receives a signal including a legacy header field, an enhanced directional multi-gigabit (EDMG) header field, and a data field; and
decoding circuitry which, in operation, decodes data included in the data field of the received signal, wherein:
the legacy header field includes a Length field comprising multiple bits,
the reception apparatus is an EDMG terminal, and a subset of the multiple bits of the Length field included in the legacy header field is for indicating bandwidth over which the signal is transmitted, and
remaining bits of the Length field included in the legacy header field are for indicating data length information of the received signal.

2. The reception apparatus according to claim 1, wherein the bandwidth comprises one or more channels over which the signal is transmitted.

3. The reception apparatus according to claim 2, wherein the one or more channels are any of a 2.16 GHz band, a combination of 2.16 GHz bands, a concatenation of 2.16 GHz bands, and a combination of concatenated 2.16 GHz bands.

4. The reception apparatus according to claim 1, wherein the remaining bits of the Length field is set so that spoofing error is less than a threshold value and is non-negative.

5. A reception method for a reception apparatus, the reception method comprising:
receiving a signal including a legacy header field, an enhanced directional multi-gigabit (EDMG) header field and a data field; and
decoding data included in the data field of the received signal, wherein:
the legacy header field includes a Length field comprising multiple bits,
the reception apparatus is an EDMG terminal, and a subset of the multiple bits of the Length field included in the legacy header field is for indicating bandwidth over which the signal is transmitted, and
remaining bits of the Length field included in the legacy header field are for indicating data length information of the received signal.

6. The reception method according to claim 5, wherein the bandwidth comprises one or more channels over which the signal is transmitted.

7. The reception method according to claim 6, wherein the one or more channels are any of a 2.16 GHz band, a combination of 2.16 GHz bands, a concatenation of 2.16 GHz bands, and a combination of concatenated 2.16 GHz bands.

8. The reception method according to claim 5, wherein the remaining bits of the Length field is set so that spoofing error is less than a threshold value and is non-negative.

* * * * *